United States Patent [19]

Oshima et al.

[11] Patent Number: 5,740,463
[45] Date of Patent: Apr. 14, 1998

[54] INFORMATION PROCESSING SYSTEM AND METHOD OF COMPUTATION PERFORMED WITH AN INFORMATION PROCESSING SYSTEM

[75] Inventors: Takeharu Oshima; Toshiyuki Tamura; Satoru Kotoh; Hirono Tsubota; Shinji Komori; Shinji Nakashima, all of Tokyo; Hiroaki Terada; Makoto Iwata, both of Osaka; Katsuhito Yamaguchi, Hyogo; Junji Onishi, Osaka; Akira Kondo, Hyogo, all of Japan

[73] Assignee: Mitsubishi Denki Kabushiki Kaisha, Tokyo, Japan

[21] Appl. No.: 504,583

[22] Filed: Jul. 20, 1995

[30] Foreign Application Priority Data

Jul. 22, 1994 [JP] Japan .................................. 6-171385
Jul. 17, 1995 [JP] Japan .................................. 7-180195

[51] Int. Cl.$^6$ .............................. G06F 13/38; G06F 15/16
[52] U.S. Cl. ...................... 395/800.11; 395/800.12; 364/DIG. 1; 364/DIG. 2
[58] Field of Search ................. 395/800, 200.15, 395/287, 210.16, 405, 200.1, 500, 200.02, 312, 773, 800.22, 11, 800.12, 124, 24, 377, 21, 800.14, 200.78, 800.16, 800.11; 364/DIG. 1, DIG. 2; 382/304, 306

[56] References Cited

U.S. PATENT DOCUMENTS

| | | | |
|---|---|---|---|
| 4,908,751 | 3/1990 | Smith | 395/800.12 |
| 4,939,642 | 7/1990 | Blank | 395/800.22 |
| 4,975,834 | 12/1990 | Xu et al. | 395/800 |
| 5,339,396 | 8/1994 | Muramatsu et al. | 395/800 |
| 5,513,364 | 4/1996 | Nishikawa | 395/287 |
| 5,522,060 | 5/1996 | Kawase et al. | 395/479 |
| 5,546,596 | 8/1996 | Geist | 395/800 |
| 5,588,152 | 12/1996 | Dapp et al. | 395/800 |

FOREIGN PATENT DOCUMENTS

| | | |
|---|---|---|
| 0 536946 A2 | 4/1993 | European Pat. Off. . |
| 0536946A3 | 4/1993 | European Pat. Off. . |
| 63-147258 | 6/1988 | Japan . |
| 2 201817 | 9/1988 | United Kingdom . |

OTHER PUBLICATIONS

Microprocessing & Microprogramming, vol. 25, No. 1–5, pp. 229–232, Jan. 1, 1989, E. S. T. Fernandes, et al., "MPH — A Hybrid Parallel Machine".

Journal of Parallel and Distributed Computing, vol. 19, No. 4, pp. 308–322, Dec. 1993, Shlomit Weiss, et al., "Architectural Improvements for a Data–Driven VLSI Processing Array".

(List continued on next page.)

*Primary Examiner*—Daniel H. Pan
*Attorney, Agent, or Firm*—Oblon, Spivak, McClelland, Maier & Neustadt, P.C.

[57] ABSTRACT

Intercommunication of data between adjacent element processors (3) is performed through a memory unit (6) which is independently accessible to the respective element processors (3) without interfere with the operations of the other element processors (3). Thus, memory access and data transfer can be achieved without interfere with the operations of individual element processor (3). Furthermore, it becomes possible to solve differential equations by asynchronous communication system.

77 Claims, 59 Drawing Sheets

OTHER PUBLICATIONS

Parallel Computing, vol. 12, No. 2, pp. 131–144, Nov. 1989, L. Hart, et al., "Asynchronous Multilevel Adaptive Methods for Solving Partial Differential Equations on Multiprocessors: Basic Ideas".

Microprocessing & Microprogramming, vol. 20, Nos. 1–3, pp. 113–118, Apr. 1987, C. Siva Ram Murthy, et al., "A Multi–Microprocessor Architecture for Solving Partial Differential Equations".

Proceedings of the Third International Conference on Calorimetry in High Energy Physics, pp. 553–566, D. Corsetto, "Programmable Level–1 Trigger for Calorimeter".

IEEE Transactions on Consumer Electronics, vol. 36, No. 3, pp. 327–333, Aug. 1, 1990, Ulrich Schmidt, et al., "Data–Driven Array Processor for Video Signal Processing".

Data Units: A Process Interaction Paradigm; William P. Delaney, Department of Electrical and Computer Engineering, University of Arizona, Tucson, AZ; David L. Cohn, Department of Computer Science and Engineering, University of Notre Dame, Notre Dame, IN; Karen M. Tracey and Michael R. Casey, Department of Electrical Engineering, University of Notre Dame, Notre Dame, IN; Mar. 1991, pp. 1–16.

Using Kernel–Level Support for Distributed Shared Data; David L. Cohn, Paul M. Greenwalt, Michael R. Casey, Matthew P. Stevenson; Department of Computer Science and Engineering, University of Notre Dame, Notre Dame, IN 46556; March 1991.

Proceedings of The International Conference on Application Specific Array Processors, pp. 190–201, Sep. 5, 1990, Brent Baxter, et al., "Building Blocks for a New Generation of Application–Specific Computing Systems".

Journal of Scientific Computing, vol. 1, No. 1, pp. 53–73, Jun. 26, 1986, Daniel M. Nosenchuck, et al., "Two Dimensional nonsteady Viscous Flow Simulation on the Navier–Stokes Computer Mininode".

FLAG INDICATING NECESSITY OR NOT OF COMMUNICATION OF LATTICE POINT IN SOUTH DIRECTION

FLAG INDICATING NECESSITY OR NOT OF COMMUNICATION OF LATTICE POINT IN NORTH DIRECTION

FLAG INDICATING NECESSITY OR NOT OF COMMUNICATION OF LATTICE POINT IN EAST DIRECTION

FLAG INDICATING NECESSITY OR NOT OF COMMUNICATION OF LATTICE POINT IN WEST DIRECTION

FIG. 46

TRANSFER TO
HOST COMPUTER

INFORMATION PROCESSING SYSTEM AND METHOD OF COMPUTATION PERFORMED WITH AN INFORMATION PROCESSING SYSTEM

BACKGROUND OF THE INVENTION

1. Field of the Invention

The present invention relates to the construction and the method of computation of an information processing system for greatly improving processing performance by means of parallel processors and, more specifically, to increase of speed in numerical calculations of differential equations.

2. Description of the Background Art

In the solution of differential equations which is the main field of application of the present invention, the object equation is solved with the calculus of finite differences through interaction of mutually adjacent lattice points in analytic time and space which is discrete in space and time. In the past, those problems have been analyzed by the method of either sequential calculation by Neumann's computer or parallel calculation on multi-processor computers.

Moreover, in recent years, large-scale estimation by numerical analysis of heat and fluid is being made in weather forecasting or environmental assessment of atmospheric & ocean pollution, for example. In weather forecasting, a weather report is issued by estimating the movement of atmosphere such as movement of high & low air pressures, course of typhoon, etc. based on the air pressure, wind velocity, atmospheric temperature, solar radiation, etc. In environmental assessment, the way the source of pollution is diffused by air currents or tidal currents is evaluated through estimation of the current velocity and the concentration of polluting matters. A large number of supercomputers are put into operation for such jobs and a great amount of time is spent for computation. In this way, a lot of computer resources have been put into operation and great efforts have so far been made to improve the computing speed and the accuracy of estimation, prevent disasters due to winds and rains and to prevent destruction of environments. Methods of dealing with this kind of problems on multi-processor machines are being tried and, as shown in the collection of papers No. 558, vol. 59, pp. 427–432 (literature 1) of the Japanese Society of Mechanical Engineers and the collection of papers No. 569, vol. 60, pp. 99–106 (literature 2) of the Japanese Society of Mechanical Engineers, use is made of that domain decomposition method which consists in dividing a discrete analytic area into blocks and assigning the respective split areas to single element processors so as to perform parallel processing by means of a multi-processor system which consists of multiple element processors.

FIG. 68 is a general construction drawing of the system for performing the domain decomposite dividing process by combining element processors by means of near-neighbor mesh indicated in literature 1 which is an example of prior art. In the drawing, 201 is an element processor acting on a single assigned subdomain, 202 is a connection between element processors for data communication between element processors 201, 203 is the host computer for integrally controlling the element processors 201, 204 is an interface board for connecting the host computer 203 and the element processors 201, and 205 is a transpurer board on which 4 element processors 201 are mounted.

Moreover, in the example of prior art in literature 2, a parallel general purpose computer AP1000 is used and the element processors 201 are connected by means of a similar near-neighbor mesh.

In the parallel computation method utilizing those multi-processor systems for general use, low-speed communication such as packet communication, etc. is used for the communication between processors. Moreover, because synchronization of processing is necessary between processors, there exists an overhead at the time of data transfer between element processors 201 and this limits the efficiency of parallel computation as the number of units of element processors 201 increases.

FIG. 69 is a drawing showing the efficiency saturation in parallel computation due to the increase in the number of units of element processors in the case of computational fluid dynamics which is an example of solving partial differential equations as indicated in literature 2 and uses the finite difference method. In the drawing, abscissa indicates the number of units of element processors 201, the axis of ordinate indicates the improvement ratio of operation speed, the mark ○ is the operation speed improvement in a case where the MAC (Marker And Cell) method is used, the mark △ is the operation speed improvement in the case of use of the SMAC (Simplified MAC) method, the mark □ is the operation speed improvement of a case where the HSMAC (Highly Simplified MAC) method is used, and the solid line indicates the operation speed improvement proportional to the number of element processors 201. In the MAC method, SMAC method and HSMAC method, the increase in efficiency of parallel computations slows as the number of element processors 201 increases due to the overhead of the data transfer. Moreover, to look at the possibility of parallel operations in the analysis of partial differential equations, it was not sufficient for the conventional numerical analysis using existing hardware to incorporate parallel operations into the analysis of partial differential equations, because of the emphasis put on the universality of the hardware architecture.

In other words, even by using supercomputers or parallel computers for general use, it was difficult to analyze large-scale partial differential equations rapidly and yet at low cost.

Because the conventional solving system of differential equations was a process as described above, the main stream in the solution of partial differential equations has been the domain decomposition method using parallel processors for general use such as nCUBE, AP-1000, Transputer, etc. For the communication between those multi-processors, low-speed communication such as packet communication, etc. is used. As far as the existing hardware architecture is retained, there is no choice but attach much importance to parallel and/or concurrent processing between processors. Namely, while the solution by domain decomposition method was effective to some extent for the parallel processing of coarse grain parallel processing in which the operation time represents a larger proportion compared with the communication time in the entire time required for computation, it had a problem that the overhead at the time of data transfer increases and this causes a drop of efficiency of parallel computation in the fine grain parallel processing in which the computation time represents a larger proportion compared with the operation time appearing in the analysis of differential equations.

Moreover, while various methods are devised for raising the latency tolerance (countermeasure against the problem of waiting for data) by improving software, a problem was that it was impossible to radically change the communication system as far as the existing hardware is used and therefore there was no way to sharply decrease the waiting time for synchronization of communication.

Furthermore, another problem was that the parallel processing on the level of operation in the processor depends on the architecture of the hardware and no effective measure can be taken on the software.

SUMMARY OF THE INVENTION

The present invention is directed to an information processing system. According to the first aspect of the present invention, the information processing system comprises: a plural number of element processors respectively having processing units for performing computing operations and data memories for storing data regarding the computing operations for performing computation by assigning, regarding at least one governing equation of a field which can be described in at least one prescribed equation by using the plural number of element processors, a plural number of lattice points obtained by spatially dividing the field to the element processors; and a plural number of data buses for having mutual communications of the data between adjacent ones of the element processors. In the information processing system, the computation is performed by operating the element processors asynchronously and independently by using the data transmitted through the data buses.

According to the second aspect of the present invention, the information processing system comprises: a plural number of element processors respectively having processing units for performing computing operations and data memories for storing data regarding the operations for performing computation by assigning, regarding at least one governing equation of a field which can be described in at least one prescribed equation by using the plural number of element processors, a plural number of lattice points obtained by spatially dividing the field and a plural number of time steps corrdsponding to identical ones of the lattice points to the element processors; and a plural number of data buses for having mutual communications of the data between adjacent ones of the element processors. In the information processing system, the computation is performed by operating the element processors asynchronously and independently by using the data transmitted through the data buses.

According to the third aspect of the present invention, in the information processing system of the second aspect, a plural number of two-dimensional planes, in which the element processors performing the processing of the lattice points obtained by spatially dividing a two-dimensional field are two-dimensionally arranged, are arranged along the time base to be constructed three-dimensionally, when a two-dimensional analytical solution is looked for, and the element processors are constructed in pipeline in the direction of time base.

According to the fourth aspect of the present invention, the information processing system of the first or second aspect further comprises transmission means for transmitting initial conditions and boundary conditions to the element processors.

According to the fifth aspect of the present invention, in the information processing system of the first or second aspect, data communications between the adjacent element processors are performed individually for each of the element processors, asynchronously and repeatedly.

According to the sixth aspect of the present invention, in the information processing system of the first or second aspect, data communications between the adjacent element processors are message communications and performed with multiple instruction stream and multiple data stream.

According to the seventh aspect of the present invention, in the information processing system of the first or second aspect, the element processors can directly refer, respectively, to the data memory of the adjacent element processors.

According to the eighth aspect of the present invention, in the information processing system of the seventh aspect, the element processors can directly refer to and renew, respectively, the data memory of the adjacent element processors.

According to the ninth aspect of the present invention, in the information processing system of the first or second aspect, the data memories include, on the routes connecting the adjacent element processors, first memories shared by the adjacent element processors and can directly refer to and renew the content stored in the first memories from a plural number of the element processors connected to the first memories.

According to the tenth aspect of the present invention, in the information processing system of the seventh aspect, the data memories include multiport memories.

According to the eleventh aspect of the present invention, the information processing system of the first or second aspect further comprises buffer means for temporarily buffering access demand to the data memories.

According to the twelfth aspect of the present invention, in the information processing system of the first or second aspect, the element processors respectively have buffer memories to which data sent from the adjacent element processors are written as data with object name in communications between the adjacent element processors, and the element processors complete reception of data from the adjacent element processors by searching data with object name at optional timing from the buffer memories.

According to the thirteenth aspect of the present invention, in the information processing system of the first or second aspect, the element processors respectively have matching memories for waiting for the data necessary for at least one of the computing operations, and the processing unit in each of the element processors performs at least one prescribed operation among the computing operations at the point in time sequence when the necessary data are available in the matching memory in the same.

According to the fourteenth aspect of the present invention, in the information processing system of the first or second aspect, the element processors respectively have program memories available for rewriting the program stipulating the operations of the processing units.

According to the fifteenth aspect of the present invention, in the information processing system of the first or second aspect, each of the processing units works based on a data flow system which enables simultaneous execution of a plural number of the program assigned to different areas of each of the program memories, and each of the processing units executes the computing operations of a plural number of the lattice points simultaneously by assigning a plural number of programs for processing the respective lattice points to different areas of each of the program memories.

According to the sixteenth aspect of the present invention, in the information processing system of the fifteenth aspect, the data flow system includes a dynamic data driven system capable of simultaneously executing one same program on input data of a plural number of sets with the use of identifiers.

According to the seventeenth aspect of the present invention, in the information processing system of the first or second aspect, the processing units respectively have hardware circuits in which arithmetic-logic elements are wired in the shape based on a data flow graph according to the wired-logic for part or whole of the data processing flow.

According to the eighteenth aspect of the present invention, in the information processing system of the first or second aspect, the processing units respectively have hardware circuits according to one same wired-logic, the hardware circuits load in advance the data memories of the element processors with internal point bits indicating that the lattice points are positioned inside a computing area in the field or outside the object in the computing area with respect to all of the lattice points, with the external point bits indicating that the lattice points are positioned outside the computing area or inside an object in the computing area and with boundary condition bits indicating information of boundary conditions with respect to the lattice points positioned on the boundary of the computing area, and the hardware circuits change the processing of the data flow graph according to internal point bits, the external point bits and the boundary condition bits.

According to the nineteenth aspect of the present invention, in the information processing system of the seventeenth aspect, the processing units further respectively have arithmetic devices for directly executing operation codes for cumulatively adding the respective results of multiplication of first input by second input, third input by fourth input, fifth input by sixth input, ..., (2×N−1)-th input by (2×N)-th input to 2N pieces of input data.

According to the twentieth aspect of the present invention, the information processing system of the first or second aspect, further comprises fine node couplings connecting the adjacent element processors to each other and coarse node couplings connecting the element processors to each other by skipping no less than one the element processors between them.

According to the twenty-first aspect of the present invention, in the information processing system of the first or second aspect, the element processors respectively have output units for asynchronously reading output data, furnishing that output data with identifiers necessary for arranging and sorting of data and sending data to outside the element processors.

According to the twenty-second aspect of the present invention, the information processing system of the twenty-first aspect, further comprises output data image processing unit for collecting output data from the output units of the element processors and generating visible images of the output data in real time based on the output data arriving asynchronously from all of the element processors.

According to the twenty-third aspect of the present invention, the information processing system of the first or second aspect, further comprises coordinate conversion unit for convening an first coordinate system used by a host computer controlling the element processors to a second coordinate system used by the element processors when data are transferred from the host computer to the element processors, and converting the second coordinate system used by the element processors to the first coordinate system used by the host computer when data are transferred from the element processors to the host computer.

According to the twenty-fourth aspect of the present invention, in the information processing system of the first or second aspect, the plural number of element processors integrally controlled by a host computer respectively comprise first convergence judging units, provided in each of the element processors and independently of the processing units, for judging convergence without disturbing the computation of the processing units, and the information processing system further comprising: first communication routes for dividing a plural number of the element processors into a plural number of groups and connecting the first convergence judging units of the respective element processors in the form of a unidirectional closed loop or in a centralized form in the respective groups; second convergence judging units, connected to the first communication routes respectively, for integrating the results of judgment of convergence of all the first convergence judging units in the groups; and second communication routes for connecting all of the second convergence judging units of the groups in the form of a unidirectional closed loop or in a centralized form.

According to the twenty-fifth aspect of the present invention, the information processing system of the first or second aspect, further comprises: at least one route for transferring messages of a plurality of the element processors; first convergence judging means for judging convergences on the element processors or no less than one processing means assigned to each of the element processors; first message sending means for sending a first message indicating the convergence on a prescribed element processor or the processing means of the prescribed element processor when the first convergence judging means judges the convergence on the prescribed element processor or the processing means of the same; second message sending means for sending a second message indicating the convergence on the element processor or the processing means receiving the first or second message from the adjacent element processor or the adjacent element processor after the element processor or the processing means receiving the first or second message; and second convergence judging means for judging the convergence of all the element processors by transferring the second message one after another through the at least one route by the second sending means.

According to the twenty-sixth aspect of the present invention, in the information processing system of the twenty-fifth aspect, the at least one route includes a plurality of different routes connecting the processing means, and the second convergence judging means confirms the convergence of all the element processors in multiplex ways by the messages transferred one after another through the plurality of different routes.

The present invention is also directed a method of computation performed by using an information processing system. According to the twenty-seventh aspect of the present invention, in the method, the information processing system comprises: a plural number of element processors respectively having processing units for performing computing operations and data memories for storing data regarding the computing operations for performing computation by assigning, regarding at least one governing equation of a field which can be described in at least one prescribed equation by using the plural number of element processors, a plural number of lattice points obtained by spatially dividing the field to the element processors; and a plural number of data buses for having mutual communications of the data between adjacent ones of the element processors, wherein the computation is performed by operating the element processors asynchronously and independently by using the data transmitted through the data buses.

According to the twenty-eighth aspect of the present invention, in the method, the information processing system comprises: a plural number of element processors respectively having processing units for performing computing operations and data memories for storing data regarding the operations for performing computation by assigning, regarding at least one governing equation of a field which can be described in at least one prescribed equation by using the plural number of element processors, a plural number of lattice points obtained by spatially dividing the field and a plural number of time steps corresponding to identical ones of the lattice points to the element processors; and a plural number of data buses for having mutual communications of the data between adjacent ones of the element processors, wherein the computation is performed by operating the element processors asynchronously and independently by using the data transmitted through the data buses.

According to the twenty-ninth aspect of the present invention, in the method of the twenty-eighth aspect, a plural number of two-dimensional planes, in which the element processors performing the processing of the lattice points obtained by spatially dividing a two-dimensional field are two-dimensionally arranged, are arranged along the time base to be constructed three-dimensionally, when a two-dimensional analytical solution is looked for, and the element processors are constructed in pipeline in the direction of time base.

According to the thirtieth aspect of the present invention, in the method of the twenty-seventh or twenty-eighth aspect, the at least one prescribed equation includes at least one differential equation, and the at least one prescribed equation obtains the solution to the at least one differential equation by operating the element processors asynchronously and independently by finite difference method.

According to the thirty-first aspect of the present invention, in the method of the thirtieth aspect, the at least one prescribed differential equation includes at least one partial differential equation or at least one ordinary differential equation.

According to the thirty-second aspect of the present invention, in the method of the twenty-seventh or twenty-eighth aspect, the element processors take charge of computation of a plural number of lattice points obtained by spatially dividing the field respectively, and the number corresponding to the lattice points or the base address of the data area corresponding to the lattice points on the data memories are used as input tokens to control the computation performed by the element processors.

According to the thirty-third aspect of the present invention, in the method of the twenty-seventh or twenty-eighth aspect, the information processing system performs the computation by using transmission means for transmitting initial conditions and boundary conditions to the element processors.

According to the thirty-fourth aspect of the present invention, in the method of the twenty-seventh or twenty-eighth aspect, data communications between the adjacent element processors are performed individually for each of the element processors, asynchronously and repeatedly.

According to the thirty-fifth aspect of the present invention, in the method of the twenty-seventh or twenty-eighth aspect, data communications between the adjacent element processors are message communications and performed with multiple instruction stream and multiple data stream.

According to the thirty-sixth aspect of the present invention, in the method of the twenty-seventh or twenty-eighth aspect, the element processors directly refer, respectively, to the data memories of the adjacent element processors.

According to the thirty-seventh aspect of the present invention, in the method of the thirty-sixth aspect, the element processors directly refer to and renew, respectively, the data memories of the adjacent element processors.

According to the thirty-eighth aspect of the present invention, in the method of the twenty-seventh or twenty-eighth aspect, the data memories include, on the routes connecting the adjacent element processors, first memories shared by the adjacent element processors and directly refer to and renew the content stored in the first memories from a plural number of the element processors connected to the first memories.

According to the thirty-ninth aspect of the present invention, in the method of the thirty-sixth aspect, the data memories include multiport memories.

According to the fortieth aspect of the present invention, in the method of the twenty-seventh or twenty-eighth aspect, the information processing system performs the computation by using buffer means for temporarily buffering access demand to the data memories.

According to the forty-first aspect of the present invention, in the method of the twenty-seventh or twenty-eighth aspect, the element processors respectively comprise buffer memories to which data sent from the adjacent element processors are written as data with object name in communications between the adjacent element processors, and the element processors complete reception of data from the adjacent element processors by searching data with object name at optional timing from the buffer memories.

According to the forty-second aspect of the present invention, in the method of the twenty-seventh or twenty-eighth aspect, the element processors respectively comprise matching memories for waiting for the data necessary for at least one of the computing operations, and the processing unit in each of the element processors performs at least one prescribed operation among the computing operations at the point in time when the necessary data are available in the matching memory in the same.

According to the forty-third aspect of the present invention, in the method of the twenty-seventh or twenty-eighth aspect, the element processors respectively comprise program memories available for rewriting the program stipulating the computing operations of the processing units.

According to the forty-fourth aspect of the present invention, in the method of the twenty-seventh or twenty-eighth aspect, the processing units perform the computing operations by using one same computation program, the computation program loads in advance the data memories of the element processors with internal point bits indicating that the lattice points are positioned inside a computing area in the field or outside the object in the computing area or inside an object in the computing area with the external point bits indicating that the lattice points are positioned outside the computing area, and with boundary condition bits indicating information of boundary conditions with respect to the lattice points positioned on the boundary of the computing area, and the computation program changes the processing on the element processors according to the internal point bits, the external point bits and the boundary condition bits.

According to the forty-fifth aspect of the present invention, in the method of the twenty-seventh or twenty-eighth aspect, each of the processing units works based on a data flow system which enables simultaneous execution of a plural number of the program assigned to different areas of each of the program memories, and each of the processing units executes the computing operations of a plural number of the lattice points simultaneously by assigning a plural number of programs for processing the respective lattice points to different areas of the program memories.

According to the forty-sixth aspect of the present invention, in the method of the forty-fifth aspect, the data flow system includes a dynamic data driven system capable of simultaneously executing one same program on input data of a plural number of sets with the use of identifiers.

According to the forty-seventh aspect of the present invention, in the method of the forth-sixth aspect, the processing units calculate the address of the data memories which store data regarding the adjacent element processors and make reference to and renewal of the data memories by using the address of the data memories, based on the value of the identifiers assigned to the input data.

According to the forty-eighth aspect of the present invention, in the method of the twenty-seventh or twenty-eighth aspect, the processing units respectively have hardware circuits in which arithmetic-logic elements are wired in the shape based on a data flow graph according to the wired-logic for part or whole of the data processing flow.

According to the forty-ninth aspect of the present invention, in the method of the twenty-seventh or twenty-eighth aspect, the processing units respectively have hardware circuits according to one same wired-logic, the hardware circuits load in advance the data memories of the element processors with internal point bits indicating that the lattice points are positioned inside a computing area in the field or outside the object in the computing area or inside an object in the computing area with respect to all of the lattice points, with the external point bits indicating that the lattice points are positioned outside the computing area or inside an object in the computing area, and with boundary condition bits indicating information of boundary conditions with respect to the lattice points positioned on the boundary of the computing area, and the hardware circuits change the processing of the data flow graph according to the internal point bits, the external point bits and the boundary condition bits.

According to the fifties aspect of the present invention, in the method of the forth-eighth aspect, the processing units respectively have arithmetic devices for directly executing operation codes for cumulatively adding the respective results of multiplication of first input by second input, third input by fourth input, fifth input by sixth input, . . . , (2×N−1)-th input by (2×N)-th input to 2N pieces of input data.

According to the fifty-first aspect of the present invention, in the method of the forty-eighth aspect, the information processing system levels the number of times of communications at all of the lattice points by performing dummy communications even for the lattice points with small number of times of communications for solving the at least one governing equation of the field because the lattice points forming the subject of computation are found on the border of areas.

According to the fifty-second aspect of the present invention, in the method of the twenty-seventh or twenty-eighth aspect, the information processing system levels the number of times of operations at all of the lattice points by performing dummy operations even for the lattice points with small number of times of operations for solving the at least one governing equation of the field because the lattice points forming the subject of computation are found on the border of areas.

According to the fifty-third aspect of the present invention, in the method of the twenty-seventh or twenty-eighth aspect, the information processing system which performs processing of each of the lattice points for finding solution to at least one differential equation by finite difference method and performs communications between the respective lattice points, information indicating the necessity or not of communication and the method of communication for each of the lattice points.

According to the fifty-fourth aspect of the present invention, in the method of the twenty-seventh or twenty-eighth aspect, the information processing system which performs processing of each of the lattice points for finding solution to at least one differential equation by finite difference method assigns a memory area to each of the lattice points, performs communications between information of adjacent lattice points by the memory area and provides each of the lattice points with information for indicating the memory area to be used for communication in each direction where communication should be made.

According to the fifty-fifth aspect of the present invention, in the method of the fifty-fourth aspect, the information processing system provides each of the lattice points with information indicating a common dummy area in the direction where communication is impossible.

According to the fifty-sixth aspect of the present invention, in the method of the twenty-seventh or twenty-eighth aspect, when the adjacent lattice points are assigned over different the element processors, the element processors on both sides hold two pairs of data in time for intercommunication and, when the data for those lattice points has been renewed, the processors do not rewrite the data if any displacement of the renewed data is no larger than the prescribed value in comparison with the data of the chronologically previous pair.

According to the fifty-seventh aspect of the present invention, in the method of the fifty-fourth aspect, the information processing system assigns, to the data memory, virtual data area simulating lattice points which are closest to the border of the computation area forming the subject of the calculation of the at least one prescribed equation and found outside the computation area.

According to the fifty-eighth aspect of the present invention, in the method of the twenty-seventh or twenty-eighth aspect, the information processing system comprises fine node coupling connecting mutually adjacent the element processors to each other and coarse node coupling connecting the element processors to each other by skipping no less than one the element processors between them.

According to the fifty-ninth aspect of the present invention, in the method of the fifty-eighth aspect, the information processing system advances computation of the at least one prescribed equation by alternately performing computation by the element processors connected by the coarse node coupling and computation by the element processors connected by the fine node coupling.

According to the sixtieth aspect of the present invention, in the method of the twenty-seventh or twenty-eighth aspect, the information processing system performs calculation of the at least one governing equation of the field using only part of the lattice points selected, in parallel with the calculation of the at least one governing equation of the field using all of the lattice points.

According to the sixty-first aspect of the present invention, in the method of the twenty-seventh or twenty-eighth aspect, the algorithm of the calculation of the at least one governing equation of the field using only selected ones of the lattice points is different from the algorithm used for the calculation of the at least one prescribed governing equation of the field using all of the lattice points.

According to the sixty-second aspect of the present invention, in the method of the sixty-first aspect, the information processing system has no less than two pairs of data regarding mutually adjacent the lattice points in time sequence and stops the operation of the lattice points if the amount of fluctuation between the pairs of data is no larger than the prescribed amount.

According to the sixty-third aspect of the present invention, in the method of the sixty-second aspect, the value of the prescribed amount for omitting the operation of the lattice points depending on the value of fluctuation between the pairs of data is reduced according to the grade of convergence.

According to the sixty-fourth aspect of the present invention, in the method of the twenty-seventh or twenty-eighth aspect, the element processors respectively have output units for asynchronously reading output data, furnishing that output data with identifiers necessary for arranging and sorting of data and sending data to outside the element processors.

According to the sixty-fifth aspect of the present invention, in the method of the sixty-fourth aspect, the information processing system comprises output data image processing unit for collecting output data from the output units of the element processors and generating visible images of the output data in real time based on the output data arriving asynchronously from all the element processors.

According to the sixty-sixth aspect of the present invention, in the method of the twenty-seventh or twenty-eighth aspect, the information processing system comprises coordinate conversion unit for converting a first coordinate system used by a host computer controlling the element processors to a second coordinate system used by the element processors when data are transferred from the host computer to the element processors, and converting the second coordinate system used by the element processors to the first coordinate system used by the host computer when data are transferred from the element processors to the host computer.

According to the sixty-seventh aspect of the present invention, in the method of the twenty-seventh or twenty-eighth aspect, the plural number of element processors are a plural number of element processors integrally controlled by a host computer, the plural number of element processors comprise convergence judging units, provided in each of the element processors and independently of the processing units respectively, for judging convergence without disturbing the computation of the processing unit, and the information processing system comprises first communication routes for dividing a plural number of the element processors into a plural number of groups and connecting the convergence judging units of the respective element processors in the form of a unidirectional closed loop or in a centralized form in the respective groups, and second communication routes connected to each of the first communication routes of the groups, and connecting all of the convergence judging units integrating the results of judgement of convergence of all the convergence judging units in the groups and all of the convergence judging units of the groups in the form of a unidirectional closed loop or in a centralized form.

According to the sixty-eighth aspect of the present invention, in the method of the twenty-seventh or twenty-eighth aspect, the information processing system comprises at least one route for transferring messages of a plurality of the element processors. The method of computation further comprises steps of (a)judging convergences on each of the element processors or no less than one processing means assigned to each of the element processors; (b)sending a first message indicating a prescribed element processor or a processing means of the prescribed element, when the information processing system judges the convergence on the prescribed element processor or the processing means of the prescribed element; (c)sending a second message indicating the convergence on the element processor or the processing means receiving the first or second message from the adjacent element processor or the adjacent element processor after the element processor or the processing means receiving the first or second message; and (d)judging the convergence of all the element processors by transferring the second message one after another by repeating the step (c).

According to the sixty-ninth aspect of the present invention, in the method of the sixty-eighth aspect, the information processing system repeats the step (a) to step (d) for a plurality of confirmations of the convergence of all the element processors.

According to the seventieth aspect of the present invention, in the method of the sixty-ninth aspect, the information processing system comprises second convergence judging means, the at least one route includes a plurality of different routes connecting the processing means, and the second convergence judging means confirms the convergence of all the element processors in multiplex ways by the messages transferred one after another through the plurality of different routes.

According to the seventy-first aspect of the present invention, in the method of the seventieth aspect, the information processing system forms judgement of convergence again by stopping the processing of all the element processors or the processing means, after the completion of general convergence has been judged by the processes which judge the general convergence.

According to the seventy-second aspect of the present invention, the method of computation performed by using an information processing system having a plural number of element processors further comprises steps of: initializing the storing means for storing the results of judgement of convergence; and judging convergence or not of the computation for the lattice points for the respective lattice points taken charge by the element processors and, if it is judged that convergence has not yet been reached, sets the storing means to the prescribed logical value.

According to the seventy-third aspect of the present invention, in the information processing system of the first or second aspect, the plural number of element processors share the data memory between the adjacent element processors, and each of the plural number of element processors comprises input/output control unit commonly connected to a plural number of data memories shared with the adjacent element processors for controlling input/output of data with one of the plural number of data memories by switching the direction of communication according to demand for access.

According to the seventy-third aspect of the present invention, the information processing system of the first or second aspect, further comprises a plural number of registers provided in correspondence to the plural number of element processors for temporarily storing the results of judgement of a convergence of an operation executed by each of the plural number of element processors; and a wired OR circuit for generating logical product of the output of a plural number of the registers.

According to the seventy-fifth aspect of the present invention, in the method of the twenty-seventh or twenty-eighth aspect, a plural number of the element processors share the data memory between the adjacent element processors, each of the plural number of element processors comprises input/output control unit commonly connected to a plural number of data memories shared with the adjacent element processors for controlling input/output of data with one of the plural number of data memories by switching the direction of communication according to demand for access, and each of the plural number of element processors refers to the content of the data memory through the input/output control unit.

According to the seventy-sixth aspect of the present invention, in the method of the twenty-seventh or twenty-eighth aspect, the information processing system temporarily stores, in the plural number of registers provided in correspondence to the plural number of element processors, the results of judgement of a convergence of the corresponding element processors, and executes operations while taking the logical product of the results of judgement of the convergence stored in a plural number of the registers with the wired OR circuit.

According to the seventy-seventh aspect of the present invention, in the method of the twenty-seventh or twenty-eighth aspect, the number of lattice points per one element processor including unstable lattice points for numerical analysis in which unstable factors exist is smaller than the number of lattice points per one element processor not including any unstable lattice points for numerical analysis.

By making data communications between adjacent element processors by means of the data buses of the first aspect or the twenty-seventh aspect and performing computation with that data by operating the element processors asynchronously and independently, it becomes possible to shorten the communication time between the element processors.

As described above, according to the information processing system of the first aspect or the method of computation performed by using an information processing system of the twenty-seventh aspect, computation is performed, in an information processing system for performing computation by assigning a plural number of lattice points obtained by spatially dividing a field to element processors, by having a plural number of data buses for having mutual communications of data between adjacent element processors and by using data transmitted by data buses and by operating the element processors asynchronously and independently, and this has an effect of making it possible to shorten the communication time between the element processors and thus increase the processing speed of the information processing system.

By making data communications between adjacent element processors by means of the data buses of the second aspect or the twenty-eighth aspect and performing computation with that data by operating the element processors asynchronously and independently, it becomes possible to shorten the communication time between the element processors.

According to the information processing system of the second aspect or the method of computation performed by using an information processing system of the twenty-eighth aspect, computation is performed, in an information processing system for performing computation by providing a plural number of lattice points in a way to spatially divide a field and correspond to a plural number of time steps, by further having a plural number of data buses for having mutual communications of data between adjacent element processors and by using data transmitted by data buses and by operating the element processors asynchronously and independently, and this has an effect of making it possible to shorten the communication time between the element processors and thus increase the processing speed of the information processing system.

The two-dimensional planes of the third aspect or the twenty-ninth aspect, in which element processors performing the processing of lattice points obtained by spatially dividing a two-dimensional field are two-dimensionally arranged, can shorten the communication time between the element processors and can shorten the computation time by performing computation on a plural number of times in parallel and designing the element processors in pipeline along the direction of time base.

According to the information processing system of the third aspect or the method of computation performed by using an information processing system of the twenty-ninth aspect, two-dimensional planes are arranged along the time base to be constructed three-dimensionally and the dimension in the direction of time base is constructed in pipeline, and this has an effect of making it possible to shorten the communication time between the element processors and thus increase the processing speed of the information processing system.

In the case where the prescribed equation in the thirtieth aspect is a differential equation and that the solution to the differential equation is obtained by using finite difference method, it is possible to obtain analytical solution of high accuracy because the influence of the lattice points adjacent to the lattice points forming the subject of the computation is very small.

According to the method of computation performed by using an information processing system of the thirtieth aspect, solution to at least one differential equation is obtained by operating element processors asynchronously and independently by difference calculus, and this has an effect of making it possible to shorten the processing time of the information processing system without sacrificing the accuracy of analysis.

In the partial differential equation or ordinary differential equation of the thirty-first aspect, analytical solution of high accuracy can be obtained because the influence of the lattice points adjacent to the lattice points forming the subject of the computation is negligible when the solution to the differential equation is obtained by using finite difference method.

According to the method of computation performed by using an information processing system of the thirty-first aspect, solution to at least one partial differential equation or at least one ordinary differential equation is obtained by operating element processors asynchronously and independently by difference calculus, and this has an effect of making it possible to shorten the processing time of the information processing system without sacrificing the accuracy of analysis.

The element processors in the thirty-second aspect take charge of computation of a plural number of lattice points obtained by spatially dividing the field respectively. For that reason, even mutual adjacent lattice points include some which extend over two element processors and some which do not. By controlling the operation of the element processors by using either the number corresponding to the lattice points or the base address of the data area corresponding to the lattice points as input tokens to transfer data between adjacent lattice points existing in different element processors, it becomes to perform data transfer between the element processors by directly having access to the data memory on the adjacent element processors, eliminate data transfer overhead between lattices and perform high-speed analysis by asynchronous control.

According to the method of computation performed by using an information processing system of the thirty-second aspect, the operation of the element processors is controlled by using, as input tokens, either the number corresponding to the lattice points or the base address of the data area corresponding to the lattice points on the data memory, and this has an effect of making it possible to directly have access to the data memory on the adjacent element processor and perform high-speed analysis by asynchronous control by eliminating data transfer overhead between lattices.

The transmission means according to the fourth aspect or the thirty-third aspect, if initial conditions and boundary conditions of computation to element processors are input for the host computer, resets the data memory on all element processors, assigns the initial conditions and boundary conditions of computation to element processors to the respective element processors through the network and the connection between element processors. And the respective element processors get into the standby state for starting computation.

The information processing system of the fourth aspect or the method of computation performed by using an information processing system of the thirty-third aspect, which have transmission means for transmitting initial conditions and boundary conditions to the processing unit, produce an effect of making it possible to realize computation of various initial conditions and boundary conditions with a simple procedure of inputting conditions in the host computer, by using one same construction of element processors.

By performing data communications between data processing units of the adjacent element processors in the fifth aspect or the thirty-fourth aspect individually for each processing unit, asynchronously and repeatedly, it becomes possible to have access to the data memory and continue the processing on the respective element processors utterly asynchronously without disturbing the processing in the adjacent element processors. Namely, communication can be established between adjacent element processors without disturbing the computation in the adjacent element processors.

According to the information processing system of the fifth aspect or the method of computation performed by using an information processing system of the thirty-fourth aspect, data communications between adjacent element processors are performed individually for each processing unit, asynchronously and repeatedly, making it possible to continue the processing quite asynchronously by having access to the data memory without disturbing the processing of the adjacent element processor and make communication without disturbing the operation of the adjacent element processor, and this has an effect of increasing the speed of operation.

By performing the communication between adjacent element processors in the sixth aspect or the thirty-fifth aspect by message communication and with multiple instruction stream and multiple data stream, it becomes possible to improve the efficiency of parallel processing.

According to the information processing system of the sixth aspect or the method of computation performed by using an information processing system of the thirty-fifth aspect, communications between adjacent element processors are message communications and performed with multiplex command flow and multiplex data flow, and this has an effect of increasing the processing speed of the information processing system by improving the efficiency of parallel processing.

In the element processors of the seventh aspect or the thirty-sixth aspect, the access to the data memory from adjacent element processors can be limited to the reference action only by directly referring, respectively, to the data memory of the adjacent element processors, and this can be done easily by each processing unit asynchronously and repeatedly, in the data communication between processing units of adjacent element processors.

According to the information processing system of the seventh aspect or the method of computation performed by using an information processing system of the thirty-sixth aspect, the element processors directly refer, respectively, to the data memory of adjacent element processors and data communications between adjacent element processors can be performed easily without collision of requests for renewal to one same memory address for each processing unit, asynchronously and repeatedly, and this has an effect of increasing the speed of processing of the information processing system by simplifying the arbitration of data buses for memory access.

The element processors of the eighth aspect or the thirty-seventh aspect can directly refer to and renew the data memory of adjacent element processors, and this makes it possible to sharply improve the efficiency of computation and complete the desired operations in a short time by allowing different element processors to directly have access to the data memory of others mutually, regarding the data of the adjacent lattices points the processing of which is to be taken charge by the respective element processors.

According to the information processing system of the eighth aspect or the method of computation performed by using an information processing system of the thirty-seventh aspect, the element processors directly refer to and renew, respectively, the data memory of the adjacent element processors, and this has an effect of reducing overhead for data communications between adjacent element processors and improving the computation efficiency.

A plural number of element processors connected to the memory of the ninth aspect or the thirty-eighth aspect can refer to and renew the content of memory stored in the memory, and this memory is shared by the adjacent element processors on the route connecting adjacent element processors. This makes it possible for improve the efficiency of computation by directly referring to and renewing the data of adjacent lattice points in the memory through I/O control unit, etc., for example.

According to the information processing system of the ninth aspect or the method of computation performed by using an information processing system of the thirty-eighth aspect, a memory shared by adjacent element processors is provided on the route connecting the adjacent element processors and the content of memory stored in the memory can be directly referred to and renewed from a plural number of element processors connected to the memory, and this has an effect of increasing the speed of processing of the information processing system by sharply improving the computation efficiency and shortening the computation time.

Since the data memory in the tenth aspect or the thirty-ninth aspect is a multiport memory, it becomes possible to simultaneously process memory reference commands given to the multiport memory by the element processor concerned and the adjacent element processors.

According to the information processing system of the tenth aspect or the method of computation performed by using an information processing system of the thirty-ninth aspect, the data memory is a multiport memory, and this has an effect of easily realizing high-speed operation of the information processing system by eliminating stagnation of processing, sharply contributing to the shortening of computation time in processings involving collision of references to one same memory address and enabling simultaneous processing of requests for reference to memory made to the multiport memory by the element processor concerted and the adjacent element processor.

Since buffer means in the eleventh aspect or the fortieth aspect temporarily buffers access commands to the data memories, there is no risk of interruption of the processing even in case of collision of renewal commands to one same memory address.

According to the information processing system of the eleventh aspect or the method of computation performed by using an information processing system of the fortieth aspect, the system comprises a buffer mechanism for temporarily buffering access demand to the data memory, and this has an effect of increasing the speed of processing of the information processing system by avoiding any interruption of processing due to collision of requests for renewal and thus avoiding any increase of computation time.

The buffer memories in the twelfth aspect or the forty-first aspect write the data sent from adjacent element processors, respectively, in communications between adjacent element processors, as data with object name, and the element processors complete reception of data from adjacent element processors by searching data with object name at optional timing from the buffer memories. This makes it possible to prevent any disturbance to the operation inside the respective element processors by the data communications between adjacent element processors.

According to the information processing system of the twelfth aspect or the method of computation performed by using an information processing system of the forty-first aspect, the element processors are further provided, respectively, with a buffer memory in which to write, in communications between adjacent element processors, data sent from the adjacent element processors as data with object name, and the element processors complete reception of data from the adjacent element processors by searching data with object name at optional timing from the buffer memory, and this has an effect of obtaining higher operating speed by preventing any interference to the operation inside the respective element processors due to data communications between adjacent element processors.

By keeping the matching memories in the thirteenth aspect or the forty-second aspect waiting for data necessary for at least one of the computing operations, each of the processing units in the element processors performs a certain amount of prescribed operations only at the point in time when the necessary data is available in the corresponding matching memory, transfers the results to the matching memory, sends out data to the adjacent element processor and also receives data from the adjacent element processor, thus enabling automatic synchronization between data and faster processing with less overhead of communication.

According to the information processing system of the thirteenth aspect or the method of computation performed by using an information processing system of the forty-second aspect, the processing unit performs a certain amount of prescribed operations only at the point in time when the necessary data is available in the matching memory, transfers the results to the matching memory, sends out data to the adjacent element processor and also receives data from the adjacent element processor, and this has an effect of enabling automatic processing with less overhead of communication and increasing the speed of processing of the information processing system.

The program memories in the fourteenth aspect or the forty-third aspect are available for rewriting the program stipulating the operations of the processing units and, in the case where the element processors are integrally controlled by host computer for example, make it possible to change the program by loading a new program in the program memories inside the processing units from the host computer through a network.

According to the information processing system of the fourteenth aspect or the method of computation performed by using an information processing system of the forty-third aspect, the system is constructed by comprising a program memory available for rewriting the program stipulating the operations of the processing unit and, in the case where the host computer integrally controlling the element processors is connected through a network, for example, it becomes possible to change the program by loading a new program in the program memory inside the processing unit from the host computer, and this has an effect of providing an information processing system highly applicable to general purposes.

The processing units in the forty-fourth aspect load in advance the data memories of the element processors with the internal point bits, the external point bits and the boundary condition bits so that they may perform operations by using one same computation program regardless of the kind of lattice points, and change the processing to the element processors by using the internal point bits, the external point bits and the boundary condition bits.

According to the method of computation performed by using an information processing system of the forty-fourth aspect, the processing unit performs operations by using one same computation program capable of changing the processing in the element processors with the internal point bits, the external point bits and the boundary condition bits, and this has the effect of making it possible to perform operations by using one same computation program regardless of the kind of lattice points and reduce the scale of the information processing system by simplifying the computation program.

Each of the processing units in the fifteenth aspect or the forty-fifth aspect works based on a data flow system which enables simultaneous execution of a plural number of programs assigned to different areas of each of the program memories. And, one same processing unit can execute the processing of a plural number of lattice points simultaneously by assigning a plural number of programs for processing the respective lattice points to different areas of the corresponding program memory.

According to the information processing system of the fifteenth aspect or the method of computation performed by using an information processing system of the forty-fifth aspect, the processing unit works based on a data flow system which enables simultaneous execution of a plural number of programs assigned to different areas of the program memory, and it executes the processing of a plural number of lattice points simultaneously by assigning a plural number of programs for processing respective lattice points to different areas of the program memory, and this has the effect of making it possible to reduce the scale of the information processing system and simplify the construction of the information processing system.

The processing units in the sixteenth aspect or the forty-sixth aspect work based on a dynamic data driven system capable of simultaneously executing one same program on the input data of a plural number of sets with the use of identifiers.

According to the information processing system of the sixteenth aspect or the method of computation performed by using an information processing system of the forty-sixth aspect, the data flow system is a dynamic data drive system capable of simultaneously executing one same program on said input data of a plural number of sets with the use of identifiers, and this has the effect of easily realizing simplification of construction of the information processing system.

The processing units in the forty-seventh aspect calculate the address of the data memories which store data regarding adjacent element processors based on the value of the identifiers assigned to the input data. And they refer to and renew the data memory by using the address of the data memories. For that reason, computation can be made easily by dynamic data driven system even in an information processing system which performs, individually for the respective processing units, data communication between the processing units of adjacent element processors asynchronously and repeatedly.

According to the method of computation performed by using an information processing system of the forty-seventh aspect, the system calculates the address of the data memory which stores data regarding adjacent element processors and refers to and renews the data memory by using the address of the data memory, based on the value of identifiers assigned to the input data, and this has the effect of easily realizing simplification of construction of the information processing system.

Because the processing units in the seventeenth aspect or the forty-eighth aspect are provided with hardware circuits in which computing elements are wired in the shape of a data flow graph according to the wired-logic for part or whole of the data processing flow, the respective data passes through the sequence of arithmetic elements one by one from the top of the data graph to be submitted to the processing one after another to automatically reach the final arithmetic element. When a series of operations are over, the results of computation are written in the data memory through data bus inside the processor and are also written at the same time in the data memory of the adjacent element processors through the connection between element processors.

According to the information processing system of the seventeenth aspect or the method of computation performed by using an information processing system of the forty-eighth aspect, the data processing unit is provided with a hardware circuit in which computing elements are wired in the shape of a data flow graph according to the wiring logic for part or whole of the data processing flow, and the respective data pass through the column of computing elements from the top of the data flow graph to be submitted to processing one after another and automatically reach the final computing element. When a series of operations are over, the data processing unit writes the results of computation in the data memory through the data bus inside the processors and writes those results of computation, at the same time, in the data memory of the adjacent element processors to complete the series of processing operation. Therefore, this invention has the effect of realizing high-speed operation by extracting the maximum parallel processing specializer for differential operations.

The processing units in the eighteenth aspect or the forty-ninth aspect load in advance the data memories of the element processors with the internal point bits, the external point bits and the boundary condition bits so that the computation may be made with hardware circuits according to one same wiring logic regardless of the kind of lattice points, and change the processing of data flow graph according to the internal point bits, the external point bits and the boundary condition bits.

According to the information processing system of the eighteenth aspect or the method of computation performed by using an information processing system of the forty-ninth aspect, the processing unit is provided with a hardware circuit according to one same wiring logic capable of changing the processing of the data flow graph according to the internal point bits, the external point bits and the boundary condition bits, and this has the effect of making it possible to perform computations with a hardware circuit according to one same wiring logic regardless of the kind of lattice points and reduce the scale of the information processing system by simplifying the computation program.

The processing units in the nineteenth aspect or the fiftieth aspect can increase, when executing operations for cumulatively adding the respective results of multiplication of first input by second input, third input by fourth input, fifth input by sixth input, . . . , (2×N−1)-th input by (2×N)-th input to 2N pieces of input data, the speed of operation processing which frequently uses those operations such as Navier-Stokes equation, for example, by directly calling the arithmetic device.

According to the information processing system of the nineteenth aspect or the method of computation performed by using an information processing system of the fiftieth aspect, the processing unit is provided with computing device for directly executing operation codes for cumulatively adding the respective results of multiplication of first input by second input, third input by fourth input, fifth input by sixth input, seventh input by eighth input to 8 pieces of input data, and executes operations of data flow graph according to the wiring logic to data input at the respective input terminals of the multiplier and outputs the results at the output terminals of the multiplier, thus presenting an effect of increasing the speed of solving equations such as differential equations, etc.

The element processors in the fifty-first aspect level the number of times of communications at all of the lattice points by increasing the number of times of communications of the lattice points with small number of times of communications for solving the governing equation of a field by having dummy communications even for lattice points with small number of times of communications.

According to the method of computation performed by using an information processing system of the fifty-first aspect, the number of times of communications at all the lattice points is levelled, and this produces an effect of raising the efficiency in parallel operations.

The element processors in the fifty-second aspect level the number of times of operations at all of the lattice points by increasing the number of times of operations of the lattice points with small number of times of operations for solving the governing equation of a field by having dummy operations even for lattice points with small amount of operations.

According to the method of computation performed by using an information processing system of the fifty-second aspect, the processing unit levels the number of times of communications at all the lattice points by performing dummy operations even for lattice points with small number of times of operations, and this produces an effect of raising the efficiency in parallel operations.

The element processors in the fifty-third aspect improve the efficiency of communications between lattice points by assigning the communication information between lattice points to the respective lattice points. For example, the element processors improve the efficiency of communication between lattice points by assigning the information of necessity or not of communication between lattice points and the information about the method of communication indicating if it is a communication passing through a network or not, thus eliminating any unnecessary communications.

According to the method of computation performed by using an information processing system of the fifty-third aspect, communication information between lattice points is assigned to the respective lattice points, and this has the effect of improving the efficiency of communication between lattice points and increasing the speed of processing of the information processing system. Moreover, this invention also has the effect of improving the efficiency of communication between lattice points and increasing the speed of processing of the information processing system if information of necessity or not of communication indicating the necessity or not of communication between lattice points and information of method of communication indicating if the communication is made through a network or not are assigned to the respective lattice points, for example.

The data memories in the fifty-fourth aspect has their memory areas assigned to the respective lattice points, and the element processors exchange data between adjacent lattice points through the memory areas and can perform the exchange of data between lattice points independently for each lattice point. And, the data memories can effectively hold communications of data for each lattice point by retaining the information for indicating the memory area to be used for communication for each direction to be used for communication of each lattice point.

According to the method of computation performed by using an information processing system of the fifty-fourth aspect, the processing system assigns a memory area of the data memory to each lattice points to make exchange of data between adjacent lattice points through the memory area and provides each of lattice point with information for indicating the memory area to be used for communication in each direction where communication should be made, and this has an effect of easily realizing high-speed processing by the information processing system.

The element processors in the fifty-fifth aspect can perform one same processing regardless if communication is possible or impossible by providing for retention each of the lattice points with information indicating a common dummy area in the direction where communication is impossible, and does not require any judging program for judging possibility or not of communication.

According to the method of computation performed by using an information processing system of the fifty-fifth aspect, each lattice point is provided, for retention, with information indicating a common dummy area in the direction where communication is impossible, and this has an effect of making it possible to reduce the program for judging possibility or not of communication and contract the program size. This system is capable of omitting synchronization, etc. and, therefore, it also has an effect of realizing contraction of program size and increase of processing speed.

The element processors in the fifty-sixth aspect can omit any unnecessary communications between element processors by holding two pairs of data in time sequence for intercommunication when adjacent lattice points are assigned over different element processors and by not rewriting the data if any displacement of the renewed data is no larger than the prescribed value in comparison with the data of the chronologically previous pair when the data for those lattice points has been renewed.

According to the method of computation performed by using an information processing system of the fifty-sixth aspect, element processors on both sides mutually hold 2 pairs of data transmitted from the other party in time sequence and, when the data for those lattice points has been renewed, the processors do not rewrite the data of the other party if any displacement of the renewed data is no larger than the prescribed value in comparison with the data of the chronologically previous pair, and this has the effect of increasing the processing speed of the information processing system by omitting any unnecessary communication between the element processors.

The element processors in the fifty-seventh aspect assign virtual data area simulating lattice points which are closest to the border of the computation area forming the subject of the calculation of equation and found outside the computation area and equalize the processing of the lattice points which are immediately inside the computation are with the processing of other lattice points in the computation area.

According to the method of computation performed by using an information processing system of the fifty-seventh aspect, virtual data area simulating lattice points which are closest to the border of the computation area forming the subject of the calculation of said equation and found outside said computation area is assigned to the data memory and the data of the lattice point is written in the virtual data area, and this has the effect of enabling simplification of processing program or contraction of program size.

In the twentieth aspect or the fifty-eighth aspect, by comprising fine node coupling connecting the adjacent element processors to each other and coarse node coupling connecting the element processors to each other by skipping no less than one element processors between them, it is possible to advance computation with the use of coarse node coupling and fine node coupling and shorten the computing time without lowering the accuracy.

According to the information processing system of the twentieth aspect or the method of computation performed by using an information processing system of the fifty-eighth aspect, the information processing system advances the computation of equations by performing computation by element processors connected by coarse node coupling and computation by element processors connected by fine node coupling, and this has the effect of not only increasing the convergence speed with computation made by using element processors connected by coarse node coupling but also maintain the accuracy of computation by computation made by using element processors connected by fine node coupling, thus enabling high-accuracy processing at a high speed.

In the fifty-ninth aspect, the computation of equations is advanced with alternate execution of computation by element processors connected by coarse node coupling and computation by element processors connected by fine node coupling, the convergence time is shortened with the computation by element processors connected by coarse node coupling and the accuracy of computation is compensated with computation by element processors connected by fine node coupling.

The method of computation performed by using an information processing system of the fifty-ninth aspect has the effect of enabling high-accuracy processing at a high speed because this system advances computation of equations by alternately performing computation by element processors connected by coarse node coupling and computation by element processors connected by fine node coupling.

In the sixtieth aspect of the present invention, the computation of equations using selected lattice points only simultaneously with the computation of equations of all the lattice points to improve the converging performance.

According to the method of computation performed by using an information processing system of the sixtieth aspect, the system performs calculation of equations using only part of lattice points selected and the calculation of governing equations using all the lattice point simultaneously, and this has the effect of shortening the processing time of the information processing system.

The algorithm of the calculation of the equations using selected lattice points only in the sixty-first aspect is made to be different from the algorithm used for the calculation of equations using all the lattice points, in such a way that emphasis is put on convergence in the former algorithm while emphasis is put on accuracy of solution in the latter algorithm.

According to the method of computation performed by using an information processing system of the sixty-first aspect, the algorithm of the calculation of equations using only selected lattice points is different from the algorithm used for the calculation of equations using all the lattice points, and this has the effect of making it possible to put stronger emphasis on the convergence speed than the accuracy of the algorithm applicable to coarse nodes and to sharply reduce the processing time of the information processing system.

The element processors in the sixty-second aspect have no less than 2 pairs of data regarding the adjacent lattice points in time sequence and omit the operation of the lattice point concerned if the amount of fluctuation between the pairs of data is no larger than the prescribed amount by comparing those 2 pairs of data.

According to the method of computation performed by using an information processing system of the sixty-second aspect, the processing unit has no less than 2 pairs of data regarding adjacent lattice points in time sequence and omits the operation of lattice points if the amount of fluctuation between the pairs of data is no larger than the prescribed amount, and this has the effect of sharply reducing the processing time of the information processing system.

The element processors in the sixty-third aspect can further avoid making any wasteful local computation by reducing the value of the prescribed amount for omitting the operation of lattice points depending on the value of fluctuation between the pairs of data according to the grade of convergence.

According to the method of computation performed by using an information processing system of the sixty-third aspect, the value of the prescribed amount for omitting the operation of lattice points depending on the value of fluctuation between said pairs of data is reduced according to the grade of convergence, and this has the effect of sharply reducing the processing time of the information processing system.

The I/O unit in the twenty-first aspect or the sixty-fourth aspect asynchronously reads output data in the element processors and, by furnishing that output data with identifiers necessary for arranging and sorting of data, and can perform post-processing, even if a plural number of physical values are sent in mixed state, by identifying and sorting the respective output data with the identifiers.

According to the information processing system of the twenty-first aspect or the method of computation performed by using an information processing system of the sixty-fourth aspect, the output I/O unit asynchronously reads output data in the element processors and furnishes that output data with identifiers necessary for arranging and sorting of data, and this has the effect of performing post-processing by using output data provided with identifiers and performing high-speed processing while outputting the intermediate results of non-steady computation.

The output data image processing unit in the twenty-second aspect or the sixty-fifth aspect collects output data from the output units of the respective element processors and, to transmit the situation of progress of computation to outside, generates visible images of the data in real time based on the output data arriving asynchronously from all the element processors.

According to the information processing system of the twenty-second aspect or the method of computation performed by using an information processing system of the sixty-fifth aspect, the information processing system is constructed by comprising output data image processing unit for collecting output data from the output I/O unit and generating visible images of the output data in real time based on the output data arriving asynchronously from all the element processors and can output intermediate results of non-steady computation without disturbing the operation of the element processors, and this has the effect of performing high-speed processing while outputting intermediate results of non-steady computation.

The coordinate conversion unit in the twenty-third aspect or the sixty-sixth aspect can use different coordinate systems i.e. coordinate system suitable to input and coordinate system suitable to computation by converting from the first coordinate system used by the host computer to the second coordinate system used by the element processors, and converting from the second coordinate system used by the element processors to the first coordinate system used by the host computer, and thus facilitates the formation of lattice.

According to the information processing system of the twenty-third aspect or the method of computation performed by using an information processing system of the sixty-sixth aspect, the information processing system is provided with coordinate conversion unit for converting, when transferring data from the host computer controlling the element processors to the element processors, from the first coordinate system used by the host computer to the second coordinate system used by the element processors, and converting, when transferring data from said element processors to the host computer, from the second coordinate system used by said element processors to said first coordinate system used by said host computer, and this has the effect of facilitating formation of lattices and improving the accuracy of the solution.

The first convergence judging units in the twenty-fourth aspect or the sixty-seventh aspect are provided in each of the element processors and independently of the processing units for judging convergence without disturbing the computation of the processing unit concerned. Moreover, the plural number of element processors are divided into a plural number of groups and the first convergence judging unit of the respective element processors are connected in the form of a unidirectional closed loop or in an integrated form in the respective groups by means of first communication routes, and they are also connected to the respective first communication routes of each group by means of second communication routes, so as to connect all of the second convergence judging units integrating the results of judgement of convergence of all first convergence judging units in the respective groups and all of the second convergence judging units of the respective groups in the form of a unidirectional closed loop or in an integrated form, thus making it possible to form judgement of convergence without disturbing the computation in the respective element processors and transmit that information to the host computer through the first and the second communication routes.

According to the information processing system of the twenty-fourth aspect or the method of computation performed by using an information processing system of the sixty-seventh aspect, the processing unit can perform judgement of convergence in parallel for each group without disturbing the processing in the element processors, and this has the effect of increasing the computation speed.

The plural number of element processors in the twenty-fifth aspect or the sixty-eighth aspect first form judgement of convergence to either the respective element processors or to no less than one processing means assigned to the processors. And, if judgement of convergence is made, the respective element processors send out a message indicating convergence Of either the element processors or the processing means concerned after receiving a message of convergence from the adjacent element processors. By repeating those operations, the element processors transmit messages one after another according to the route and judge convergence of the whole system.

According to the information processing system of the twenty-fifth aspect or the method of computation performed by using an information processing system of the sixty-eighth aspect, the information processing system comprises a process for forming judgement of convergence for each of the element processors or for each of no less than one processing means assigned to the processors, and a process for judging convergence by transferring message one after another according to the prescribed route, and the respective element processors can execute operations in parallel without being disturbed in their respective operations, and this has the effect of increasing the operation speed.

After the completion of convergence is judged by the process judging the convergence of the whole part in the sixty-ninth aspect, it becomes possible, by repeating the respective processes, to form similar judgement of convergence again and, even in the case of existence of any unstable lattice points, judge twice with a time lag so as to ensure the judgement of convergence of the entire system.

According to the method of computation performed by using an information processing system of the sixty-ninth aspect, the convergence judging unit forms similar judgement of convergence again by repeating the respective processes after the completion of general convergence has been judged by the processes which judge the general convergence, and this has the effect of correcting forming judgement of convergence of the entire information processing system even in the present of any unstable lattice points.

By confirming convergence in multiplex ways by messages transferred one after another according to the plural number of routes in the twenty-sixth aspect or the seventieth aspect, it becomes possible to form similar judgement of convergence at least twice for one lattice point even in the case of existence of any unstable lattice points and ensure the judgement of convergence of the entire system.

According to the information processing system of the twenty-sixth aspect or the method of computation performed by using an information processing system of the seventieth aspect, convergence is confirmed in multiplex ways by messages transferred one after another according to a plural number of routes, and this has the effect of correcting forming judgement of convergence of the entire information processing system even in the present of any unstable lattice points.

By newly confirming convergence after the completion of convergence of the entire system is judged by the process judging the convergence of whole system in the seventy-first aspect, it becomes possible to form judgement of convergence at a time even in the presence of any unstable lattice points so as to ensure the judgement of convergence of the entire system, though this leads to once stopping the processing of the entire element processors.

According to the method of computation performed by using an information processing system of the seventy-first aspect, the convergence judging unit forms judgement of convergence again by stopping the processing of all element processors or the processing means, after the completion of general convergence has been judged by the processes which judge the general convergence, and this has the effect of correcting forming judgement of convergence of the entire information processing system even in the present of any unstable lattice points.

The storing means in the seventy-second aspect judges, after being initialized by a process of initializing the storing means for storing the results of judgement of convergence, convergence or not of the computation for lattice points for the respective lattice points taken charge by the processors after passage of the prescribed time in which the entire system is believed to have sufficiently converged and, if it is judged that convergence has not yet been reached, sets the storing means to the prescribed logical value and judges convergence by checking the content of the memory in the storing means, thus making it possible to cope even with cases where the system is continuously unstable.

According to the method of computation performed by using an information processing system of the seventy-second aspect, the information processing system is constructed by comprising a process of initializing the storing means for storing the results of judgement of convergence, and a process of judging convergence or not of the computation for lattice points for the respective lattice points taken charge by the processors and, if it is judged that convergence has not yet been reached, sets the storing means to the prescribed logical value, and this has the effect of maintaining the system workable even in a case where the system gets in a state of constant instability and thus improving the reliability of the information processing system.

The input/output control unit of the seventy-third or the seventy-fifth aspect of the present invention switches the direction of communication according to a demand for access to data memory of an element processor, and the element processor can read out/write data at high speed from/in one data memory of the plural number of data memories shared with the adjacent element processor. This readout data are data written by the adjacent element processor, and the data communication between the adjacent element processors is held with access to the data memory.

According to the information processing system of the seventy-third aspect or the method of computation performed by using an information processing system of the seventy-fifth aspect, the I/O controller is commonly connected to a plural number of data memories shared by the adjacent element processors and is constructed in a way to control input/output of data with one of the plural number of data memories by switching the direction of communication according to demand for access, and this has an effect of increasing the speed of data communication between adjacent element compressors.

The value of the logical product generated by the wired OR circuit in the seventy-fourth or the seventy-sixth aspect of the present invention can tell whether or not the results of judgement of convergence indicating convergence of operations in the respective element processors are stored in all of the plural number of registers. At that time, the element processors can continue operations independently of the judgement of convergence by using the results of judgement of convergence stored in the registers.

According to the information processing system of the seventy-fourth aspect or the method of computation performed by using an information processing system of the seventy-sixth aspect, the system is constructed in a way to generate logical product of the output of a plural number of registers provided respectively in correspondence to a plural number of element processors to temporarily storing the results of judgement of convergence of the operations executed by each of the plural number of element processors by means of a wired OR circuit, this has an effect of judging convergence with the value of the logical product generated by the wired OR circuit and shortening the convergence judging time while forming judgement of convergence independently of the processing for operations of the element processors.

The element processors of the seventy-seventh aspect of the present invention can shorten the time required for the convergence of all element processors because they shorten the time up to convergence by assigning a smaller number of lattice points in the case where they contain unstable lattice points for analysis than in the case there they do not contain any unstable lattice points, thus reducing the deviation in the operating time of all element processors.

According to the method of computation performed by using an information processing system of the seventy-seventh aspect, the system is constructed in a such way that the number of lattice points assigned to element processors comprising unstable lattice points for analysis in which unstable factors exist is smaller than the number of lattice points assigned to element processors not comprising any unstable lattice points for analysis, and this has an effect of shortening the time up to convergence by levelling the operating time in the respective element processors.

The first object of the present invention is to provide an information processing system capable of improving latency tolerance by asynchronously transmitting messages between element processors.

Moreover, the second object of the present invention is to provide an information processing system capable of realizing a memory access system suitable to the solution of differential equations by having a memory structure protected against any disturbance to the processing inside the element processors by communication.

Furthermore, the third object of the present invention is to provide an information processing system capable of fully demonstrating the parallel processing on the level of operation inherent in the method of numerical analysis based on thermal hydraulic numerical analysis and other methods of solution of partial differential equations, by arranging computing elements realized by directly turning the wiring logic into hardware in the processors.

These and other objects, features, aspects and advantages of the present invention will become more apparent from the following detailed description of the present invention when taken in conjunction with the accompanying drawings.

BRIEF DESCRIPTION OF THE DRAWINGS

FIG. 46 is a layout drawing for explaining simplification of program according to the twenty-eighth embodiment of the present invention;

DESCRIPTION OF THE PREFERRED EMBODIMENTS

The first embodiment of the present invention will be described hereafter by using drawings.

Figure 1:
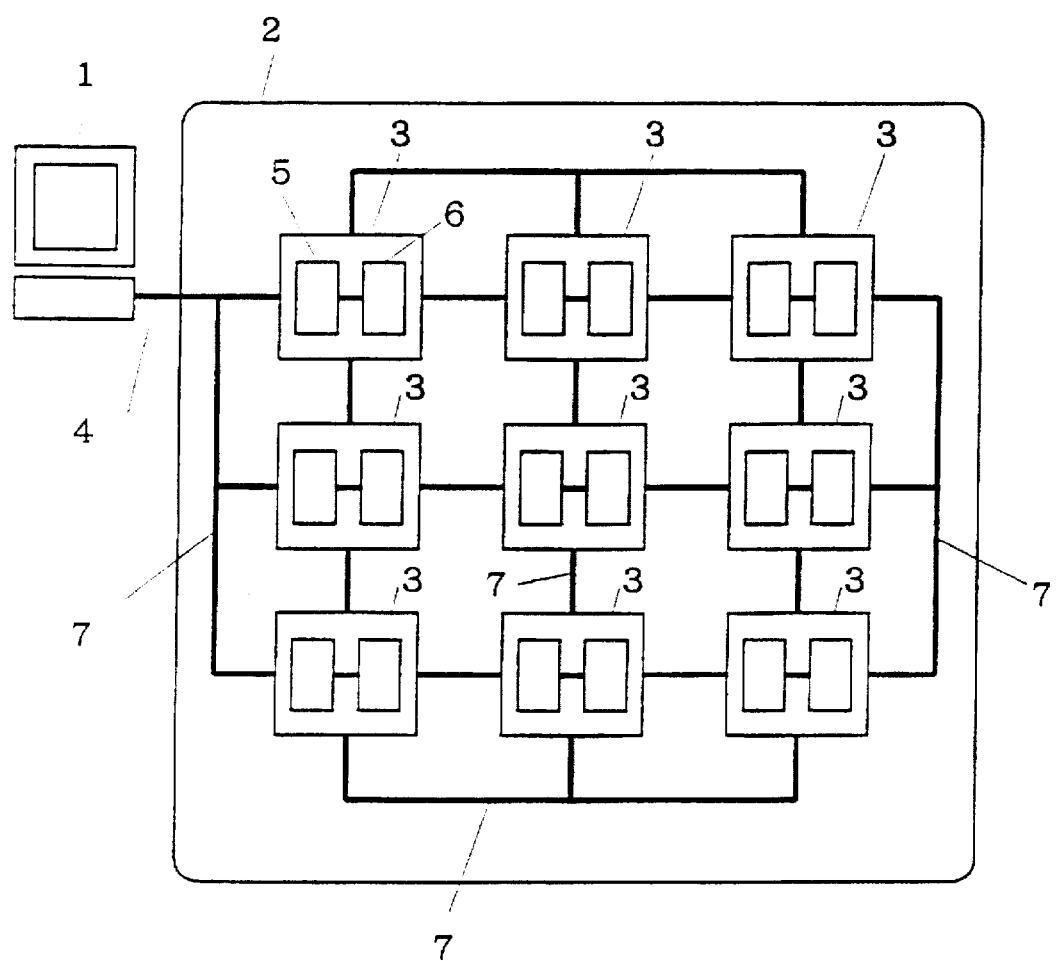
FIG. 1 is a block diagram showing the construction of the information processing system according to the first embodiment of the present invention.

FIG. 1 is a general construction drawing of the multi-processor in the first embodiment of the present invention. In FIG. 1, 1 is the host computer integrally controlling the computation processing, 2 is the main body of information processing system performing computation processing under the control of the host computer 1, 3 are element processors arranged spatially and constituting the information processing system 2, 4 is a network for exchanging information by connecting between the host computer 1 and the information processing system 2, 5 are processing units provided in the respective element processors 3 for performing computation, 6 are memories provided in the respective element processors 3 for storing information, and 7 are connections among element processors for communicating by connecting between the respective element processors 3.

In the information processing system 2 in FIG. 1, the state of connection among the respective element processors 3 is indicated for the case of near-neighbor meshes arranged in the form of lattices, but may also be of other connecting systems such as linear array, ring, star, tree, systric array, completely connected and the like.

Next, explanation will be given on actions.

The host computer 1, which faces to the information processing system 2 through the network 4, performs setting of initial conditions and boundary conditions, judgement of convergence inside the information processing system 2, output of results of computation in the information processing system 2, etc. The respective element processors 3, which are connected to one another so that they may mutually communication through the connection 7 between element processors, either set initial conditions and boundary conditions, send out information for judgement of convergence of computation or send out results of computation, according to the control command sent from the host computer 1 to the information processing system 2. As host computer 1, personal computer or work station, etc. is used and connected to the information processing system 2 through the network 4.

The respective element processors 3, which are composed of processing unit 5 and memory unit 6, have the functions of storing the initial conditions and boundary conditions sent from the host computer 1 through the network 4 and the connection 7 between element processors in the memory unit 6, performing the prescribed computation processing in the processing unit 5 immediately after receipt of token for starting computation from the host computer 1, write the processed data in the memory unit 6 and further continue computation.

Figure 2:
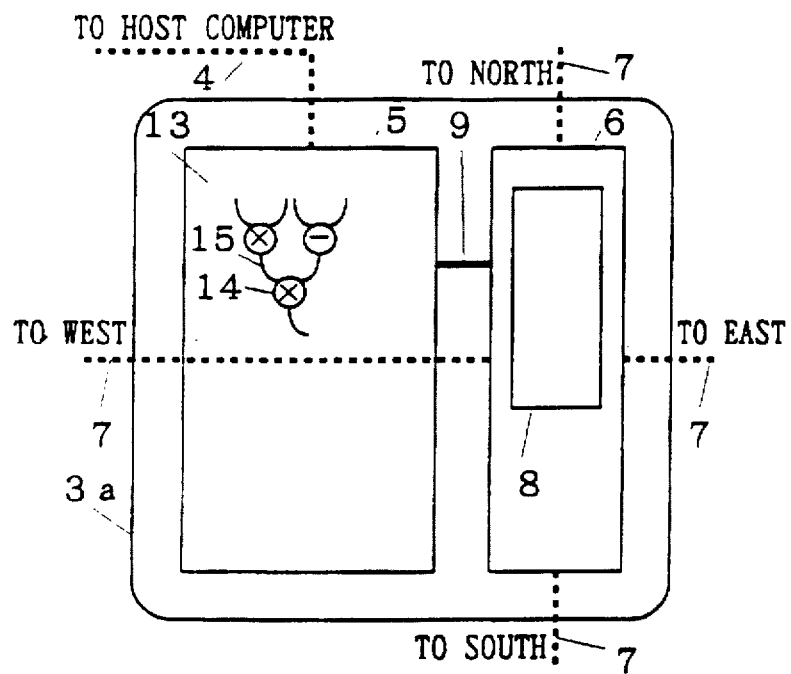
FIG. 2 is a block diagram showing the hardware construction of an element processor according to the second embodiment of the present invention.
Figure 3:
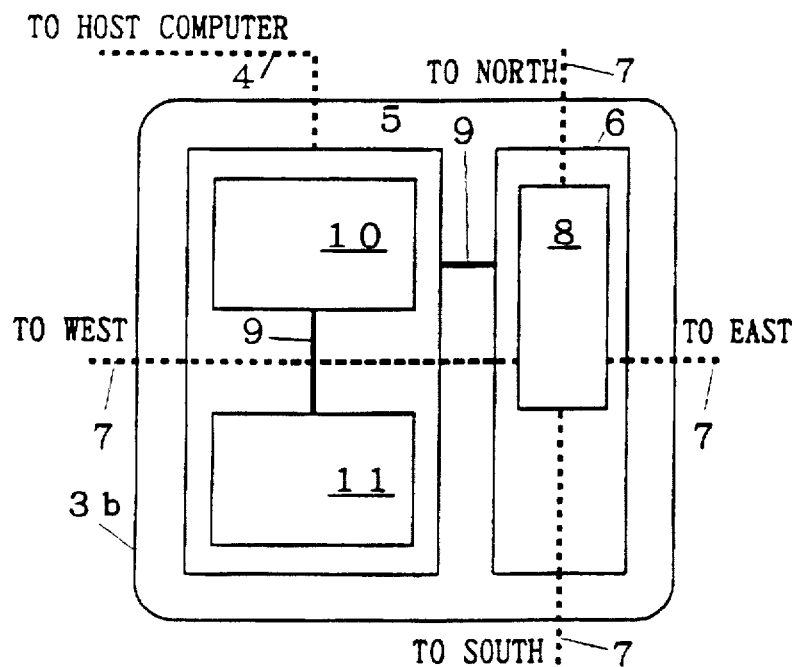
FIG. 3 is a block diagram showing the hardware construction of an element processor according to the third embodiment of the present invention.
Figure 4:
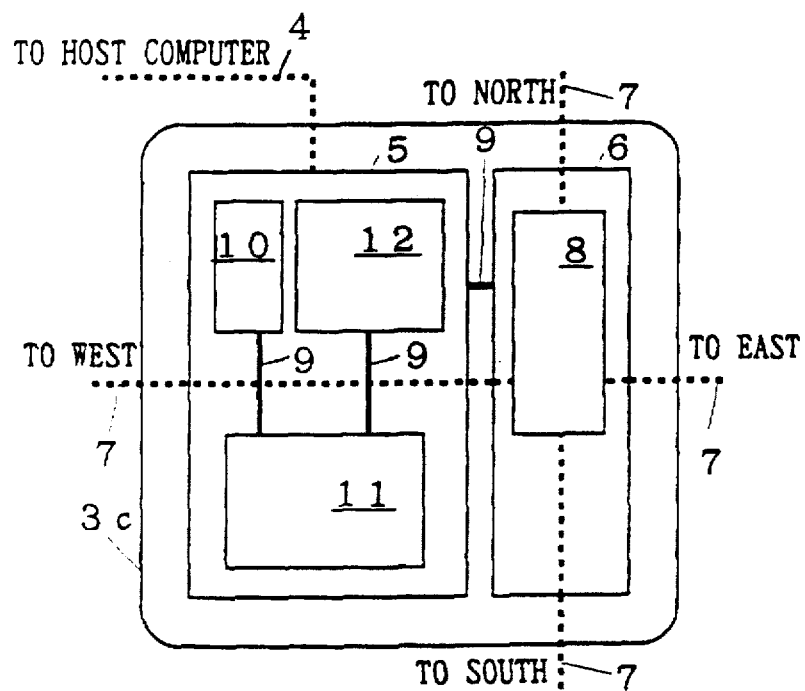
FIG. 4 is a block diagram showing the hardware construction of an element processor according to the fourth embodiment of the present invention.

The element processors 3 are classified in the 3 major categories according to the construction system of the hardware. FIG. 2 to FIG. 4 are block diagrams showing examples of hardware construction system of various kinds of element processors 3a to 3c.

In the respective drawings, 8 is a data memory provided in the memory unit 6, 9 is a data bus in processor for communicating by connecting between the processing unit 5 and the data memory 8, 10 is a floating point arithmetic element provided in the processing unit 5, 11 is a program memory provided in the processing unit 5, 12 is a function module provided in the processing unit 5, 13 is a hardware circuit in the shape of a data flow graph according to the wiring logic provided in the processing unit 5, 14 are computing elements arranged according to the data flow graph 13, and 15 is a data line connecting the computing elements 14 according to the data flow graph 13.

By realizing all operations necessary for solving differential equations with the hardware, it becomes possible to realize the maximum degree of parallel processing on the command level. In the solving method with multi-processors based on domain decomposition method, the parallel processing on the command level of the respective processors depends on the architecture of the processors but is not based on the parallel processing owned by the solving method itself of the differential equations. FIG. 2 is a construction drawing of an element processor which realized the flow of data processing with a data flow graph based on the wired-logic.

Figure 5:
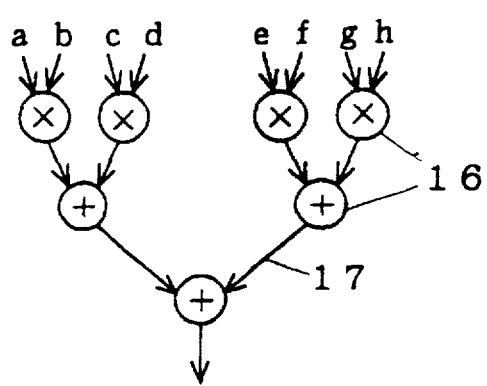
FIG. 5 is a data graph showing the basic flow of operations.

Explanation will be given on the second embodiment of the present invention by using drawings. FIG. 2 is a block diagram showing an element processor constituting the information processing system by the second embodiment of the present invention. In FIG. 2, inside the processing unit 5, the respective arithmetic-logic elements are arranged along the data flow graph 13 according to the wired-logic indicated in FIG. 5 and connected by means of the data line 15, for example. FIG. 5 is a data flow graph showing the flow of the basic processing. In the drawing, 16 are arithmetic nodes which perform the prescribed operation to the data input along the arc 17 and output the results of operation to the next arithmetic nodes along the arc 17.

The arithmetic-logic elements 14 have the functions of performing, for example, four arithmetical operations, logical operation, readout & writing command of memory, absolute value, exponential operation, etc.

If the token (a message calling for node address or start of computation) sent from the host computer 1 through the network 4 gets into the processing unit 5 through the data bus 9 inside the processor, element processor 3a have access first to the data memory 8 such as DRAM (dynamic random access memory), SRAM, flash memory, etc., for example, and prepare the necessary data by absorbing the quantity of state of their own processing unit 5 stored in the data memory 8 and the quantity of state of the adjacent processing unit 5. The respective data pass through the sequence of arithmetic-logic elements 14 one after another from the top of the data flow graph 13 to be submitted to computation processing and automatically reach the final arithmetic-logic element 14.

When there are completed a series of operations as the respective data pass through the sequence of arithmetic-logic elements 14 one after another from the top of the data flow graph 13 to be submitted to computation processing and automatically reach the final computing element 14. The arithmetic-logic elements 14 write the results of computation in the data memory 8 through the data bus 9 inside the processor and also write them in the data memory 8 of the adjacent element processor 3a through the connection 7 between element processors to complete the series of computation processing. In that case, the processing unit 5 acts as a special purpose computer which executes only the series of processings described in the data flow graph 13, thus providing a high computing speed.

Next, explanation will be given on the third embodiment of the present invention by using drawings.

FIG. 3 is a block diagram showing an element processor constituting the information processing system by the third embodiment of the present invention. By arranging a reloadable program memory in the respective element processors, it becomes possible to provide them with flexibility in their function of special purpose computers. The processing unit 5 indicated in FIG. 3 is constituted with a floating point arithmetic element 10 and a program memory 11 instead of a sequence of arithmetic-logic elements 14 according to the data flow graph 13. The operations are performed by further loading the program sent from the host computer through the network 4 to the program memory 11 of the respective element processors 1b through the connection 7 between element processors.

The content of the program memory 11 is reloadable and, therefore, it is possible to change the program by loading a new program in the program memory 11 inside the processing unit 5 from the host computer through the network 4. Therefore, any change of algorithm for solving differential equations or supplementation of function can be made with simple loading of new program in the program memory 11.

As it has been described above, even a multi-processor of a construction specialized for increasing the operating speed can be provided with flexible functions of change of algorithm, supplementation of function, etc. with rewriting of the program. According to the processing unit indicated in FIG. 3, it becomes possible to freely select and change the solution algorithm and thus greatly expand the scope of applications of computer compared with the processing unit of FIG. 2, by changing the program.

By providing a reloadable program memory in the element processors, it becomes possible to change the program by rewriting the content of the program memory and realize change of algorithm or scheme for solving differential equations or supplementation of functions, etc. on one same hardware. FIG. 1 and FIG. 3 indicate respectively the construction of an information processing system and the construction of an element processor for loading new algorithm, scheme or model in the program memory of the respective element processors in the first embodiment of the present invention.

In FIG. 3, the content of the program memory 11 is reloadable and, therefore, it is possible to change the program by loading a new program in the program memory 11 inside the processing unit 5 from the host computer 1 through the network 4. The respective element processors 3b are constructed in a way to perform operations by operating the floating point computing element 10 according to the software written in the program memory 11. If any program written with new algorithm, scheme and model to the element processors 3b is input from the host computer 1, the program memory 11 on all the element processors is reset, the program is assigned to the respective element processors 3b through the network 4 and the connection 7 between element processors, the program in the program memory 11 is rewritten and, upon completion of this procedure, the respective element processors 3b get ready for starting computation.

As explained above, even a multi-processor of a construction specialized for increasing the operating speed can statically reconstruct model, algorithm and scheme to have flexible functions with rewriting of the program.

By providing a data memory the content of which is erasable with command from host computer in the element processors, it becomes possible to change the boundary conditions by rewriting the content of the data memory and realize computation of various analytical models on one same hardware.

In FIG. 1, the respective element processors 3 can be constructed in a way to perform operations by either having a hardware circuit in the shape of a data flow graph 13 linked by data line 15 in the arithmetic-logic element 14 or operating the floating point computing element 10 according to the software written in the program memory 11. Moreover, an initial condition setting program is loaded on the host computer 1, and boundary conditions can be set freely by using this setting program. If any boundary conditions of computation are input in the host computer 1, the initial condition setting program is started, the data memory 8 on all the element processors is reset, the initial conditions and boundary conditions of computation are assigned to the respective element processors 3 through the network 4 and the connection 7 between element processors and, upon completion of this procedure, the respective element processors 3 get into the state of standby for starting computation.

Therefore, operations to various boundary conditions and initial conditions can be realized with simple procedure of loading conditions in the host computer, by using an information processing system 2 of one same multi-processor construction.

Next, explanation will be given on the fourth embodiment of the present invention by using drawings.

FIG. 4 is a block diagram indicating the element processors constituting the information processing system by the fourth embodiment of the present invention. The processing unit 5 indicated in FIG. 4 has composite functions of the processing unit constructions indicated in FIG. 2 and FIG. 3. In the processing unit 5 indicated in FIG. 4, operation processing functions frequently used for solving differential equations are constructed in the form of hardware circuits in a function module 12. When performing computation, the function module 12 is called out as required for functioning, by describing a command for calling function module 12 in the program. Therefore, the computation time during that period can be sharply reduced compared with a case in which the software makes the floating point arithmetic element 10 function for all the computation processing, as with the processing unit indicated in FIG. 3.

The respective element processors 3c are connected with adjacent element processors 3c in the form of lattice by means of the connection 7 between element processors for data communication, and data communication between mutually adjacent element processors 3c is held through this connection 7 between element processors. Moreover, a network 4 is provided between all the element processors 3c or peripheral element processors 3c and the host computer 1, to have communication of either convergence judging flag or results of computation.

Next, the fifth embodiment of the present invention will be explained by using FIG. 6.

By three-dimensionally connecting two-dimensional computing boards constituted with element processors 3 arrange on a two-dimensional plane indicated in the first embodiment, it is possible to make extension to three-dimensional computation. FIG. 6 is a drawing showing the construction of element processors for performing three-dimensional computation by three-dimensionally connecting two-dimensional computing boards.

In the drawing, 1 is the host computer, 3 are three-dimensionally arranged element processors, 5 are processing units provided in the element processors 3, 6 are memories provided in the element processors 3 for storing information, 4 is a network and 18 are two-dimensional computing boards constructed by two-dimensionally connecting element processors 3. In this case, unlike the construction in pipeline in the direction of time base of the two-dimensional computing boards 18, the network 4 provided between the two-dimensional computing boards 18 is used for the communication of data for spatial integral calculus. Moreover, the state of connection in the form of three-dimensional array between element processors 3 can also be freely changed into lattice type topology, hypercube or pipeline, etc. with a change in the wiring of the network 4.

While, in the above embodiment, explanation was given on a case of a near-neighbor mesh where the state of connection between element processors 3 is arranged in the form of lattice, the same effects can also be obtained even with other connecting systems such as chordal ring, 3-cube, binary 4-cube, etc., for example.

Next, the sixth embodiment of the present invention will be explained by using drawings.

Explanation will be given on the method of use of the information processing system 2 of the construction indicated in the embodiments given earlier.

Figure 6:
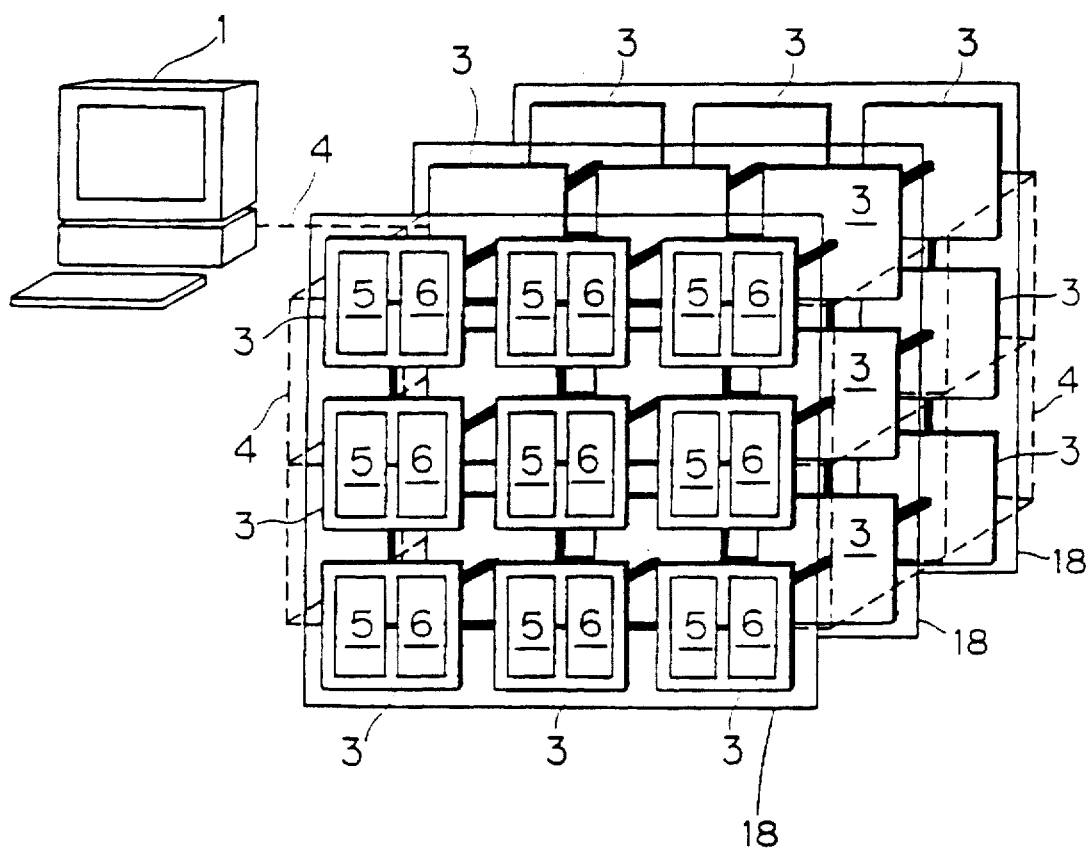
FIG. 6 is a block diagram showing the construction of the information processing system for performing constructed three-dimensional computation by three-dimensionally connecting two-dimensional boards, according to the fifth embodiment of the present invention.

FIG. 1 and FIG. 6 indicate an information processing system of multi-processor construction for sending out initial conditions and boundary conditions to respective element processors in the first embodiment of the present invention.

The information processing system 2 is constructed in a way to perform operations by either having, in the respective element processors 3b, a hardware circuit in which computing elements 14 are connected by means of data line 15 in the shape of a data flow graph 13, or operating the floating point computing element 10 according to the software written in the program memory 11 as shown in FIG. 3 and FIG. 4. If any initial conditions and boundary conditions of computation to element processors are input in the host computer 1, the data memory 8 on all the element processors 3 is reset, the initial conditions and boundary conditions of computation are assigned to the respective element processors 3 through the network 4 and the connection 7 between element processors and, upon completion of this procedure, the respective element processors 3 get into the state of standby for starting computation.

Therefore, in the information processing system 2, operations to various boundary conditions and initial conditions can be realized with simple procedure of inputting conditions in the host computer, by using one same multi-processor construction.

As example of use of the information processing system 2, explanation will given on numerical analysis of fluid based on the domain decomposition method. A fluid which is a continuum is generally described with an equation of continuity and an equation of strong non-linearity which is called Navier-Stokes equation. When solving the governing equation of a field described with those partial differential equations by the finite difference method, first the object phenomenon and area are divided into the smallest elements (lattices) having a fine size in both space and time. On those lattices, a solution is obtained by transforming the governing equation expressed with partial differential equations into a descretized difference equation and solving this difference equation. While, in the method of solution by finite difference method, the quantity of state owned by fine space elements are influenced only by the physical value owned by elements existing in the immediate neighborhood, this effect is produced, in computation, by making computation processing to the quantity of state owned by adjacent elements. Namely, it is seen that small elements which are separate in space from one another do not have any influence one upon another and can be calculated independently by just taking the influences of adjacent small elements only into consideration.

For example, consider solving an incompressible fluid by SIMPLE (Semi-Implicit Method for Pressure-Linked Equations) method (method which consists in solving equation of motion under a hypothetical pressure and obtaining, for the portion not satisfying continuity, a solution eventually satisfying the rule of continuity while correcting pressure and flow velocity, as described in S. V. Patankar, Numerical Heat Transfer and Fluid Flow (1980), McGRAW-HILL BOOK COMPANY, for example).

Figure 70:
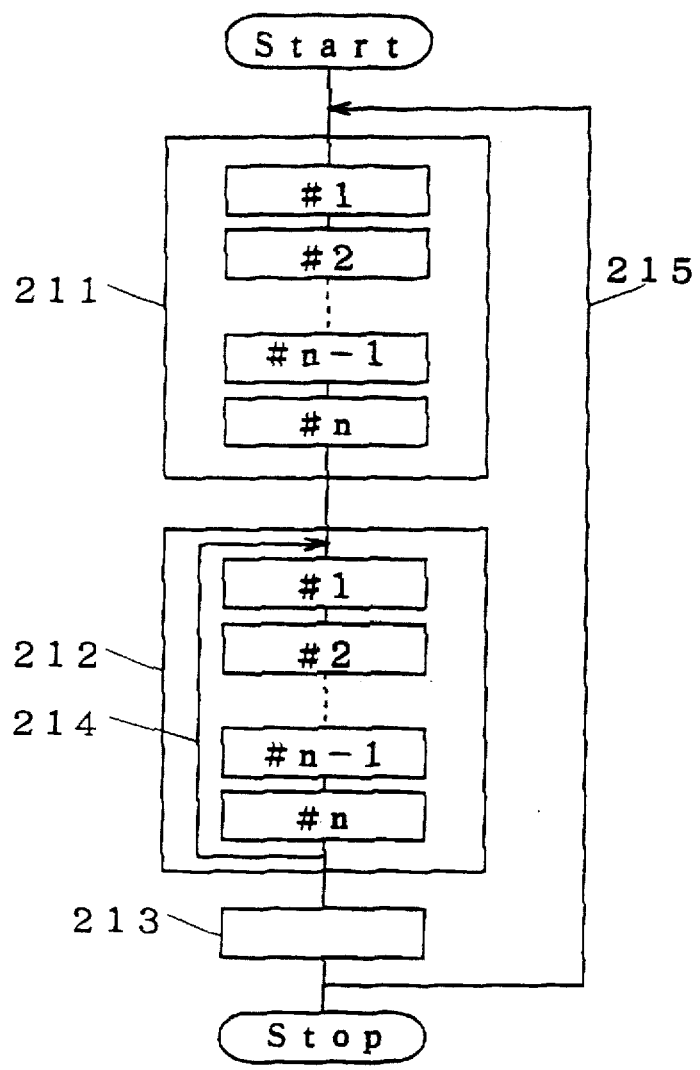
FIG. 70 is a flow chart showing the computation procedure of numerical analysis of fluid by SIMPLE method.

FIG. 70 is a flow chart showing the calculation procedure conventionally used for making numerical analysis of fluid by SIMPLE method. In the drawing, 211 indicates a group of routines for solving Navier-Stokes equations of motion, 212 is a group of routines for solving the pressure-correction equation, 213 is a routine for performing correction of flow velocity and pressure, 214 is a repetition cycle for non-linear convergence, and 215 represents a computation cycle for advancing time. Namely, the procedure of thermal hydraulic analysis by SIMPLE method consists in solving discrete Navier-Stokes equation of motion with the group of routines 211, solving the flow velocity & pressure determining equations one after another with the routine 213 and also repeating the computing cycle for time marching 215.

In the method of parallel solution using multi-processor which is frequently employed these days, the mainstream is the domain decomposition method which consists in dividing the entire computation space into a plural number of areas, assigning the element processors to the respective areas and transmitting data of the quantity of state of borders only between the element processors.

A problem in this method is waiting for synchronization regarding the communication between element processors. In the current parallel processors for general use, in which data communication between element processors is realized with a low-speed remote memory access by packet communication, etc., it is necessary to have a technique of using computation algorithms of coarse grain with least possible communication amount to the number of the element processors and avoid waiting for synchronization as much as possible. However, there is no way to avoid sudden increase of waiting for synchronization in the case where the element processors are constructed in super parallel and, therefore, no parallel proportional to the number of processors can be expected.

For that reason, a new SIMPLE method in which the lattice points individually calculate the quantity of state will be indicated, with special attention to the fact that the solution obtained is sufficiently accurate even if the equation of motion and the pressure-correction equation are solved by referring to the quantity of state of the adjacent lattice points only.

Figure 7:
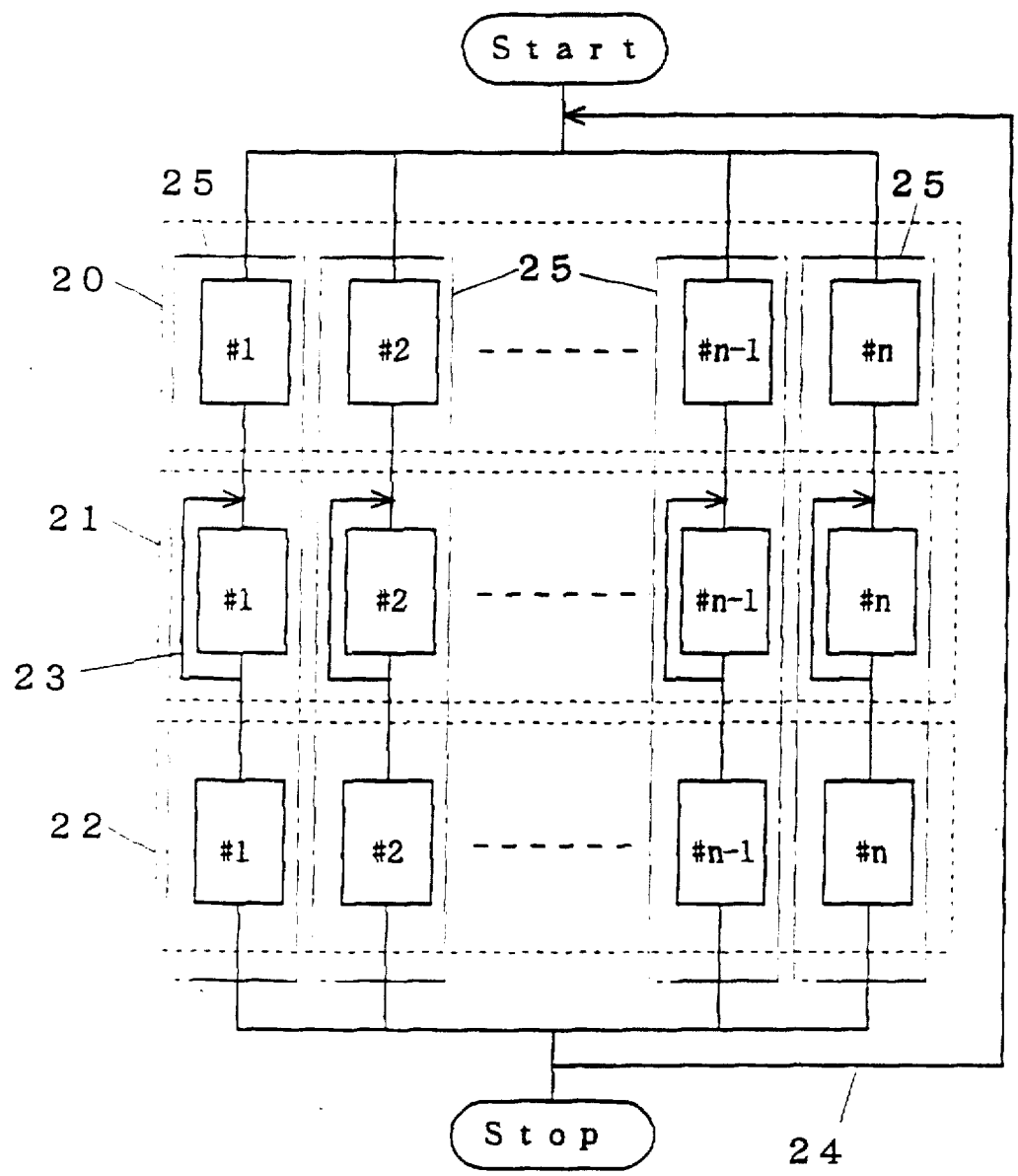
FIG. 7 is a flow chart showing the operation algorithm by asynchronous computation system according to the sixth embodiment of the present invention.

FIG. 7 is a flow chart showing the computation algorithm with which the lattice points #1, #2, . . . #n in this embodiment calculate the quantity of state independently without making any interrupt operation in the computation of other lattice points.

In the drawing, 20 is a group of routines for solving Navier-Stokes equation of motion, 21 is a group of routines for solving the pressure-correction equation, 22 is a routine for performing correction of flow velocity and pressure, 23 is a repetition cycle for non-linear convergence, 24 is a computation cycle for time marching, and 25 is a group of routines of element processors assigned to the respective lattice points #1, #2, . . . #n.

Here, a concrete algorithm will be indicated by taking numerical analysis of fluid of an incompressible two-dimensional layer current. When no temperature field is taken into account, a fluid is described with the following 3 non-dimensional equations:

Continuous equation is given in Formula 1.

$$\frac{\partial u}{\partial x} + \frac{\partial v}{\partial y} = 0 \tag{1}$$

$$\frac{\partial u}{\partial t} + \frac{\partial (u^2)}{\partial x} + \frac{\partial (uv)}{\partial y} = -\frac{\partial p}{\partial x} + \frac{1}{Re} \left[ \frac{\partial^2 u}{\partial x^2} + \frac{\partial^2 u}{\partial y^2} \right] \tag{2}$$

$$\frac{\partial v}{\partial t} + \frac{\partial (uv)}{\partial x} + \frac{\partial (v^2)}{\partial y} = -\frac{\partial p}{\partial y} + \frac{1}{Re} \left[ \frac{\partial^2 v}{\partial x^2} + \frac{\partial^2 v}{\partial y^2} \right] \tag{3}$$

Here, the respective symbols represent the following:

u=velocity component in direction x; v=velocity component in direction y; p=pressure; Re=Reynolds number Formula 1 to Formula 3 can be expressed uniformly with Formula 4, in which φ represents an optional variable. Γ is a diffusion term, and Su, Sp are generation terms and take the values given in Table 1 below.

$$\frac{\partial \phi}{\partial t} + \frac{\partial (u\phi)}{\partial x} + \frac{\partial (v\phi)}{\partial y} = \tag{4}$$

$$\frac{\partial}{\partial x}\left[\Gamma\frac{\partial \phi}{\partial x}\right]+\frac{\partial}{\partial y}\left[\Gamma\frac{\partial \phi}{\partial y}\right]+S_u+S_p\phi$$

[TABLE 1]

| Equation | φ | Γ | Su | Sp |
|---|---|---|---|---|
| Continuity Equation | 1 | 0 | 0 | 0 |
| Equation of Motion (X) | u | 1/Re | −∂p/∂x | 0 |
| Equation of Motion (Y) | v | 1/Re | −∂p/∂y | 0 |

Figure 8:
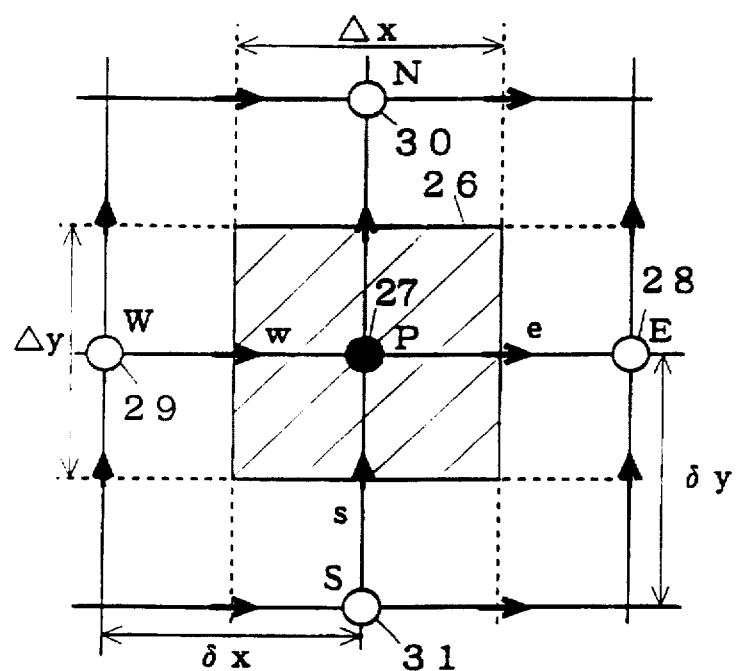
FIG. 8 is a conceptual drawing for explaining the control volume based on finite difference method.

FIG. 8 indicates a control volume necessary for differentiation of Fonnula 4. An optional variable φ is placed at the center point P 27 of the control volume 26, the respective points of adjacent φ are defined as E (East) 28, W (West) 29, N (North) 30, S (South) 31, and their center points (intersections between the border of the control volume 26 and axe lance line) are indicated with small letters (e, w, n, s). Because they are staggered grids, the scalar quantity is placed at the position of capital letters and the vector quantity (velocity) is placed at the position of small letters. If the Euler explicit method is applied to Formula 4 as scheme for difference of time to make digtizing considering the flow velocity coming into and going out of the control volume 26, Formula 4 changes into Formula 5.

$$\frac{\phi_P^{n+1}-\phi_P}{\Delta t}+\frac{(u\phi)_e-(u\phi)_w}{\Delta x}+\frac{(v\phi)_n-(v\phi)_s}{\Delta y}= \tag{5}$$

$$\frac{(\Gamma d\phi/dx)_e-(\Gamma d\phi/dx)_w}{\Delta x}+\frac{(\Gamma d\phi/dy)_n-(\Gamma d\phi/dy)_s}{\Delta y}+S_u+S_p\phi$$

Supposing that φ is distributed linearly among lattices and that e, w, n, s are center points between P and E, P and W, P and N, P and S respectively, Formula 6 to Formula 9 can be supposed.

$$\phi_e=\frac{1}{2}(\phi_P+\phi_E) \tag{6}$$

$$\phi_n=\frac{1}{2}(\phi_P+\phi_N) \tag{7}$$

$$\left[\frac{d\phi}{dx}\right]_e=\frac{1}{(\delta x)_e}(\phi_E-\phi_P) \tag{8}$$

$$\left[\frac{d\phi}{dy}\right]_n=\frac{1}{(\delta y)_n}(\phi_N-\phi_P) \tag{9}$$

Formula 10 is obtained by integrating Formula 5 over the control volume.

$$\frac{(\phi_P^{n+1}-\phi_P)}{\Delta t}\Delta x\Delta y+(u_e\Delta y\phi_e-u_w\Delta y\phi_w)+(v_n\Delta x\phi_n-v_s\Delta x\phi_s)= \tag{10}$$

$$\frac{\Gamma_e}{(\delta x)_e}\Delta y(\phi_E-\phi_P)-\frac{\Gamma_w}{(\delta x)_w}\Delta y(\phi_P-\phi_W)+$$

$$\frac{\Gamma_n}{(\delta y)_n}\Delta x(\phi_N-\phi_P)-\frac{\Gamma_s}{(\delta y)_s}\Delta x(\phi_P-\phi_S)+(S_u+S_p\phi_P)\Delta x\Delta y$$

Here, definitions will be made as in Formula 11 and Formula 12 regarding convection term C and diffusion term D. In those expressions, the suffix letters indicate the position of border face of the control volume 26.

$$C_e=u_e\Delta y,\ C_w=u_w\Delta y, \tag{11}$$
$$C_n=v_n\Delta x,\ C_s=v_s\Delta x$$

$$D_e=\frac{\Gamma_e}{(\delta x)_e}\Delta y,\ D_w=\frac{\Gamma_w}{(\delta x)_w}\Delta y, \tag{12}$$

$$D_n=\frac{\Gamma_n}{(\delta y)_n}\Delta x,\ D_s=\frac{\Gamma_s}{(\delta y)_s}\Delta x$$

If the definitions of Formula 11 and Formula 12 arc used, Formula 10 changes to Formula 13.

$$\frac{\phi_P^{n+1}-\phi_P}{\Delta t}\Delta x\Delta y+\frac{C_e}{2}(\phi_E+\phi_P)-\frac{C_w}{2}(\phi_W+\phi_P)+ \tag{13}$$

$$\frac{C_n}{2}(\phi_N+\phi_P)-\frac{C_s}{2}(\phi_S+\phi_P)=$$

$$D_e(\phi_E-\phi_P)-D_w(\phi_P-\phi_W)+D_n(\phi_N-\phi_P)-$$

$$D_s(\phi_P-\phi_S)+(S_u+S_p\phi_P)\Delta x\Delta y$$

If arrangement is made regarding φ by applying hybrid scheme as space difference scheme to this Formula 13, Formula 14 is obtained.

$$a_P\phi_P^{n+1}=F_e\phi_E+F_w\phi_W+F_n\phi_N+F_s\phi_S+(S_u+S_p\phi_P)\Delta x\Delta y+(a_{P0}-a_P)\phi_P \tag{14}$$

$$F_e=\max\left[-C_e, D_e-\frac{C_e}{2}, 0\right], F_w=\max\left[C_w, D_w+\frac{C_w}{2}, 0\right]$$

$$F_n=\max\left[-C_n, D_n-\frac{C_n}{2}, 0\right], F_s=\max\left[C_s, D_s+\frac{C_s}{2}, 0\right]$$

$$a_P=F_e+F_w+F_n+F_s$$
$$a_{P0}=\Delta x\Delta y/\Delta t$$

where max { .. } is a function for selecting the maximum value in the parentheses.

As time difference methods, various methods such as explicit method, implicit method, semi-implicit method, etc. However, by evaluating φp included in the right member of Formula 13 with the value $\phi_P^{a+1}$ of the subsequent time aiming at eventually acquiring a steady state solution as an acceleration method, the discretization equation of Formula 15 can be obtained from Formula 14.

$$F_P\phi_P=F_e\phi_E+F_w\phi_W+F_n\phi_N+F_s\phi_S+G \tag{15}$$
where
$$F_P=F_e+F_w+F_n+F_s+a_{P0}$$
$$G=(S_u+S_p\phi_P)\Delta x\Delta y+a_{P0}\phi_P$$

Velocity and pressure which are unknowns of the discretization equation led out by the SIMPLE method will be related to each other. First, the discretization equation of Formula 2 and Formula 3 of the equations of motion will be led out. The variable φ is u, v and, if Formula 16 to Formula 19 are defined for velocity component u, the discretization equation will become as Formula 20 and, if Formula 21 to Formula 24 are defined for velocity component v, the discretization equation will become as Formula 25.

Formula 16 indicates the coefficient of w-face regarding velocity component u.

$$A_w=\Delta y_P\times\frac{u_P+u_w}{2} \tag{16}$$

$$B_w=\frac{\Delta y_P}{R_e\Delta x_{P-1}}$$

$$D_w = B_w \times \max\left[0, \left(1 - 0.5 \times \left|\frac{A_w}{B_w}\right|\right)\right]$$

Formula 17 indicates the coefficient of e-face regarding velocity component u.

$$A_e = \Delta y_P \times \frac{u_P + u_e}{2} \tag{17}$$

$$B_e = \frac{\Delta y_P}{R_e \Delta x_P}$$

$$D_e = B_e \times \max\left[0, \left(1 - 0.5 \times \left|\frac{A_e}{B_e}\right|\right)\right]$$

Formula 18 indicates the coefficient of s-face s regarding velocity component u.

$$A_s = \delta x_P \times \frac{v_P + v_s}{2} \tag{18}$$

$$B_s = \frac{\Delta y_P}{R_e \delta x_{P-1}}$$

$$D_s = B_s \times \max\left[0, \left(1 - 0.5 \times \left|\frac{A_s}{B_s}\right|\right)\right]$$

Formula 19 indicates the coefficient of n-face regarding velocity component u.

$$A_n = \delta x_P \times \frac{v_n + v_{nw}}{2} \tag{19}$$

$$B_n = \frac{\delta x_P}{R_e \delta y_{P+1}}$$

$$D_n = B_n \times \max\left[0, \left(1 - 0.5 \times \left|\frac{A_n}{B_n}\right|\right)\right]$$

$$u_P{}^*F_P = u_e{}^*F_e + u_w{}^*F_w + u_n{}^*F_n + u_s{}^*F_s + G \tag{20}$$

where
$F_w = D_w + \max(A_w, 0)$
$F_e = D_e + \max(-A_e, 0)$
$F_s = D_s + \max(A_s, 0)$
$F_n = D_n + \max(-A_n, 0)$
$F_P = F_w + F_e + F_s + F_n + a_{P0}$
$G = \Delta y_P (P_w - P_P) + a_{P0} u_P$ Formula 21 indicates the coefficient of w-face regarding velocity component u.

$$A_w = \Delta y_P \times \frac{u_P + u_s}{2} \tag{21}$$

$$B_w = \frac{\Delta y_P}{R_e \delta x_P}$$

$$D_w = B_w \times \max\left[0, \left(1 - 0.5 \times \left|\frac{A_w}{B_w}\right|\right)\right]$$

Formula 22 indicates the coefficient of c-face regarding velocity component v.

$$A_e = \delta y_P \times \frac{u_e + u_{es}}{2} \tag{22}$$

$$B_e = \frac{\delta y_P}{R_e \delta x_{P+1}}$$

$$D_e = B_e \times \max\left[0, \left(1 - 0.5 \times \left|\frac{A_e}{B_e}\right|\right)\right]$$

Formula 23 indicates the coefficient of c-face regarding velocity component v.

$$A_s = \delta x_P \times \frac{v_P + v_s}{2} \tag{23}$$

$$B_s = \frac{\Delta x_P}{R_e \delta y_{P-1}}$$

$$D_s = B_s \times \max\left[0, \left(1 - 0.5 \times \left|\frac{A_s}{B_s}\right|\right)\right]$$

Formula 24 indicates the coefficient of n-face regarding velocity component v.

$$A_n = \Delta x_P \times \frac{v_n + v_P}{2} \tag{24}$$

$$B_n = \frac{\Delta x_P}{R_e \Delta y_P}$$

$$D_n = B_n \times \max\left[0, \left(1 - 0.5 \times \left|\frac{A_n}{B_n}\right|\right)\right]$$

$$v_P{}^*F_P = v_e{}^*F_e + v_w{}^*F_w + v_n{}^*F_n + v_s{}^*F_s + G \tag{25}$$

where
$F_w = D_w + \max(A_w, 0)$
$F_e = D_e + \max(-A_e, 0)$
$F_s = D_s + \max(A_s, 0)$
$F_n = D_n + \max(-A_n, 0)$
$F_P = F_w + F_e + F_s + F_n + a_{P0}$
$G = \Delta x_P (P_s - P_P) + a_{P0} v_P$ By solving Formula 20, an assumed flow velocity u* at point P can be determined. By solving Formula 25, an assumed flow velocity v* at point P can be determined. By using the assumed values u*, v* obtained from Formula 20 and Formula 25 as well as Fp necessary for leading thos= equations, the coefficient of the pressure-correction equation to determine the pressure correction value p'. Formula 26 indicates the pressure-correction equation. The suffix letters e and n in the equation indicate values transferred from the element processors on East side and North side respectively.

$$G = \Delta y_P u^*_p - \Delta y_P u^*_p, e + \Delta x_P v^*_p - \Delta x_P v^*_p, n$$

where $F_w = \Delta y_P \Delta y_P / F_P(u)$ $F_e = \Delta y_P \Delta y_P / F_{P,e}(u)$ $F_s = \Delta x_P \Delta x_P / F_P(u)$ $F_n = \Delta x_P \Delta x_P / F_{P,n}(u)$ $$P'_P F_P = P'_e F_e + P'_w F_w + P'_n F_n + P'_s F_s + G \tag{26}$$

The flow velocity and pressure are calculated with the formulas of Formula 27 to Formula 29 by using the pressure correction value p' transferred from the element processors on the West side and the South side.

$$P_p = P^*_p + P'_p \tag{27}$$

$$u_p = u^*_p \Delta y_p / F_p(u) \times (P'_w - P'_p) \tag{28}$$

$$v_p = v^*_p \Delta x_p / F_p(v) \times (P'_s - P'_p) \tag{29}$$

Various kinds of lattice points for computation are conceivable in which discrete points may be generally found inside the substance, neighboring the wall or at flow inlet or outlet, etc. Preparing many kinds of computation programs (software) and computation circuits (hardware) makes the programming very troublesome. For that reason, the position information of the respective points is given in advance to the memory of the respective element processors as initial conditions in the form of internal point & external point bits and boundary conditions, so that one exactly same program may be executed for the computation itself.

The distinction between internal point and external point of the computation area is also made by using bits. If the discretization point is inside the substance, it will be considered as an external point and, when the discretization point is in the fluid, it will be considered as an internal point. The internal point & external point bits are defined for each of the variables u, v, p, and the internal point will be given as 1 (on) while the external point will be given as 0 (off). For example, if the flag for u is put as bit(u), the following operation processing will be made before deciding the coefficient of the discretization equation of u:

$$F_p = bit(u)F_p + \overline{bit(u)}$$

$$F_w = bit(u)F_w, \quad F_e = bit(u)F_e,$$

$$F_s = bit(u)F_s, \quad F_n = bit(u)F_n,$$

$$G = bit(u)G + \overline{bit(u)}u_p \quad (30)$$

where $\overline{bit(u)}$ represents "not bit(u)".

As for boundary conditions, the boundary conditions of the kinds given below can be set. Each of the variables u, v, p has a flag indicating use or not of wall function. However, the bits are set in the respective directions of w, e, s, n to judge on which face the wall exists. The operations of Formula 31 to Formula 33 are performed before deciding the coefficient of the discretization equation of u and v.

Formula 31 indicates the wall face conditions using wall function.

$$\tau = \frac{1}{R_e} \frac{2\Delta x_P}{\Delta y_P} \quad (31)$$

$$F_P = F_P - bit(w)F_w - bit(e)F_e - bit(s)F_s - bit(n)F_n +$$

$$[bit(w) + bit(e) + bit(s) + bit(n)]\tau$$

$$F_w = \overline{bit(w)}\, F_w$$

$$F_e = \overline{bit(e)}\, F_e$$

$$F_s = \overline{bit(s)}\, F_s$$

$$F_n = \overline{bit(n)}\, F_n$$

where $\tau$ represents shear force.

Formula 32 indicates the outlet boundary conditions of gradient 0.

$$\phi_{p1} = bit(w)_1\phi_w + bit(e)_1\phi_e + bit(s)_1\phi_s + bit(n)_1\phi_n \quad (32)$$

where $\phi p1$ represents variable having outlet boundary conditions of gradient 0.

Formula 33 indicates fixing of boundary values.
Fixing of boundary values.

$$\phi_{PS} = bit(w)_3(2\phi_{bound} - \phi_w) + bit(e)_3(2\phi_{bound} - \phi_e) + \quad (33)$$
$$bit(s)_3(2\phi_{bound} - \phi_s) + bit(n)_3(2\phi_{bound} - \phi_n)$$

where $\phi_{p1}$ represents variable having fixed boundary conditions and $\phi_{bound}$ represents a fixed boundary value.

The variable $\phi p$ can be described as in Formula 34 by combination of Formula 32 and Formula 33.

$$\phi_p = bit(\phi)\phi_p + \overline{bit(\phi)} \times (\phi_{p1} + \phi_{p3}) \quad (34)$$

As for the nature of operations necessary for the respective computation cells, almost the same operation is made though under different boundary conditions, because of the characteristics of governing equation of fluid. If only the boundary conditions are mapped initially on the data memory by providing various kinds of bit according to said setting of boundary conditions, one same program can be used regardless at which position of border, an internal point or an external point of computation space the computation cell may be. Therefore, just loading the program in which to describe a series of operations necessary for calculating the physical value of one lattice point on the program memory of the element processors 3 will be enough. To perform computation by sweeping the computation lattices one after another using that one kind of operation program, first the lattice point number of the computation lattice (or base address on the data memory 8) is outlet on the circulating pipeline (84 in FIG. 21) inside the element processor 3 as input token. If the lattice point number which is the input token is 2, for example, the computing element will start computation by having access to the memory area assigned to the second lattice point. Since there is no limitation of order in the input of tokens, it is also possible to input lattice numbers at random, in addition to just advancing the computer sequentially as 1, 2, 3 ...

Figure 9:
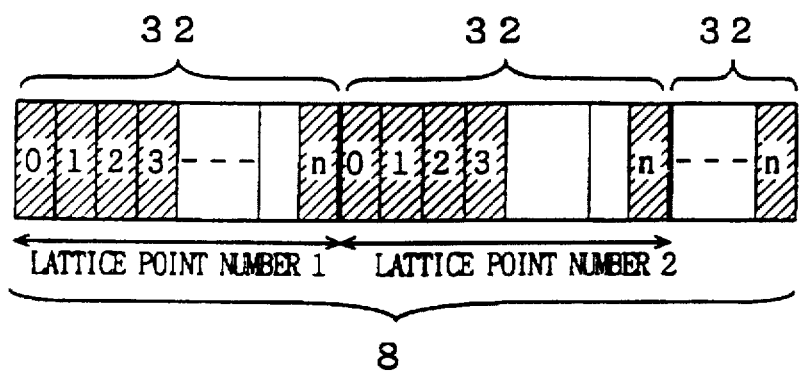
FIG. 9 is a drawing showing the construction of the data handled by the data memory.

FIG. 9 is a drawing showing the data construction inside the data memory provided in the element processor. As shown in the drawing, the inside of the data memory provided in the element processor is divided into partitions 32 in the same number as the number of lattice points to be taken charge by one processor, and the data necessary for computation of one lattice point is mapped in the respective partitions.

Figure 10:
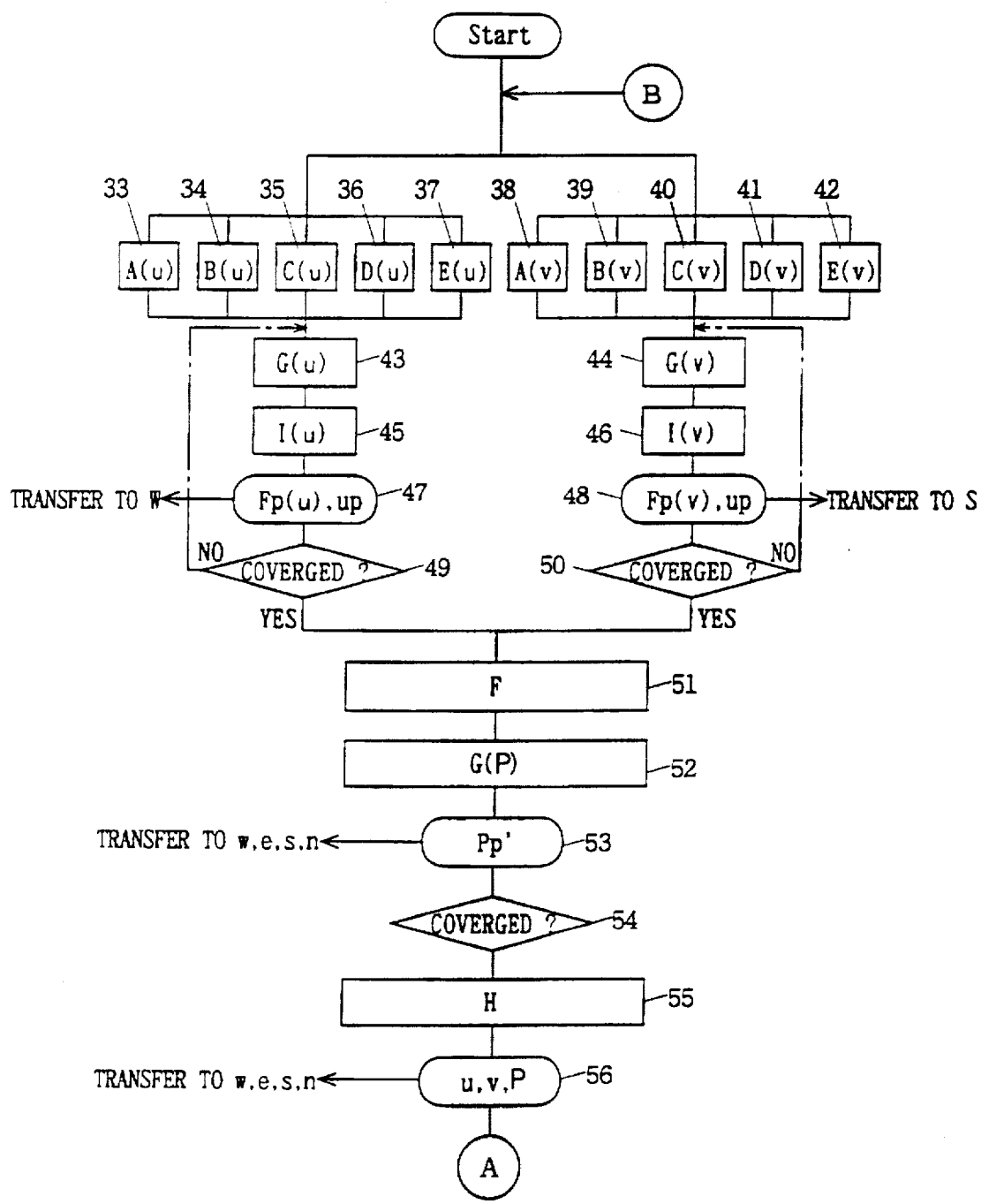
FIG. 10 is a flow chart showing the computation procedure of the computation algorithm by asynchronous computation system.
Figure 11:
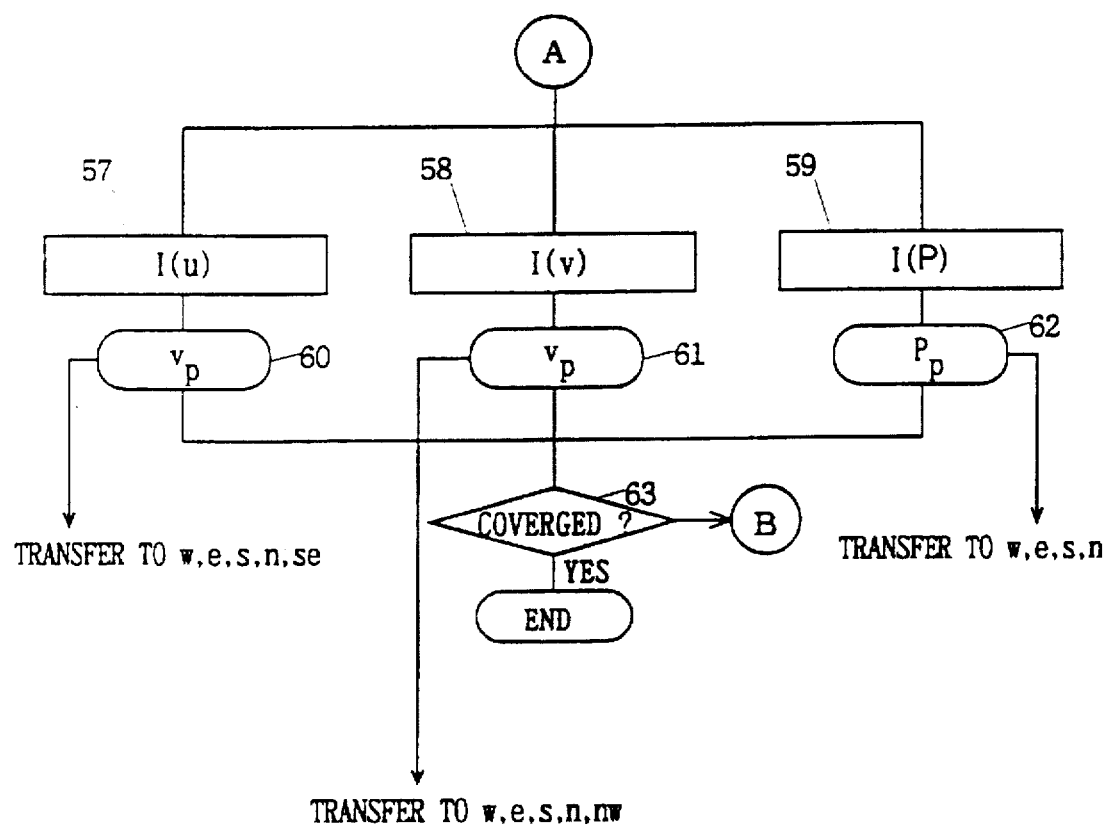
FIG. 11 is a flow chart showing the computation procedure of the computation algorithm by asynchronous computation system.

FIG. 10 and FIG. 11 are flow charts showing the flow of the algorithm which has so far been described. In the drawings, 33 to 63 are the respective computing functions A to I indicated respectively hereafter.

(a) The element processor 3 has a function of determining the predict value u* by solving the equation of motion in the direction x. In the drawing, 33 is function A (u) of determining the coefficient $F_w$ of the equation of motion in the direction x in the computation for w-face of u, 34 is function B (u) of determining the coefficient $F_e$ of the equation of motion in the direction x in the computation for e-face of u, 35 is function C (u) of determining the coefficient $F_s$ of the equation of motion in the direction x in the computation for s-face of u, 36 is function D (u) of determining the coefficient $F_n$ of the equation of motion in the direction x in the computation for n-face of u, 37 is function E (u) of determining the generation term G of the equation of motion in the direction x, and 43 is function G (u) of determining the coefficient $F_p$ of the equation of motion in the direction x and determining the predict velocity component u* from the respective coefficients and the generation term.

(b) The element processor 3 has a function of determining the predict value v* by solving the equation of motion in the direction y. In the drawing, 38 is function A (v) of determining the coefficient $F_w$ of the equation of motion in the direction y in the computation for w-face of v, 39 is function B (v) of determining the coefficient $F_e$ of the equation of motion in the direction y in the computation for e-face of v, 40 is function C (v) of determining the coefficient $F_s$ of the equation of motion in the direction y in the computation for s-face of v, 41 is function D (v) of determining the coefficient $F_n$ of the equation of motion in the direction y in the computation for n-face of v, 42 is function E (v) of determining the generation term G of the equation of motion in the direction y, and 44 is function G (v) of determining the coefficient $F_p$ of the equation of motion in the direction y and determining the predict velocity component v* from the respective coefficients and the generation term.

(c) The element processor 3 has a function of determining the pressure correction value p'. In the drawing, 51 is function F of determining the generation term G of the equation for p', 52 is function G (p) of determining p' by solving the equation for p' on the basis of the generation term obtained with the coefficient of equation of motion and F.

(d) The element processor 3 has a function of correcting flow velocity and pressure. In the drawing, 55 is function H of determining u, v, p on the basis of p'.

(e) The element processor 3 has a function of setting boundary conditions. In the drawing, 45, 46, 57 to 59 are functions I of setting boundary conditions based on bit data given in initial values.

(f) The element processor 3 has a function of transferring boundary conditions set. In the drawing, 47, 48, 53, 60 to 62 are functions of transferring the boundary conditions set respectively in the previous processes to the adjacent element processors 3. (g) The element processor 3 has a function of judging convergence or not. In the drawing, 49, 50, 54, 63 are functions of judging convergence or not.

By connecting those functions according to the flow chart indicated in FIG. 11, the computation code for one lattice point is completed.

Next, the algorithm for computing one lattice point is mapped on the program memory 11 of the element processor 3. The mapped program starts by using as input token the lattice point number information tag sent from the host computer 1 through the network 4 and the connection 7 between element processors. In the case where a plural number of lattice points are mapped on one element processor 3, the data transferred between the element processors 3 through the connection 7 between element processors is an information held by the lattice point positioned at the outermost part of the respective divided areas constituted with a plural number of lattice points. For that reason, by directly having access to the data memory on the adjacent element processors 3 through the connection 7 between element processors provided between the element processors 3, it becomes possible to perform data transfer between processors and make rapid analysis by asynchronous control by eliminating data transfer overhead between lattice points.

Moreover, it is also possible to map one lattice point on one element processor, use at least the same number of element processors 3 as the number of computed lattice points, arrange a multiport memory to be described later between the element processors 3, construct a super parallel system connecting them with the connection 7 between element processors and obtain convergent solution by performing exchange of data without mutually disturbing the processing of the element processors 3 while keeping data communication asynchronously between mutually adjacent element processors 3.

Furthermore, synchronous analysis between element processors 3 also becomes possible by mapping a plural number of lattice points on one element processor and adopting synchronous communication system between element processors. In this case also, sharp improvement in the processing speed is possible compared with the method synchronous solution using conventional processors for general use, because the processing unit 5 inside the element processors 3 has a special purpose of high-speed operation suitable for solving partial differential equations.

Although explanation was given, in the above embodiment, about a case where the algorithm for computing one lattice point is mapped on the program memory 11 of the element processor 3, the same effects can also be obtained even if the computing element 14 is connected with the data line 15 to form a hardware circuit in the shape of data flow graph 13, as a matter of course.

In addition, efficient parallel processing of the communication between mutually adjacent element processors 3 is possible when it is a message communication of sending messages to a suitable process by means of address symbols of message when sending message (data) from a certain process to another and that a plural number of different (may also be same) commands are executed in parallel on a plural number of data.

Next, explanation will be given on the seventh embodiment of the present invention.

As method of approximation of time differential, there are Euler explicit method, Euler implicit method, second-order Crank-Nicholson scheme, third-order Richardson scheme, etc. because of differences in the time steps of quantity of state to be referred to. In the third-order Richardson scheme, for example, when the current time is given as n, the quantity of state necessary for obtaining the value of next time n+1 is determined by the values of time n−1 and n. In the method using a conventional Neumann's computer, there was a limitation to the scale of computation due to shortage of memory capacity, because it was necessary to store the values of time n−1 and n excessively on the common memory.

Figure 12:
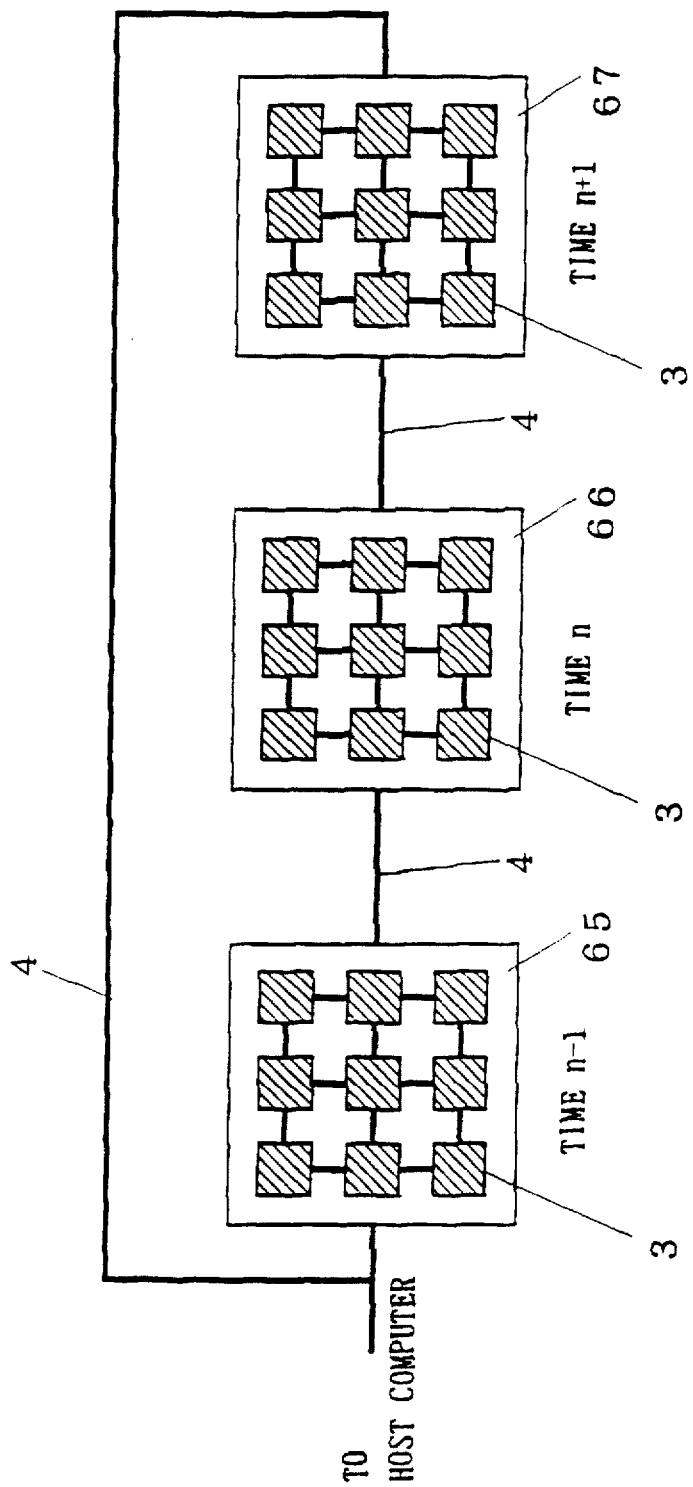
FIG. 12 a block diagram showing the construction of two-dimensional boards construction in pipeline in the direction of time base according to the seventh embodiment of the present invention.

Even such problem of shortage of memory can be easily solved with the use of a plural number of two-dimensional computing boards constituted by element processors arranged on two-dimensional plane indicated in the first embodiment. FIG. 12 is a drawing showing the construction of an information processing system for approximation of time differential on two-dimensional space. In the drawing, 65 to 67 are two-dimensional computing boards constituted respectively by two-dimensionally connecting element processors 3, 65 is a two-dimensional computing board taking charge of computation of the value corresponding to time n−1, 66 is a two-dimensional computing board taking charge of computation of the value corresponding to time n and 67 is a two-dimensional computing board taking charge of computation of the value corresponding to time n+1. Moreover, 4 is a network for exchanging information by connecting the respective two-dimensional computing boards in a pipeline and also connecting them to the host computer 1.

In the case of Richardson scheme, for example, the values of time n−1 and n necessary for obtaining the value of time n+1 is transferred from the data memory of the respective element processors 3 on the two-dimensional computing board 65 for time n−1 and the two-dimensional computing board 66 for time n to the respective element processors 3 on the two-dimensional computing board 67 for time n+1 through the network 4. When the computation is over, the results of computation are automatically stored in the data memory on the respective element processors 3 on the two-dimensional computing board 67. To calculate the value of n+2 in succession, reset the data memory on the respective element processors 3 on the two-dimensional computing board for time n−1 where the value of time n−1 is stored, newly transfer the values of time n and n+1 respective as value of time n+2 from the two-dimensional computing board 66 for time n and the two-dimensional computing board 67 for time n+1 to the two-dimensional computing board 65 for time n−1 through the network 4 for computation and store the result as value of time n+2 in the data memory on the respective element processors 3.

As explained above, according to the information processing system of the third embodiment, the problem of shortage of memory is solved and the operations become speedier.

This construction in pipeline in the direction of time base also contributes to increase of speed in the judgement of convergence of two-dimensional analytical solution. In the solution of differential equations, in which the judgement of convergence is made when the difference between the calculated value at the current time n and the calculated value at the previous time n−1 has become no larger than a certain standard range, the construction in pipeline in the direction of time base makes it possible to judge convergence with a simple action of comparing the value between mutually adjacent two-dimensional computing boards.

Next, explanation will be given on the eighth embodiment of the present invention.

While the main object of application of the present invention is solution of differential equations, this kind of problem is computed by repeating mutual actions between mutually adjacent lattice points and the computation is completed with convergence of all lattice points in a steady state. Namely, hardly any exchange of data is made between lattice points which are not adjacent to each other and exchange of data must be made only between mutually adjacent lattice points. Moreover, as a general practice, after the object system is divided into lattice points, the computation regarding one or a plural number of mutually adjacent lattice points is taken charge by one element processor 3 and the computation regarding lattice points adjacent to those lattice points is also taken charge by the adjacent element processor 3.

By paying attention to such characteristics of the object problem, it can be understood that the efficiency of computation sharply improves and the desired operations can be completed in a short time if mutually adjacent element processor 3 are constructed in a way to share one same memory and to directly have access mutually to the memory of the other processor.

Figure 13:
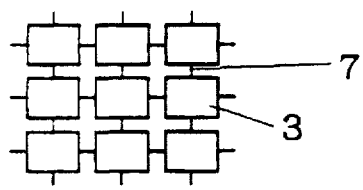
FIG. 13 is a block diagram showing the construction of the information processing system according to the eighth embodiment of the present invention.
Figure 14:
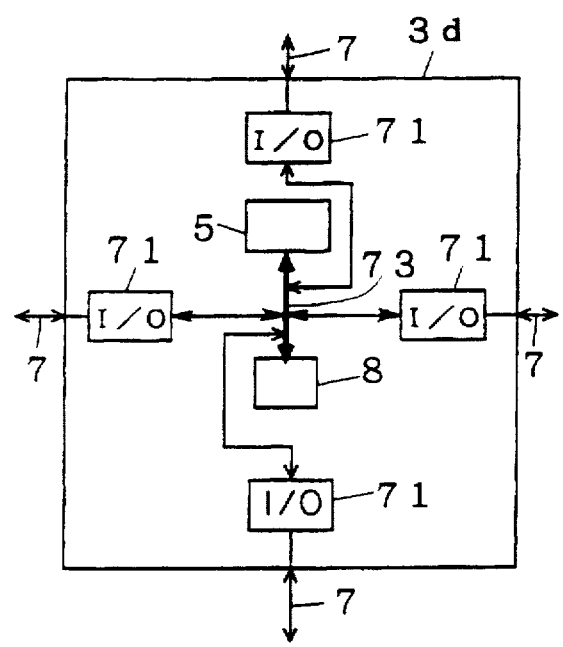
FIG. 14 is a block diagram showing the construction of the element processor constituting the information processing system according to the eighth embodiment of the present invention.

FIG. 13 indicates a part of multi-processor in which element processor 3 are connected by the connection 7 between element processors and arranged in the shape of square lattices. Moreover, FIG. 14 is a drawing showing the internal construction of one piece of element processor indicated in FIG. 13. In the drawing, the processing unit 5 is connected with the data memory 8 incorporated in the same processor and can have access to this data memory 8. Furthermore, this processing unit 5 is connected with adjacent element processors through input/output control circuit (hereinafter referred to as "I/O") 71.

By being connected with the adjacent element processor 3d through the I/O 71, it becomes possible (for the processing unit 5) to directly have access to the data memory 8 in the adjacent element processor 3d as if it were a memory in one same element processor. Conversely, the adjacent element processor 3d can also have access to the illustrated data memory 8 in the same way.

To mutually have access to the memory between mutually adjacent element processors, the I/O 71 in the drawing must discharge the function of arbitration against the demand of memory access from the adjacent element processor for the data bus 73 between the processing unit 5 and the data memory 8. However, explanation on this point will be omitted here, because arbitration for data bus is a known technology which is already used in general processors and realized with the use of VME bus, for example.

As explained above, in the element processor, the processing unit 5 is connected with the data memory 8 incorporated in one same processor so that the processing unit 5 may have access to the data memory and it also is connected with the adjacent element processor 3d through I/O 71. This makes it possible to reduce the overhead for data communication between element processors 3d and improve the efficiency of computation.

While a general case was explained in the explanation of the construction of element processors given above, just referring to the data (namely reading) of adjacent lattice points is enough and no renewal (namely writing) is required as far as solution of differential equations is concerned. It is apparent that, if the operation is limited to referring only, there is no risk of collision between requests for renewal to one same memory address and therefore the arbitration of data bus for memory access can be simplified.

However, it is expected that a plural number of requests for reference to one same memory may occur at a fairly high frequency. In that case, there is a fear that accumulation of processing may be produced eventually requiring a longer computation time with the memory of a single board. To avoid such problem, it will be all right if a multi-port memory is adopted to enable simultaneous processing of reference to a plural number of memories.

Explanation will be given on the ninth embodiment of the present invention realized for that purpose.

Figure 15:
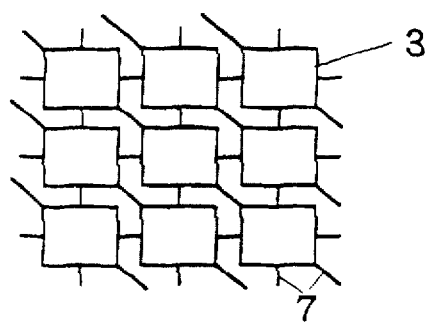
FIG. 15 is a block diagram showing the construction of the information processing system according to the ninth embodiment of the present invention.

FIG. 15 indicates a case where the memory is shared with 6 adjacent element processors. In the drawing, 3 is an element processor and 7 is a network.

Figure 16:
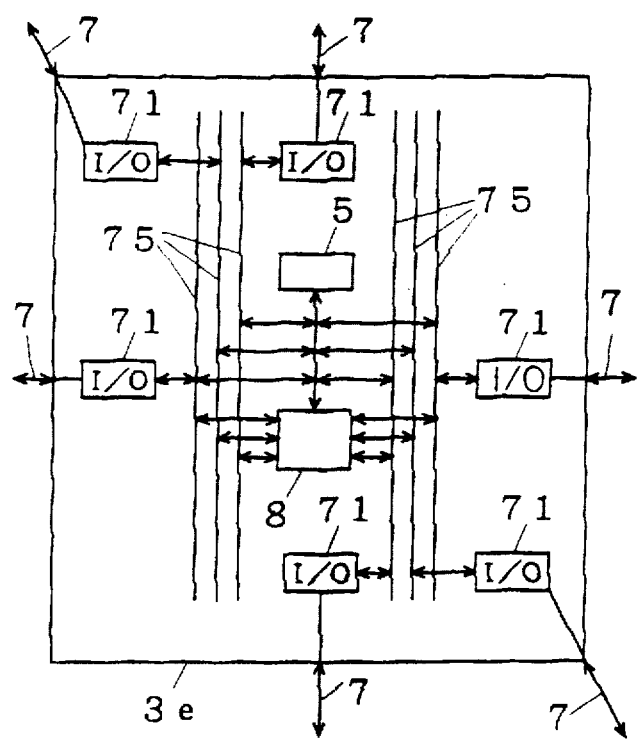
FIG. 16 is a block diagram showing the construction of the element processor used for realizing the information processing system according to the ninth embodiment of the present invention.

FIG. 16 indicates the internal construction of one element processor, and the data memory 8 has 7 ports. The data memory 8 is connected with 6 I/O 71 through data bus 75 and is also connected with the processing unit 5. By having such construction, it becomes possible to simultaneously handle requests for reference to memory from the element processor concerned and 6 adjacent element processors.

If the operation is reference only, it can be realized with a comparatively simple control circuit. However, in the case where the information processing system is for general purposes, there are cases where (the processing unit) is requested to also have a function of writing in the memory of adjacent element processors 3e. By having this kind of construction, it becomes possible to also write one same data in the data memory 8 of adjacent element processors 3e simultaneously with writing in the data memory 8 of the element processor 3e concerned, thus greatly contributing to the shortening of computation time in the processing involving collision of references to one same memory address.

Still more, it is not always necessary to have the memory unit to be shared inside the element processors. Therefore, explanation will be given on the drawing of the tenth embodiment of the present invention realized with some modification to this memory unit.

Figure 17:
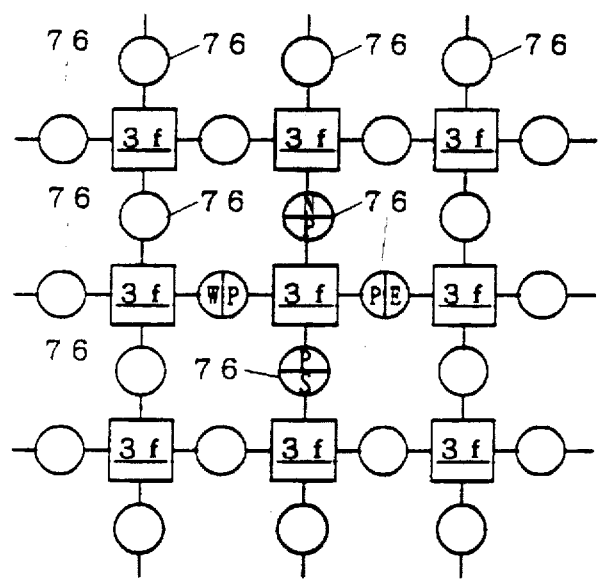
FIG. 17 is a block diagram showing the construction of the information processing system according to the tenth embodiment of the present invention.
Figure 18:
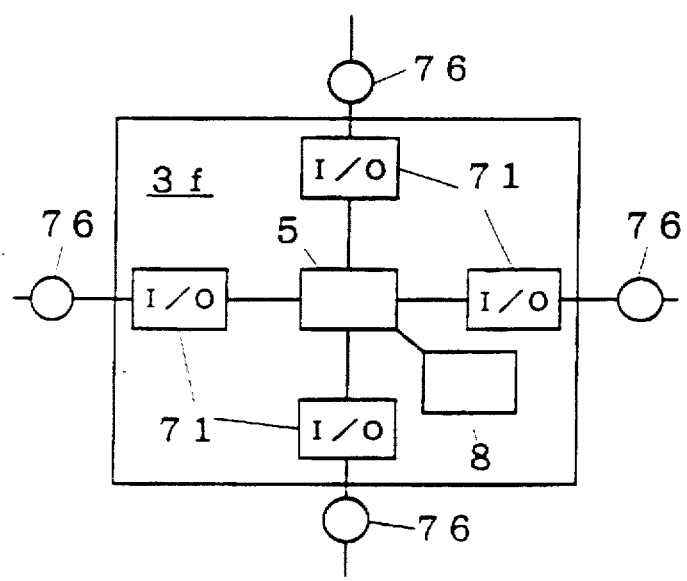
FIG. 18 is a block diagram showing the construction of the element processor used for realizing the information processing system according to the tenth embodiment of the present invention.

FIG. 17 indicates the construction of an information processing system in which the commonly shared memory unit is arranged outside the element processor. Moreover, FIG. 18 indicates the construction of an the element processor constituting the information processing system indicated in FIG. 17 and the relation of connection with the memory unit. In the drawing, 76 is a memory provided outside the element processor 3f. 5 is a processing unit connected with the external memory 76 by means of I/O 71. 8 is a data memory provided inside the element processor 3f and directly connected with the processing unit 5 and is connected with the processing unit inside the element processor 3 through I/O 71. Namely, as shown in FIG. 17, the memory 76 is arranged on the data route between element processors. By arranging this way, it becomes possible to directly refer to and renew four memories 76 shared with adjacent element processors through I/O 71.

The method indicated hereafter is available as example of a method for exchanging data between mutually adjacent element processors 3f through said memory 76.

Namely, exchange of data between element processors 3f is completed by stipulating in advance the address or scope of address for writing by respective element processors 3f, writing data in the predetermined address area of the memory 76 and reading out that address area with the element processor 3f on the data receiving side.

In FIG. 17, the symbol "P" described inside the memory 76 indicates the scope of address for writing by element processor 3, while the symbols "S", "N", "E", "W" indicate the scope of address for writing by element processors 3f.

While explanation was given on an example including data memory 8 in the element processors 3f in this embodiment, it is apparent that the same effects can be obtained even by element processors having no data memory 8 if the data to be stored in the data memory 8 is stored in the memory 76 connected to the element processor.

In the above explanation, it was given on a case where single-port memory is used as memory 76. However, by using multi-port memory also in the case of memories arranged on the data route, it becomes possible to shorten the computation time in the same way as the case of incorporating the data memory 8 in the element processors 3f explained in FIG. 16.

Figure 19:
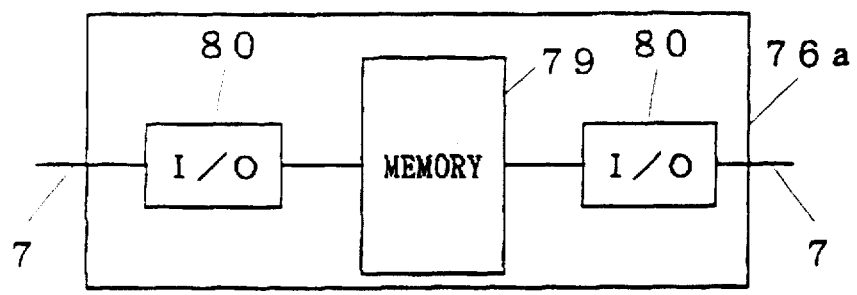
FIG. 19 is a block diagram showing the construction of the memory used for realizing the information processing system according to the tenth embodiment of the present invention.

However, even when multi-port memory is adopted, the processing is interrupted leading to increase of computation time in case of collision of requests for renewal for one same memory address. To avoid such problem it is effective to introduce a buffer mechanism for temporarily storing requests for reference to/renewal of memory. FIG. 19 indicates a multi-port memory introducing a buffer memory for that purpose and shows only the portion corresponding to the memory 76 in the information processing system of FIG. 17.

In the drawing, 76a is a multiport memory with buffer mechanism, 79 is a 2-port memory and 80 is a buffer mechanism. The buffer mechanism 8 can temporarily store the data received from the 2-port memory 79 through the connection 7 between element processors or the data to be written in the 2-port memory 79.

As explained above, because a buffer mechanism 80 is provided in each port of the 2-port memory 79 arranged between mutually adjacent element processors 3f, there is no fear of interruption of processing even in case of collision of requests for renewal for one same memory address. Any increase in computation time resulting from such interruption of processing can also be avoided.

In the multiport memory indicated in FIG. 19, explanation was given on a case where the buffer mechanism 80 is provided in each port of the 2-port memory 79. However, it is apparent that the buffer mechanism may also be provided for the respective ports of the multiport (memory) and that it is also effective to have one buffer for a plural number of or all ports.

Next, explanation will be given on the eleventh embodiment of the present invention. By providing a buffer memory for retaining communication data for each of the element processors, any disturbance to operations of the respective element processors due to data communication between element processors can be prevented.

Figure 20:
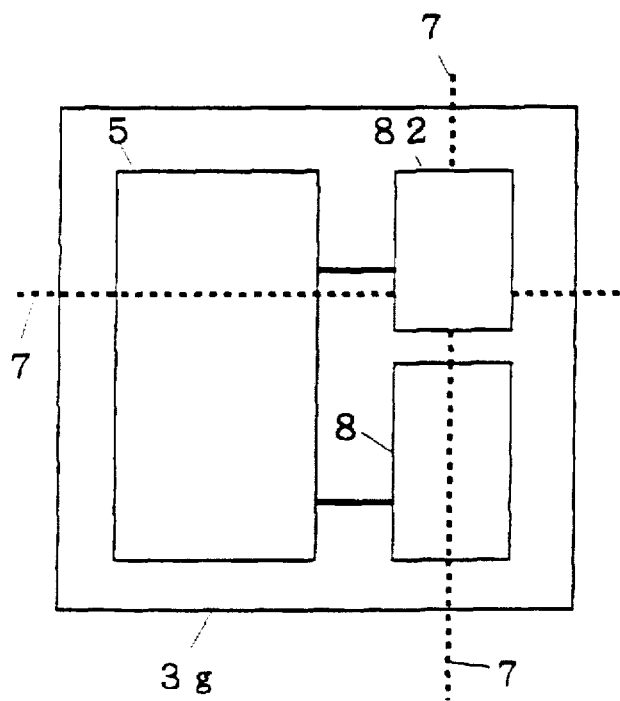
FIG. 20 is a block diagram showing the construction of the element processor according to the eleventh embodiment of the present invention.

FIG. 20 is a block diagram showing the construction of an element processor having a buffer memory for retaining communication data. In the drawing, 5 is a processing unit provided in the element processor 3g, 7 is a data bus connecting between element processor 3g, 82 is a buffer memory provided in the element processor 3g and connected to the data bus 7 between element processors and the processing unit 5, and 8 is a data memory provided in the element processor 3 and connected to the processing unit 5.

The respective element processors 3g write the data sent from the adjacent element processor 3g through the data bus 7 between element processors in the buffer memory 82 as data with object name, and search the data with object at optional timing from this buffer memory to complete reception of data from the adjacent element processor 3g. According to an information processing system formed with element processors having the construction indicated in FIG. 20, faster processing becomes possible without disturbing the operations of the processing unit 5 inside the respective element processors 3g or floating point arithmetic element, for example, with data communication between mutually adjacent element processors.

Figure 21:
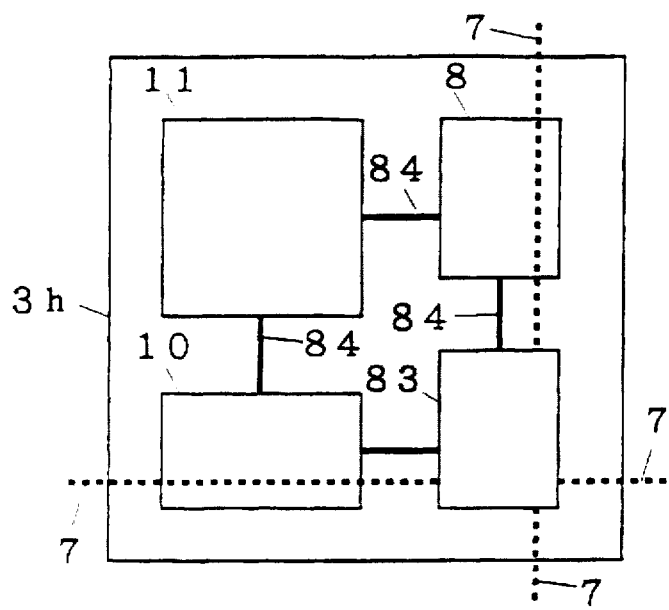
FIG. 21 is a block diagram showing the construction of the element processor according to the twelfth embodiment of the present invention.

Next, explanation will be given on the twelfth embodiment of the present invention. FIG. 21 is a block diagram showing an example of the construction of element processor of the information processing system according to this twelfth embodiment.

In the drawing, 3h is an element processor, 10 is a floating point arithmetic element provided inside the element processor 3h, 83 is a matching memory (data pool) provided inside the element processor 3h, 11 is a program memory provided inside the element processor 3h, 8 is a data memory provided inside the element processor 3h, 84 is a pipeline for exchanging information by connecting the floating point arithmetic element 10, the data memory 8, the program memory 11 and the data memory 8, and 7 is a connection between element processors for exchanging information by connecting between element processors.

There are a wide variety of data to be exchanged by communication between mutually adjacent element processors 3h. In this embodiment, the respective data are given object names enabling discrimination in advance of the kind of processing to be made next. A data with object name is input in the form of a data packet on the pipeline 84 provided with the matching memory (data pool) 83, circulates and is sent out to the matching memory (data pool) 83 inside the adjacent element processor 3h through the connection 7 between element processors. The floating point arithmetic element 10 searches inside the matching memory 83 at optional timing and starts operations as soon as any data with object name necessary for performing an optional processing is ready.

At that time, it is necessary to secure a sufficient storage capacity for the matching memory 83 because the programs solving partial differential equations tends to have large degrees of parallel processing.

The explanation involved a case in which the processing unit of the element processor 3h is constructed with a floating point arithmetic element 10 in the above description. However the same effects can be obtained even with a design in which the arithmetic-logic elements 14 are connected with data line 15 to form a circuit in the shape of data flow graph 3 in hardware indicated in FIG. 2. Another alternative is a construction in which the portions frequently appearing during an operation are formed into a circuit in hardware inside a functional module 12 as shown in FIG. 4 while other portions are operated with the floating point arithmetic element 10 according to instructions from the program memory 11.

As described above, by automatically synchronizing different data, it becomes possible to make processing rapidly with little communication overhead.

Next, explanation will be given on the thirteenth embodiment of the present invention.

As mentioned earlier, in the solution of Navier-Stokes equations by SIMPLE method, operations of cumulatively adding the respective results of multiplication of first input by second input, third input by fourth input, fifth input by sixth input and seventh input by eighth input frequently appear, and increase of speed of this processing is one of the keys to shortening of the computation time. FIG. 5 is a flow graph schematically expressing the operation of Formula 35.

$$x = a \times b + c \times d + e \times f + g \times h \quad (35)$$

Figure 22:
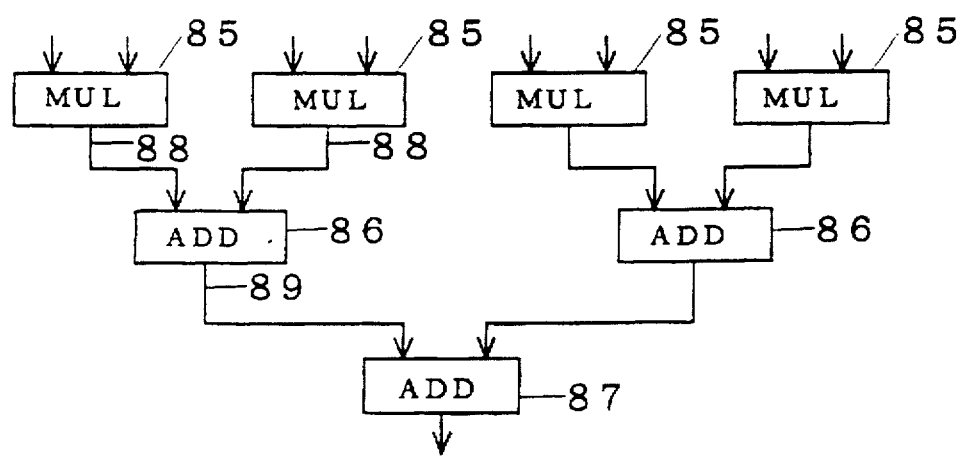
FIG. 22 is a system flow chart for explaining the construction of the processing unit according to the thirteenth embodiment of the present invention.

FIG. 22 shows a hardware construction realized for integration of this processing. In the drawing, 85 are multipliers which execute multiplication of two data input from the input terminal and output at the output terminal. 86, 87 are adders which execute addition of two data input from the input terminal and output at the output terminal. The output terminal of the multiplier 85 and the input terminal of the adder 86 are connected to each other by means of data wire 88. Moreover, the output terminal of adder 86 and input terminal of adder 87 are connected to each other by means of data wire 89. By connecting adders and multipliers in the above construction, it becomes possible to execute the operations indicated in FIG. 5 and output the results at the output terminal of the adder 87 against the data input at the respective input terminals of the multipliers.

In this way, element processors having so-called macro-functional blocks realized by connecting computing elements by means of data wire greatly contribute to the increase of speed in the solution of differential equations such as Navier-Stokes equations, etc.

Next, explanation will be given on the fourteenth embodiment of the present invention.

Figure 23:
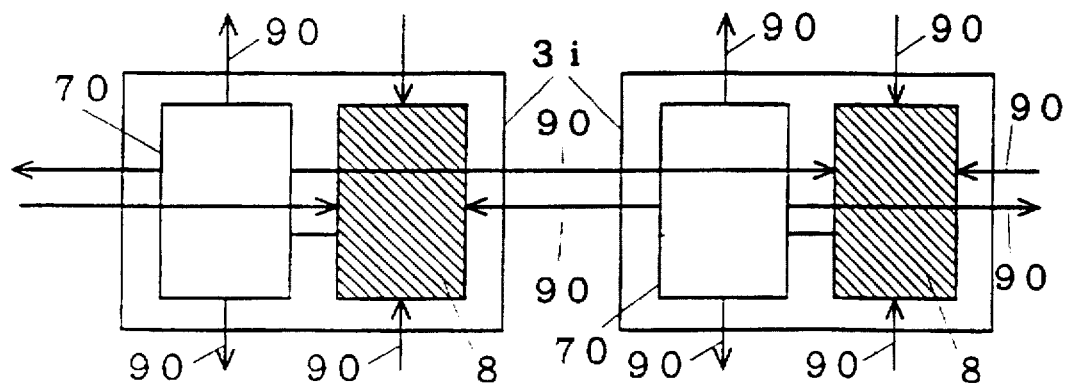
FIG. 23 is a block diagram showing the construction of the information processing system according to the fourteenth embodiment of the present invention.

FIG. 23 is a block diagram showing the construction of a communication circuit for realizing asynchronous and repetitive data communication between mutually adjacent element processors for the respective element processors.

In the drawing, 3$i$ is an element processor, 5 is a processing unit for performing operations provided in the element processor 3$i$, 8 is a data memory for storing the data necessary for the processing of the processing unit provided in the element processor 3$i$, and 90 is a data bus for exchanging the information described in the data memory 8 of the element processor 3 between mutually adjacent element processors 3$i$.

Next, explanation will be given on actions. If, in the processing by the processing unit 5, any information of adjacent element processor 3$i$ is required, that adjacent element processor 3$i$ performs memory access actions of referring to the necessary information described in the data memory 8 of the counterpart utterly asynchronously and repeatedly with the adjacent element processor 3$i$. The operation performed by the respective element processors 3$i$ in the solution of partial differential equations is local because it depends not on the information held by remote element processors 3$i$ but only on the information held by the adjacent element processor 3$i$. Therefore, communication between mutually adjacent element processors 3$i$ shall preferably be maintained utterly asynchronously and repeatedly through the data bus 90, without disturbing the processing of the processing unit 5.

With a construction realized in a way to allow utterly asynchronous and repeated memory access between mutually adjacent element processors 3$i$ without disturbing the processing of adjacent element processors 3$i$, the communication between mutually adjacent element processors 3$i$ are held utterly asynchronously and repeatedly through the data bus 90, without disturbing the processing of the processing unit 5. This makes it possible to continue the operations performed on the respective element processors 3$i$ in an utterly asynchronous way.

While the processing unit 5 and the data memory 8 have data communication between the respective element processors 3$i$ by using a data bus 90 capable of referring to the memory without disturbing the action of the counterpart in this embodiment, the data communication system between element processors becomes synchronous when there is any need of synchronous operation for interrupting the action of the processing unit 5 in the adjacent element processor 3$i$ to have access to the data memory 8 and this increases the communication overhead but does not put any obstacle to the obtention of analytical solution.

Next, explanation will be given on element processor for obtaining an output easy for arranging and sorting of data even with asynchronous absorption of data, according to the fifteenth embodiment of the present invention.

Figure 24:
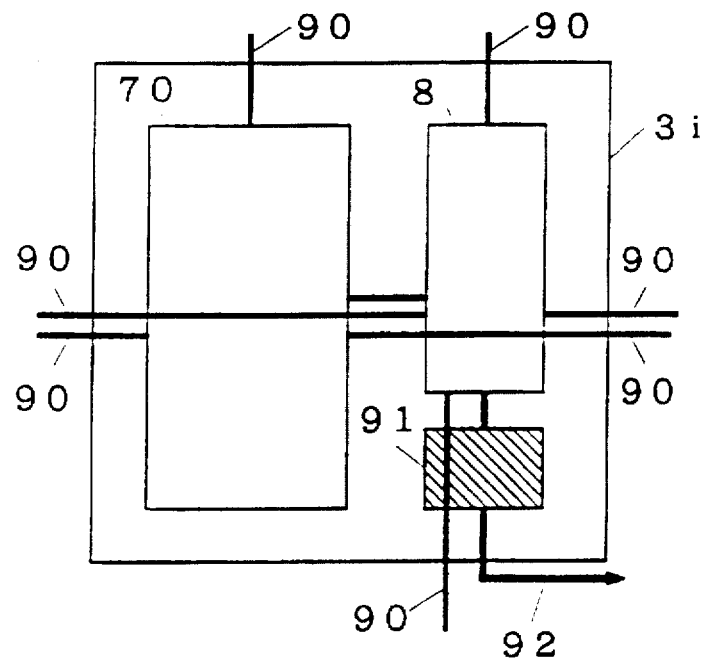
FIG. 24 is a block diagram showing the construction of the element processor used for realizing the information processing system according to the fifteenth embodiment of the present invention.

FIG. 24 is a block diagram showing the construction of an element processor for obtaining an output easy for arranging and sorting of data even with asynchronous absorption of data, realized by attaching an identifier for each quantity of state inside the memory.

In the drawing, 3$i$ is an element processor, 70 is a processing unit for performing operations provided in the element processor 3$i$, 8 is a data memory for storing the computation data including output data and provided in the element processor 3$i$, 90 is a data bus connecting element processors, 91 is an I/O unit for sending out data to outside the element processor 3$i$ by attaching identifier depending on the kind of quantity of state to be output and provided in the element processor 3$i$, and 92 is an output data bus for transferring the data output through the I/O unit 91 to the host computer.

Next, explanation will be given on actions. The results of computation obtained with a series of processings of the processing unit 70 are constructed with a plural number of kinds of quantity of state and yet the sampling time interval of the output data is very much shortened because high-speed operation is intended. For that reason, the output data is given, at its head or tail, an identifier which enables identification of the quantity of state. The output data is continuously output to outside its own element processor 3$i$ asynchronously and in a large volume in the form of packet communication in which a plural number of physical values are carried in a mixed way, and sent out to the host computer through the I/O unit 91 to be submitted to post-processing. At that time, because an output data bus 92 is provided for each of the element processors 3$i$, the data output through the I/O unit 91 is output asynchronously without disturbing the output of the adjacent element processors 3$i$, and transferred to the host computer. Moreover, because the output data is provided with an identifier enabling judgement of that quantity of state, the host computer can perform post-processing by discriminating the data for arranging and sorting even if output data consisting of a plural number of physical value in the form of a packet is sent in a mixed way.

Therefore, according to this embodiment, intermediate results of transient calculation can be outuptted without disturbing the operation of the adjacent element processors 3$i$, thus achieving high-speed operation.

The following output method of synchronous type is also possible as a matter of course: The host computer sends an output command to the respective element processors 3i through the output data bus 92, and the element processors 3i execute the reference function of the data memory provided inside the I/0 unit 91 according to the command received, absorb the output data of the required quantity of state in the order described in the command and prepare a sequence of output data. The sequence of output data generated in the I/O unit are sent out through the data bus 92. Therefore, it becomes possible to make output at optional time by adjusting the timing of sending output commands from the host computer to the respective element processors 3i.

Next, explanation will be given on the sixteenth embodiment of the present invention.

Figure 25:
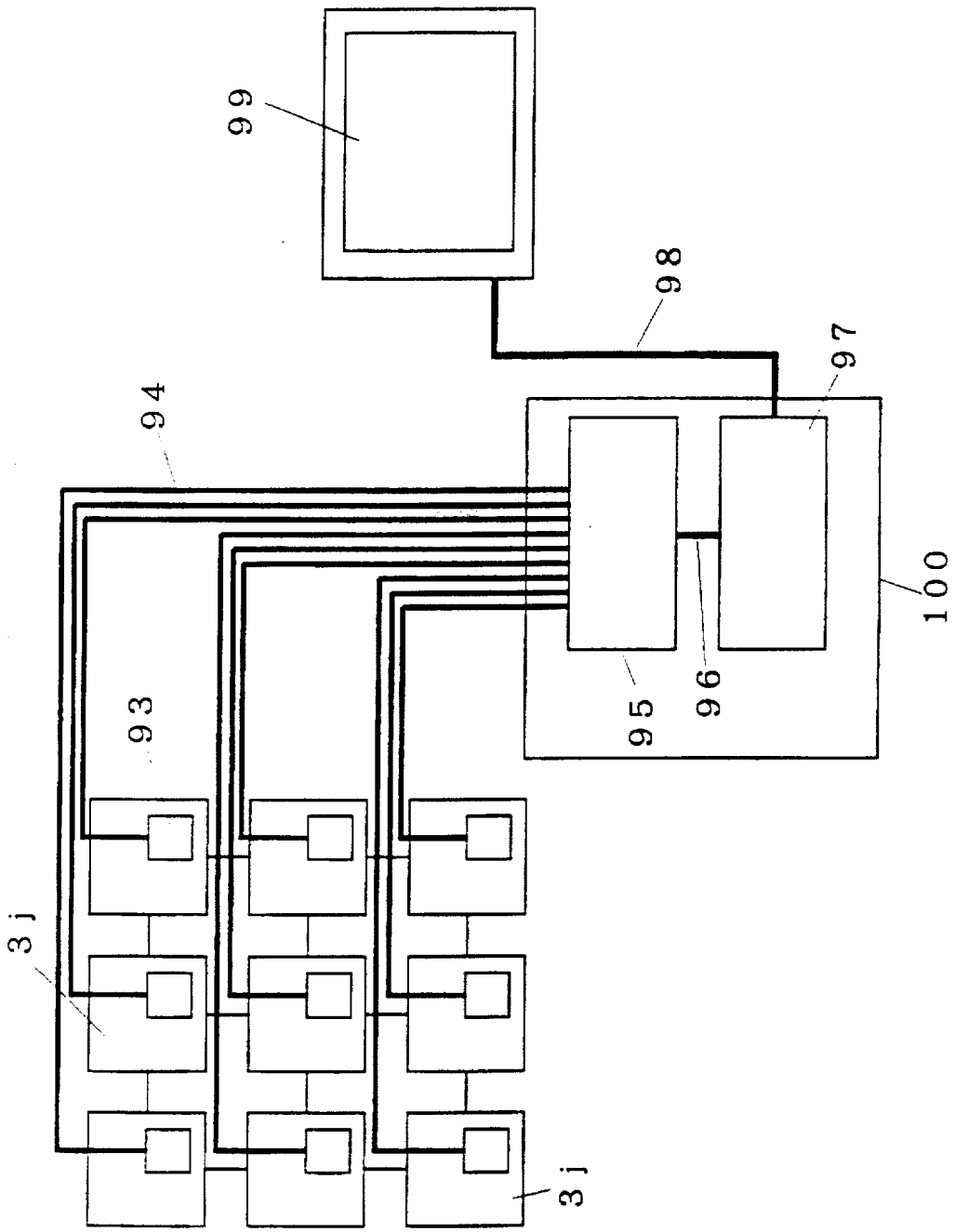
FIG. 25 is a block diagram showing the construction of the information processing system according to the sixteenth embodiment of the present invention.

FIG. 25 is a construction drawing of the entire computer system for collecting asynchronously output data from the respective element processors and visualizing them in real time, according to the sixteenth embodiment of the present invention. In the drawing, 3j is an element processor performing operations, 93 is an I/O unit for output for converting data when outputting the results of operation to outside and provided in the element processor 3j, 94 is an output data bus for transferring the data output through the I/O unit 93 for output on the respective element processors, 95 is a data output control unit for converting the parallel data in at least equal number with that of the element processors 3j transferred from the respective element processors 3j through the output data bus 94 into serial data, 96 is a serial data bus for transferring the data converted into serial data through the data output control unit, 97 is a post-processing unit for sorting the data sent through the serial data bus 96 by type and performing post-processings such as inversion of scale, double scaling, averaging, correction of colour tone, indication of contour, contour processing, fringe treatment, vector indication, etc., 98 is an image output data bus for transferring image data prepared by the post-processing unit 97, and 99 is a display for indicating the image data transferred through the image output data bus 98.

Next, explanation will be given on actions.

The output data bus 94 is directly connected with the element processor 3j, and the external output data of the respective element processors 3j is output asynchronously through the I/O unit for output 93. The output data is a sequence of data containing a plural number of physical values at the point in time when it is output from the element processors 3j. Moreover, at the time of output, the data construction is made in the form of packet by attaching identifier showing the element processor number to either the head or the tail of the data sequence to make clear from which element processor 3j the data is output. The data sequence is collected to the data output control unit 95 through the output data bus 94 and converted into one serial data from parallel data in a number at least equal to that of the element processors. Moreover, the data sent to the post-processing unit 97 through the serial data bus 96 are assigned according to the identifiers of element processor number and also split and arranged according to the identifiers of quantity of state. The arranged data is submitted to post-processings for visualization such as contour processing, fringe treatment, vector indication, etc. and turned into visual images on the display 99 through the image output data bus 98. Therefore, according to this embodiment, intermediate results of transient calculation can be output without disturbing the operation of the element processors 3j, thus achieving high-speed operation.

It is also possible, naturally, to output the data output asynchronously from the I/O unit for output through the post-processing unit 97 and freely control the time intervals of visualization by setting the sampling time inside the post-processing unit 97.

If the output data bus 94 is connected to the data output control unit 95 from the respective element processors 3 as shown in FIG. 25, the wiring becomes a complicated one and this presents a risk of making miniaturization of equipment difficult or frequently producing manufacturing troubles.

Figure 26:
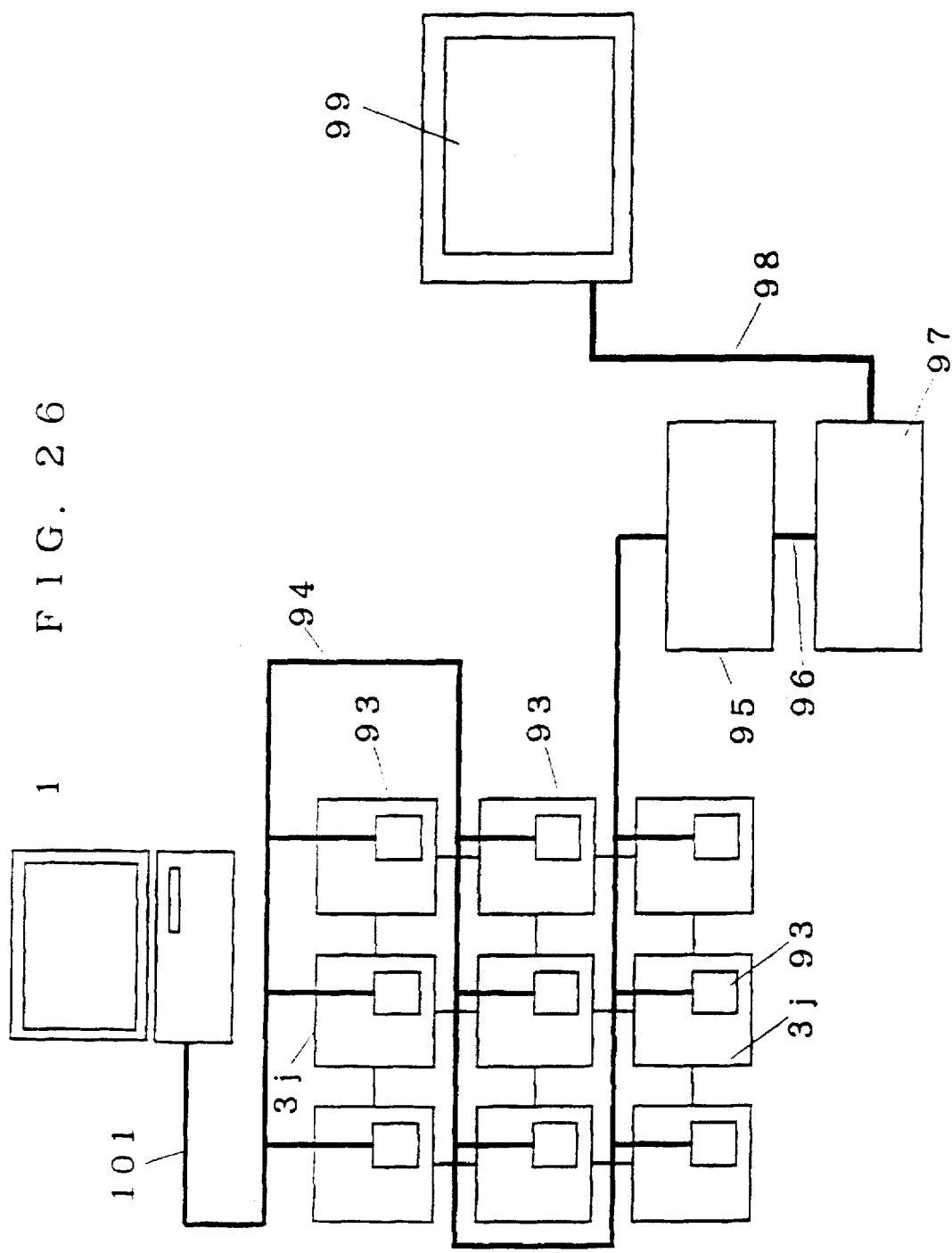
FIG. 26 is a block diagram showing the construction of the information processing system according to the seventeenth embodiment of the present invention.

Explanation will be given on the seventeenth embodiment realized for the purpose of solving that problem based on drawings. FIG. 26 is a construction drawing of an entire computer system for solving the said problem by minimizing the output data bus 94. The output data bus 94 is a single data bus connecting all the element processors 3j and the data output control unit 95. Moreover, 100 is the host computer and 101 is a network connecting the host computer and 100 and the output data bus 94. Others are the same as those in FIG. 25.

Next, explanation will be given on the actions.

The output data is a sequence of data containing a plural number of physical values. The host computer controls the timing of sending the output data from the respective element processors 3j to the output data bus 94. The respective element processors 3j send out output data to the output data bus through the I/O unit for output 93. At that time, the data construction is made in the form of packet by attaching identifier showing the element processor number to either the head or the tail of the data sequence to make clear from which element processor 3j the data is output. The data output control unit 95 rearranges the data coming in through the output data bus 94 according to the identifier of element processor number and convert them into one serial data. Moreover, the data sent to the post-processing unit 97 through the serial data bus 96 are classified and arranged according to the identifiers of quantity of state. The arranged data is submitted to post-processings for visualization such as contour processing, fringe treatment, vector indication, etc. and turned into visual images on the display 99 through the image output data bus 98. Therefore, with the construction of minimum output data bus, intermediate results of transient calculation can be outputted without disturbing the operation of the element processors 3j, thus achieving high-speed operation.

Next, explanation will be given on the eighteenth embodiment of the present invention. In conventional parallel computers, which are mainly intended for high-speed computation, a problem was that increase of computing speed does not necessarily lead to increase of speed of the entire operations because, when either indicating the results of computation of stationary computation or indicating the results of computation at every moment of transient calculation, it is necessary to suspend the operation of all element processors or keep other element processors on standby by suspending their operations until the results of all the element processors are available.

Figure 27:
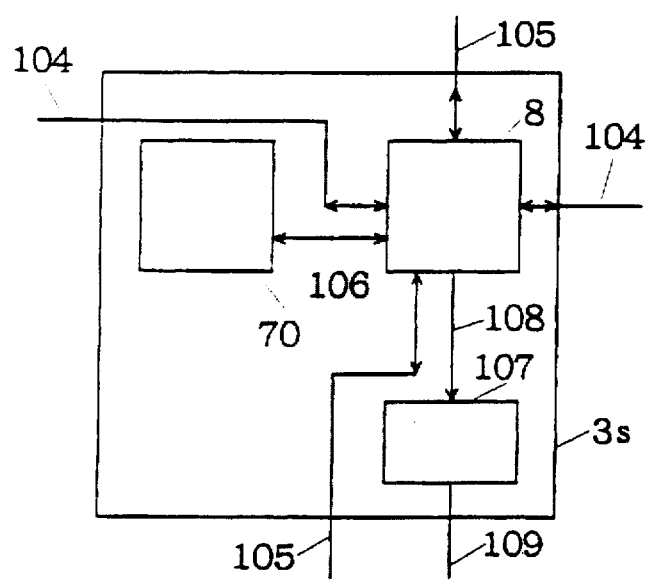
FIG. 27 is a block diagram showing the construction of the element processor used for realizing the information processing system according to the sixteenth and seventeenth embodiments of the present invention.
Figure 28:
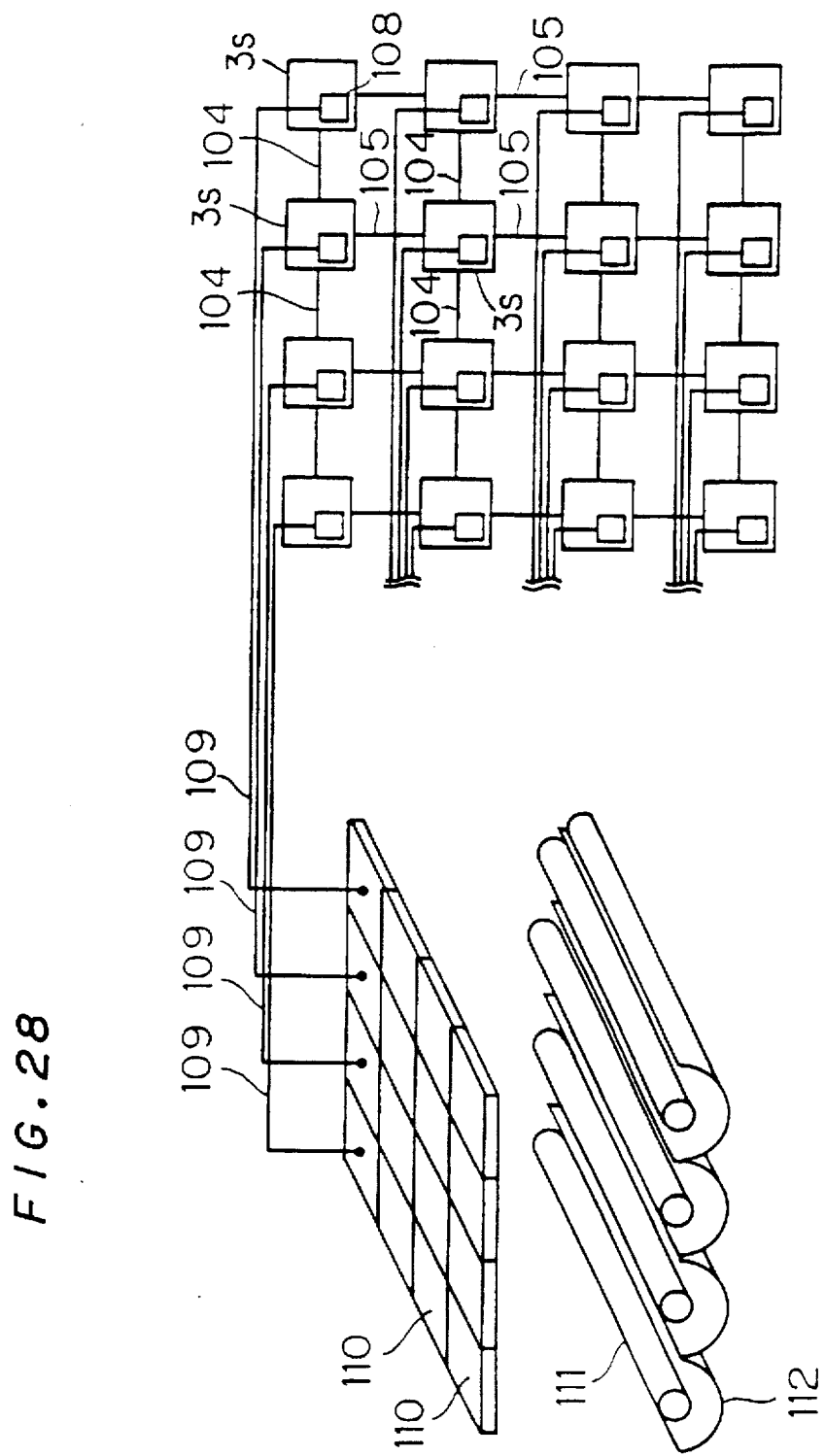
FIG. 28 is a block diagram showing the construction of the information processing system according to the eighteenth embodiment of the present invention.

FIG. 27 is a construction drawing of an element processor indicating an example for increase of speed of entire computation by parallel indication of results of computation, and FIG. 28 is a general construction drawing of a multiprocessor composed of element processors indicated in FIG. 27.

In the drawings, 3s is an element processor, 70 is a processing unit for performing computation provided in the element processor 3s, 8 is a memory unit for storing the computation information necessary for the computation of the processing unit 70 and provided in the element processor 3s, 107 is an output information processing unit for receiving the computation information stored in the memory unit 8 without suspending the computation of the processing unit 70 and keeping that information as it is if one computation lattice point is assigned to one element processor but, in case a plural number of lattice points are woven in one element processor, processing the information of those lattice points. 104 is a computation information bus in line direction for exchanging data necessary for the operations between the memory units 6 inside the element processor 3s in the line direction, 105 is a computation information bus in direction of sequence for exchanging data necessary for the operations between the memory unit 8 inside the element processor 3s in the direction of sequence, 106 is an internal computation information bus for exchanging data necessary for the operations between the processing unit-70 and the memory units 8 or data of results of computation, 108 is an output processing information bus for transmitting the computation information stored in the memory units 70 to the output information processing unit 107, 110 are display elements such as elements for converting computation information into transmissivity of light like liquid crystal display element or using Kerr effect of changing magnetic strain into reflection of light, colour liquid crystal display element for conversion into change of colour, etc., 111 are lamps for emitting light from the back side of the display element 110 if they are of light transmission type and from the surface side of the display elements 110 in the case of light reflection type, 112 are reflectors for turning the light of the lamps 111 into parallel light, and 113 is an output processing information bus for transmitting output processing information from the output information processing unit 107 of the respective element processors 3s to the display elements 110.

The memory unit 8 of the respective element processors 3s stores the computation information necessary for the computation of the processing unit 70 and exchange data necessary for operations (input data) or data of results of computation (output data) between the processing unit 5 and the memory unit 6. Therefore, until the time when the computation converges or for displaying the change in the results of computation at every moment of transient calculation, there is no choice but disturb the entire computation by either stopping the computation of the processing unit 70 to have access to the memory unit 8 or by remaining on standby until the computation of all the element processors 3s converges to display the results of computation after convergence. In this embodiment, an output information processing unit 107 connected asynchronously with the memory unit 8 (can receive the computation information sent out by the memory unit 8 without matching with the memory unit nor disturbing the communication between the memory unit 8 and the element processors 3s) is provided inside the element processors 3s, so as to keep the computation information sent out by the memory unit 8 as it is if one computation lattice point is assigned to one element processor but, in case a plural number of lattice points are woven in one element processor, process the information of those lattice points, and also convert digital data into analog data through a digital/analog conversion circuit held as internal construction to send it out to the display elements through the output processing information bus 113. The display elements 110 convert computation information into transmissivity of light like liquid crystal display element, change magnetic strain into transmissivity of light (element using Kerr effect), or convert into change of colour of transmitted light (colour liquid crystal display element), etc. At that time, the display elements 110 can visually display the output processing information without disturbing the action of the output information processing unit 107 because light is irradiated from the back side if they are of light transmission type and from the surface side of the display elements 110 in the case of light reflection type by the lamps 111 converted into parallel light by the reflectors 112.

In this way, this construction makes it possible to visually observe the intermediate progress of computation or final results of computation and utilize them for the purpose of control without disturbing the high-speed processing of the computation.

Next, explanation will be given on the nineteenth embodiment of the present invention.

Figure 29:
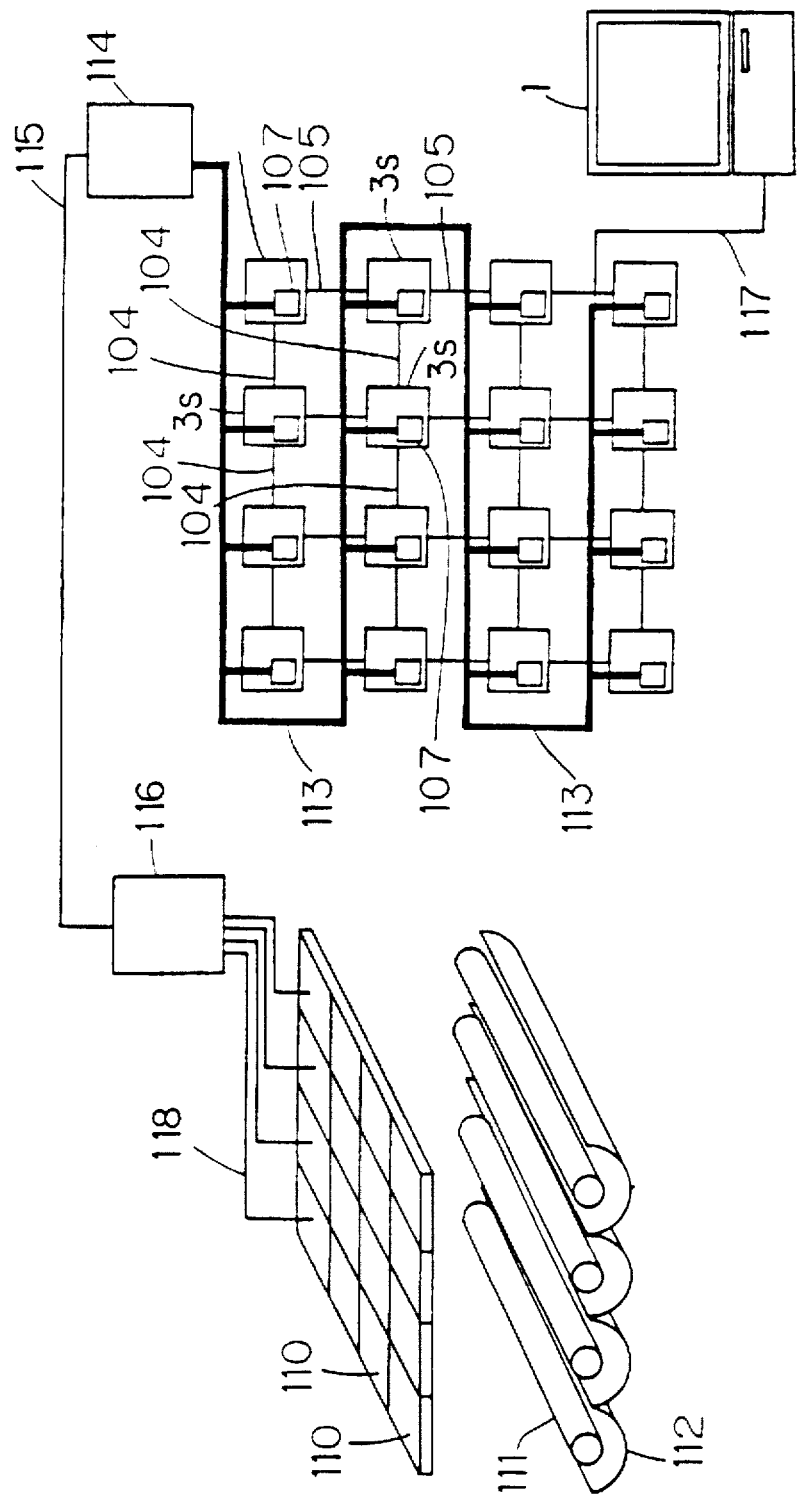
FIG. 29 is a block diagram showing the construction of the information processing system according to the nineteenth embodiment of the present invention.

If the output processing information bus 113 is wired individually to the display elements 110 from the respective element processors 3s as shown in FIG. 28, the volume of wiring becomes enormous making it impossible to secure a large distance between the computer system and the display unit. FIG. 29 is a construction drawing of an entire computer system for solving the said problem by having a single serial bus between the computer system and the display unit.

In the drawing, 1 is the host computer, 114 is a data output control unit for converting the output data sent at random into serial data by changing their order, 113 is an output processing information bus connecting all the element processors 3s and the data output control unit 114, 117 is a network connecting the host computer 1 and the output processing information bus 113, 116 is a display data control unit for decomposing the serial data and assigning them as display data to the respective display elements 110, 115 is a serial data bus connecting the data output control unit 114 and the display data control unit 116, and 118 are display data buses connecting the display data control unit 116 and the respective display elements 110. Others are the same as those in FIG. 28.

Next, explanation will be given on actions. The output information processing unit 107 keeps the computation information sent out by the memory unit as it is if one computation lattice point is assigned to one element processor but, in case a plural number of lattice points are woven in one element processor, processes the information of those lattice points. The host computer 1 controls the timing of sending output processing information from the respective element processors 3s to the output processing information bus 113. The respective element processors 3s send out output processing information from the output information processing unit 107 to the output processing information bus 113 according to the timing controlled by the host computer 1. At that time, the data construction is made in the form of packet by attaching identifier showing the element processor number to either the head or the tail of the data sequence to make clear from which element processor 3s the data is output. The data output control unit 114 rearranges the output processing information coming in through the output processing information bus 113 according to the identifiers of element processor number and converts them into one serial data. Moreover, the data sent to the display data control unit 116 through the serial data bus 115 are assigned again to the corresponding display elements 110 respectively according to the identifiers of element processor number, converted from digital data into analog data through a digital/analog conversion circuit and sent out to the respective display elements through the display data bus 113. The display elements 110 convert computation information into transmissivity of light like liquid crystal display element, change magnetic strain into reflection of light, or convert it into change of colour of transmitted light, for example. At that time, the display elements 110 can visually display the output processing information without disturbing the action of the output information processing unit 107 because light is irradiated from the back side if they are of light transmission type and from the surface side of the display elements 110 in the case of light reflection type by the lamps 111 converted into parallel light by the reflectors 112.

As explained above, this construction makes it possible to secure a large distance between the computer system and the display unit, visually observe the intermediate progress of computation or final results of computation and utilize them for the purpose of control without disturbing the high-speed processing of the computation with the minimum data bus construction.

Next, explanation will be given on the twentieth embodiment of the present invention. This embodiment is explained in fluid analysis, etc., for example.

Figure 30:
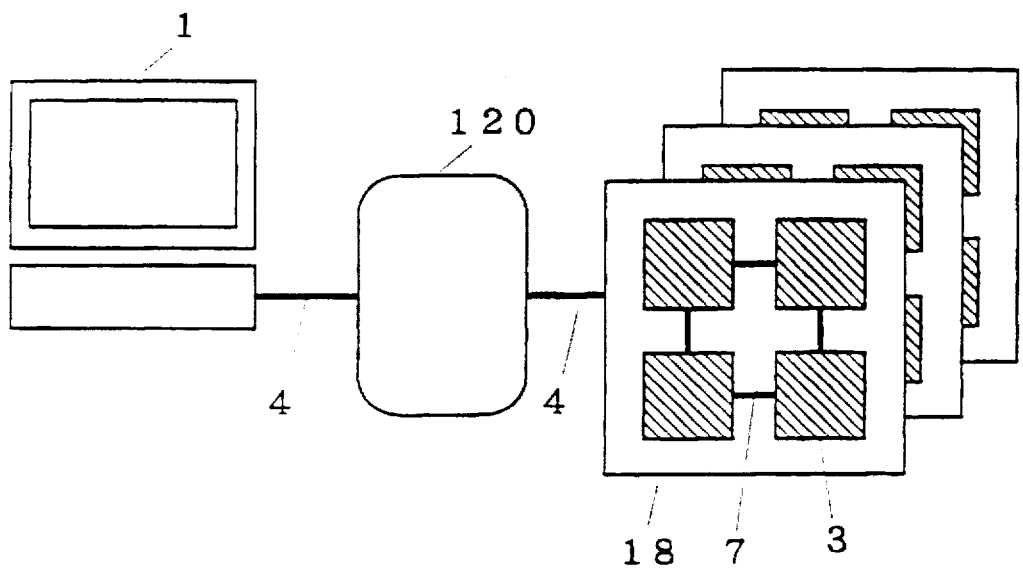
FIG. 30 is a block diagram showing the construction of the information processing system according to the thirtieth embodiment of the present invention.

The accuracy of analysis improves with the use of body fitted curvature using lattices along the surface of body when analyzing a flow along the external surface of a material having a complicated curved shape if the object of computation is an external flow but along the internal wall face having a curved shape if it is an internal flow, with the use of a complex curvature using a combination of coarse lattices and fine lattices in the case where the object of computation has a locally complicated structure, and with the use of solution fitted curvature which automatically reduces the size of lattices of the part with violent changes in the case where the phenomena produce violent local changes. However, to use such coordinate systems, it is necessary to constantly perform troublesome conversion of coordinates between physical coordinate system and computed coordinate system. This embodiment is intended to not only facilitate generation of lattices but also increase the computation speed in the fluid analysis and shorten the display time of the results of computation, by providing a special coordinate conversion unit having the function of coordinate conversion between the physical coordinate space and computed coordinate space. FIG. 30 indicates the general construction drawing of the multi-processor.

In the drawing, 1 is the host computer, 3 are element processors, 7 is a connection between element processors connecting between the element processors for exchanging information, 18 are secondary computation boards realized by connecting element processors 3 in the shape of two-dimensional planes by means of the connection between element processors 7, 4 is a network for exchanging information by connecting the element processors in the secondary computation boards 18, and 120 is a special coordinate conversion unit for converting coordinates provided on the way of the network 4.

When initial conditions and boundary conditions are loaded on the multi-processor from the host computer, first the coordinate conversion unit 120 converts coordinates from physical coordinate system to computed coordinate system, and only the information relating to the computed coordinate is input in the multi-processor. Therefore, the troublesome computation of coordinate conversion is separated in the element processors and the essential fluid computation is speeded up. Moreover, while it is necessary to convert the results of computation for conversion into a physical coordinate system easy for visual understanding when outputting the results of computation, the conversion into physical coordinate system which prevents the operation inside the element processors is performed by the special coordinate conversion unit during transfer from the element processors to the host computer 1. Therefore, not only the output time of the results of computation is reduced but also the element processors can maintain high-speed operations without disturbing the operations for the purpose of outputting the results of computation.

As explained above, according to this embodiment, not only the conversion of coordinates necessary for the computation but also the formation of lattices become easier and the accuracy of the solution improves if the special coordinate conversion unit performing pre-treatment, post-treatment, etc. of coordinate systems is supported with hardware or software. Moreover, also in the visualization of the results of computation, reduction of display time can be achieved through high-speed conversion from computed coordinates to physical coordinates made by using the special coordinate conversion unit.

Next, explanation will be given on the twenty-first embodiment of the present invention.

Figure 31:
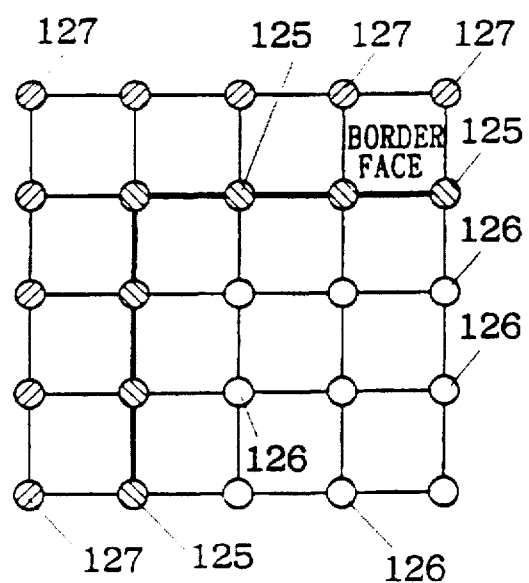
FIG. 31 is a plan view showing the state of lattice points for explaining the construction of the information processing system according to the twenty-first embodiment of the present invention.

FIG. 31 indicates computation lattice points in the neighborhood of the border of computation area showing an example for improving the efficiency of parallel computation made by levelling the load of the respective element processors. In the drawing, 125 are lattice points on the border of computation area, 126 are lattice points inside the computation area, and 127 are virtual lattice points adjacent to the lattice points outside the computation area on border 125, all those lattice points corresponding at 1:1 to the respective element processors.

The lattice points on border 125, the number of adjacent lattice points of which is smaller than the number of the lattice points inside the computation area 126, are smaller in both amount of communication and amount of operations than the internal lattice points 126. For that reason, virtual lattice points 127 are provided outside the border for equalizing the amount of processing with that of the internal lattice points 126 by making dummy communication with the lattice points on border 125 in order to level the amount of processing of all lattice points, by avoiding overhead due to synchronization in the case where synchronized processing with other internal lattice points 126 which reduces the processing time for the lattice points on border 125 is necessary, but avoiding unevenness of operating load in the case where asynchronous computation is performed.

While, in the above-mentioned embodiment, explanation was given on a case where the computed lattice points correspond at 1:1 to the element processors, the same effects as those of the above-mentioned embodiment can be obtained, also in the case where a plural number of computed lattice points correspond to one element processor, by connecting virtual lattice points 127 to the lattice points on border 125 and giving them the same computation load as that for element processor containing internal lattice points 126 only, because the processing time of the element processor containing lattice points on border 125 is reduced.

Therefore, according to this embodiment, it becomes possible to level the load of the respective element processors and improve the efficiency in parallel operation.

Next, explanation will be given on the twenty-second embodiment of the present invention. In the case where the element processor is a so-called Neumann's processor, they make time sharing processing when computation of a plural number of computed lattice points is assigned to it, because it is impossible to make parallel operation with a single Neumann's processor.

On the contrary, computation of a plural number of computed lattice points can be executed in parallel with the use of a data flow processor, for example, capable of parallel processing on command level. Data flow processor is introduced by MITSUBISHI DENKI GIHOU, Vo. 66, No. 2, 1992, p. 24 to p. 25, for example. As it can be seen from such description, a data flow processor is capable of parallel processing on the command level.

As explained above, simultaneously executable commands can be executed independently in a data flow (data driven) system.

Explanation will be given on the method for realizing a differential equation solving program based on finite difference method on a data flow processor having such characteristics. In the case of application to the element processor indicated in FIG. 21, for example, a computation program is assigned to the program memory 11 and the floating point arithmetic element performs operations according to the data flow graph.

Figure 32:
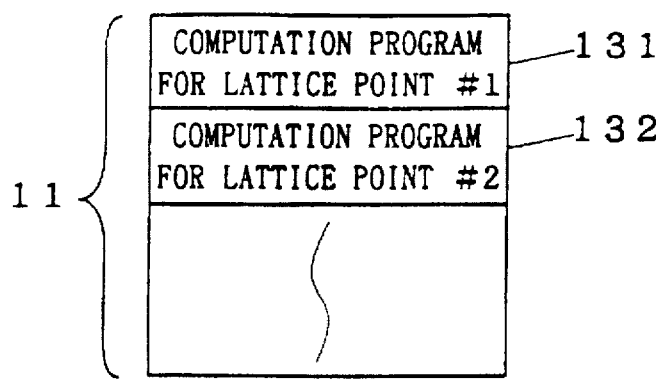
FIG. 32 is a drawing showing the layout of the program memory for explaining the information processing system according to the twenty-second embodiment of the present invention.

FIG. 32 is a drawing showing a program memory in which part of the program for solving a partial differential equation is written.

As shown in FIG. 32, the computation program for lattice points No. 1 and No. 2 is assigned to different areas 131, 132 of the program memory 11. The initial packet input from outside is given in advance command code, destination node address, etc. to have the command executed without passing through the program memory 11. Execution packets are produced when queuing is completed in the matching memory 83. In the data memory 8, access to memory is made according to the command code. Of the field constituting the packets output from the data memory, the destination node address is processed by the program memory 11 while the command code and the operand data are treated by the operation processing unit 10 respectively. Namely, the program memory 11 renews the destination node address of the input packet into the next destination node address read out, and the operation processing unit 10 sets the results of operation in the first operand data field. The result packet is either processed again or output to outside as final result. The two programs stored in different areas 131, 132 of the program memory 11 give command code and destination node address respectively to the result packet to enable simultaneous operations. On a processor of data flow system, those two programs exist in mixed state on the command level and are submitted to parallel processing.

Next, explanation will be given on the twenty-third embodiment of the present invention.

By performing processing using identifiers on a dynamic processor of data flow system, it becomes possible to execute one same program on a plural number of sets of input data. This type of dynamic processor of data flow system is indicated in J. A. Sharp: "Data Flow Computing", Science Publishing Co. (1986), for example.

Figure 33:
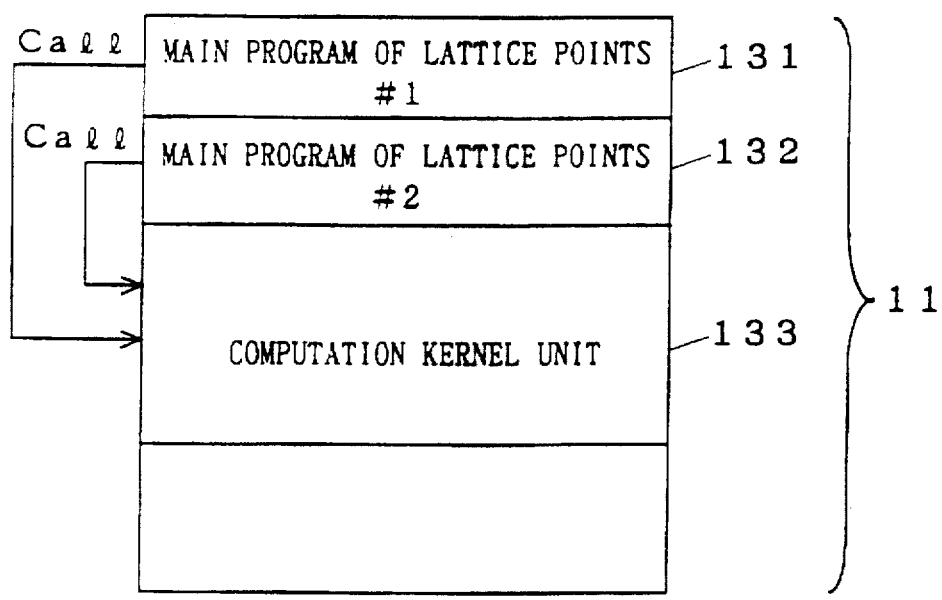
FIG. 33 is a drawing showing the layout of the program memory for explaining the information processing system by dynamic data flow system according to the twenty-third embodiment of the present invention.

As shown in FIG. 33, two lattice points (No. 1, No. 2) are assigned to the element processor concerned, and the program memory 130 stores small main programs 131, 132 for lattice points No. 1, No. 2, respectively. The function of the main programs 131, 132 is to give those data to the computation kernel unit 133 after putting specific identifier numbers (colour identifiers) to the respective lattice points. In the computation kernel unit 133, which simultaneously performs the processings 131 and 132 for lattice points No. 1, No. 2, the two processings are executed completely independently of each other because the data are provided with identifiers.

As explained above, in a data flow processing not requiring any memory access, one same program can be executed simultaneously on a plural number of sets of data by introduction of colour identifiers. However, no exclusive control by colour identifiers can be made for data memory access. This problem must be avoided on the programmer's responsibility. As a method of avoiding this problem, it is possible to obtain different data memory addresses for respective colour identifiers by making conversion of colour identifiers and data memory address with the program.

Figure 34:
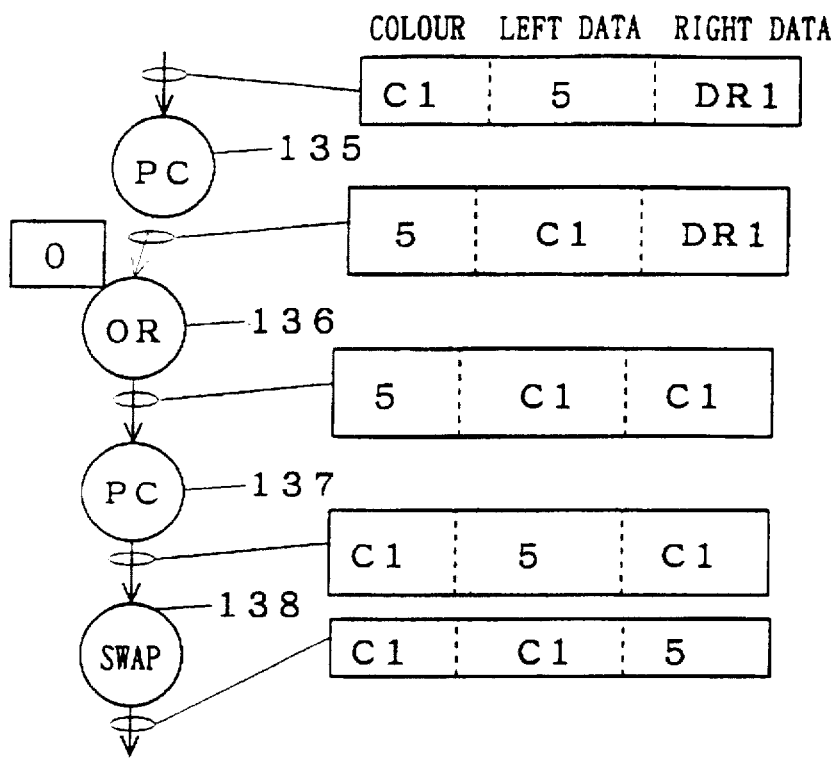
FIG. 34 is a conceptual drawing showing an example of colour acquisition function for acquiring different data memory addresses for respective colour identifiers in the twenty-third embodiment of the present invention.

FIG. 34 indicates an example of function for storing the content of colour identifiers (hereinafter referred to as "colour request function") in the operand data field. FIG. 34 is a data flow graph showing colour request functions. On the right side of the chart, the changes of data packet are also described. Since the drawing is a simple one, only the colour identifiers, the left data (first operand) and the right data (second operand) are described as a format of packet. In the drawing, 135 to 138 are nodes for processing data in order. The node 135 executes PC command, the node 136 OR command, the Node 137 PC command and the last node 138 SWAP command. The function of the commands used for the flow graph in FIG. 34 will be explained hereafter.

(1) PC is a command for exchanging the colour identifier and the left data for each other.

(2) OR is a command for performing logical sum operation on bit-to-bit basis between the left data and the right data and storing the result of that operation in the left data.

(3) SWAP is a command for outputting the left data and the right data by exchanging them for each other.

Next, explanation will be given on the action/of the colour request function. The data packet input shall be considered as storing C1 as colour identifier, 5 in the left data and DR1 in the right data.

The input data is submitted, in the node 135 to an exchange of colour identifier for left data by the PC command. Next, that data is submitted, in the node 136, to OR operation with the constant value "10" and, as a result, the data packet of 5 for colour identifier and C1 for left data and right data is output. Moreover, in the node 137, the PC command is executed to this data packet to turn it into a packet of C1 for colour identifier, 5 for left data and C1 for right data. Lastly, an output packet on the node 138 exchange the left data and the right data for each other according to the SWAP command, have colour identifiers identical to the input data packet and stores and outputs the colour identifiers owned by itself in the left data. The output packet from the colour request function could acquire the colour identifier owned by itself as left data.

Next, explanation will be given on the method for calculating the address of data memory by using the results computed with the above-mentioned colour request function.

Figure 35:
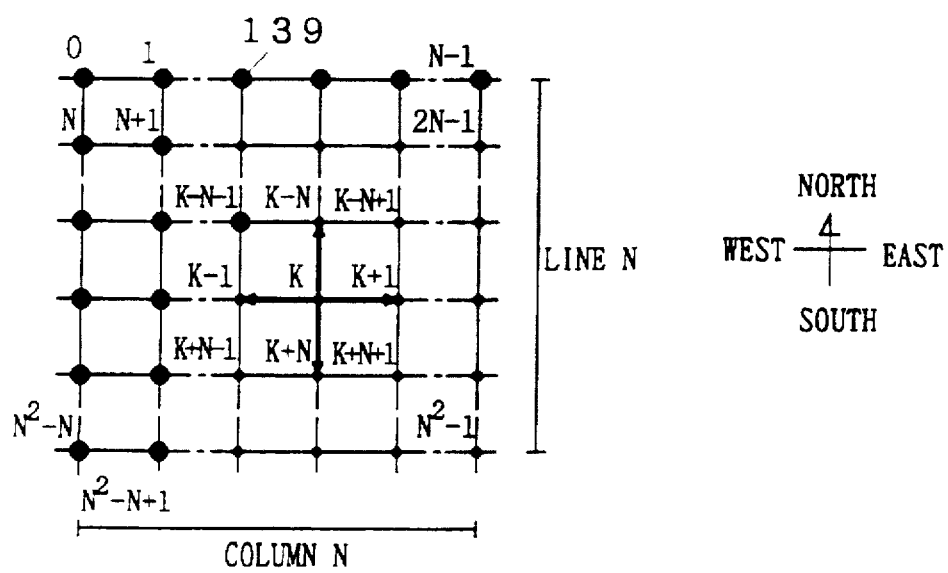
FIG. 35 is a conceptual drawing showing an example of layout of colour identifiers for realizing colour acquisition function.

FIG. 35 indicates a conceptual drawing of an example of method for assigning colour identifiers to the respective lattice points. In the drawing, 139 are lattice points. Explanation will be given on two-dimensional analysis in which the lattice points 139 are arranged in the form of mesh. Here, a colour identifier 0 is assigned at the left top of the lattice points 139 arranged in the form of mesh in lines N and columns N, and colours are assigned to the respective lattice points in such a way that the colour number increases as it progresses in the right direction and the downward direction.

In the conceptual drawing indicated in FIG. 35 the symbols at left top of the respective lattice points 139 are colour identifiers signed to the respective lattice points. Because the assignment was made as indicated above, he colour identifiers (CN) assigned to the neighboring lattice points can be calculated as in Formula 36 below by using the colour identifiers assigned to own lattice points acquired with the colour request function.

As terms indicating directions, the top will be called north, the bottom will be south, the right east and the left west. The equation ① in Formula 36 indicates the colour identifier assigned to the neighboring lattice point in the direction of north of the lattice point concerned. In the same way, the equations ② to ③ in Formula 36 indicate the colour identifiers assigned to the neighboring lattice point in the south, west and east directions respectively.

① $CN$=Output value of colour request function-$N$

② $CN$=Output value of colour request function+$N$

③ $CN$=Output value of colour request function-1

④ $CN$=Output value of colour request function+1+tm (36)

Figure 36:
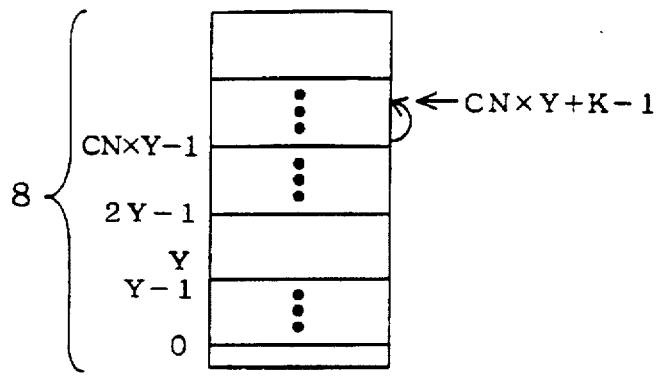
FIG. 36 is a drawing showing an example of the construction of the data memory for realizing colour acquisition function.

As shown in FIG. 36, Y words of the data memory 8 are assigned to the respective lattice points and the memory allocation is made in such a way that the address of the data memory assigned to the lattice point the colour identifier of which is Z may become the area of (Z×Y) to (X×Y+Y−1).

Therefore, the address of the memory assigned to the lattice point the colour identifier of which is CN is given by Formula 37.

$$CNA = CN \times Y + k - 1 \qquad (37)$$

However, k is a predetermined number and means that access is made to the "k"th word of the data memory elements of Y words assigned to the lattice point the colour identifier of which is CN.

As explained above, because the system is constructed in such a way as to perform the conversion of colour identifiers and data memory addresses with a program and have access to different data memory areas for respective colour identifiers, it is possible to realize asynchronous communication between lattice points at equal values by mutually referring to the memory of the element processors 3 also in the data flow system, without using any special hardware for it.

Next, explanation will be given on the twenty-fourth embodiment of the present invention.

This type of information processing system for solving differential equations divides the object equation into differences namely divides the space (time is also included in some case) in the lattice and, to determine various quantities at the respective lattice points (representative points of the divided space), executes convergence computation by using the results of computation at neighboring lattice points. In this embodiment, memories for storing the results of computation at respective lattice points are assigned to the respective lattice points to realize exchange of data between lattice points by referring to those memories. Explanation will be given on an example showing the method of exchange of data between lattice points hereafter.

Figure 37:
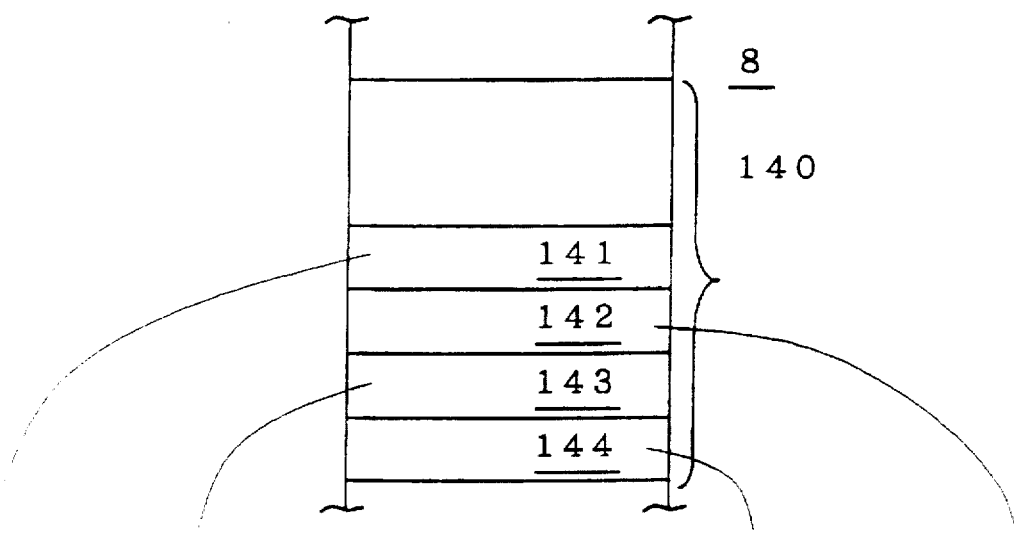
FIG. 37 is a drawing showing the construction of the data memory for realizing the information processing system according to the twenty-fourth embodiment of the present invention.

FIG. 37 indicates the data memory area assigned for storing the results of computation at one lattice point. In the drawing, 140 is an areas assigned to one lattice point in the data memory 8 for storing the results of computation at the lattice point, and 141 to 144 are areas laid out in the area 140 and storing the data of flag of necessity or not of communication for lattice points in the respective directions of east, west, south and north.

As shown in FIG. 37, in the area assigned to inch lattice point, two kinds of data i.e. (1) data to be referred to by the adjacent lattice point of the results of computation at the lattice point, and (2) flag indicating the necessity or not of communication in the respective directions of communication (here, the directions are named as directions of east, west, south and north on the supposition of two-dimensional construction) and if the communication is processing of lattice point laid out in one same processor or if it is a communication made through a network, etc. are stored.

Figure 38:
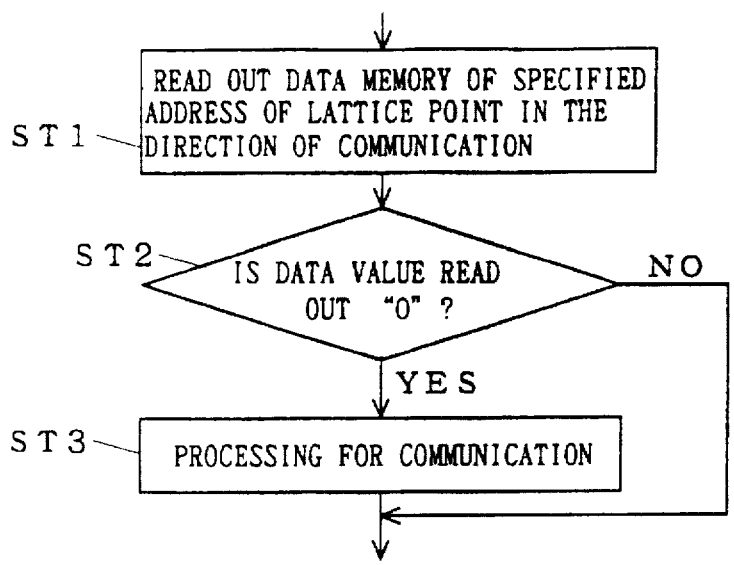
FIG. 38 is a flow chart showing the procedure of communication between lattice points according to the twenty-fourth embodiment.

FIG. 38 is a flow chart showing the flow of processing in the case where communication is held between lattice points. First, when making communication between lattice points, the data stored in the predetermined address of the data memory area assigned to each direction of communication is read out (step ST1). Next, necessity or not of communication is judged in step ST2. Namely, (the processing unit) performs a processing for communication if the data read out is "1" because it means that the adjacent lattice point exists in the direction in which the communication is intended. On the other hand, if the data read out is "0", no processing for communication will be made because it means that this lattice point exists on the border of the system and no communication is required in this direction.

Next, in step ST3, the processing unit reads out the data stored in another predetermined address of the data memory in which a flag indicating the type of communication is stored, and tests the data value read out in the same way as above.

In the case where the data read out is "0", it means that communication is made with the lattice point laid out in one same processor and (the processing unit) performs address computation by the method indicated in the twenty-third embodiment of the present invention and makes communication between lattice points by referring to and renewing the data memory area assigned to the adjacent lattice point.

On the other hand, if the data read out is other than "0", it means that the lattice point for making communication is assigned to other processor and, at the same time, the processor No. to which the lattice point of the partner of communication is stored in the upper 8 bits of the 32-bit data read out, while the base address of the data memory assigned to the lattice point of the partner of communication is stored in the lower 24 bits. As shown in the twenty-third embodiment, an off-set address is added to said 32-bit data to compute the address of the data memory storing the desired data. If any distributed shared memory access is executed with said data as address, the data packet is transferred through the network to the processor to which the lattice point for making communication is assigned, to read the desired data, return to the transmitting processor again together with that data and continue the computation of the lattice point.

As explained above, in the multi-processor making communication between lattice points, a field for storing the information indicating possibility or not or method of communication such as direction available for communication or not for each direction of the respective lattice points, communication passing through a network or not, etc. was assigned in the data memory, and distributed shared memory access was used in the case of communication passing through a network. The mechanism of distributed shared memory access is disclosed in detail in the Japanese Patent Laid-open Gazette No. 3-122338.

For that reason, both the processing of lattice points on the border and the processing of lattice points inside the border can be realized with one same program and, therefore, the program size can be reduced.

Moreover, when the respective lattice points are assigned to a plural number of processors, communication between lattice points ranging over the processors can be realized easily without relying on the method of assignment of lattice points.

In the twenty-fifth embodiment, twenty-sixth embodiment, twenty-seventh embodiment and twenty-eighth embodiment of the present invention to be described hereafter, it is premised that the processing program of a plural number of lattice points is assigned to one same element processor so as to perform exchange of data between the lattice points through the data memory in one same element processor. The respective embodiments will be explained in detail hereafter.

Next, explanation will be given on the twenty-fifth embodiment of the present invention. Explanation will be given on the computation system having a table which indicates, in a multi-processor which assigns a memory to each lattice point and makes communication between lattice points dose to each other through this memory, the memory area in each direction for making communication for each lattice point.

Figure 39:
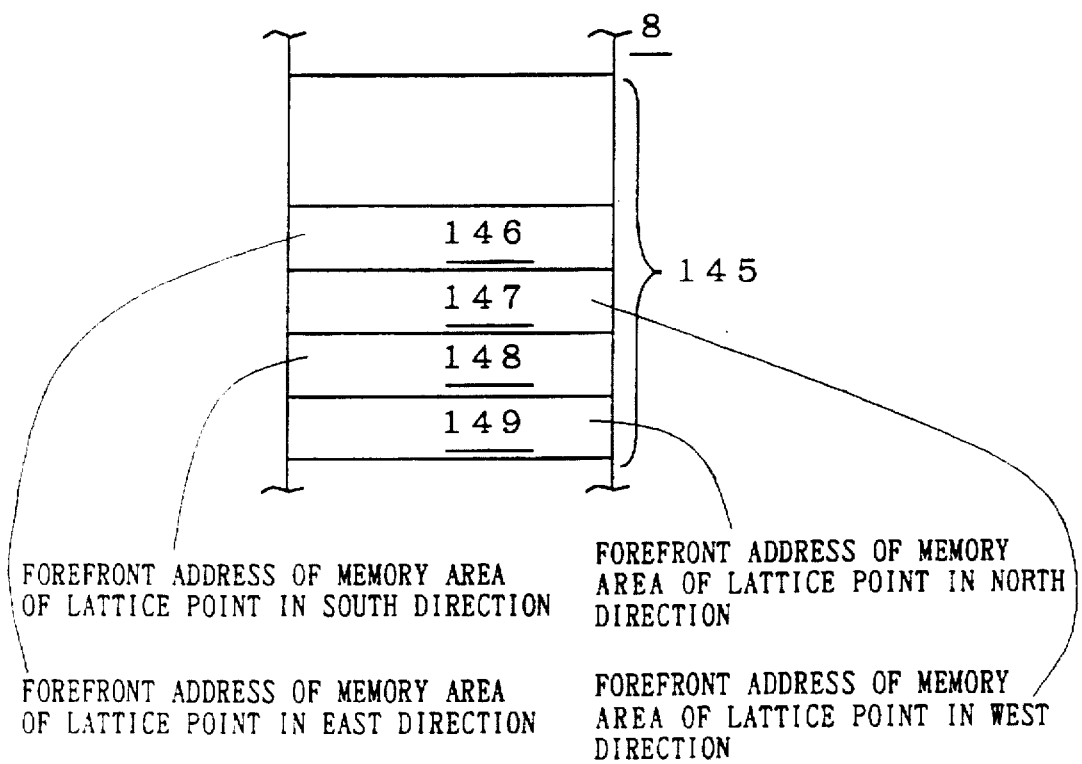
FIG. 39 is a drawing showing the construction of the data memory for realizing the information processing system according to the twenty-fifth embodiment of the present invention.

FIG. 39 is a drawing showing division of data memory areas. In the drawing, 145 is an area assigned to one lattice point inside the data memory to obtain the results of computation at the adjacent lattice point, and 146 to 149 are areas assigned inside the area 145 and storing the forefront address of the memory area of the lattice point in the east, west, south and north directions respectively.

As shown in FIG. 39, the forefront address of the memory area of the lattice point in the respective directions is stored in the assigned memory area for each lattice point. In the case of this embodiment, the forefront address of the memory area of the lattice point of the direction of communication is stored by using 4 data areas 146 to 149 in the east, west, south and north directions for each lattice point.

Figure 40:
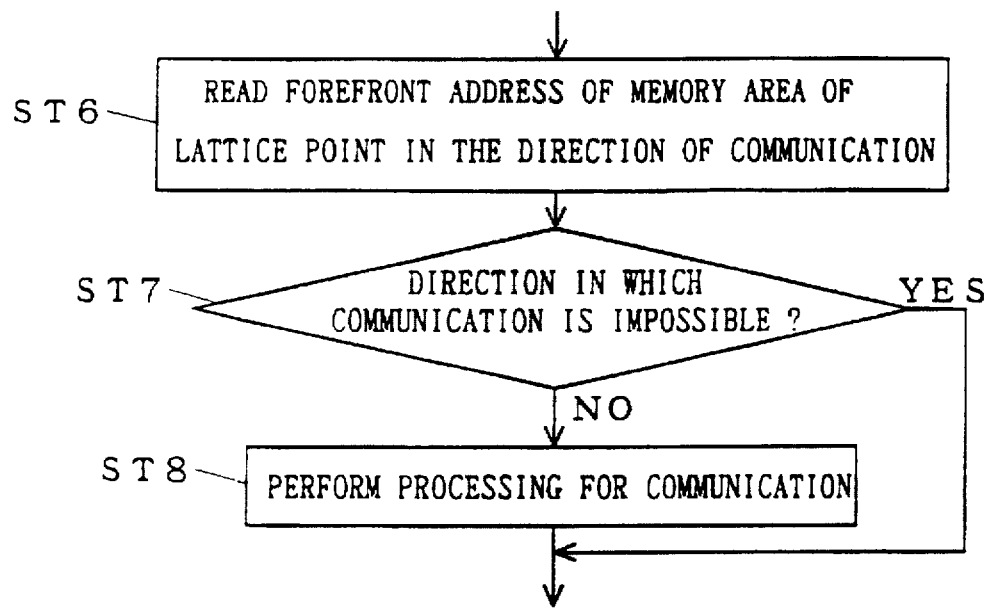
FIG. 40 is a flow chart showing the procedure of communication between lattice points according to the twenty-fifth embodiment.

FIG. 40 is a flow chart indicting the flow of processing in the case of communication. When making communication, the forefront address of the memory area of the partner of communication is read out according to the direction of communication (step ST6). In the case where the desired direction of communication is a direction in which communication is impossible, −1 is stored in advance in the area storing the forefront address of the memory area of the lattice point of the direction of communication. If the data read is −1, no communication is made (step ST7). If the desired direction is judged as a direction unavailable for communication, the address off-set of the data to be communicated is added to the forefront address of the partner of communication to obtain the address with which to make communication actually and perform actual communication (step ST8).

While an example of a case where the forefront address of the memory area in each direction for making communication is stored was indicated in the above embodiment, the present invention can also be applied to an embodiment storing lattice point numbers in the case where memory areas are assigned in the order of lattice point numbers, for example.

Moreover, while an example of a case where the forefront address of the memory area in each direction for making communication is stored was indicated in the above embodiment, the present invention can also be applied to embodiments storing identifiers which can specify the memory area to be used for communication such as difference between the forefront address of the memory area of the lattice point of the transmitting party and the forefront address of the memory area of the partner of communication, distance between lattice points which is a value obtained by dividing said value by the size of the memory used by one lattice point, and a pointer, for example.

Furthermore, while explanation was given on the case where there are 4 directions of communication in the above embodiment, the present invention can also be applied to cases where there are 6 or 8 directions (including northeast, northwest, southwest, southeast or part of such directions).

Still more, while explanation was given on the case where −1 is stored in the direction unavailable for communication in the above embodiment, the present invention can also be applied to a case where any unused optional value is used as identifier indicating the direction unavailable for communication.

Even in the case of a processing in which the lattice point to be used for communication changes in such a way that the adjacent lattice point to be communicated with is a little apart during a coarse node processing but comes closer during a fine node processing, those processings can be executed with one same program by using rewriting the area of the identifier which indicates the memory area of the lattice point in the direction of communication.

Figure 41:
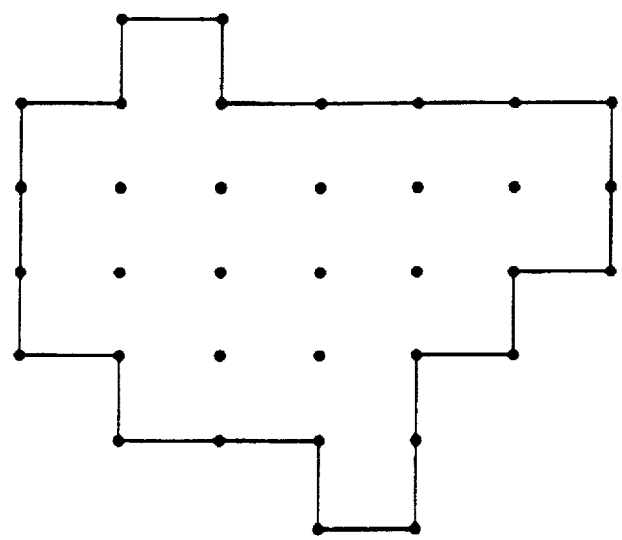
FIG. 41 is a conceptual drawing of the computation area showing the memory area in the respective directions for making communication for each lattice point.

Moreover, in the past, in a case where an area with projections and cuts as shown in FIG. 41 is taken as an object of processing, the object of processing was selected as either a square or a rectangle formed in a way to include the area with projections and cuts. For that reason, it was necessary to make the processing even for lattice points which essentially need not be processed. With the application of the present invention, however, the processing can be made directly for an area with projections and cuts, because any lattice points in any optional direction can be set as lattice points unavailable for communication. This makes it possible to eliminate the memory area of the lattice points outside the area with projections and cuts and thus reduce the memory size. It also makes processing of the lattice points outside the area with projections and cuts unnecessary, enabling faster processing. This realizes both reduction of memory size and increase of processing speed.

For the identifier used as identifier of direction of communication in this embodiment, using the value obtained by dividing the difference between the forefront address of the memory area of lattice point number or lattice point of transmitting party and the forefront address of the memory area of the partner of communication by the size of the memory used by one lattice point is more effective, compared with a case of using either address or difference of address itself, for reducing the number of bits required as memory and thus reducing the memory size used.

While the above embodiment provides a method of access to memory area in the case where a large number of lattice points are woven in a single element processor, the communication can be simplified with the embodiment indicated hereafter as far as the communication between element processors is concerned.

Figure 42:
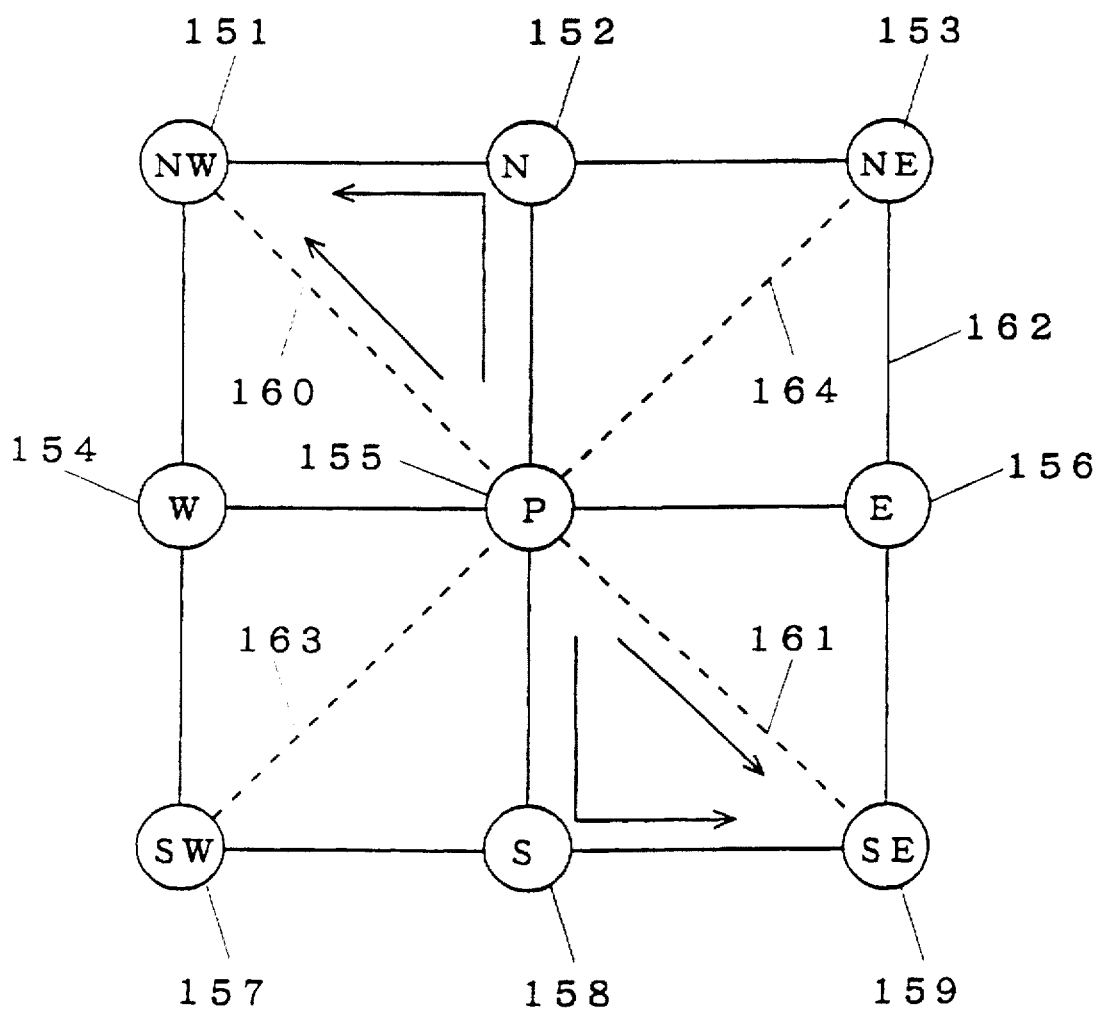
FIG. 42 is a drawing for explaining the communication between lattice points according to the twenty-fifth embodiment.

When element processors are connected in a lattice type topology, a problem is the communication with element processors in diagonal directions. FIG. 42 is a drawing showing a communication system with element processors in diagonal directions. In the drawing, 151 indicates an element processor in the NW direction, 152 is an element processor in the N direction, 153 is an element processor in the NE direction, 154 is an element processor in the W direction, 155 is an element processor under computation, 156 is an element processor in the E direction, 157 is an element processor in the SW direction, 158 is an element processor in the S direction, and 159 is an element processor in the SE direction respectively.

Moreover, in the drawing, 160 indicates a virtual communication route in the NW direction, 161 is a virtual communication route in the SE direction, 162 is a network between element processors, 163 is a virtual communication route in the SW direction, and 164 is a virtual communication route in the NE direction. In the case where the element processor 155 has communication with the element processors 151, 159 in the NW and SE directions, the conventional method consisted in either installing virtual communication routes 160 and 161 directly between the element processors 151 and 155 and between the element processors 155 and 159 to make communication or making data communication by way of the element processor 152 or 158. However, such methods had a lot of problems such as complicated communication network with the former method and deterioration of speed performance of the entire system due to large waiting time for synchronization for communication, etc. If the respective element processors have the data held by the element processors in higher and lower positions in duplicate, the communication system in the communication with the element processor 151, for example, can be simplified by referring to the data of element processor 151 on the memory of the element processor 154. However, the data held in duplicate must be rewritten every time when the original data is renewed.

Furthermore, the same effects can be obtained also by having in duplicate the data of the element processors in the left and right sides instead of the element processors in higher and lower positions and having access, when making communication with the element processor 151 for example, to the data of element processor 151 stored on the memory of the element processor 152.

Next, explanation will be given on the twenty-sixth embodiment of the present invention.

A multi-processor which assigns a memory to each lattice point and makes communication between lattice points close to each other through this memory retains information indicating the memory area in each direction for making communication for each lattice point and especially has information indicating a common dummy area in the direction unavailable for communication.

Figure 43:
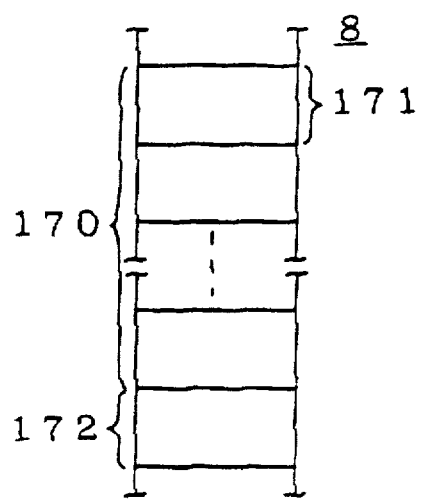
FIG. 43 is a drawing showing the construction of the data memory for realizing sharing of data area for dummy communication according to the twenty-sixth embodiment of the present invention.

FIG. 43 indicates a layout drawing of memories used in the twenty-sixth embodiment.

In FIG. 43, 170 is a memory area assigned to the lattice points forming the subject of processing inside the data memory 8, 171 is a memory area assigned to one lattice point inside the memory area 170, and 172 is a memory area for one lattice point assigned inside the data memory 8 as dummy area in the direction unavailable for communication separately from the memory area 170 assigned to the lattice points forming the subject of processing. A memory area for one lattice is secured as dummy area in the direction unavailable for communication in addition to the memory area for the lattice points forming the subject of the actual processing. An identifier indicating the dummy area is stored as identifier indicating the direction unavailable for communication in the area in which to store the memory area for the lattice points in the respective directions of communication assigned to the lattice points forming the subject of the actual processing.

Figure 44:
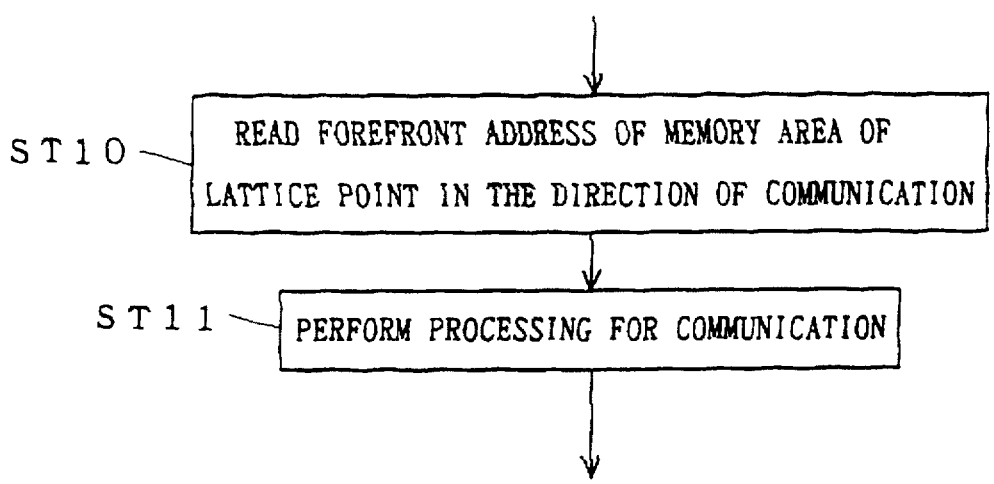
FIG. 44 is a flow chart for realizing sharing of data area for dummy communication.

FIG. 44 indicates the flow of processing of this embodiment. For establishing communication, the identifier indicating the memory area of the lattice point in the direction of communication is read (step ST10). After that, the communication processing is made to that area regardless if that identifier is a dummy area or not (step ST11).

When any readout from the area of the partner of communication for the communication processing, a certain value not having any bad influence on the processing is stored in advance also in the dummy area. However, in a communication, it is possible to restrict the processing from transmitter to partner of communication to writing only by processing the data necessary for the processing of respective lattice points in a way to be delivered in advance from adjacent lattice points without fail.

Because only one kind of processing is made regardless if communication is possible or not, no program is required for judgement and the program size can be reduced.

Because only one kind of processing is made regardless if communication is possible or not, it is possible to control deviations in the computation load for the respective lattice points and avoid any excessive progress of the processing only for lattice points with a lot of directions unavailable for communication, and thus realize contraction of program size and increase of processing speed even in a case where synchronized processing among respective lattice points, etc. is necessary.

Next, explanation will be given on the twenty-seventh embodiment of the present invention.

To shorten the delay time in the exchange of data, when mutually adjacent lattice points are assigned over two element processors, it is effective for the element processors on both sides to mutually have the data of the partner in duplicate. In that case, when the data for those lattice points has been renewed, it is necessary to send new data to the adjacent program without fail to guarantee the consistency of the data of the element programs on both sides.

However, sending data to the adjacent element processors each time when the data is renewed unnecessarily increases the volume of communication between processors and have negative influences on the essential processing when the difference of the renewed data is very small.

Figure 45:
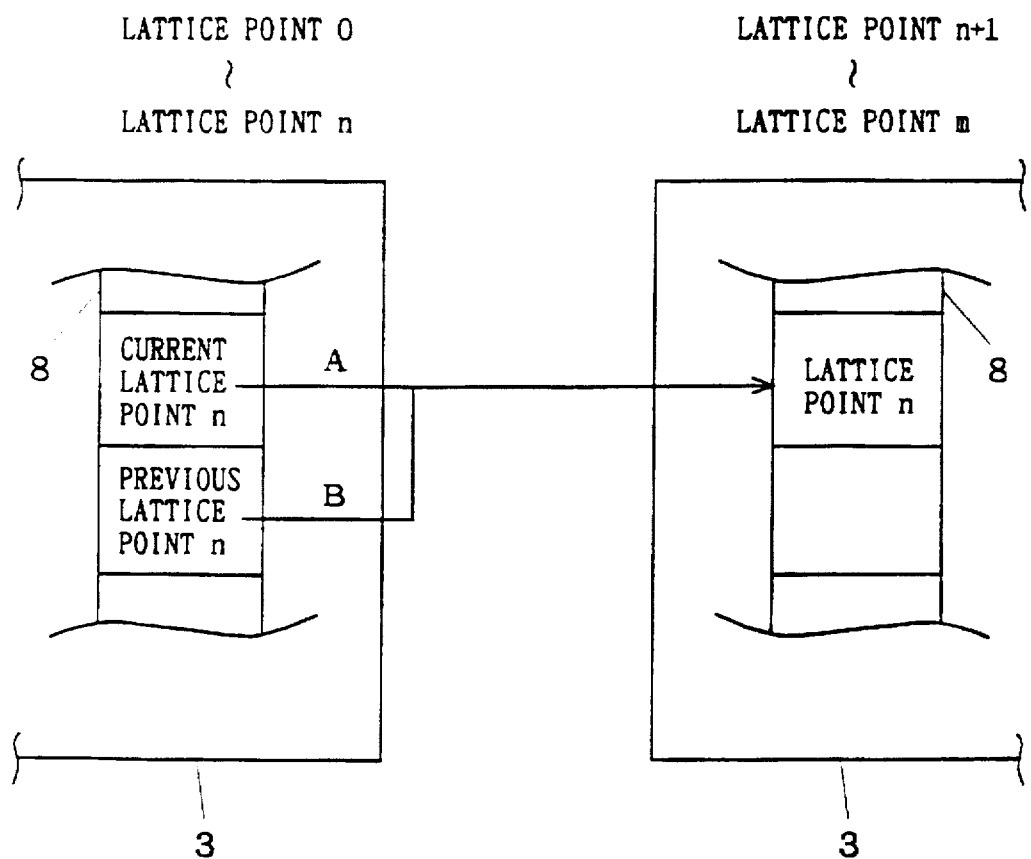
FIG. 45 is a conceptual drawing for explaining the type of communication between element processors according to the twenty-seventh embodiment of the present invention.

FIG. 45 is a conceptual drawing showing the situation of communication between mutually adjacent processors. In the drawing, the element processor 3 on the left side performs the computation of lattice points No. 0 to No. n while the element processor 3 on the right side performs the computation of lattice points No. n+1 to No. m. As shown in FIG. 45, when the element processor 3 on the left side sends the data of results of computation of lattice point No. n to the adjacent element processor 3 for example, such bad influence can be avoided by comparing the data A to be transmitted to the adjacent element processor 3 with the data B of the previous generation and stop the sending if they are identical or have a difference no larger than a certain value.

While the data B is assumed to be that of the previous generation (namely, data of results of computation of previous time) here, this data B may also be a data transmitted previously to the adjacent element processor 3 because there is a fear that differences may accumulate even if the quantity of change produced each time is very small.

Next, explanation will be made on the simplification of the program for solving equations according to the twenty-eighth embodiment of the present invention.

Figure 46:
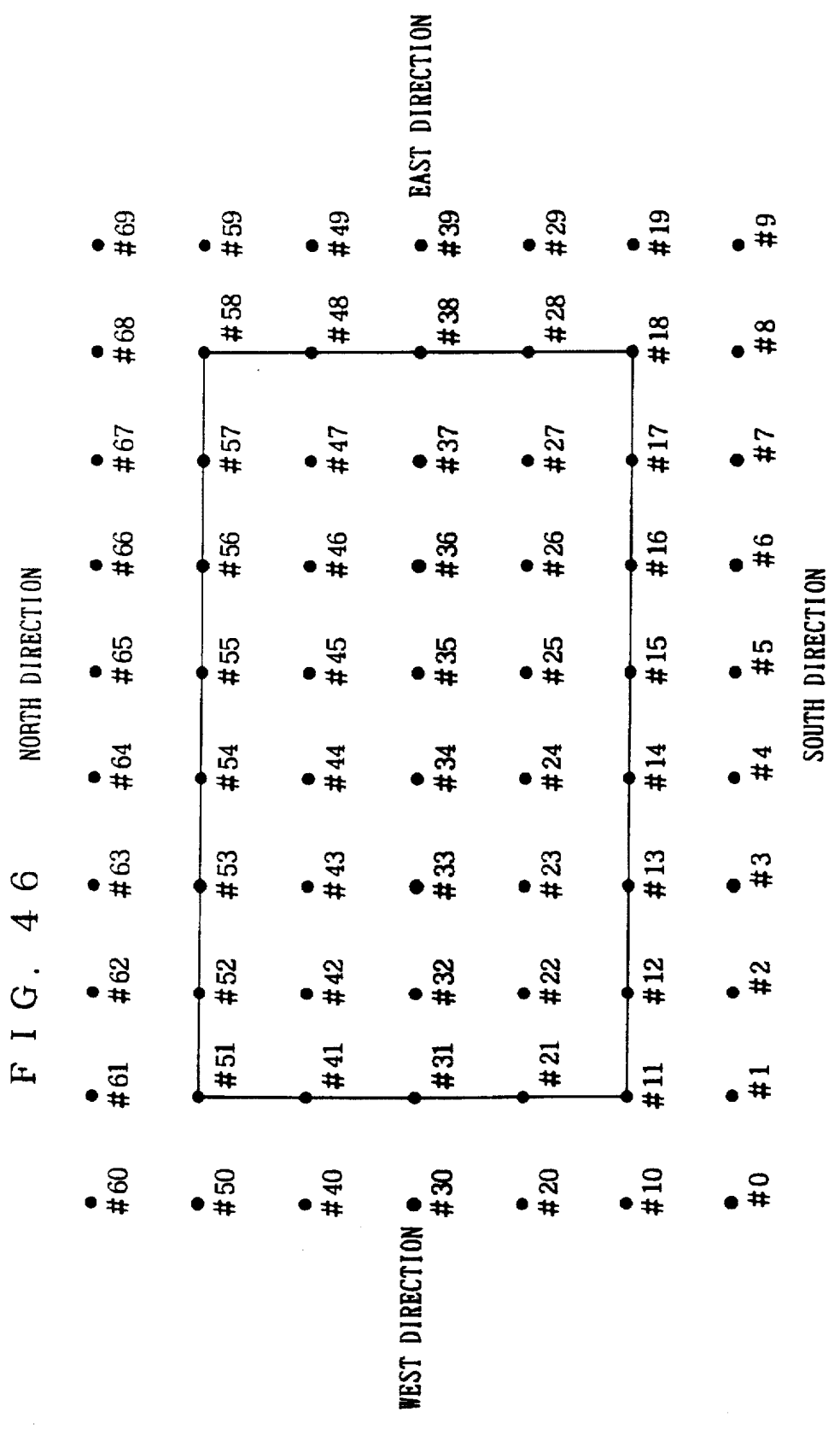

FIG. 46 is a plan view showing the relation between the computing area for analyzing equations and the lattice points assigned to the computing area. Lattice points of one external circle are considered on the outside of the lattice points requiring processing surrounded by solid line. A memory area is assigned for the respective lattice points of one external circle, and numbers are given under the respective lattice points as lattice point numbers.

When the lattice point number of the transmitter is n, the lattice point numbers in the respective directions can be obtained with the computation of Formula 38 and there is no need of any special processing even for the lattice points at the edge.

Lattice point number (East direction)=$n+1$

Lattice point number (West direction)=$n-1$

Lattice point number (South direction)=$n-10$

Lattice point number (North direction)=$n+10$ (38)

Supposing that the data for lattice points is secured for each lattice point by a quantity of R entry in the order of lattice points from the address S, the forefront address in the data area of the lattice points of the partner of communication can be obtained with Formula 39, if the lattice point of the partner of communication obtained with the above computation is put as D. The communication processing is the same as that in the twenty-fifth and the twenty-sixth embodiments.

$$D \times R + S \quad (39)$$

In the case where the communication processing includes readout from the area of the partner of communication, a value not having any bad influence on the processing is stored in advance in the respective dummy areas. This can be realized by such means as eliminating any large influence by providing the dummy area with the same data as that of the adjacent lattice points which get the wall data. Moreover, if there is any value serving as a unit element for the respective operations, the above protection can also be realized by setting that value.

While the lattice point numbers in the respective directions were obtained by calculation in this embodiment, this method can also be applied to any embodiment in which identifiers of lattice points in the direction of communication are stored in the memory in the same way as the twenty-fifth embodiment.

While explanation was given on a case where memories of blocked areas are assigned to the respective lattice points in the twenty-fifth to twenty-seventh embodiments, this method can also be applied to any embodiment in which areas are secured in blocks for respective elements, i.e. case where areas are secured in blocks for respective elements such as pressure value, flour velocity, etc. and that the respective areas store the respective elements in the order of lattice point numbers.

In a computation system capable of obtaining data of adjacent lattice points by assigning a data memory area for each lattice point and referring to said memory, it is possible to realize simplification of processing program, compression of program size and increase of processing speed by assigning, to the lattice points located at the border, virtual data areas simulating the external lattice points.

When securing areas by arranging them in blocks for respective elements, it becomes possible to improve the hitting ratio of cash and increase the processing speed by arranging in blocks the elements to which to have frequent access.

Next, explanation will be given on the twenty-ninth embodiment of the present invention.

In solving a differential equation, the object system is divided into small lattice points. In that case, however, there is a fear of extended time for reaching convergence, because a time proportional to the number of points from the border to the respective lattice point nodes is required for the state of lattice points determined by the boundary conditions to spread to all the lattice points and stabilize.

Figure 47:
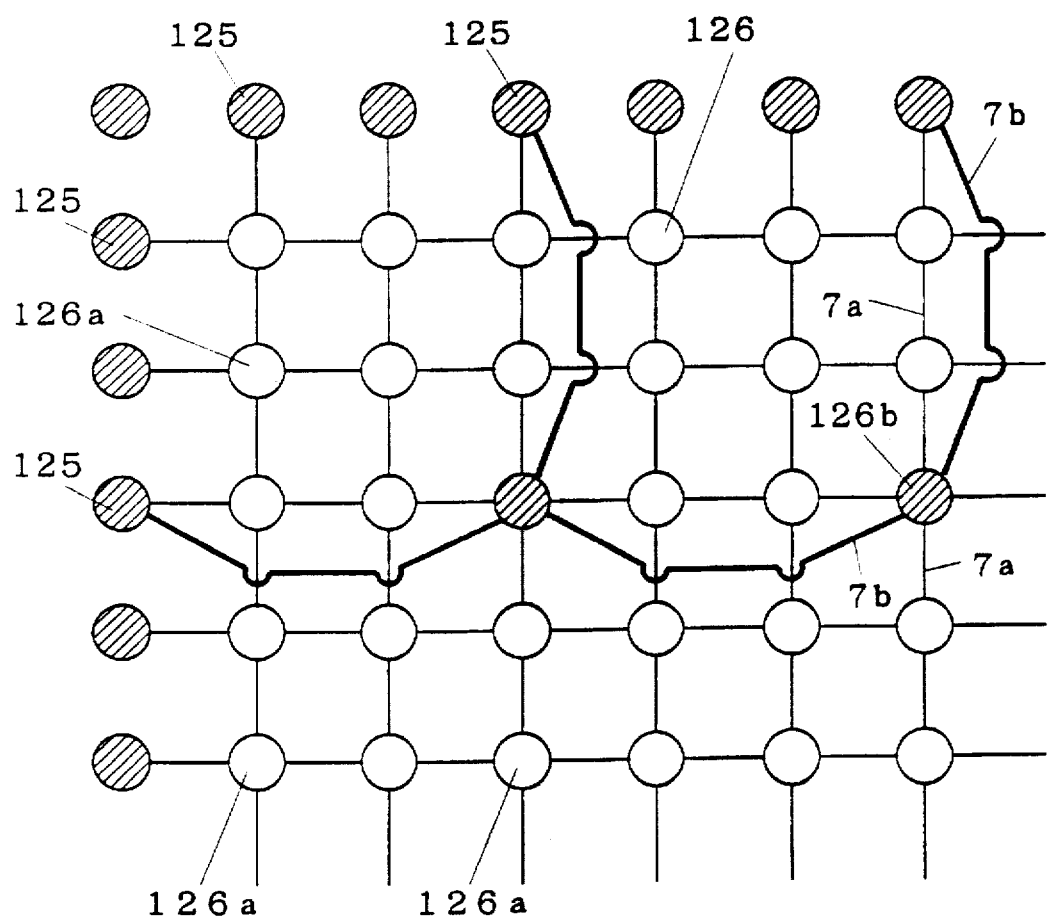
FIG. 47 is a drawing showing the relation of lattice points for explaining the actions of the information processing system according to the twenty-ninth embodiment of the present invention.

To avoid such inefficiency, there is a way to improve the speed of convergence by alternate use of coarse node and fine node. FIG. 47 indicates computed lattice points in the neighborhood of the border of computation area showing an example for improving the speed of convergence by alternately using coarse nodes and fine nodes. In the drawing, 125 are lattice points on the border of the computation area, 126a are lattice points inside the computation area at the time of connection by fine nodes, 126b are lattice points inside the computation area at the time of connection by coarse nodes, 7a is a connection between element compressors for fine node connection and 7b is a connection between element compressors for coarse node connection, and those lattice points and the respective element processors correspond to each other at 1:1.

In this embodiment, all lattice points inside the computation area 126a and 126b are connected by means of connection 7a between element compressors for fine node connection at the time of fine node connection, and the internal lattice points 126b for coarse node connection are connected by jumping a plural number of internal lattice points by means of connection 7b between element compressors for coarse node connection at the time of coarse node connection. Here, because the internal lattice points 126b for coarse node connection play the role of computed lattice points in both fine node operation and coarse node operation at the time of coarse node connection, the data memory inside the lattice points 126b plays the role of exchanging information between coarse node operation and fine node operation. And, in the computation, fine node operation and coarse node operation are used alternately. In such construction, the boundary conditions of the lattice points 125 on the board are transmitted to the inside of the computation area 3 times faster than during the fine node operation by means of the connection 7b between element compressors for coarse node connection, and then transmitted to the internal lattice points 126a for fine node connection in the neighborhood by fine node connection to perform detailed computation.

Therefore, according to this embodiment, it is possible to increase the speed of convergence by making the boundary conditions penetrate into the computation area immediately through the use of coarse nodes and then obtain results of operation of high computation accuracy with the use of fine nodes, to eventually achieve high-accuracy high-speed operation.

While an example in which the lattice points of fine node connection are connected at every 2 points at the time of coarse node connection was given in this embodiment, similar effects can be expected also with connection made by skipping whatever number of points as a matter of course. Moreover, while the coarseness of lattices was given in 2 grades or fine node connection and coarse node connection in this embodiment, the same effects can be obtained also with the use of lattices in a larger number of grades of coarseness. Furthermore, while in this embodiment explanation was given on a case where the computation at coarse node connection and the computation at fine node connection are made alternately one by one, it is also all right to make the computation at coarse node connection and the computation at fine node connection by alternating a plural number of times of one and the other.

While in the above example explanation was given on a case where the computation at coarse node connection and the computation at fine node connection are used alternately, it is also possible to adopt a method of gradually improving the accuracy of the solution after reaching convergence with coarse nodes.

Namely, this method consists, in FIG. 47, in performing computation repeatedly until a convergence solution is obtained by using the internal lattices points 126b and the lattice points on border 125 at the time of coarse node connection connected with the connection 7b between element processors at coarse node connection and, after that, either giving the solution of the internal lattices points 126b at the time of coarse node connection as initial conditions or giving the solution of the internal lattices points 126b at the time of coarse node connection as initial conditions by proportionally distributing it according to the space distribution of the fine nodes and then repeatedly performing the computation by using the internal lattices points 126a connected with the connection 7a between element processors at fine node connection, the internal lattices points 126b at the time of coarse node connection and the lattice points on border 125 to take the convergence solution as final solution.

By adopting this method, it becomes possible to sharply accelerate the computation for reaching a rough convergence. Namely, this makes it possible to not only avoid uselessly making local calculations but also reach a convergence stably and reach the final convergence quickly.

While in this embodiment explanation was given on a case where the lattice points and the respective element processors correspond to each other at 1:1, the same effects can be obtained also in a case where a space area in which a plural number of lattice point groups exist are made to correspond (assigned) to each element processor.

Next, explanation will be given on the thirtieth embodiment of the present invention.

In the above twenty-ninth embodiment, explanation was given on a case where coarse node connection is realized by skipping the connection between mutually adjacent element processors with jumper wiring.

In this embodiment, explanation will be given on a case where those coarse nodes are realized with S/W only.

In a case where a data memory area is secured for each lattice point and the data communication between lattice points is realized through mutual access, by lattice points requiring communication, to this data memory area secured for each lattice point, as explained in the twenty-fifth embodiment of the present invention, it is possible to perform data communication with lattice points other than adjacent lattice points i.e. realize coarse node connection with S/W only by having a table indicating the data memory area in the respective directions of communication for each lattice point and storing, in each entry of this table, the address of the data memory area secured for the lattice points skipped by the desired number of lattice points.

Therefore, it is possible to perform fine node processing by setting the table indicating the data memory area in the respective directions for making communication in a way to realize coarse node connection at the starting stage of solving of equations and then changing that table, after convergence of the processing, in a way to indicate the data memory area secured for the adjacent lattice points so as to realize fine node processing.

Moreover, by rewriting the table as required by the same method as above, it is also possible to alternately execute coarse node processing and fine node processing.

Furthermore, by having 2 pieces of said table indicating the data memory area in the respective directions for making communication i.e. one for coarse node processing and another for fine node processing and by executing the program for coarse node processing and the program for fine node processing in parallel, it is also possible to execute coarse node processing and fine node processing in parallel.

Even in the case of processing in which the lattice point for making communication changes in such a way that the adjacent lattice point for making communication is a little apart during a coarse node processing but is close at hand during a fine node processing, etc., it is possible to perform the processing with one exactly same program by just rewriting the area of the identifier indicating the data memory area of the lattice point in the direction of communication.

While in the above embodiment explanation was given on a case where the convergence speed is improved with simultaneous execution of coarse node and fine node, them is no need of having one same algorithm for both coarse node processing and fine node processing. By having separate programs for coarse node and fine node, it becomes possible to use different algorithms for coarse node processing and fine node processing.

For example, use of an algorithm of high convergence speed but of inferior accuracy in coarse node further improves the convergence speed of the system as a whole.

In the above embodiment relating to SIMPLE method, the current data of adjacent lattice points is referred to for performing computation regarding the lattice points concerned. However, by having no less than 2 generations of data regarding adjacent lattice points and omitting the computation of nodes concerned when the fluctuation between generations is no more than a prescribed value, it becomes possible to reduce the total amount of computation and sharply shorten the computation time. Moreover, omission of computation of lattice points with a fluctuation between generations no larger than a prescribed value also produces an effect of enabling use of obtained calculated resource for the processing of other lattice points. "Data of 2 generations" mentioned here refers to the "data based on the results of computation in the previous step of the repeated computation" and the "data based on the results of computation in the step before last of the repeated computation" regarding adjacent lattice points.

In the SIMPLE method mentioned above, conditions for omitting the computation at each lattice point are given. The difference of data between generations of adjacent lattice points was of a fixed value. However, by setting the tolerance of the difference of data between generations which is the condition for omitting computation, at a large value but gradually contracting it in the course of the convergence computation, it is possible to sharply accelerate the computation for reaching a rough convergence. Application of this method makes it possible to avoid making any useless local calculations and reach the final convergence quickly.

Next, explanation will be given on the thirty-first embodiment of the present invention.

The conventional parallel computers, which were mainly intended to minimize the number of time-iterations, had a defect that the convergence processing determines the speed of the entire computation because the computer adopted the consecutive means of judging convergence or not at the point in time when the computation of all lattice points at a certain time step is over and, if convergence is not reached yet, starting the computation of the respective lattice points again by time marching.

Because the relation of (computation cost at each lattice point CA)>(cost of processing for judgement of convergence CC) is established in a fluid simulation generally, this construction can be adopted if some small quantity of buffer equipment is prepared. Moreover, if the judgement of convergence is formed partially, only a small quantity of buffer will be enough. Putting the number of iterations up to convergence as N, N×(CA+CC+a) can be shortened to N×CA+a, a representing the communication cost.

Figure 48:
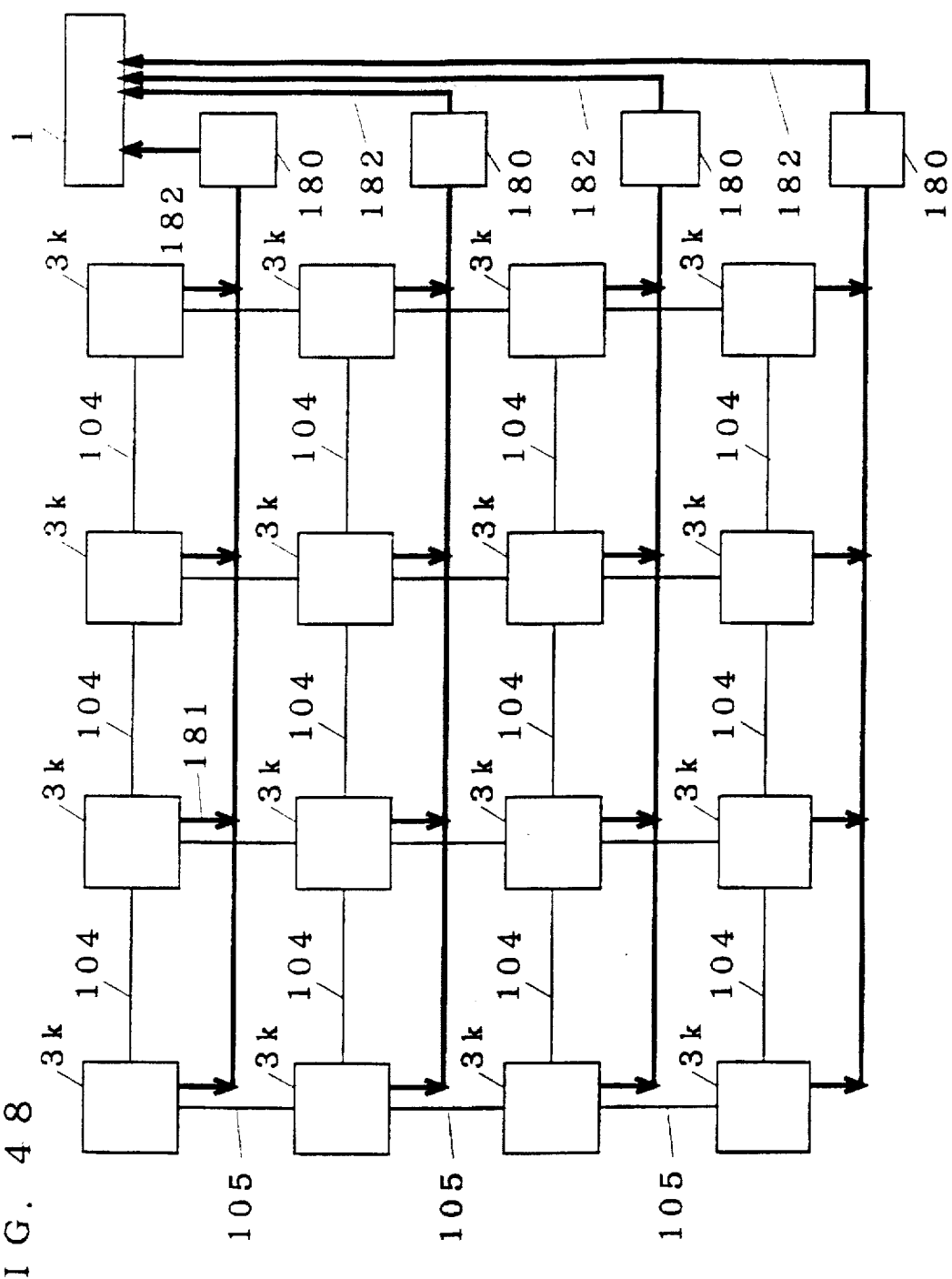
FIG. 48 is a block diagram showing the construction of the information processing system according to the thirty-first embodiment of the present invention.

FIG. 48 is a construction drawing of multi-processor showing an embodiment of the present invention realized for improving the speed of simulation by cutting off the mutual dependence between the simulation and the processing for judgement of convergence.

In the drawing, 3k are element processors for performing operations, 180 are convergence judging units for judging convergence in each column based on the information of convergence flag output by the respective element processors 3k, 1 is the host computer for integrally controlling the element processors 3k and the convergence judging units 180, 104 are computation information buses in direction of line for exchanging data for the operations between element processors 3k in the direction of line, 105 are computation information buses in direction of column for exchanging data for the operations between element processors 3k in the direction of column, 181 are convergence flag information buses for transmitting the convergence flag output by the respective element processors 3k to the convergence judging units 180, and 182 are convergence information buses for transmitting the convergence information of the respective convergence judging units 180 to the host computer.

Next, explanation will be given on actions.

The respective element processors 3k judge convergence of the computation for each step of repetition of respective computations or for a certain number of steps of respective computations against the results of internal computation in themselves and, if convergence is reached, output the convergence judgement flag as 1 to the convergence flag information buses 181, for example. The convergence judging units 180 collect the information of convergence judgement flag output from the respective element processors 3k and, when all the element processors 3k controlled by the respective convergence judging units 180 judged that convergence has been reached, output convergence information individually to the convergence information buses 182. And, finally, the host computer 1 judges convergence of the whole part from the convergence information of all the element processors 3k acquire all the convergence information buses 182 to terminate the operation.

By constructing the system this way, the element processors 3k can execute operations in parallel and increase the speed of operations without being disturbed in respective operations.

While in this embodiment the convergence judging units 180 divide the element processors arranged in the shape of lattice into groups by lines and control the convergence information of such groups, the same effects can be obtained regardless if this grouping is made by columns or at random as a matter of course.

Next, explanation will be given on the thirty-second embodiment of the present invention.

Figure 49:
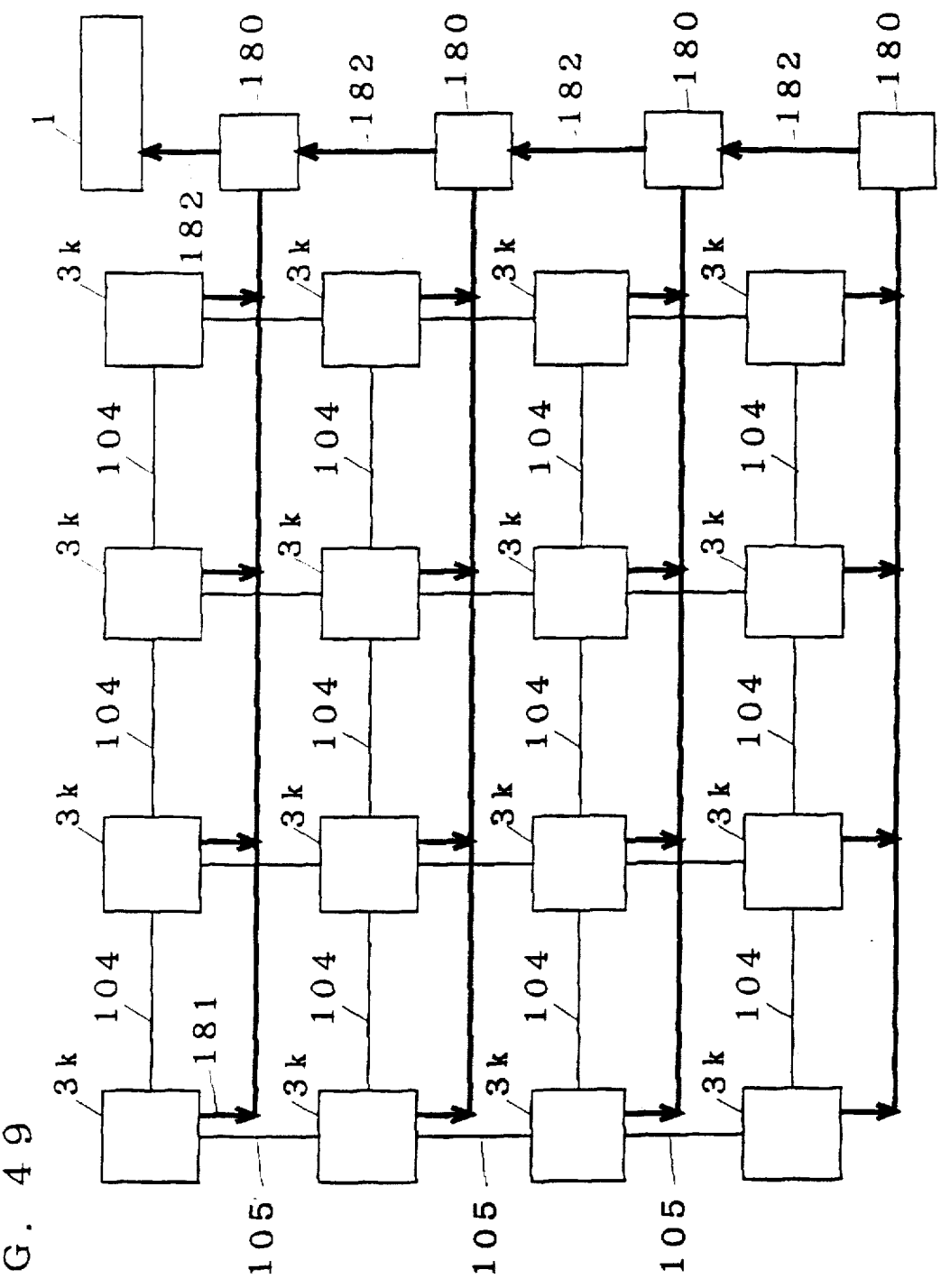
FIG. 49 is a block diagram showing the construction of the information processing system according to the thirty-second embodiment of the present invention.

FIG. 49 is a construction drawing of multi-processor showing an embodiment realized for improving the speed of simulation by further cutting off the relation of mutual dependence between the simulation and the processing for judgement of convergence.

In the drawing, 3k are element processors for performing operations, 180 and 180a are convergence judging units for judging the situation of convergence in each column based on the information of convergence flag output by the respective element processors 3k, 1 is the host computer for integrally controlling the element processors 3k and the convergence judging units 180, 104 are computation information buses in direction of line for exchanging data for the operations between element processors 3k in the direction of line, 105 are computation information buses in direction of column for exchanging data for the operations between element processors 3k in the direction of column, 181 are convergence flag information buses for transmitting the convergence flag indicating the situation of convergence of the respective element processors 3k to the convergence judging units 180, and 182 are convergence information buses for connecting between the convergence judging units 180 the host computer and transmitting the convergence information of the convergence judging units 180.

In this construction, the convergence judging units 180 arrange the convergence information buses 182 in a way to make transmission of information only unidirectionally between mutually adjacent convergence judging units. And, they start sending out convergence information when the computation in all the element processors 3k controlled by the convergence judging unit a farthest from the host computer 1 converged. Other convergence judging units 180 send out convergence information when both the convergence information from the adjacent convergence judging units 180 and their own judgement about convergence of the computation in all the element processors 3k controlled by themselves are ready.

By arranging in this way, the host computer 1 can immediately judge the completion of computation at the point in time when the convergence judging unit 180 closest to the host computer 1 sent out convergence information to the host computer 1. This makes it possible to further increase the speed of computation without disturbing the processing in the element processors 3k and the host computer 1.

While in this embodiment the convergence judging units 180 divide the element processors arranged in the shape of lattice into groups by lines and control the convergence information of such groups, the same effects can be obtained regardless if this grouping is made by columns or at random as a matter of course. Moreover, the same effects can be obtained even if the connection between convergence judging units 180 is made regardless of their distance from the host computer 1.

Next, explanation will be given on the thirty-third embodiment of the present invention.

Figure 50:
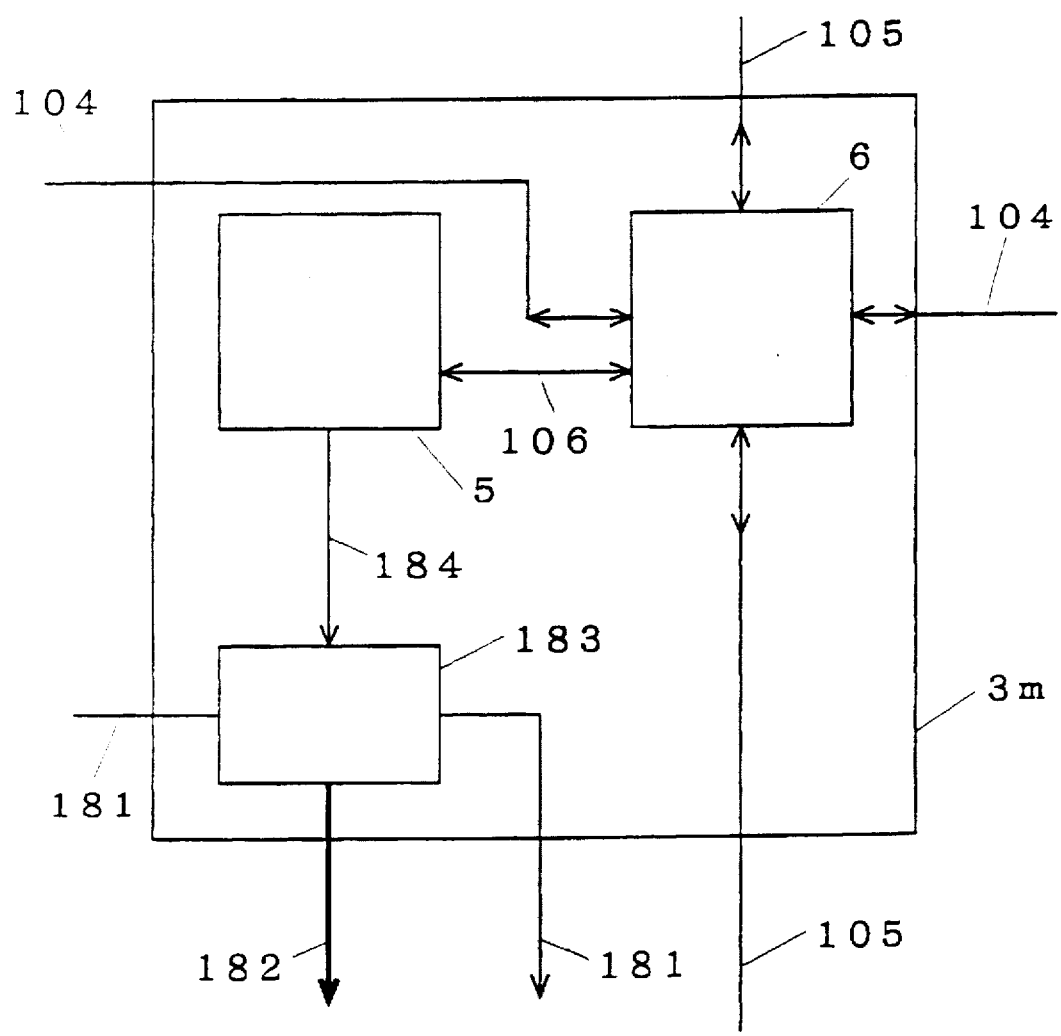
FIG. 50 is a block diagram showing the construction of the element processor used for realizing the information processing system according to the thirty-third embodiment of the present invention.

As explained in the thirty-second embodiment, transmitting convergence flag through convergence flag information buses constructed outside the element processors produces losses of communication time. FIG. 50 is a block diagram showing the construction of element processors according to the thirty-third embodiment realized for the purpose of shortening the transmission time of convergence flag. Moreover, FIG. 51 is a block diagram showing the construction of a multi-processor composed of the element processors indicated in FIG. 50.

In FIG. 50, 3m is an element processor, 5 is a processing unit for performing computation formed inside the element processor 3m, 6 is a memory unit for storing the computation information necessary for the computation of the processing unit and provided inside the element processor 3m, 183 is a convergence judging unit, provided inside the element processor 3m, for judging the situation of convergence of the processing unit 5 inside the element processor 3m it belongs to, the situation of convergence in the adjacent element compressor 3m and the situation of convergence of all element compressors 3m, 104 are computation information buses in direction of line for exchanging data for the operations between the element processor 3m in the direction of line, 105 are computation information buses in direction of column for exchanging data for the operations between the element processors 3m in the direction of column, 181 are convergence flag information buses for transmitting the convergence flag to the convergence judging unit inside 183 the respective element processors 3m by connecting the convergence judging unit 183 inside the respective element processors 3m in the form of a ring, 182 is a convergence information bus for transmitting the convergence information of all the element processors 3m to the host computer 1 by connecting between at least one of the convergence judging units 183 of all the element processors 3m and the host computer 1, 184 is an internal flag information bus for transmitting the convergence flag output by the processing unit 5 to the convergence judging unit 180, and 106 is an internal flag information bus for exchanging data necessary for computation and the data of results of computation between the processing unit 5 and the memory 6.

Figure 51:
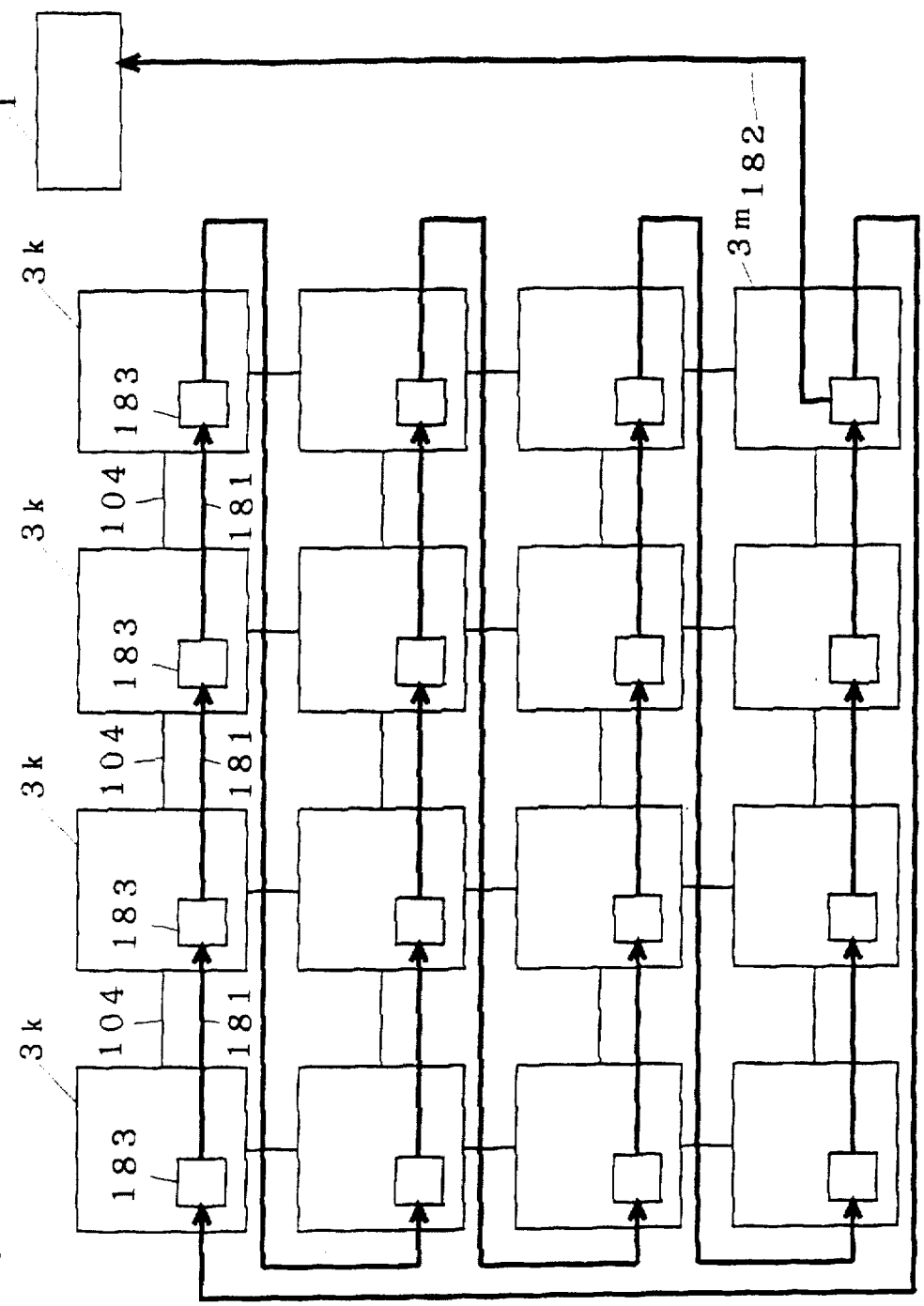
FIG. 51 is a block diagram showing the construction of the information processing system according to the thirty-third embodiment of the present invention.

In FIG. 51, 1 is the host computer for integrally controlling the element processors 3m, 3k. The respective processing units 5 judge convergence of the computation for each step of repetition of respective computations or for a certain number of steps of respective computations and, if convergence is reached, output the convergence judgement flag as 1 to the convergence judging units 183 through the internal flag information bus 184, for example. Moreover, the convergence judging unit 183 of the respective element processors 3k are connected in the shape of a ring through convergence flag information bus. The judgement of convergence is started from a predetermined specific element processor. Simultaneously as the convergence judging unit 183 of the element processor 3m receives an internal flag information bus indicating convergence from the processing unit 5 inside, it transmits the convergence judgement flag as 1 to the convergence judging units 183 of the adjacent element processor 3k through the convergence flag information bus, for example. Here, the convergence flag information bus 181 connected in the shape of a ring is provided with a function of transmitting information in one direction. Said convergence judging unit 183 of the adjacent element processor 3k takes the logical product (AND) of the internal information flag (=1) from the processing unit of the element processor 3k it belongs to and the convergence flag (=1) from the convergence judging unit 183 of the adjacent element processor 3m and, if it is found true (=1), further sends out convergence flag 1 to the convergence judging unit 183 of the adjacent element processor 3m through the convergence flag information bus 181.

The respective convergence judging units 183 connected in the shape of a ring perform the procedure of taking the logical product (AND) of the internal information flag (=1) from the processing unit of the element processor 3k they belong to and the convergence flag (=1) from the convergence judging unit 183 of the adjacent element processor 3k and, if it is found true (=1), further sending out convergence flag 1 to the convergence judging unit 183 of the adjacent element processor 3k through the convergence flag information bus, one after another in the order of connection of the convergence flag information buses 181. Finally, at the point in time when the convergence flag (=1) is returned to the convergence judging unit 183 of the element processor 3m which first transmitted the convergence flag as 1, (the convergence judging unit 183) judges that all the element processors 3k, 3m converged and send out convergence information (=1) to the host computer 1 through the convergence information bus 182 to complete the computation.

By arranging this way, it is possible to shorten the transmission time of information regarding convergence and thus achieve increase of speed of computation, because the internal flag information bus 181 is provided inside the respective element processors 3k, 3m.

While in the above embodiment the internal information flag, the convergence flag information and the convergence information were explained respectively as logical values of 0 or 1, whatever value may be given to them if only judgement of convergence or not can be made. Moreover, it is all right if a convergence information bus 182 is provided in one element processor 3m and there is no need of installing it in all the element processors.

Moreover, any of the element processors may be selected as specific element processor 3m.

Next, explanation will be given on the thirty-fourth embodiment of the present invention.

Figure 52:
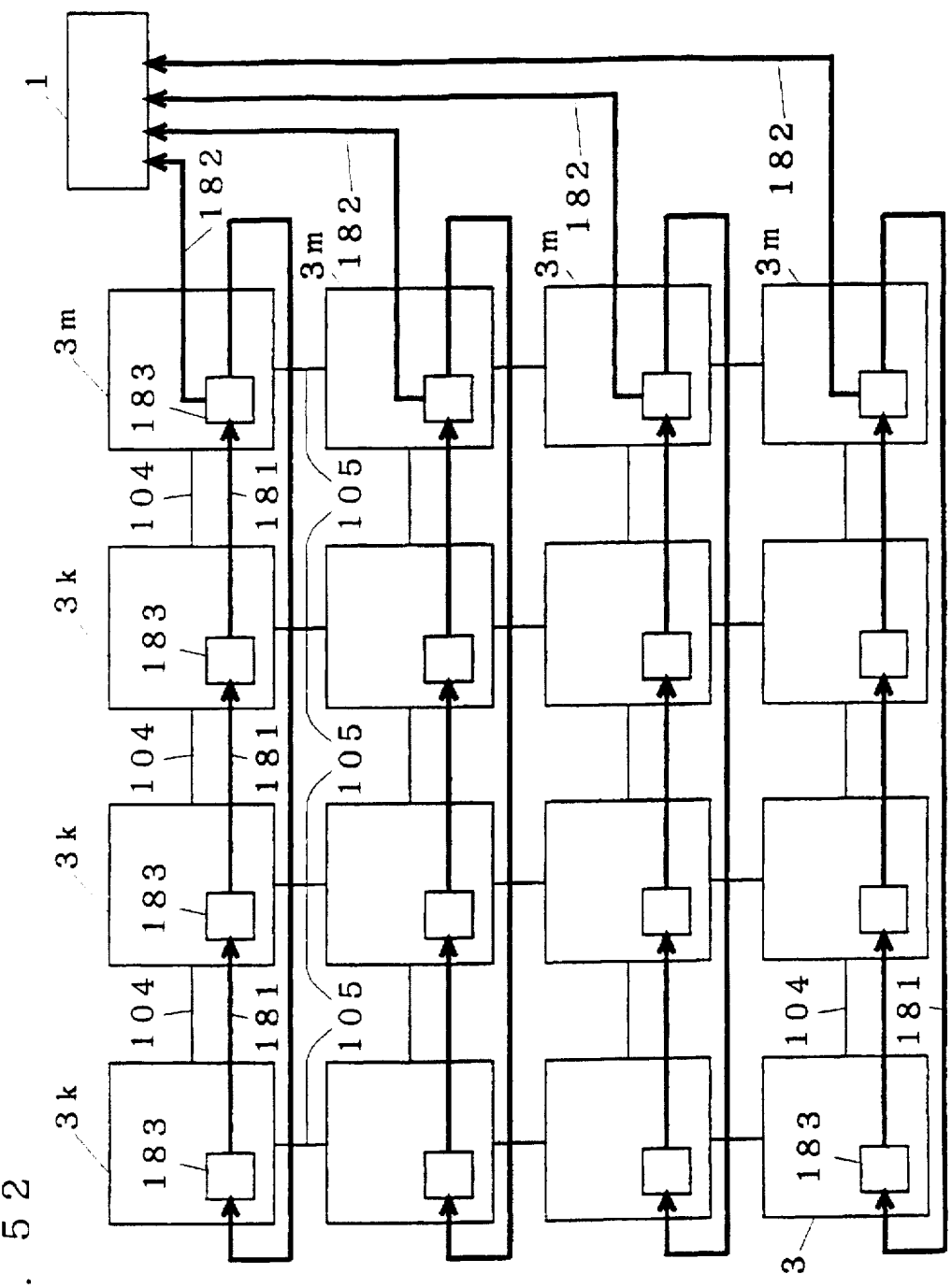
FIG. 52 is a block diagram showing the construction of the information processing system according to the thirty-fourth embodiment of the present invention.

FIG. 52 is a block diagram showing the construction of a multi-processor indicating an embodiment for grouping all the element processors into a plural number of groups and forming an information transmission link of convergence flag information bus for each group to realize parallel execution of judgement of convergence.

In FIG. 52, 181 is a convergence flag information bus for grouping all the element processors into a plural number of groups and connecting the convergence judging units 183 inside the respective element processors 3k, 3m in the groups in the shape of a ring to transmit the convergence flag to the convergence judging units 183 inside the adjacent respective element processors 3k, 3m, and 182 is a convergence information bus for transmitting the convergence information of the respective groups by connecting between the convergence judging unit 183 and the host computer 1 and provided in one specific element processor 3m in each group.

In each group, the convergence judging unit 183 of a specific element processors 3m in which the convergence information bus 182 is provided receives internal information flag indicating convergence from the processing unit 5 inside and, at the same time, transmits convergence flag 1, for example, if convergence is reached, to the convergence judging units 183 of the adjacent element processors 3k through the convergence flag information bus. Here, the convergence flag information bus 181 connecting between the convergence judging units 183 of the element processors in the group in the shape of a ring is provided with a function of transmitting information in one direction only. Said convergence judging unit 183 of the adjacent element processor 3k takes the logical product (AND) of the internal information flag (=1) from the processing unit of the element processor 3k it belongs to and the convergence flag (=1) from the convergence judging unit 183 of the adjacent element processor 3m and, if it is found true (=1), further sends out convergence flag 1 to the convergence judging unit 183 of the adjacent element processor 3k through the convergence flag information bus 181.

The respective convergence judging units 183 connected in the shape of a ring perform the procedure of taking the logical product (AND) of the internal information flag (=1) from the processing unit of the element processor 3k they belong to and the convergence flag (=1) from the convergence judging unit 183 of the adjacent element processor 3k and, if it is found true (=1), further sending out convergence flag 1 to the convergence judging unit 183 of the adjacent element processor 3k through the convergence flag information bus, one after another in the order of connection of the convergence flag information buses 181. Finally, at the point in time when the convergence flag (=1) is returned to the convergence judging unit 183 of the specific element processor 3m which first transmitted the convergence flag as 1, (the convergence judging unit 183) judges that all the element processors 3 in the group converged and send out convergence information (=1) to the host computer 1 through the convergence information bus 182. The host computer 1 judges that the computation of all element processors 3 converged at the point in time when it received convergence information (=1) from all the groups and completes the computation.

By constructing the system this way, the judgement of convergence for each group is formed in parallel and the time for judgement of convergence can be shortened.

While in the above embodiment the convergence judging units 183 divide the element processors arranged in the shape of lattice into groups and control the convergence information of such groups, the same effects can be obtained regardless if this grouping is made by columns or at random as a matter of course. Moreover, while in the above embodiment the internal information flag, the convergence flag information and the convergence information were explained respectively as logical values of 0 or 1, whatever value may be given to them if only judgement of convergence or not can be made. Moreover, it is all right if a convergence information bus 182 is provided in one element processor 3m and there is no need of installing it in all the element processors.

Moreover, any of the element processors may be selected as specific element processor 3m.

Next, explanation will be given on the thirty-fifth embodiment of the present invention.

Figure 53:
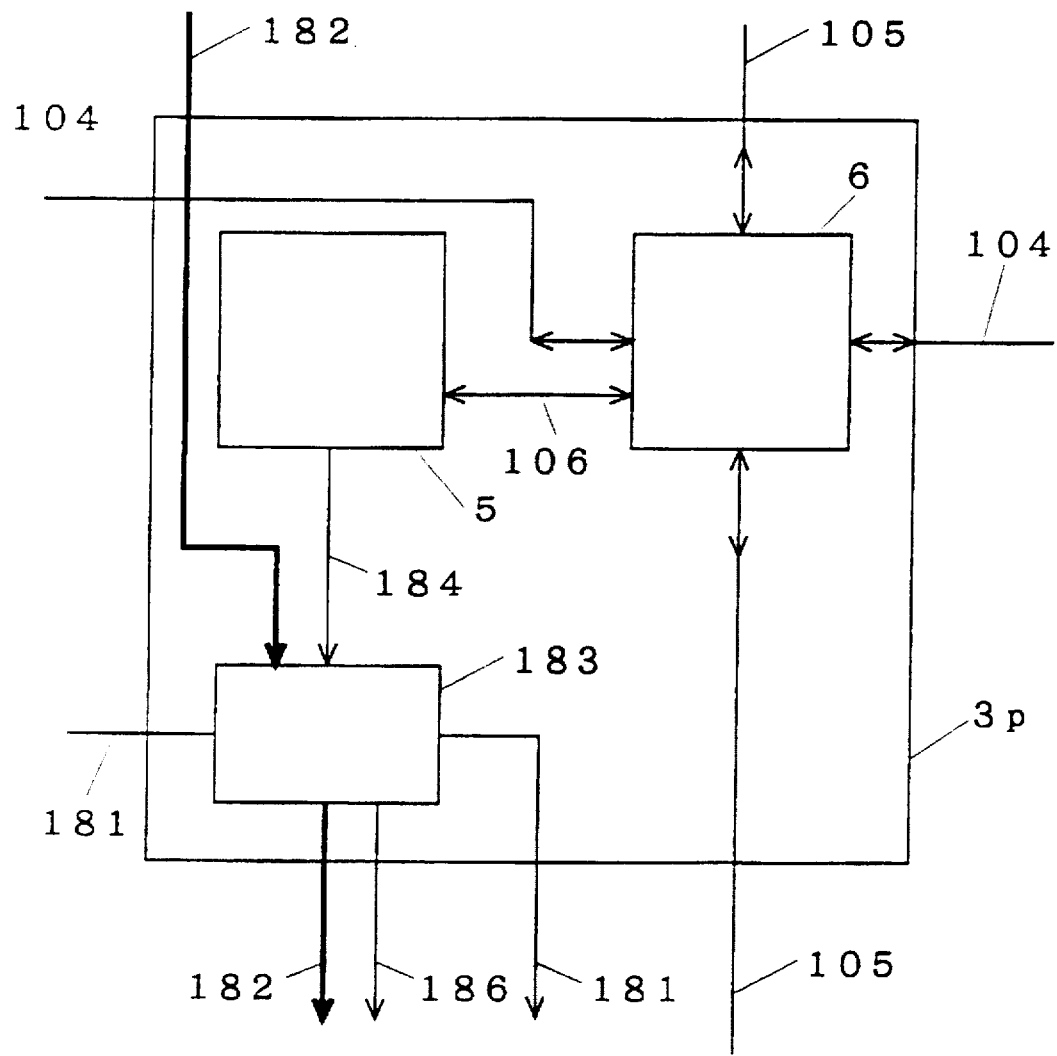
FIG. 53 is a block diagram showing the construction of the element processor used for realizing the information processing system according to the thirty-fifth embodiment of the present invention.

FIG. 53 is a block diagram showing the construction of element processors constituting a multi-processor for realizing reduction of the load on host computer at the time when judgement of convergence is made in parallel. Moreover, FIG. 54 is a general construction drawing of the multi-processor composed of the element processors indicated in FIG. 53.

In FIG. 53, 181 is a convergence flag information bus for grouping all the element processors 3k, 3p, 3q into a plural number of groups and connecting the convergence judging units 183 inside the respective element processors in the groups in the shape of a ring to transmit the convergence flag to the convergence judging units 183 inside the adjacent respective element processors. 182 is a convergence information bus provided in at least one element processor 3p, 3q in each group and connecting, in the shape of a ring, the convergence judging unit 183 of the element processors 3p, 3q in which it is provided, and 186 is an end information bus provided in at least one element processor 3p of all groups and connecting between the convergence judging unit 183 of the element processor 3p and the host computer 1.

Figure 54:
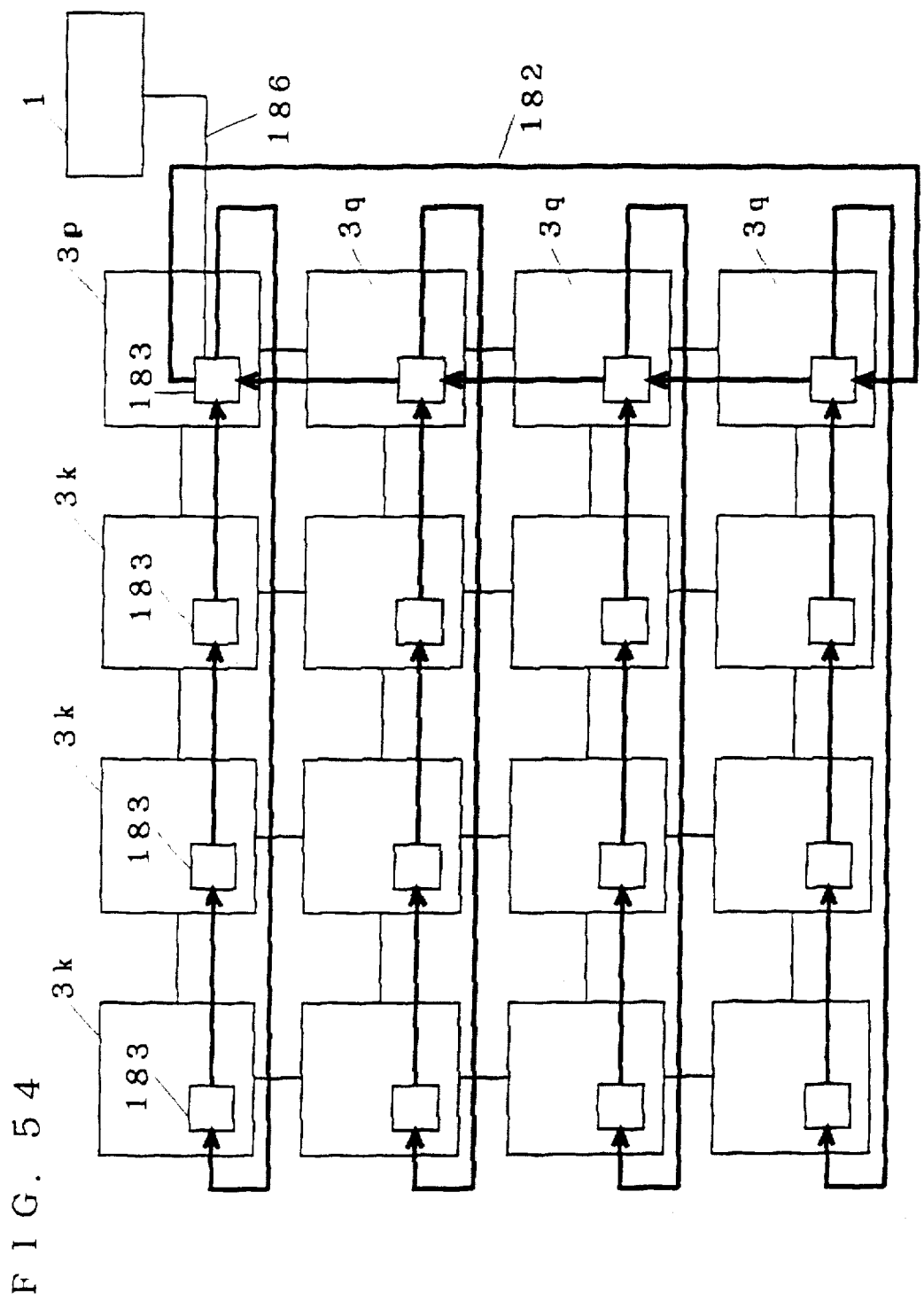
FIG. 54 is a block diagram showing the construction of the information processing system according to the thirty-fifth embodiment of the present invention.

When grouping is made as shown in FIG. 54, the convergence judging unit 183 of a specific element processors 3p in the group in which the convergence information bus 182 is provided starts judgement of convergence and, upon receipt of internal information flag indicating convergence from the processing unit 5 inside, transmits convergence flag 1, for example, if convergence is reached, to the convergence judging units 183 of the adjacent element processors 3k through the convergence flag information bus. Here, the convergence flag information bus 181 connecting between the convergence judging units 183 of the element processors 3k, 3p in the group in the shape of a ring is provided with a function of transmitting information in one direction only.

Said convergence judging unit 183 of the adjacent element processor 3k takes the logical product (AND) of the internal information flag (=1) from the processing unit of the element processor 3k it belongs to and the convergence flag (=1) from the convergence judging unit 183 of the adjacent element processors 3p, 3q and, if it is found true (=1), further sends out convergence flag 1 to the convergence judging unit 183 of the adjacent element processor 3k through the convergence flag information bus 181.

The respective convergence judging units 183 connected in the shape of a ring perform the procedure of taking the logical product (AND) of the internal information flag (=1) from the processing unit of the element processor 3k they belong to and the convergence flag (=1) from the convergence judging unit 183 of the adjacent element processor 3k and, if it is found true (=1), further sending out convergence flag 1 to the convergence judging unit 183 of the adjacent element processor 3k through the convergence flag information bus, one after another in the order of connection of the convergence flag information buses 181. Finally, at the point in time when the convergence flag (=1) is returned to the convergence judging unit 183 of the specific element processors 3p, 3q which first transmitted the convergence flag as 1, (the convergence judging unit 183) judges that the element processor 3p or 3q in the group converged.

Moreover, when the convergence judging unit 183 of any specific element processor inside the element processors 3p provided with an end information bus judged that the element processors 3p, 3k to which it belongs converged, transmits convergence information (=1) through the convergence information bus connected in the shape of a ring. Here, the convergence flag information bus 182 connecting between the convergence judging units 183 of the element processors 3p, 3q in the group in the shape of a ring is provided with a function of transmitting information in one direction only.

The element processor 3p of a predetermined group transmits (information) to the element processor 3q provided with a convergence information bus 182 of the adjacent group. The convergence judging unit 183 of the element processor 3q provided with a convergence information bus 182 of said adjacent group takes the logical product (AND) of the convergence information (=1) of the group it belongs to and the convergence information (=1) of the adjacent element group and, if it is found true (=1), further sends out convergence information 1 to the convergence judging unit 183 of the adjacent element processor 3q through the convergence flag information bus 182.

As explained above, the respective convergence judging units 183 connected in the shape of a ring perform the procedure of taking the logical product (AND) of the convergence information (=1) of the group they belong to and the convergence information (=1) from the adjacent group and, if it is found true (=1), further sending out convergence information 1 to the convergence judging unit 183 of the element processor 3q provided with a convergence information bus 182 of the adjacent group through the convergence flag information bus 182, one after another in the order of connection of the convergence information buses 182.

Finally, at the point in time when the convergence information (=1) is returned to the convergence judging unit 183 of the specific element processor 3p which first transmitted the convergence flag as 1, (the convergence judging unit 183) judges that all the element processors 3k, 3p, 3q in the group converged and sends out end information (=1) to the host computer 1 through the end information bus 186. The host computer 1 judges, at the point in time when it received the end information (=1), judges that the computation of all element processors 3k, 3p, 3q converged, and completes the computation.

By constructing the system this way, it becomes possible to alleviate the load of the host computer at the time when the judgement of convergence is made in parallel, and to further increase the computation speed.

While in this embodiment the convergence judging units 180 divide the element processors arranged in the shape of lattice into groups by lines and control the convergence information of such groups, the same effects can be obtained regardless if this grouping is made by columns or at random as a matter of course. Moreover, while in the above embodiment the internal information flag, the convergence flag information and the convergence information were explained respectively as logical values of 0 or 1, whatever value may be given to them if only judgement of convergence or not can be made. Furthermore, it is all right if a convergence information bus 182 is provided in one element processor 3p or 3q and there is no need of installing it in all the element processors. In addition, it is all right if an end information bus 186 is provided in one element processor 3p and there is no need of installing it in all the element processors.

Moreover, any of the element processors inside the group may be selected as specific element processor 3p and 3q, and any element processor representative of the group may be selected as specific element processor 3p.

Next, explanation will be given on the thirty-sixth embodiment of the present invention.

When computation is executed on a multi-processor, there are cases, though quite rarely, where non stable points (non converged points) patrol. This kind of so-called "oscillation phenomenon" must be detected.

Detection of "oscillation phenomenon" can be made by judging convergence for the second time after once confirming convergence in all element processors, and this makes it possible to judge convergence with a fairly high accuracy.

To be concrete, an end flag is transferred in order according to a predetermined route to form judgement of convergence of the entire computation.

Figure 55:
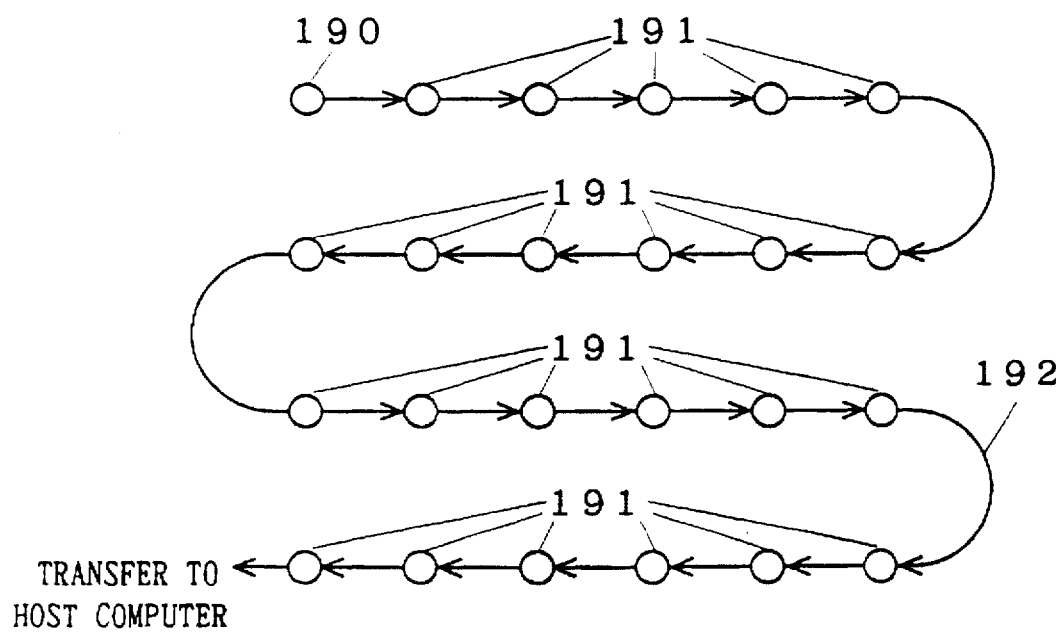
FIG. 55 is a conceptual drawing showing the route of transfer of end flag for explaining the actions of the information processing system according to the thirty-sixth embodiment of the present invention.

FIG. 55 is a conceptual drawing showing an example of the route for transferring end flag. In FIG. 55, 190 and 191 are lattice points obtained as a result of digitizing of a two-dimensional space. Moreover, the arrow mark line 192 linking the respective lattice points indicates the route through which the end flag is transferred.

The processing for judging convergence at the respective lattice points will be explained hereafter. When convergence is confirmed for the first time after the arrival of the end flag from the adjacent lattice point, the end flag is transferred to the subsequent lattice point.

Figure 56:
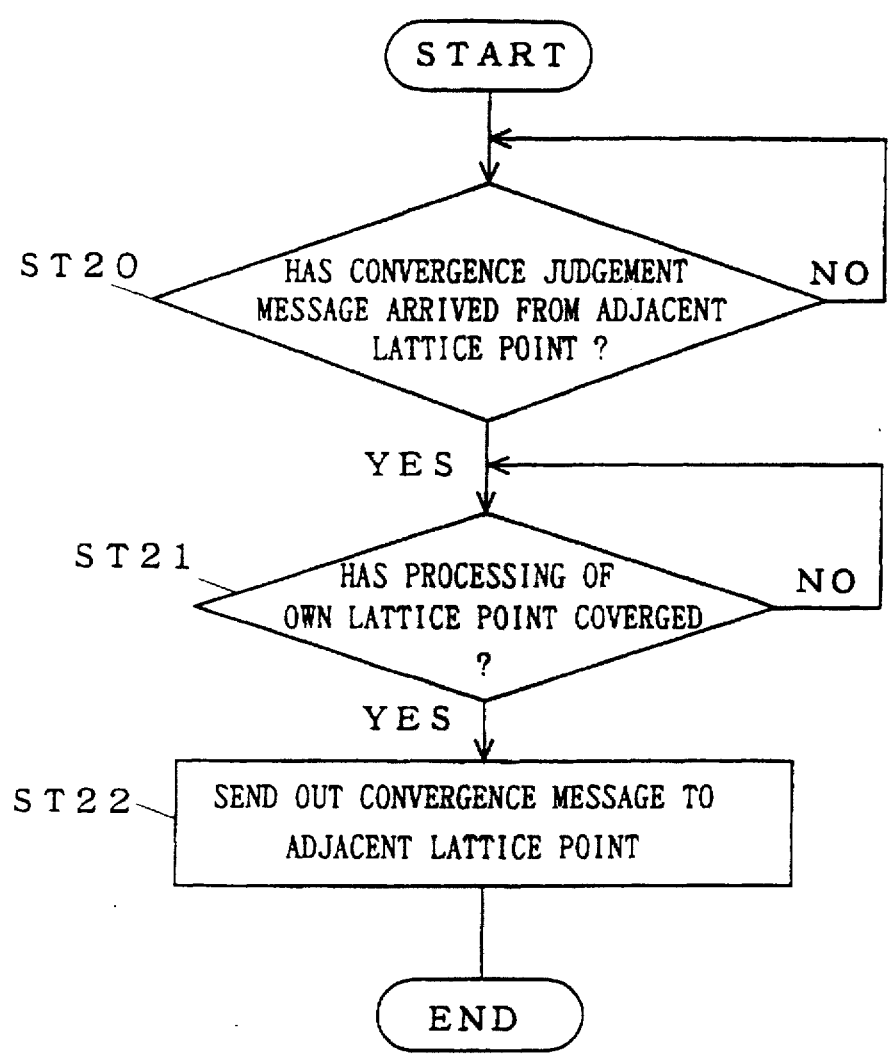
FIG. 56 is a flow chart for explaining the procedure of transfer of end flag to adjacent lattice point of the information processing system according to the thirty-sixth embodiment of the present invention.

FIG. 56 indicates a flow chart for the respective lattice points to carry the end flag to the adjacent lattice point, except for the processing of the lattice point 190 which serves as the starting point of the end flag.

As shown in FIG. 56, first, judgement is made whether or not a message carrying the end flag arrived from the adjacent lattice point (step ST20). If a message carrying the end flag arrived from the adjacent lattice point, (the convergence judging unit) drives the convergence judging processing of the own lattice point, waits until the processing of the own lattice point reaches convergence (step ST21) and, at the point in time where convergence is reached, transfers a message carrying the end flag to the next lattice point through the prescribed route (step ST22).

Figure 57:
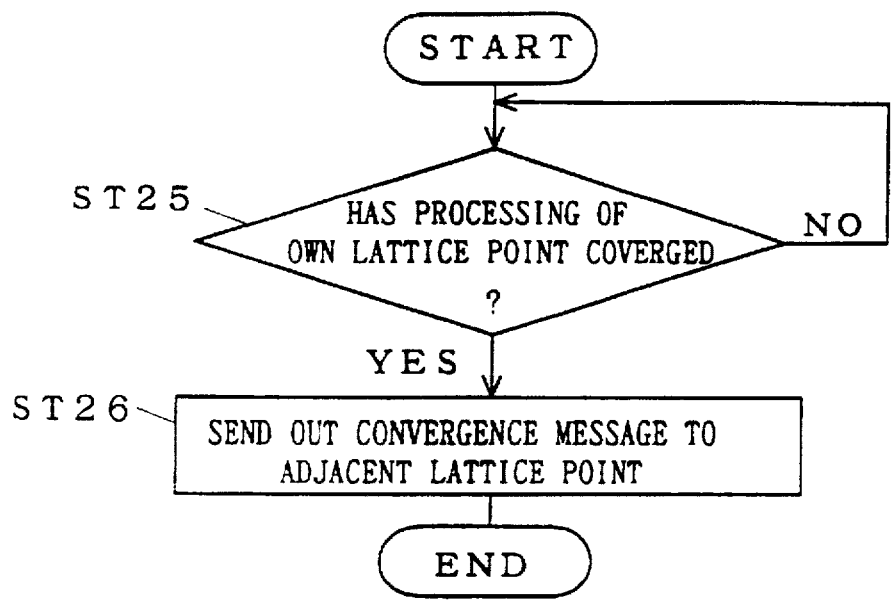
FIG. 57 is a flow chart for explaining the procedure of transfer of end flag to adjacent lattice point of the information processing system according to the thirty-sixth embodiment of the present invention.

FIG. 57 indicates a flow chart for the sending out of the end flag at the lattice point serving as the starting point for the transfer of end flag. As shown in the chart, (the convergence judging unit) judges convergence of the processing of the own lattice point only at the lattice point serving as the starting point of the end flag (step ST25) and, if convergence is reached, transfers a message carrying the end flag to the next lattice point through the route indicated in FIG. 55 (step ST26).

After passing through all the lattice points as described above, the end flag is transferred to the host computer and convergence is confirmed. In this multi-processor of the thirty-fifth embodiment, after once convergence is confirmed, the above process is repeated to ensure the judgement of convergence.

As explained above, this embodiment is realized in such a way that the convergence judging processing of the own lattice point is started with input of a message carrying the end flag in the processing at respective lattice points and that a message carrying the convergence judging flag is output if convergence is reached in the processing of the own lattice point, and this makes it possible to judge convergence of the entire system correctly even in the presence of any unstable lattice points.

Moreover, while in this embodiment explanation was given on a case where the processing for judgement of convergence for the processing of the own lattice at the lattice point serving as the starting point of the end flag is constantly driven, the same effects can also be obtained even if the processing for judgement of convergence is started from the host computer, as a matter of course.

In this kind of information processing system, the solution of equations is stored by being distributed to the storing means such as memory, etc. assigned to the respective lattice points. For that reason, it is necessary to integrate the results of computation stored separately, perform processing such as visualization, etc. and display them on a monitor.

This embodiment indicates a method of integrating the solution of equations distributed to the respective lattice points on the host computer.

In the thirty-sixth embodiment, explanation was given on the method of judgement of convergence about completion or not of the computation in the entire system. Namely, (the convergence judging unit) sends the end flag in order according to the prescribed route and, after fully patrolling of all lattice points, sends out a message indicating the convergence of the entire system to the host computer. The host computer performs processing for verifying the completion of computation by receiving said message.

FIG. 56 is a flow chart showing the relationship between the processing for judgement of convergence at respective lattice points and sending out of solution to differential equations. Explanation will be given on the procedure of judgement of convergence and the sending out of solution to differential equations based on FIG. 56. First, the respective lattice points receive the end flag from the adjacent lattice point (step ST20). Next, they judge convergence of the processing of the own lattice points (step ST21) and, after confirmation of convergence, send out the end flag along the predetermined route (step ST22) while sending, at the same time, the results of computation at the own lattice points, i.e. the solution of differential equations to the host computer.

Figure 58:
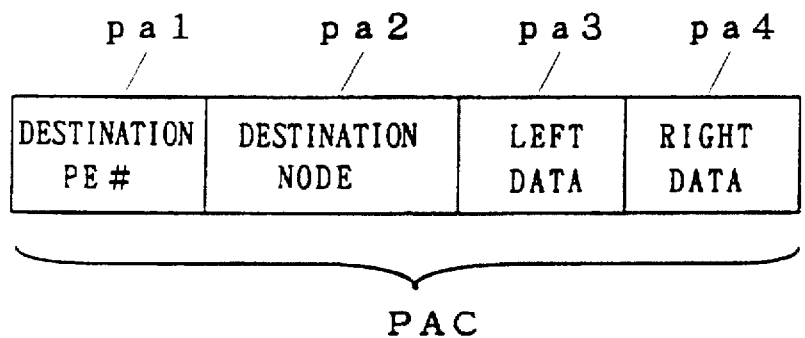
FIG. 58 is a drawing showing the construction of the message packet used for outputting result data according to the thirty-sixth embodiment of the present invention.

Moreover, FIG. 58 indicates a format of message packet PAC having the solution of differential equations to be sent out to the host computer. The field of the message packet is composed of the respective fields of left data (first operand) pa3, right data (second operand) pa4, destination PE number pa1 storing the element processor numbers to which to transfer the message packet and destination node numbers pa2 storing the address of the command to be executed next.

The left data field, right data field, destination element processor number and destination node number in the message packet according to this embodiment are given as follows: The left data field is a value (functional value) at the lattice point concerned of the solution of differential equations. The right data field is the identification number of the lattice point concerned. The destination element processor (PE) numbers are numbers assigned by the host computer to the element processors and the destination node numbers are results. The results are predetermined values and indicate that the message packet stores the results of computation at respective lattice points.

If such message packet is received by the host computer, the system makes the following actions:

(1) Checks the filed of the destination node number and, because the value is a result, confirms that the message packet concerned is the results of computation at the respective lattice points.

(2) Reads out the number of lattice point stored in the right data field and the solution of a differential equation stored in the left data.

(3) Determines the address by a predetermined method from the lattice point number and stores the value of the solution of a differential equation at the lattice point concerned in storing means such as memory, etc.

As explained so far, this embodiment is realized in such a way that (the respective lattice points) transfer the results of computation at the own lattice points (solution of differential equations) to the host computer as soon as they confirm convergence of the computation at respective lattice points, and has the effect of getting the data of final results ready on the host computer at the point in time when the completion of the solving of a differential equation under execution is confirmed.

While the twenty-ninth embodiment premises assignment of the processing of one lattice point (program) to one element processor, the twenty-fifth to twenty-eighth embodiments premise that the processing of a plural number of lattice points is assigned to one same element processor and that the exchange of data between lattice points is made through the data memory inside one same element processor. The respective embodiments will be explained in detail hereafter.

Explanation will be given on the thirty-seventh embodiment of the present invention. As another method of detecting circulation of unstable lattice points (non converged points) conceivable is a method of judgement of convergence which consists in confirming convergence of all lattice points in multiplex ways by transferring the end flag through a plural number of routes passing through all the lattice points.

To be concrete, judgement of convergence can be formed in multiplex ways by exchanging the end flag in 2 directions of longitudinal and transversal directions.

Figure 59:
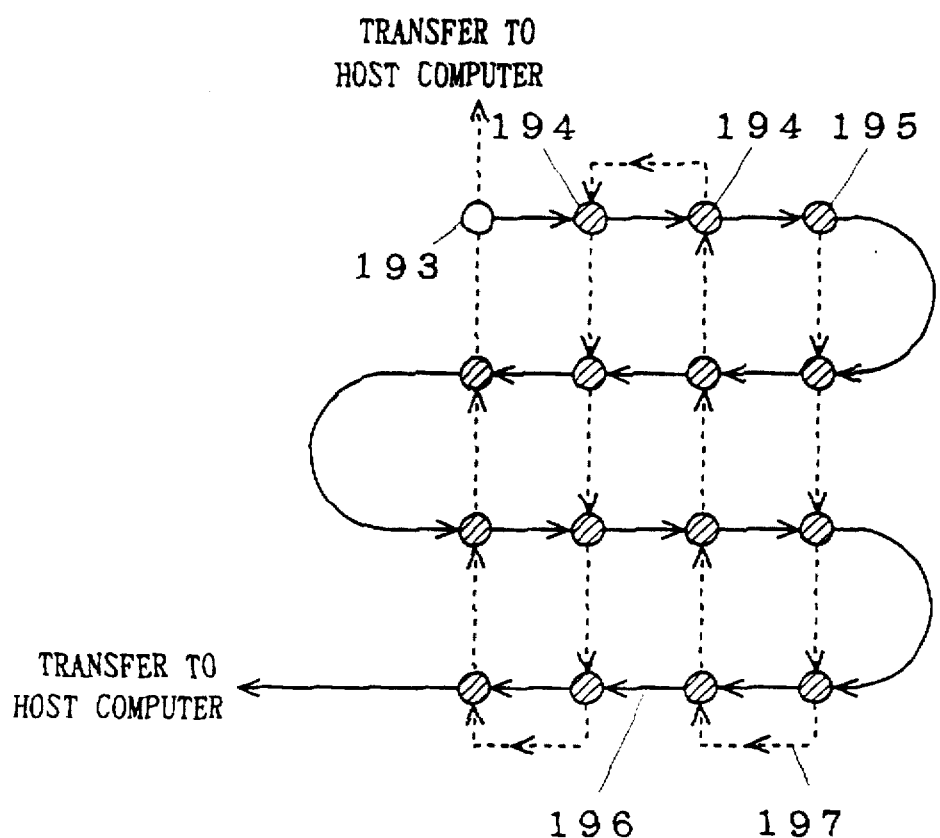
FIG. 59 is a conceptual drawing showing the route of transfer of end flag for explaining the actions of the information processing system according to the thirty-seventh embodiment of the present invention.

FIG. 59 indicates a conceptual drawing showing the route of transfer of the end flag in this embodiment.

In the drawing, 193, 194 and 195 indicate square lattices in two-dimensional space, the arrow mark indicated with solid line indicates the route of transfer of the first end flag 196 and the arrow mark indicated with dotted line indicates the route of transfer of the first end flag 197 respectively. In this embodiment, circulation of non converged points can be detected by making the routes of transfer of the first and the second end flags orthogonally intersect each other.

Figure 60:
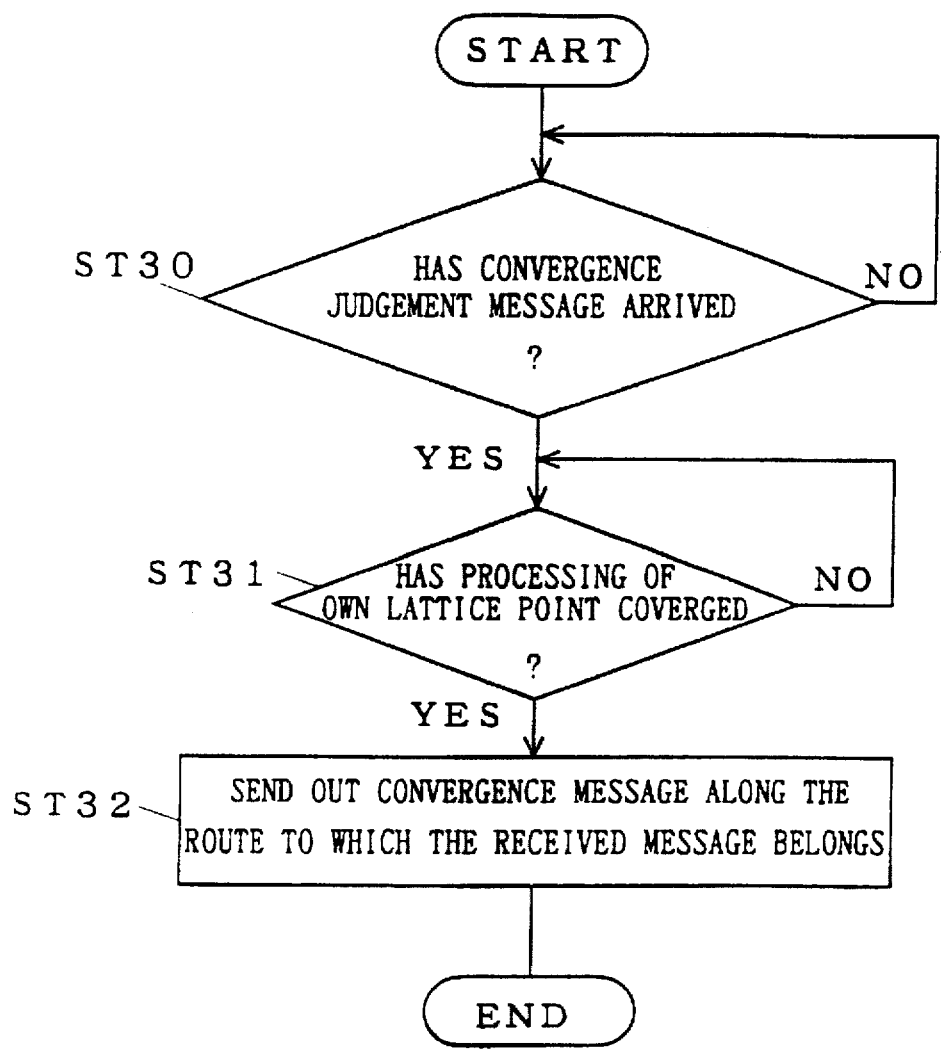
FIG. 60 is a flow chart for explaining the procedure of transfer of end flag to adjacent lattice point of the information processing system according to the thirty-seventh embodiment of the present invention.

FIG. 60 indicates a flow chart for the respective lattice points to carry the end flag to the adjacent lattice points, except for the processing of lattice points 193, 195 serving as starting points for the end flag.

As shown in FIG. 60, judgement is made first on whether or not a message of judgement of convergence arrived from the adjacent lattice point (step ST30). If a message carrying the end flag arrives from the adjacent lattice point, the lattice point drives the convergence judging processing of the own lattice point, waits until the processing of the own lattice point reaches convergence (step ST31) and, at the point in time where convergence is reached, judges if the end flag which arrived belongs to the first route of transfer or to the second route of transfer, and transfers a message carrying the end flag to the next lattice point through the prescribed desired route (step ST32).

Figure 61:
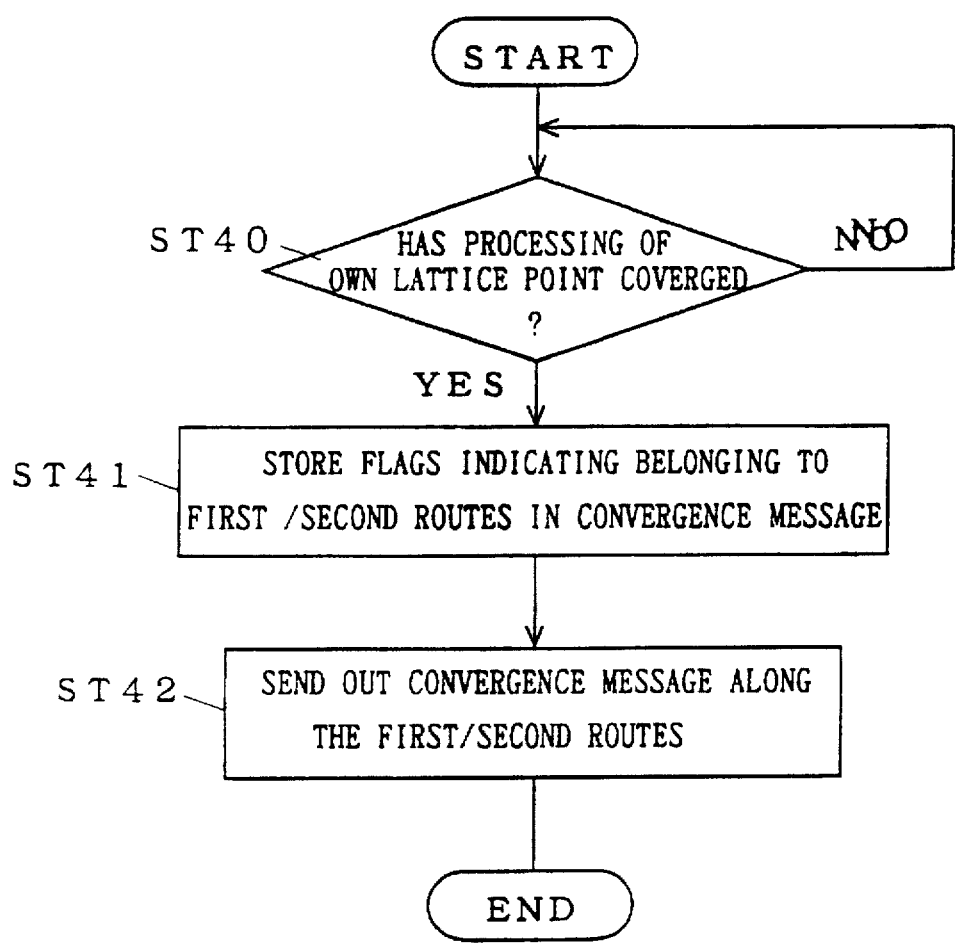
FIG. 61 is a flow chart showing the procedure of sending out of end flag of the element processor serving as starting point for the transfer of end flag of the information processing system according to the thirty-seventh embodiment of the present invention.

FIG. 61 indicates a flow chart for the sending out of end flag at the lattice point serving as starting point for the transfer of end flag. As shown in the drawing, the lattice point serving as starting point of end flag first judges convergence of the processing at the own lattice (step ST40) and, if convergence is reached, stores the flag showing that it belongs to the first or the second route of transfer in the convergence message (step ST41), and then sends out a message carrying the end flag to the next lattice point through the route indicted in FIG. 59 (step ST32).

At that time, the lattice point stores in the value of the end flag a value corresponding to either the first route or the second route to which the end flag belongs. On the basis of this value, other lattice points can determine the route of the arriving end flag.

As explained above, two or more routes for transferring flag for judging convergence are provided and this makes it possible to correctly judge convergence of the entire system even in the case where unstable lattice points exist.

While in this embodiment a flag value was used for indicate on which of two routes the end flag is transferred, it is apparent that the same effects can be obtained also when programs for processing end flag are provided separately so that the program for judging convergence may be started for each transfer route of end flag at the time of arrival of the respective end flags.

Next, Explanation will be given on the thirty-eighth embodiment of the present invention. Explanation will be given on the procedure of detecting unstable lattice points in the computation of convergence using multi-processor in the case where there is a possibility of existence of unstable lattice points.

First, in the same way as in the thirty-fifth embodiment, the lattice point transfers an end flag to the host computer through all the lattice points along the predetermined route. Next, the host computer transmits a message for stopping the processing of all lattice points and, as a result, stops all processing operations. After that, it detects patrolling of unstable lattice points by checking for convergence again. Accurate judgement of convergence can be realized also with this method.

Figure 62:
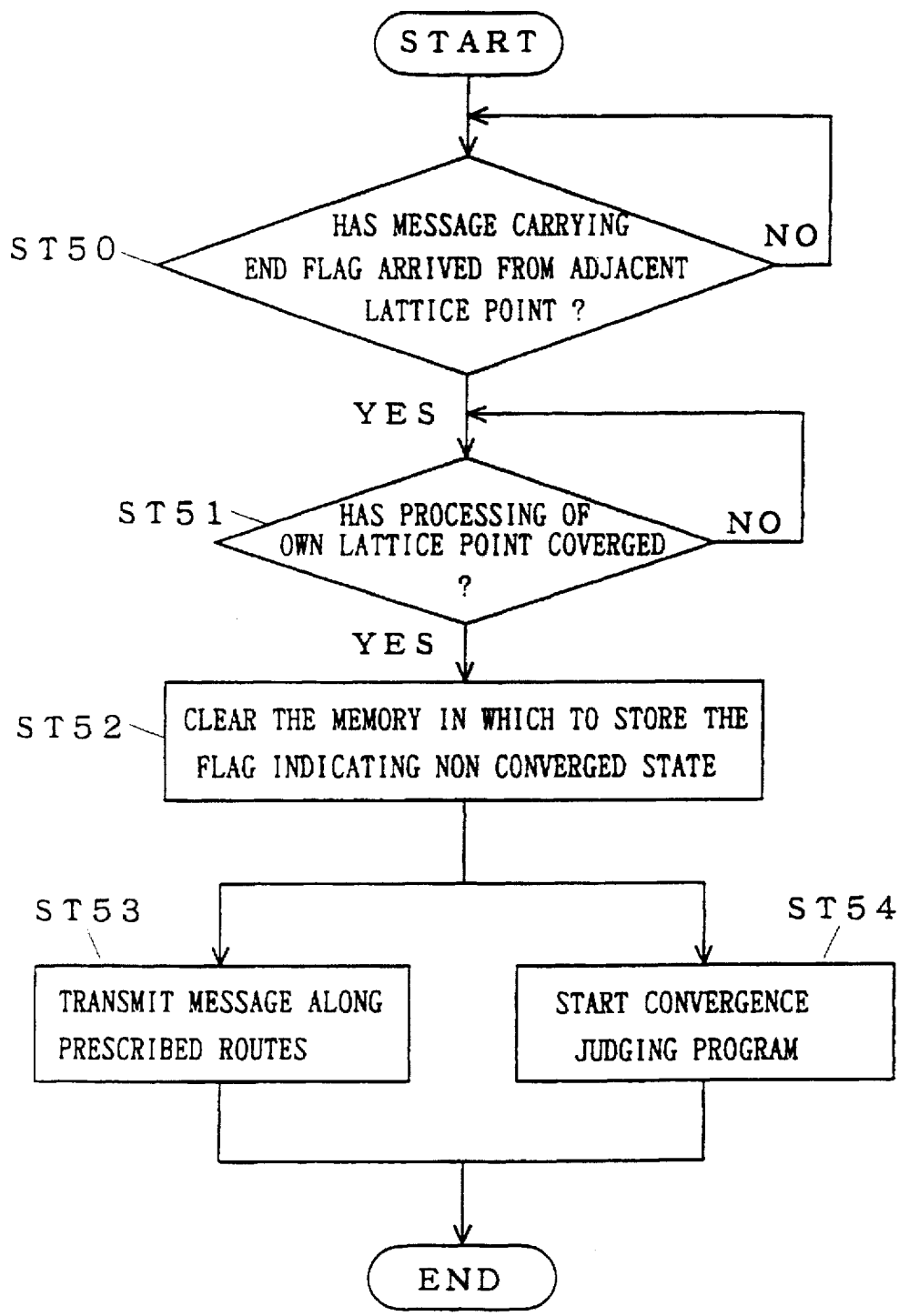
FIG. 62 is a flow chart for explaining the procedure of transfer of end flag to adjacent lattice point of the information processing system according to the thirty-eighth embodiment of the present invention.
Figure 63:
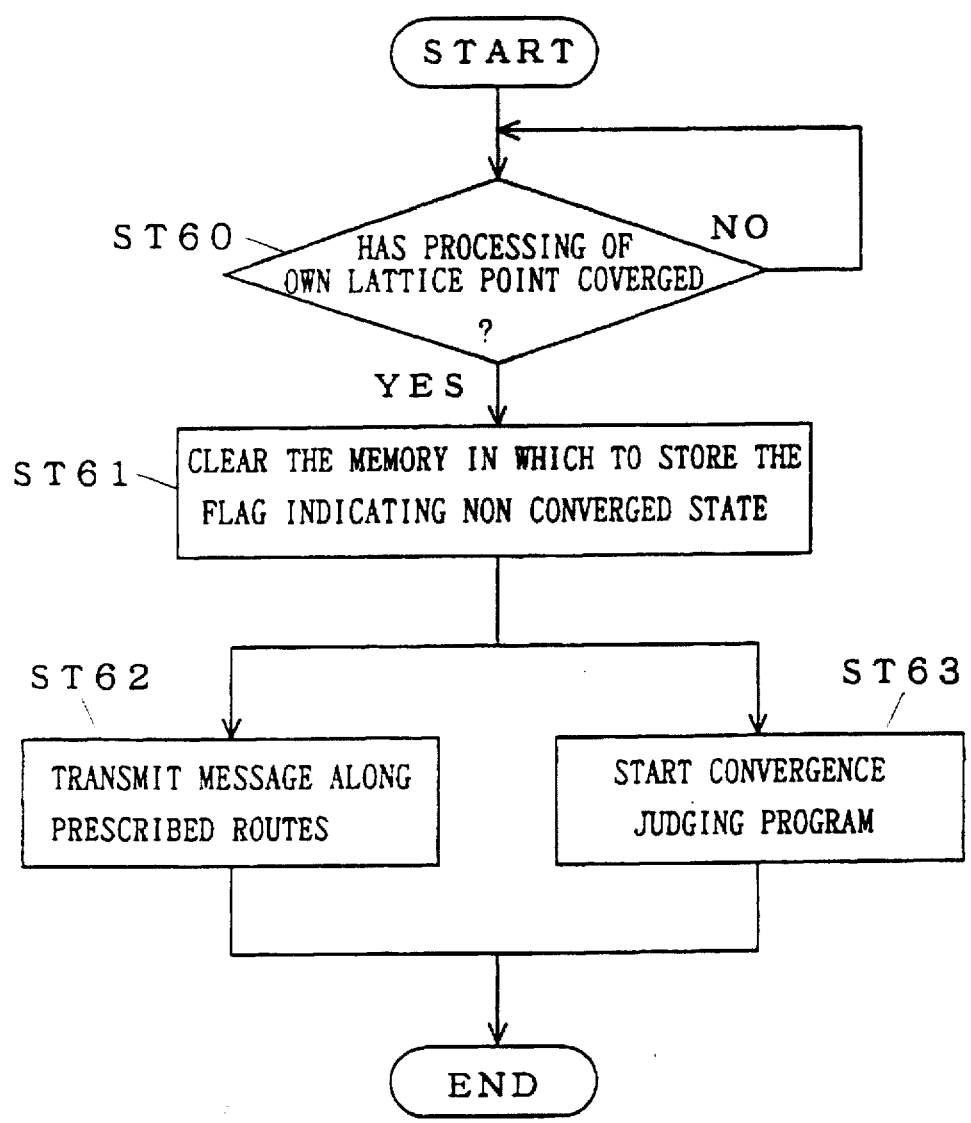
FIG. 63 is a flow chart showing the procedure of sending out of end flag of the element processor serving as starting point for the transfer of end flag of the information processing system according to the thirty-eighth embodiment of the present invention.

FIG. 62 is a flow chart indicating the content of processing relating to the judgement of convergence of the respective lattice points in this embodiment.

The processing relating to the judgement of convergence of the respective lattice points will be explained based on FIG. 62. In this embodiment, a memory or a register for storing the results of judgement of convergence is used.

In step ST50, the lattice point judges if a message carrying the end flag arrived from the adjacent lattice point or not. If a message carrying the end flag arrived from the adjacent lattice point, the lattice point drives the convergence judging processing of the own lattice point, waits until the processing of the own lattice point reaches convergence (step ST51) and, at the point in time where convergence is reached, transfers a message carrying the end flag to the next lattice point through the predetermined route as shown in FIG. 55

(step ST53). At that time, the lattice point clears said memory (step ST52) and starts the program for processing judgement of convergence (step ST54). The program for processing judgement of convergence judges if the processing of the own lattice point is in the state of non convergence or not and, when it is judged as in the state of non convergence, writes a flag indicating the state of non convergence of own lattice point in said memory.

Moreover, while the processing for judging convergence at the lattice point serving as starting point of a message carrying the end flag is, as shown in FIG. 36, basically the same as the processing of the lattice point serving as starting point of a message carrying the end flag in the thirty-sixth embodiment, the lattice point clears said memory (step ST61) and drives the program for processing judgement of convergence (step ST63), in addition to that processing. The program for processing judgement of convergence judges if the processing of the own lattice point is in the state of non convergence or not and, when it is judged as in the state of non convergence, writes a flag indicating the state of non convergence of own lattice point in said memory.

After that, a message carrying the end flag is transferred to the host computer. Upon receipt of the message carrying the end flag, the host computer transmits a message for stopping the processing of predetermined lattice points.

The lattice point which received said message for stopping the processing stops the processing and, at the same time, transmits the message for stopping the processing to the next lattice point along the predetermined route. The lattice point which received the message for stopping the processing performs the same stopping operation. After the processing of all lattice points is over, the host computer reads out said memory assigned to the respective lattice points and, in the case where all results of reading are zero, it means that the object computation converged. If any of said results of reading is found to be other than zero, the above-mentioned processing will be repeated.

Figure 64:
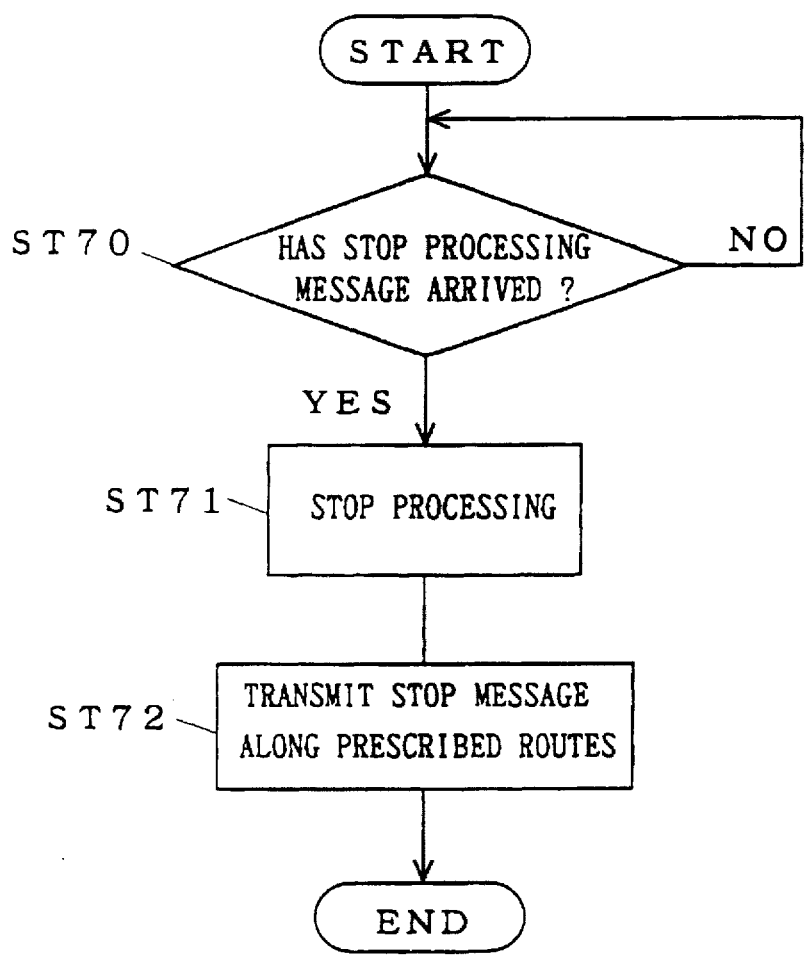
FIG. 64 is a flow chart showing the procedure of arbitration of processing at the lattice points of the information processing system according to the thirty-eighth embodiment of the present invention.

FIG. 64 indicates a flow chart for the lattice points to stop processing. The host computer transmits a message for stopping processing at a predetermined lattice point only. The predetermined lattice points judge arrival or not of the message for stopping processing (step ST70). They stop the processing if the message for stopping processing arrives (step ST71). While in this embodiment explanation was given on a case where a message for stopping processing at a predetermined lattice point only is transmitted from the host computer, the same effects can also be obtained even if this message is sent to all or a plural number of lattice points simultaneously or in time series.

Moreover, while in this embodiment explanation was given on a case where processing at lattice point is stopped with a message, the same effects can also be obtained, when the element processors constituting the multi-processor according to the present invention are provided with a mechanism for receiving interrupt signals, even if the processing is stopped with an interruption made by the host computer to said element processors.

Furthermore, while in this embodiment explanation was given on a case where a memory for storing a flag indicating non converged state of lattice point is assigned to each lattice point, it is apparent that the same effects can also be obtained if only at least one memory exists in the system. Moreover, if the element processors constituting said multi-processors are of a construction having a register, the same effects can be obtained also with the use of the register.

Next, explanation will be given on the thirty-ninth embodiment of the present invention.

In the thirty-sixth to thirty-eighth embodiments, explanation was given on a case where, a message carrying a flag indicating that the processing of the own lattice point reached a state of convergence is transferred along the predetermined route, and that message is transmitted to the host computer and then the host computer starts the processing for detecting "oscillation phenomenon" explained in the thirty-sixth embodiment.

However, though quite rarely, there may be cases where the state of convergence is not reached for a long time depending on the boundary conditions, etc.

Explanation will be given hereafter on the method of judgement of convergence of the information processing system workable even in a case where the system gets in a state of constant instability as mentioned above.

In case said convergence message is not transferred to the host computer for a certain period of time after the processing time is measured with the timer on the host computer or the watch-dog timer installed on the system, etc., the processing program of the respective lattice points performs the following processings (1), (2):

(1) Relax the standards of judgement of convergence at respective lattice points than usual.

(2) Attach, to the message to be transferred, a flag indicating that the judgement was made by using relaxed standards of judgement.

By performing the processings (1), (2), it becomes possible to prevent the system from getting into a state of constant instability.

Next, an embodiment for realizing the processings (1), (2) will be explained based on the thirty-sixth embodiment.

Figure 65:
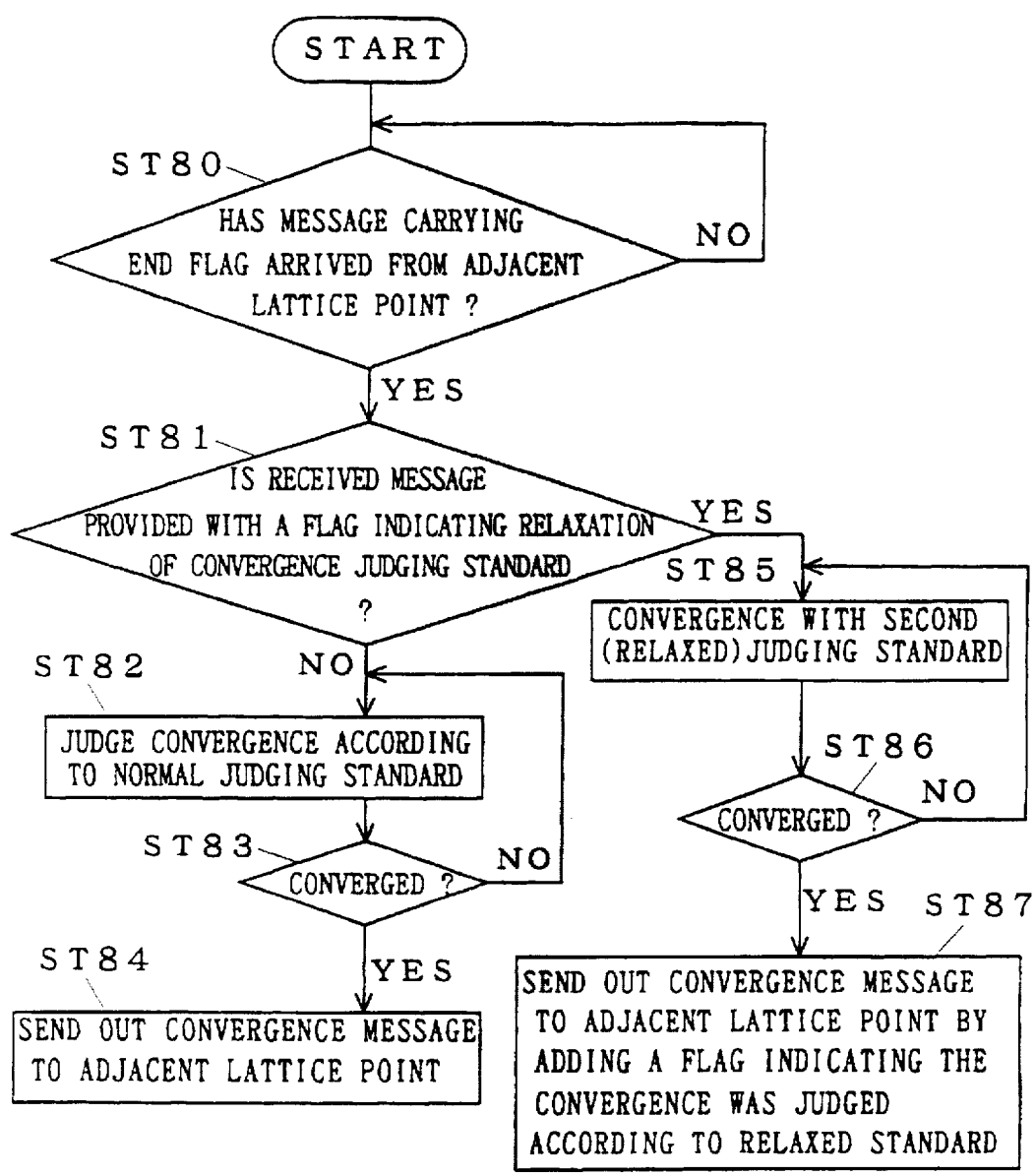
FIG. 65 is a flow chart for explaining the procedure of transfer of end flag to adjacent lattice point of the information processing system according to the thirty-ninth embodiment of the present invention.
Figure 66:
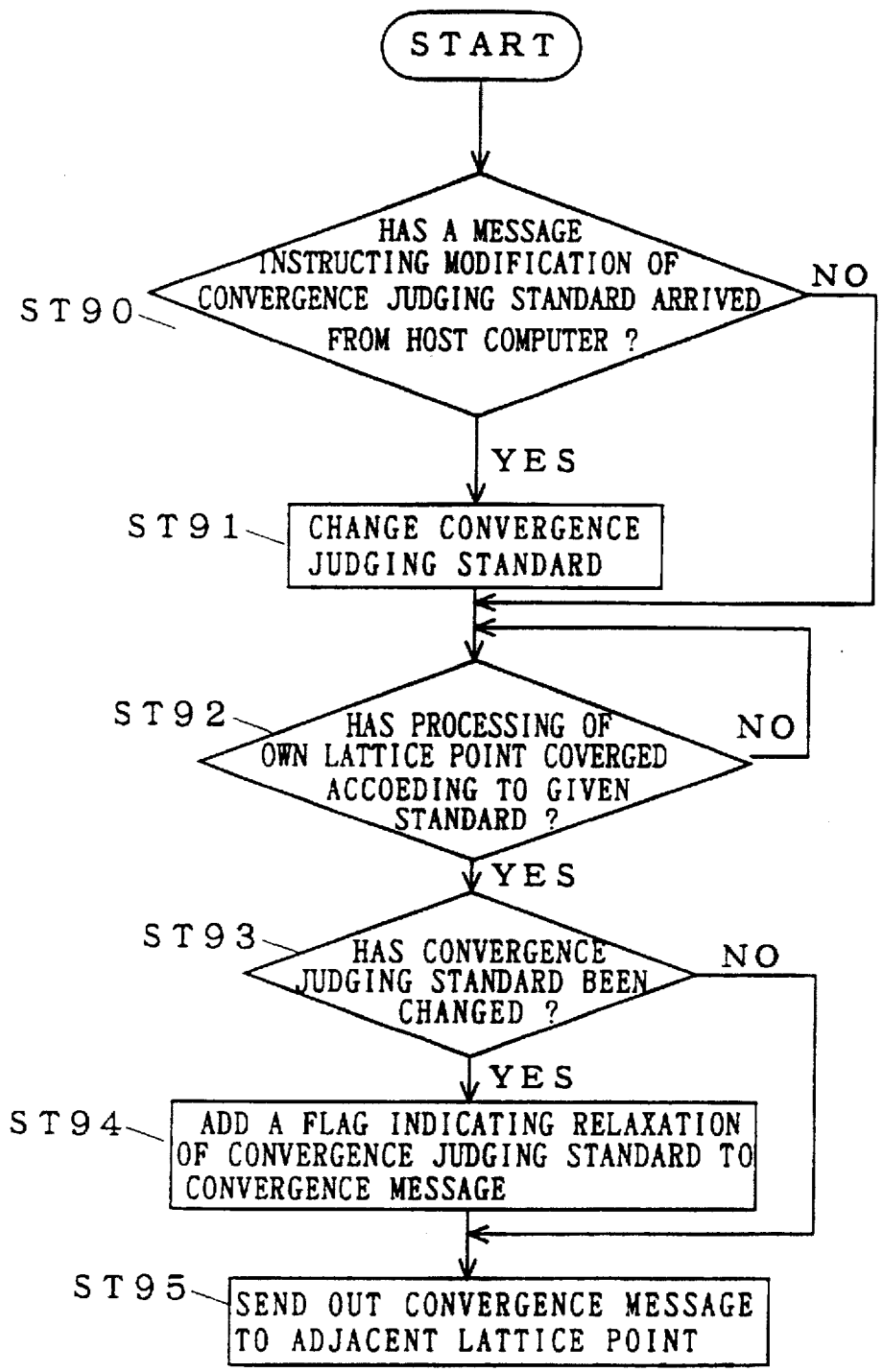
FIG. 66 is a flow chart for explaining the procedure of transfer of end flag to adjacent lattice point of the information processing system according to the thirty-ninth embodiment of the present invention.

FIG. 65, FIG. 66 indicate flow charts of processing for judgement of convergence at respective lattice points necessary for realizing the processings (1), (2). FIG. 65, FIG. 66 correspond to FIG. 56, FIG. 57 explained in the thirty-sixth embodiment respectively.

FIG. 65 indicates a flow chart showing the processing for judgement of convergence at lattice points other than the lattice point which serves as starting point of the flag.

As shown in the drawing, judgement is made first on whether or not a message carrying an end flag arrived from the adjacent lattice point (step ST80). If that message arrived, the lattice point judges if a flag indicating relaxation of the standards of judgement is attached to the message or not (step ST81).

If this message has no flag indicating relaxation of the standards of judgement, a convergence judging determine to performing according to the normal standards of judgement (step ST82) and the judgement of convergence or not is made (step ST83). If convergence is reached, the lattice point sends out a convergence message to the adjacent lattice point (step ST84).

If, after the convergence message is input from the adjacent lattice point, this message is found to have a flag indicating that the judgement was made by using relaxed standards of judgement, the lattice point forms judgement of convergence of the own lattice point by using the second standards set in advance (steps ST85, ST86), and sends out the message to the next lattice point by attaching a flag indicating relaxation of the standards of judgement to it (step ST87).

FIG. 66 indicates a flow chart showing the processing for judgement of convergence at the lattice point which serves as starting point of the flag. FIG. 66 indicates the procedure of a case in which the lattice point forms judgement of convergence of the own lattice point by using the second standards set in advance if it receives a message indicating change of the standards of judgement of convergence from the host computer, and sends out the message to the next lattice point by attaching a flag indicating relaxation of the Standards of judgement to it. The lattice point judges arrival or not of the instruction message for changing the standards of judgement of convergence from the host computer (step ST90). If the instruction message arrived, the lattice point changes the standards in step ST91, and judges if the processing of the own lattice point converged with the given standards or not (step ST92). If the processing of the own lattice point converged with the given standards, judgement is made on if there has been a change of the standards of judgement of convergence or not (step ST93). The lattice point sends out the convergence message as it is to the adjacent lattice point (step ST95) if there was no change of the standards of judgement of convergence, but sends out the convergence message to the adjacent lattice point (step ST95) by attaching a flag indicating relaxation of the standards of judgement to it (step ST94) if there has been a change of the standards of judgement of convergence.

In both the thirty-seventh and thirty-eighth embodiments, it is apparent that the function for realizing said processings (1), (2) can be supplemented in the same way as in the thirty-ninth embodiment.

Next, explanation will be given on the fortieth embodiment of the present invention. This embodiment is characterized with the method of judgement of convergence which consists in detecting unstable lattice points in the computation of convergence using a multi-processor.

In this embodiment, the system is provided with a convergence judging program convergence judging unit for judging convergence or not of the computation at respective lattice points and a register (CREG) or memory for storing the state of convergence. CREG can be cleared to zero from outside at optional timing and is set for 1 when it is judged that the computation of the lattice point concerned has not converged yet.

Figure 67:
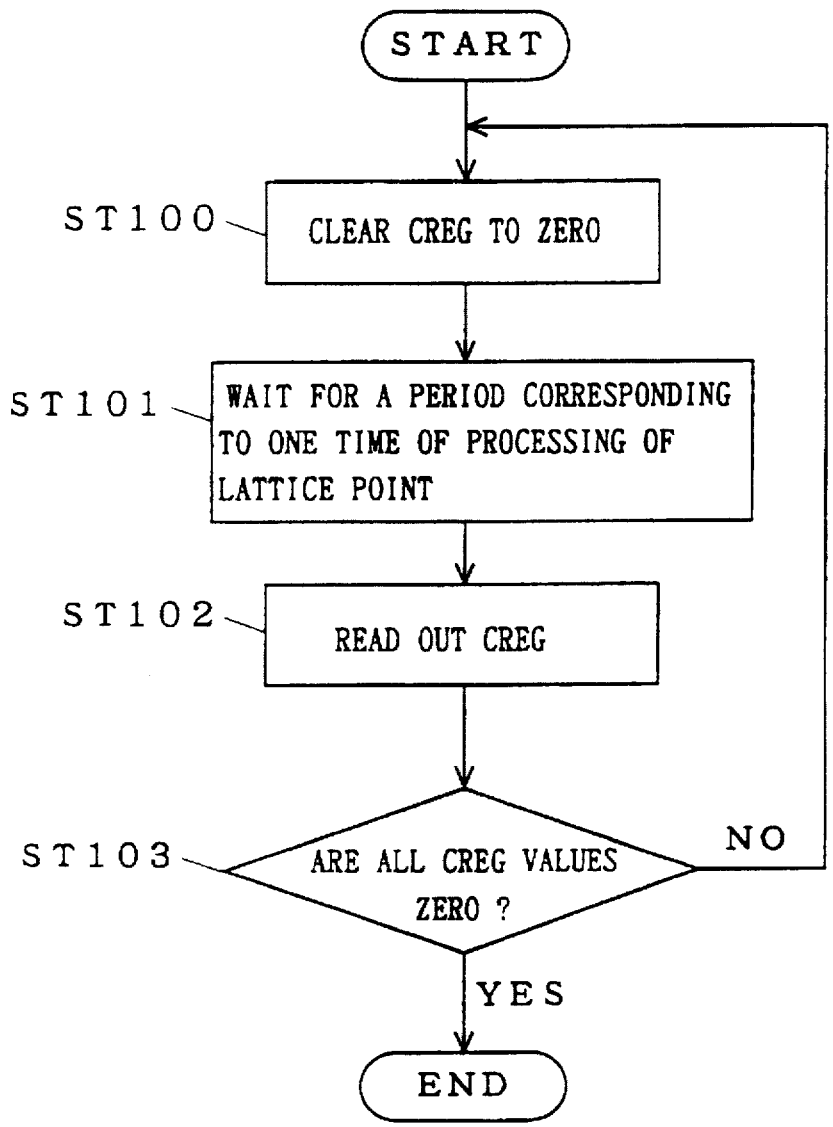
FIG. 67 is a flow chart showing the procedure of judgement of convergence of the information processing system according to the fortieth embodiment of the present invention.
Figure 68:
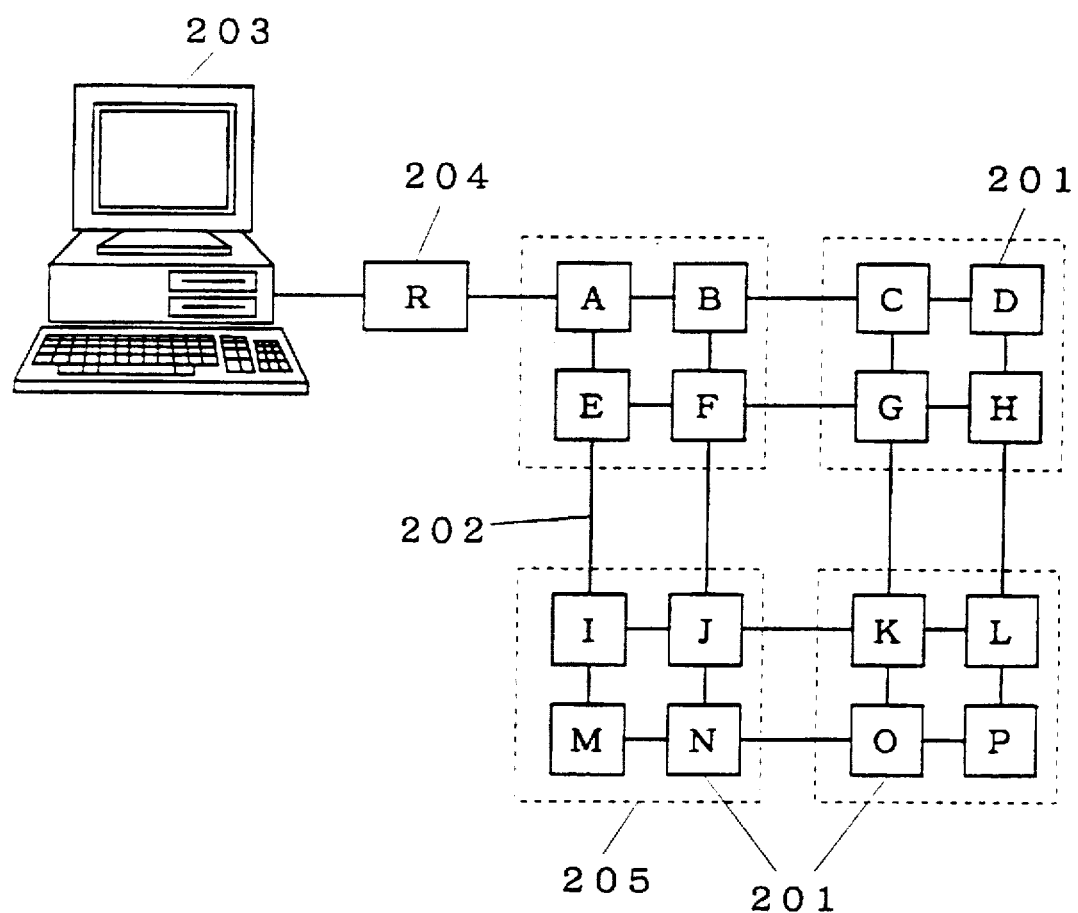
FIG. 68 is a block diagram showing the construction of a system for solving differential equations using a conventional multi-processor.
Figure 69:
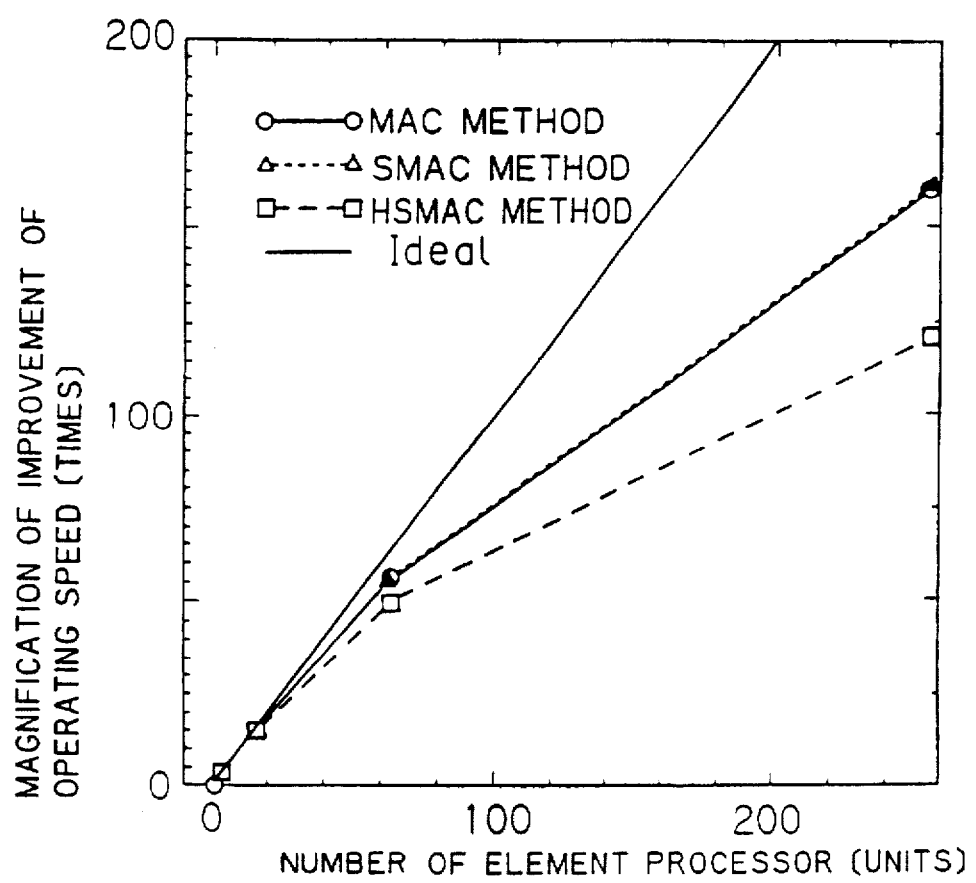
FIG. 69 is a graph showing the efficiency of parallel operations in the case of use of the conventional method of solving differential equations.

The judgement of convergence of the entire system is made by the procedure indicated below. FIG. 67 indicates a flow chart corresponding to that procedure.

(1) Clears the CREG registers corresponding to all the lattice points to zero (step ST100).
(2) Waits for a time sufficient for terminating one time of processing of all the lattice points (step ST101).
(3) Reads the said register of all the lattice points to make sure that it remains 0 (step ST102).
(4) Repeats the processings (1) to (3) in case 1 is read out even at only one lattice point. Terminates the processing if the value of said register for all the lattice points is 0 (step ST103).

While in this embodiment 1 is written in said CREG register in the case where the convergence judging program judged that convergence is not yet reached, this processing may be incorporated in the program from the beginning, or may be made by starting said judging program by rewriting the program once after the convergence of computation of the lattice point concerned, for operating said CREG register.

Moreover, while in this embodiment explanation was given on a case where a register is assigned to each lattice point as storing means for storing the state of convergence of the computation of lattice points, it is apparent that the same effects can be obtained also by using memory as said storing means. In addition, while in this embodiment explanation was given on a case where either a register or a memory element is assigned to each lattice point, no less than one piece of such register or memory will be enough in the entire system. Needless to say, assigning no less than one piece of said storing means to each element processor will be more effective in the case where the convergence judgement method according to the present invention on a system constructed with a multi-processor.

As explained above, this embodiment, which is provided with at least one storing means for storing the state of non convergence, means for clearing all such storing means to zero and means for reading the content stored in such storing means for making sure that their values are all zero, is capable of judging convergence without error even in the case of presence of some non converged points.

Moreover, the processing program of each lattice point writes "1" in the register (CREG) when the lattice point concerned got in the state of non convergence in this embodiment. With the addition of "1", it becomes possible to know the number of lattice points which got in the state of non convergence, by finally reading out the value of CREG. In this way, if the processing program for each lattice point is constructed in a way to add "1" to the content of CREG in case the lattice point concerned got in the state of non convergence, it has an effect of making it possible to shorten the processing time by making modification of standards of judgement of convergence, adjustment of coarseness of lattice points, etc. based on the final value of CREG.

The inventions of the thirty-first to thirty-ninth embodiments not only are effective for an ordinary multi-processor having a plural number of processors as a matter of course but also have an effect of making it possible to operate the element processors independently even during judgement of convergence and improve the accuracy of the solution by combined use with an information processing system allowing independent operation of element processors such as that of the first embodiment, etc.

Next, explanation will be given on the forty-first embodiment of the present invention.

Figure 71:
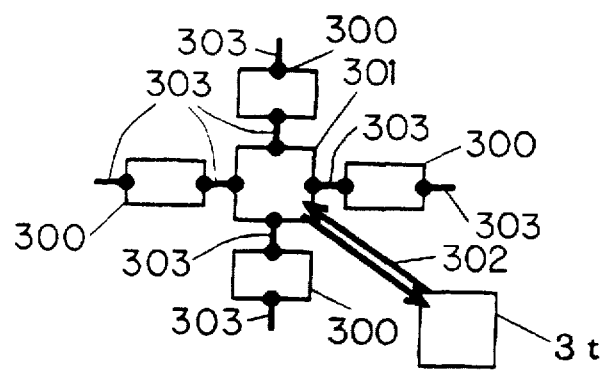
FIG. 71 is a block diagram for explaining units of the network constructed with I/O controller and data memories according to the forty-first embodiment of the present invention.

FIG. 71 is a block diagram showing the network construction composed of an I/O controller and data memories for holding data communication between mutually adjacent element processors according to the forty-first embodiment of the present invention. In FIG. 71, 3t is an element processor not having any data memory or I/O controller for communication with data memory inside. 300 are data memories arranged on the network. 301 is an I/O controller for determining access route between element processor 3t and a plural number of data memories 300 and controlling data communication between element processor and data memories 300. 302 are data buses connecting between element processor 3t and I/O controller for data communication, and 303 are connections between element processors connecting between element processor 3t and data memories 300.

The I/O controller 301 is connected with 4 data memories 300 here, and the respective data memories 300 are connected to other I/O controllers which are connected to the adjacent element processors of the element processor 3t. However, the number of data memories 300 connected to the I/O controller 301 is not limited to 4. The number of data memories 300 connected to the respective I/O controllers 301 is determined depending on the state of network, and the state of network is determined depending on the mode of respective analyses.

The element processor 3t sends a demand for access to memory to the I/O controller 301 through the data bus 302. The demand for access to memory contains a data of direction of communication showing in which of the 4 directions to have access to the data memory 300 and a description of the address number of the memory space of the specified data memory 300. The I/O controller 301 switches the direction of communication according to this demand for access to memory to enable access to the specified data memory 300 among those in the 4 directions. And, the data of the address No. described in the memory access demand passes through the connection 303 between element processors, the I/O controller 301 and the data bus 302 to be given to the element processor 3*t*. This data given to the element processor 3*t* is a data which was written in advance by an adjacent element processor, for example, and is a data of equal value as that given by direct communication with the adjacent element processor.

Moreover, needless to say, when having access to a plural number of data arranged regularly on the memory, it is possible to realize continuous access to those data by sending the forefront address and the addressing mode of such data from the element processor 3*t* to the I/O controller 301.

As explained above, by constructing a network with the I/O controller 301 placed among data memories 300, it becomes possible for the adjacent element processor to have access at high speed to the data memory 300 in which data is written, even in a case where the I/O controller 301 is not mounted inside the element processor 3*t*.

In the network construction indicated in FIG. 71, in which the element processor 3*t* and the I/O controller 301 were connected directly to each other through the data bus 302, it is necessary to build the system actions in a way to avoid collision of demands for reference/renewal because of the direct connection. In case of collision of demands for reference/renewal to one same memory, the processing is interrupted, leading to an increase of access time.

Figure 72:
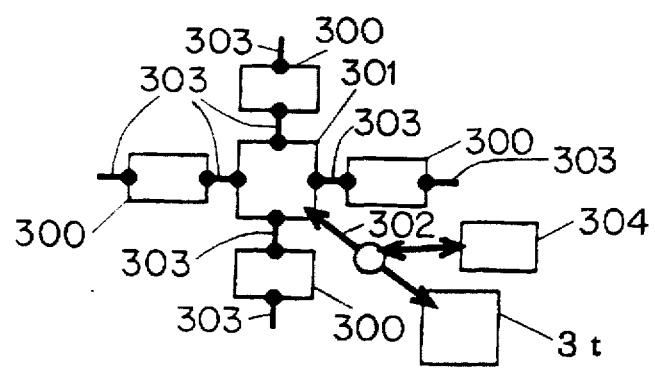
FIG. 72 is a block diagram for explaining other units of the network constructed with I/O controller and data memories according to the forty-first embodiment of the present invention.

The network construction indicated in FIG. 72 is provided with a buffer mechanism for temporarily storing memory access demands sent from the element processor 3*t* to the I/O controller 301. In FIG. 72, 304 is a buffer mechanism for temporarily storing memory access demands sent from the element processor 3*t* to the I/O controller 301, and other parts of the same codes with those in FIG. 71 are parts corresponding to those of the same codes in FIG. 71.

In a multi-processor constructed as shown in FIG. 72, one data memory 300 is shared by mutually adjacent element processors. There is a possibility that 2 mutually adjacent element processors have access to one same memory simultaneously. The buffer mechanism 304 temporarily stores requests for reference/renewal to data memory. If any request for reference/renewal is stored in the buffer mechanism 304, the element processor 3*t* can execute processing regardless of acquisition or not of data from the data memory. Even in the case of collision of requests for reference/renewal to one same memory address, speedier access to memory becomes possible without any interruption of the processing.

Figure 73:
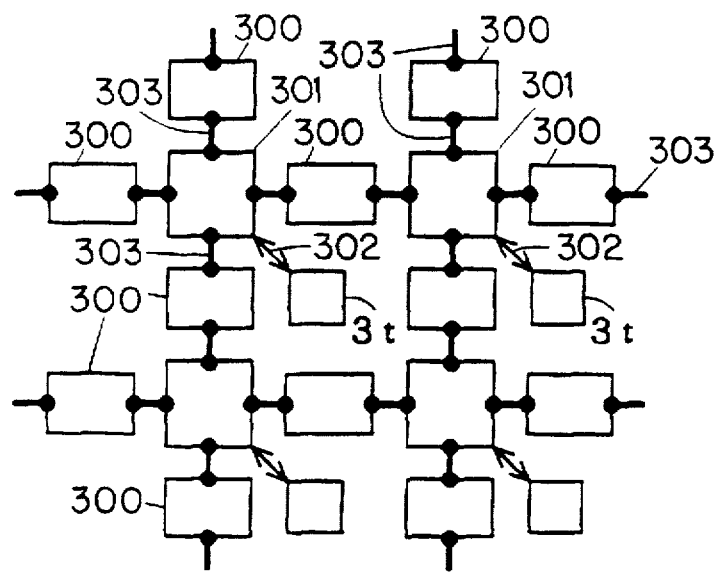
FIG. 73 is a block diagram for explaining units of the first network constructed with I/O controller and data memories according to the forty-first embodiment of the present invention.

FIG. 73 indicates a lattice type network topology most suitable to thermal hydraulic analysis formed by connecting a plural number of element units indicated in FIG. 71. In the two-dimensional lattice type network explained in the eighth to eleventh embodiments, element processors are arranged at points of intersection of lattices. As shown in FIG. 73, in the case where the I/O controller 301 is placed outside the element processor 3*t*, the I/O controller 301 is disposed at the position of intersection of lattices. The element processor 3*t* corresponds to the I/O controller 301 at 1:1 and the I/O controller 301 and the element processor 3*t* are connected to each other through the data bus 302, and the I/O controller 301 is also connected with 4 data memories 300.

In this way, by connecting various devices such as element processor 3*t*, data memories 300, etc. centering on the I/O controller 301, it becomes possible to construct a two-dimensional lattice type network and execute memory access between mutually adjacent element processors at high speed.

Figure 74:
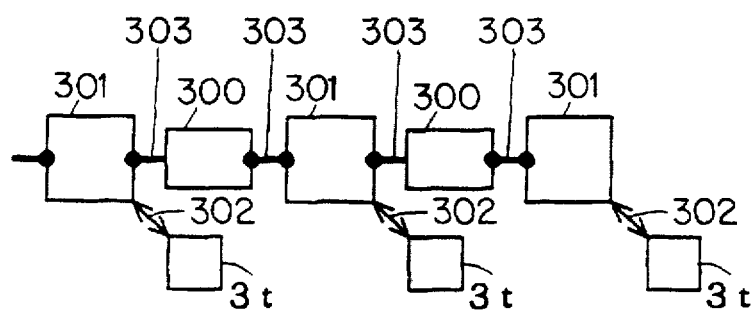
FIG. 74 is a block diagram for explaining units of the second network constructed with I/O controller and data memories according to the forty-first embodiment of the present invention.

Naturally, it is also possible to construct a network based on a one-dimensional pipeline topology by using the I/O controller 301. FIG. 74 is a block diagram showing part of the network of a multi-processor system constructed in the shape of a one-dimensional pipeline topology. In the case of a one-dimensional pipeline topology, the number of data memories 300 connected to the I/O controller 301 is 2.

Needless to say, by thus constructing a network through the I/O controller 301, it becomes possible to speed up the access to data memories 300 by the element processor 3*t* also in a one-dimensional pipeline type network in the same way as with a two-dimensional lattice type network.

Figure 75:
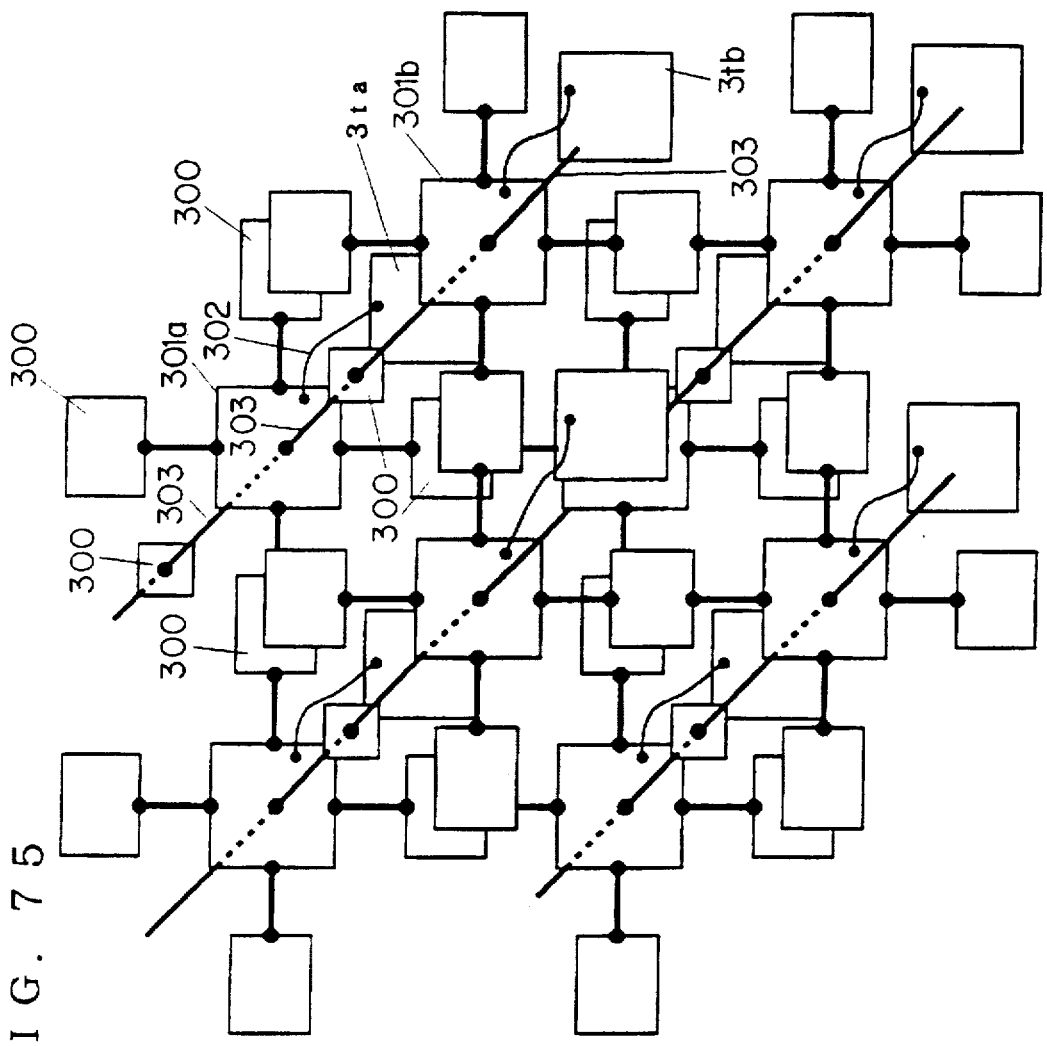
FIG. 75 is a block diagram for explaining units of the third network constructed with I/O controller and data memories according to the forty-first embodiment of the present invention.

Moreover, a similar construction is also possible in a case where element processors are arranged three-dimensionally. As shown in FIG. 75, in a three-dimensional construction, 6 data memories 300 are connected to one I/O controller. For example, a plural number of lattice type network topologies indicated in FIG. 73 may be placed one upon another into a three-dimensional construction. In FIG. 75, the I/O controllers 301*a* and 301*b* belong to lattice type network topologies on different planes. Those two I/O controllers 301*a* and 301*b* share one data memory 300. In this way, by connecting various devices such as element processor 3*t*, data memories 300, etc. centering on the I/O controllers 301*a* and 201*b*, it becomes possible to construct a three-dimensional lattice type network and execute memory access between mutually adjacent element processors at high speed.

Furthermore, while this construction is applicable in optional networks, it is also possible to have data communication with a remote element processor 3*t*, located in the neighborhood, other than the adjacent element processor 3*t* in a lattice type network topology as shown in FIG. 73, for example. For example, by providing an area in which to write data of a prescribed element processor in the data memory and copying that area with the I/O controller 301, it becomes possible to obtain data of an element processor located at a certain distance from the adjacent element processor 3*t*.

Figure 76:
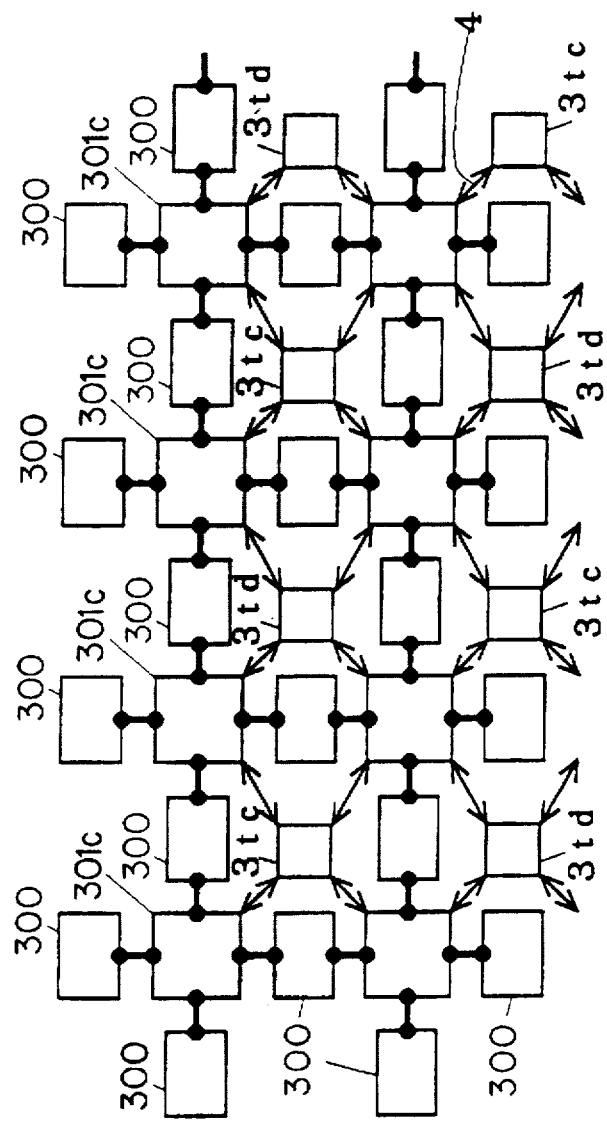
FIG. 76 is a block diagram for explaining units of the fourth network constructed with I/O controller and data memories according to the forty-first embodiment of the present invention.

The construction may also be made in such a way that the element processor outputs a request for reference/renewal to a plural number of I/O controllers. FIG. 76 indicates a construction realized by applying that idea to the two-dimensional lattice type topology indicated in FIG. 73. As shown in FIG. 76, the element processors 3*tc*, 3*td* can output a request for reference/renewal to the I/O controllers 301*c* arranged in 4 directions. For example, when holding communication between element processors 3*tc*, they output a request for reference/renewal to two mutually adjacent I/O controllers 301*c* sharing one data memory 300. This makes it possible to hold communication between element processors 3*tc* by skipping one adjacent element processor 3*td*. For example, this makes it possible to make selective use of both coarse node coupling performing computation by using element processors tc only and fine node coupling performing computation by using element processors 3*tc*, 3*td*.

Still more, the element processors 3*t* may not only be connected to the I/O controllers 301 arranged around them through data bus to output requests for reference/renewal but also be connected to the I/O controllers 301 at more distant positions through data bus depending on the object of analysis, accuracy, etc., as a matter of course.

Next, explanation will be given on the forty-second embodiment of the present invention.

In the thirtieth to thirty-fourth embodiments, the convergence judgement flags (1 or 0) output by the respective element processors $3k$, $3m$, $3p$, $3q$ were logically multiplied one by one by means of the convergence judging unit 180 or the logical circuit mounted inside the convergence judging unit 183, and eventually transferred to the host computer 1 as convergence judgement information. By the way, in the case of a small-scale multi-processor system in which the number of element processors connected is tens of unit or so, it is possible to take the logical product of the convergence judgement bits at sufficiently high speed even with the construction indicated in the thirtieth to thirty-fourth embodiments. However, in the case of a large-scale multi-processor system in which the number of element processors connected amounts to as many as hundreds of unit, the total time required for the completion of logical products in all the convergence judging units 180 or the convergence judging unit 183 and the transfer to the host computer 1 of the results of judgement of convergence becomes enormous, and this reduces the effect of having a special hardware constructed by locating the convergence judging units 180, for example, outside the element processor $3k$, etc.

Figure 77:
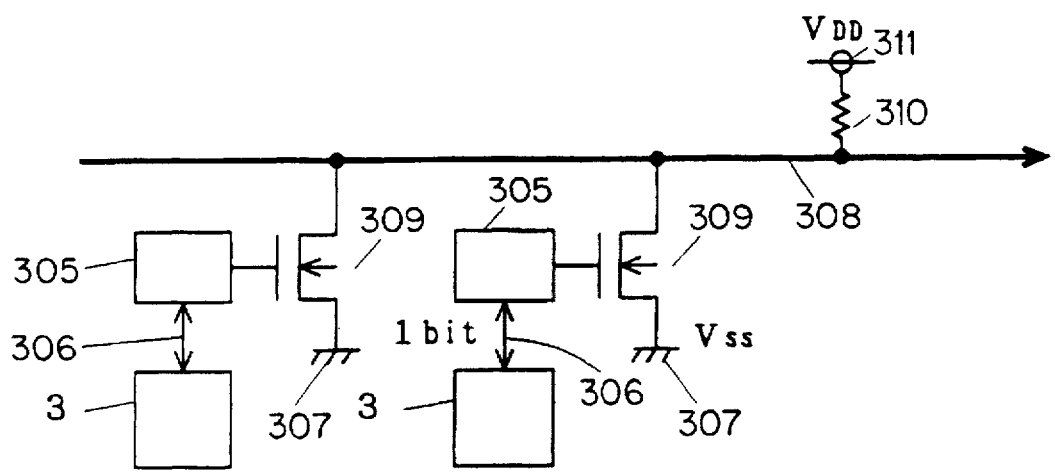
FIG. 77 is a conceptual drawing indicating an outline of the construction of the convergence judging system according to the forty-second embodiment of the present invention.

FIG. 77 is a conceptual drawing indicating an outline of the convergence judging system according to the forty-second embodiment of the present invention. In FIG. 77, 3 are element processors, 305 are registers for convergence judgement bits for temporarily storing convergence judgement bits, 306 are convergence judgement bit wires for transmitting convergence judgement bits output from the element processors 3 by connecting between the element processors and the registers for convergence judgement bits 305, 308 is a convergence information signal wire for transmitting convergence information to the host computer, 309 are N type MOS transistors having a source connected to the grounding potential point 307 fixed at a grounding potential of Vss, a gate connected to the registers for convergence judgement bits 305 and a drain connected to the convergence information signal wire 308, and 310 is a resistor having an end connected to the supply potential point 311 and the other end connected to the convergence information signal wire 308. The wired OR is composed of N type MOS transistors 309, convergence information signal wire 308 and resistor 310.

At least 1 bit of convergence judgement bits output respectively from the respective element processors 3 is temporarily preserved on the register 305 for convergence judgement bits through the convergence judgement bits wire 306. The convergence judgement bits stored in the register 305 for convergence judgement bits are submitted to logical multiplication by wired OR and are reflected in at least 1 bit of the results of judgement of convergence output on the convergence information signal wire 308.

Now, definition will be given as a state of convergence for a state in which the convergence judgement bits output from the respective element processors 3 are "0", and as a state of non convergence if they are "1". In the case where all of the respective element processors 3 output "0", namely a state of convergence, as convergence judgement bits, the N type MOS transistors 309 all get in a state of non continuity, the convergence information signal wire 308 outputs a supply potential of VDD through the resistor 310 and the host computer can recognize that the entire system has reached a state of convergence.

Moreover, in the case where at least one of the element processors 3 outputs "1" as convergence judgement bit (namely a state of non convergence), it is possible to make the convergence information signal wire 308 output a potential which can be considered digitally as supply potential of VDD, by setting the resistance value of the resistor 310 sufficiently larger compared with the resistance value at the time of continuity of the N type MOS transistors 309, because the corresponding N type MOS transistors 309 remain in the state of continuity. With the convergence information signal wire 308 kept at a potential which can be considered digitally as VSS, the host computer 1 can recognize that the system as a whole has not yet reached a state of convergence.

Needless to say, in this embodiment, definition is given as a state of convergence when the logical values of the convergence judgement bits output from the respective element processors 3 are "1", and as a state of non convergence if they are "0", and a circuit making similar actions can be constructed by changing the N type MOS transistors into P type MOS transistors.

By constructing the convergence judging unit as described above, it becomes possible to continuously obtain the logical value of the convergence judgement bits preserved on all the register 305 for convergence judgement bits in a short time of several micro seconds or so and thus shorten the convergence judging time while forming judgement of convergence independently of the processing for operations.

Next, explanation will be given on the forty-third embodiment of the present invention.

In the method of paralleling of thermal hydraulic value analysis by the method of division of area, the computation area is divided into areas in a number at least equal to that of element processors 3 and the computation of the respective area is assigned to the respective element processors 3. In the case where the communication system between element processors is set for low-speed remote access of message passing type as it is generally practiced, it is possible to realize parallel operations to some extent by averaging the calculation load by maintaining the number of lattice points assigned to the element processors 3 at about the same level but, when some unstable lattice points exist in the divided areas, a lot of repetitive operations are required before a solution of convergence is obtained because of the differences in the volume of processing of the element processors 3, and this produces an increase of the volume of processing of the element processors 3. For that reason, the multi-processor system is constructed by asynchronous communication system completely eliminating any latency due to waiting for synchronization of communication, and the number of lattice points to be mounted is changed for each element processor 3, to solve the above-mentioned problem.

Figure 78:
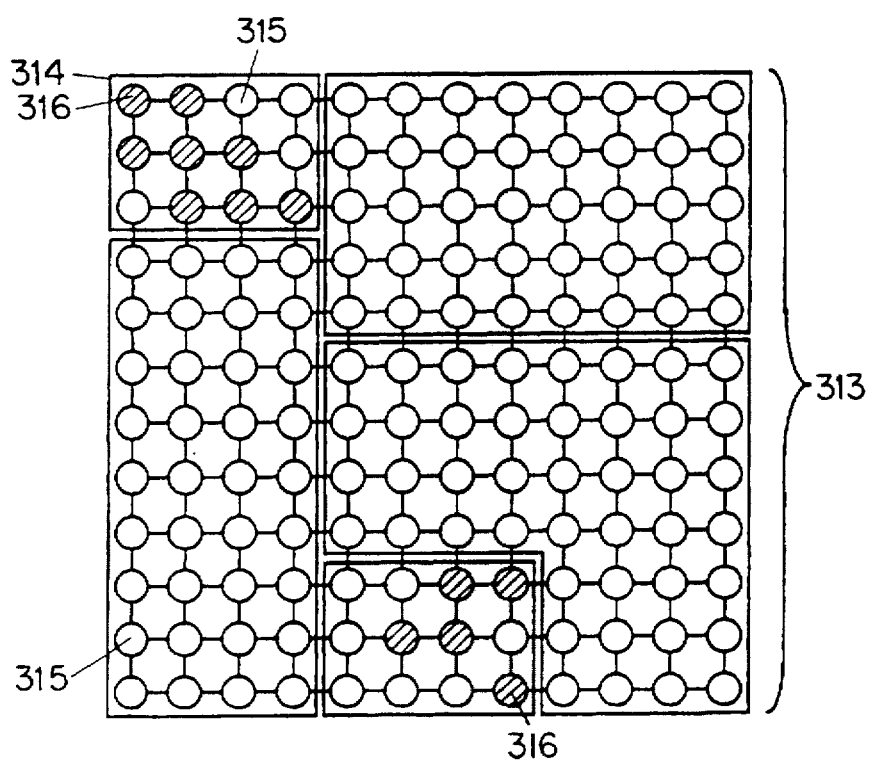
FIG. 78 is a conceptual drawing indicating form of division of the computation area including unstable lattice points for analysis according to the forty-third embodiment of the present invention.

FIG. 78 indicates the form of division of computation area including unstable lattice points for analysis. In FIG. 78, 313 is the entire computation area used for the analysis, 214 are divided areas to be taken charge by the respective element processors 3, 315 are ordinary lattice points, and 316 are unstable lattice points for analysis where some unstable factor such as chronological change of physical quantity, etc. exists. Factors producing instability of analysis include, for example, the points on which the speed of an object changes rapidly, the points on which the temperature changes rapidly, the points in vortex, the points on which a physical value changes in stationary, the points neighboring to the moving object or moving boundary, the points in the turning fluid, the singular points on the corner, the points of heat generation, the points of inflow & effluence of fluid, etc., points of movement of substance, etc. and points in their neighborhood.

Next, explanation will be given on actions.

In the element processors 3 taking charge of the divided areas 14 including unstable lattice points for analysis 316, the number of times of repetition up to obtainment of a spatial solution of convergence increases because the instability of the unstable lattice points for analysis 316 has influence on all lattice points in the divided areas 14. For that reason, the number of lattice points in the divided areas including unstable lattice points for analysis 316 is made smaller than the number of lattice points in other divided areas not including any unstable lattice points for analysis 316. This makes it possible to make up for the increase of processing volume due to increase of number of times of repetition by reducing the number of lattice points. Moreover, by adopting asynchronous communication system, it becomes possible to execute the computation of divided areas 314 including unstable lattice points for analysis 216 prior to the execution of stable divided areas 14 not including any unstable lattice points for analysis 316. As explained above, by combined use of asynchronous communication system and uneven distribution of lattice points, it becomes possible to increase the speed of operations for convergence even in a case where unstable areas are included in the computation area.

Next, explanation will be given on the forty-fourth embodiment of the present invention.

The computation circuit used in the element processors 3 explained in the first to fifth embodiments is mostly of synchronous system based on a clock provided in the element processors 3. This is because, at the present level of technology, the relation of reaction time of elements in the circuit (element delay)>delay due to transmission of information in the chips (wiring delay) is established.

However, the rapid progress of super high-speed element technology in recent years has enabled actions with an element delay of 10 ps with silicon semiconductor element, 5 ps with compound semiconductor element and 1 ps level with Josephson element. Moreover, in line with the progress of VLSI technology, the chip dimensions expanded to 15 mm×15 mm, and the number of mountable elements is going to increase up to 3 million pieces with logical LSI. If such pico-second LSI is realized, while the time up to outputting of the results of processing for an input in the element (element delay) is reduced, the time required for the information to pass through the wiring in the chips (wiring delay) which has so far been not questioned becomes non negligible. If a chip is constituted with an element having an element delay of 1 pico-second, the action in a single clock is guaranteed only up to a chip surface area of 0.3 mm×0.3 mm max. for the entire chip. So, by making a circuit design based on an in-processor asynchronous system which does not synchronize actions in the chip with a clock, it becomes possible to sharply improve the processing capacity of the element processors. Moreover, asynchronous system design provides such advantages as ① and ④, etc. to be described later and makes it possible to improve robustness and high-speed operation of the element processors 3 and eventually achieve high-speed thermal hydraulic analysis.

① Enables normal actions regardless of the amount of element delay according to the causal relations of transition of signals, achieving high-speed operation.

② Achieves high reliability by eliminating timing fluctuations even against external disturbances such as voltage fluctuations, temperature & environmental changes, etc. of the information processing system.

③ Facilitates the design work because no timing adjustment is required.

④ Does not require any electric power for generating clock and therefore provides an information processing system of low power consumption.

Asynchronous circuit having such characteristics can be used for the circuit in the element processors 3. So, explanation will be given hereafter on the basic construction of an asynchronous circuit.

An asynchronous system is an aggregate of functional modules constructed with asynchronous circuits mutually exchanging signals. If any request for processing is made from a certain functional module A to another functional module B, the actions to one request for processing between the functional modules A and B are completed with an exchange of 2 signals or a demand signal named "demand" indicating the request for processing between module A to module B and a response signal named "response" indicating notification of end of processing from module B to module A. However, in an asynchronous system, there is no need of any device for notifying the timing of arrival of those demand signal and response signal because no synchronizing clock exists. First, for control signals, if definition is given as "1" for "valid" and "0" for "invalid", the transition itself of either 0→1 or 1→0 expresses the timing of demand or response. What is to be questioned is a case where the exchanged signals are data signals. Usually, data signals are of single-wire system and can only be given in binary expressions, and there is no way of describing the timing of demand and response. As a solution to this problem, the exchange of data signals between a plural number of functional modules constructed with asynchronous circuits is made by using two-wire type data expressing 1-bit information with 2 signal wires. As two-wire type data expressions, there are 2-wire 2-phase system, 2-wire transition system, parity alternating system, etc. Among those systems, the 2-wire 2-phase system is highly flexible and enables simplification of circuit construction. So explanation will be given hereafter on a case where the data signal expression of 2-wire 2-phase system is used.

In the data expression of 2-wire 2-phase system, a-bit data D is expressed as in Formula 40 with two-wire signals (d1, d0).

$$D=0 \longleftrightarrow (d1,d0)=(0,1)$$
$$D=1 \longleftrightarrow (d1,d0)=(1,0)$$
$$D=\text{state of spacer } (d1,d0)=(0,0) \quad (40)$$

For example, to transfer "1", the system performs a series of actions of changing the pause phase (0, 0) to (1, 0) and, after the end of processing, resetting it to a state of spacer (0, 0) to get ready for the next data transfer.

Next, data transfer route based on this data expression of 2-wire 2-phase system will be examined hereafter.

Figure 79:
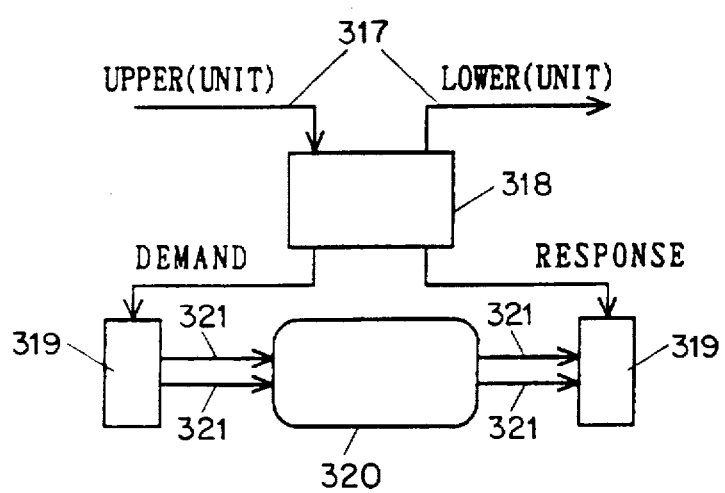
FIG. 79 is a block diagram indicating a model of data transfer route between registers according to the forty-fourth embodiment of the present invention.

FIG. 79 is a block diagram showing a model of data transfer route between registers based on the data expression of 2-wire 2-phase system. In FIG. 79, 317 are control signal buses for transferring control signals, 318 is a 2-wire 2-phase control module for resetting 2-wire 2-phase signals after the end of processing for demand & response, 319 are registers for temporarily storing signals, 320 is a two-wire logical circuit, and 321 are two-wire type data buses. It is to be noted, however, that the two-wire logical circuit 320 in the drawing is composed of a basic logical element constructed based on two-wire logic.

At the receipt of information of end of processing from the upper unit, the 2-wire 2-phase control module 318 generates a demand (transition 0→1). At this demand, two-wire data signal is read out from the transferring register 319. The data read out from the transferring register 319 is given to the two-wire logical circuit 320 through the two-wire type data bus 321 and is treated by the two-wire logical circuit 320. Moreover, the data treated by the two-wire logical circuit 320 is written in the destination register 319 through the two-wire type data bus 321. After that, the 2-wire 2-phase control module 318 which received the response (transition 0→1) generated by the register 319 transfers information of end of processing to the lower unit. Following the information of end of processing from the upper unit, a command for extinction of demand (1→0) is transferred from the upper unit, passes through the transferring register 319 to the logical circuit 320 up to the destination register 319 to put all the two-wire signals there in the state of spacer, and to eventually extinguish the response (transition 1→0) to terminate the operation.

The two-wire logical circuit 320 in FIG. 79 may be a circuit of whatever construction if only it is a circuit constructed by connecting basic logical elements such as two-wire type AND gate, OR gate, NOT gate, etc. For example, by realizing the entire processing unit 5 indicated in either of the first embodiment to the fifth embodiment with two-wire logical circuits 320, it becomes possible to realize high-speed operation in the element processors 3 even in case the wiring delay gets larger than the element delay.

Needless to say, asynchronous processing not using any clock can be applied to specific operation columns only and the same effects can be obtained also in this case.

It is also possible to use said different embodiments in combination.

While the invention has been shown and described in detail, the foregoing description is in all aspects illustrative and not restrictive. It is therefore understood that numerous modifications and variations can be devised without departing the scope of the invention.

We claim:

1. An information processing system, comprising:
   plural buses and plural element processors which are networked by said plural buses, each of said plural element processors respectively including:
      processing units for performing computing operations, and
      data memories for storing data regarding said computing operations for performing computation by assigning, using at least one governing equation of a field which is described in at least one prescribed equation by using said plural element processors, plural lattice points obtained by spatially dividing said field to said plural element processors; and
   plural data buses for providing mutual communications of said data between adjacent ones of said plural element processors,
   wherein said computation is performed by operating said plural element processors asynchronously and independently by using said data transmitted through said plural data buses, and wherein each of said plural element processors directly writes to or reads from said data memories of adjacent element processors through one of said plural buses for communication therebetween.

2. An information processing system, comprising:
   plural buses and plural element processors which are networked by said plural buses, each of said plural element processors respectively including:
      processing units for performing computing operations, and
      data memories for storing data regarding said computing operations for performing computation by assigning, using at least one governing equation of a field which is described in at least one prescribed equation by using said plural element processors, plural lattice points obtained by spatially dividing said field and plural time steps corresponding to identical ones of said lattice points to said plural element processors; and
   plural data buses for providing mutual communications of said data between adjacent ones of said plural element processors,
   wherein said computation is performed by operating said plural element processors asynchronously and independently by using said data transmitted through said plural data buses, and wherein each of said plural element processors directly writes to or reads from said data memories of adjacent element processors through one of said plural buses for communication therebetween.

3. The information processing system of claim 2, wherein said plural element processors comprise a pipeline of element processors in a direction of a time base, and form a plural number of two-dimensional planes arranged along the time base.

4. The information processing system of either claim 1 or claim 2, further comprising transmission means for transmitting initial conditions and boundary conditions to said element processors.

5. The information processing system of either of claim 1 or claim 2, wherein
   data communications between said adjacent element processors are performed individually for each of said element processors, asynchronously and repeatedly.

6. The information processing system of either claim 1 or claim 2, wherein
   data communications between said adjacent element processors are message communications and performed with a multiple instruction stream and a multiple data stream.

7. The information processing system of either claim 1 or claim 2, wherein said data memories comprise accessible memories which are directly accessible to adjacent ones of said plural element processors.

8. The information processing system of claim 7, wherein said accessible memories are writable by said adjacent ones of said plural element processors.

9. The information processing system of claim 7, wherein said accessible memories comprise multiport memories.

10. The information processing system of either claim 1 or claim 2, wherein said data memories comprise first memories shared by adjacent ones of said plural element processors which are directly readable and writable from a plural number of said plural element processors which are connected to said first memories.

11. The information processing system of either claim 1 or claim 2, further comprising buffer means for temporarily buffering access demands to said data memories.

12. The information processing system of either claim 1 or claim 2, wherein said element processors further comprise:
   buffer memories to which communicated data sent from adjacent ones of said plural element processors are written with an object name during communications between said adjacent ones of said plural element processors, and searching for said communicated data with said object name at a specified timing from said buffer memories.

13. The information processing system of either claim 1 or claim 2, wherein said element processors respectively have matching memories for waiting for said data which is necessary for at least one of said computing operations, and wherein at least one prescribed operation among said computing operations is performed in a corresponding one of said processing units at a point in a time sequence when said data which is necessary is available in a corresponding one of said matching memories.

14. The information processing system of either claim 1 or claim 2, wherein said element processors respectively further comprise program memories for rewriting a program controlling operations of said processing units.

15. The information processing system of claim 14, wherein said program memories comprise memories controlling processing of said lattice points by controlling the processing units to simultaneously execute a plural number of programs assigned to different areas of said program memories.

16. The information processing system of claim 15, further comprising a data flow system which includes a dynamic data driven system for simultaneously executing a single program on plural input data sets using identifiers.

17. The information processing system of either claim 1 or claim 2, wherein said processing units respectively comprise hardware circuits including arithmetic-logic elements which are wired in a shape based on a data flow graph according to a wired-logic for at least part of a data processing flow.

18. The information processing system of claim 17, wherein said processing units further respectively comprise arithmetic devices for directly executing operation codes for cumulatively adding 2N pieces of input data generated by respectively multiplying a first input by a second input, a third input by a fourth input, . . . , (2×N−1)-th input by a (2×N)-th input.

19. The information processing system of either claim 1 or claim 2, wherein the processing units respectively comprise hardware circuits according to a single wired-logic, said hardware circuits loading in advance said data memories of said plural element processors with internal point bits indicating that said plural lattice points are positioned inside a computing area in said field or outside an object in said computing area with respect to all of said plural lattice points, with external point bits indicating that said plural lattice points are positioned outside said computing area or inside said object in said computing area, and with boundary condition bits indicating information of boundary conditions with respect to said plural lattice points positioned on a boundary of said computing area, and said hardware circuits further comprise a controller to change a processing of a data flow graph according to said internal point bits, said external point bits and said boundary condition bits.

20. The information processing system of either claim 1 or claim 2, further comprising:

fine node couplings connecting adjacent ones of said plural element processors to each other, and coarse node couplings connecting processors of said plural element processors to each other by skipping no less than one of said plural element processors therebetween.

21. The information processing system of either claim 1 or claim 2, wherein said element processors respectively comprise output units for asynchronously reading output data, furnishing said output data with identifiers necessary for arranging sorting internal data, and sending said internal data to outside said plural element processors.

22. The information processing system of claim 21, further comprising an output data image processing unit for collecting said output data from said output units of said plural element processors and for generating visible images of said output data in real time based on said output data.

23. The information processing system of either claim 1 or claim 2, further comprising a coordinate conversion unit for converting a first coordinate system used by a host computer controlling said plural element processors to a second coordinate system used by said plural element processors when data are transferred from said host computer to said plural element processors, and for converting said second coordinate system used by said plural element processors to said first coordinate system used by said host computer when data are transferred from said plural element processors to said host computer.

24. The information processing system of either claim 1 or claim 2, wherein said plural element processors are integrally controlled by a host computer and respectively comprise first convergence judging units, provided in each of said plural element processors and independently of said processing units, for judging convergence without disturbing computation by said processing units, and wherein said information processing system further comprises:

first communication routes for dividing a plural number of said plural element processors into plural groups and for connecting said first convergence judging units of respective ones of said plural element processors into a unidirectional closed looped or into a centralized form in said plural groups;

second convergence judging units, connected to said first communication routes respectively, for integrating judgement results of convergence of all said first convergence judging units in said plural groups; and second communication routes for connecting all of the second convergence judging units of said plural groups in the unidirection closed loop or in the centralized form.

25. The information processing system of either claim 1 or claim 2, wherein said plural element processors each comprise at least one processing means, said system further comprising:

at least one route for transferring messages of a plurality of said plural element processors;

first convergence judging means for judging convergences on said plural element processors;

first message sending means for sending a first message indicating convergence on a prescribed element processor of said plural element processors when said first convergence judging means judges the convergence on said prescribed element processor or a respective processing means of said prescribed element processor;

second message sending means for sending a second message indicating the convergence on one of the plural element processor or the processing means based on receiving said first or second message from an adjacent element processor or an adjacent processing means after said adjacent element processor or said adjacent processing means received said first or second message; and second convergence judging means for judging the convergence of all said plural element processors by transferring said second message one after another through said at least one route by said second sending means.

26. The information processing system of claim 25, wherein said at least one route includes a plurality of different routes connecting said processing means, and said second convergence judging means confirms said convergence of all said plural element processors in a multiplex fashion by the messages transferred one after another through said plurality of different routes.

27. The information processing system of either claim 1 or claim 2, wherein said plural element processors share said data memories between adjacent element processors, and each of said plural element processors comprises an input/output control unit commonly connected to a subset of said plural data memories shared with said adjacent element processors for controlling input/output of data with one of said subset of said plural data memories by switching a direction of communication according to a demand for access.

28. The information processing system of either claim 1 or claim 2, further comprising plural registers provided in correspondence to said plural element processors for temporarily storing results of a judgement of a convergence of an operation executed by each of said plural element processors; and a wired OR circuit for generating a logical product of an output of said plural registers.

29. An information processing method for use with plural element processors respectively including: processing units for performing computing operations, and data memories for storing data regarding said computing operations, the method comprising the steps of:

spatially dividing a field which is described in at least one prescribed equation by using at least one governing equation, assigning plural lattice points obtained by spatially dividing to said plural element processors, and communicating adjacent ones of said plural element processors using plural data buses with said plural element processors directly writing to or reading from data memories of said adjacent ones, operating said plural element processors asynchronously and independently by using said data transmitted through said plural data buses.

30. An information processing method for use with plural element processors respectively including: processing units for performing computing operations, and data memories for storing data regarding said computing operations, the method comprising the steps of:

spatially dividing a field and plural time steps which are described in at least one prescribed equation by using at least one governing equation, assigning plural lattice points obtained by spatially dividing to said plural element processors, and communicating adjacent ones of said plural element processors using plural data buses with said plural element processors directly writing to or reading from data memories of said adjacent ones.

31. The information processing method of claim 30, further comprising the step of pipelining said plural element processors into a pipeline of element processors in a direction of a time base, and forming a plural number of two-dimensional planes arranged along the time base to be constructed three-dimensionally, when a two-dimensional analytical solution is looked for.

32. The information processing method of either claim 29 or claim 30, wherein said at least one prescribed equation includes at least one differential equation, and said at least one prescribed equation obtains the solution to said at least one differential equation by operating said element processors asynchronously and independently by finite difference method.

33. The information processing method of claim 32, wherein said at least one prescribed differential equation includes at least one partial differential equation or at least one ordinary differential equation.

34. The information processing method of either claim 29 or claim 30, wherein said element processors take charge of computation of a plural number of lattice points obtained by spatially dividing said field respectively, and the number corresponding to said lattice points or the base address of the data area corresponding to said lattice points on said data memories are used as input tokens to control said computation performed by said element processors.

35. The information processing method of either claim 29 or claim 30, further comprising the step of transmitting initial conditions and boundary conditions to said plural element processors.

36. The information processing method of claim 35, wherein said data memories comprise multiport memories.

37. The information processing method of either claim 29 or claim 30, wherein the step of communicating comprises asynchronously and repeatedly communicating said data between adjacent processors of said plural element processors individually for each of said plural element processors.

38. The information processing method of either claim 29 or claim 30, wherein the step of communicating comprises communicating said data using a multiple instruction stream and a multiple data stream.

39. The information processing method of either claim 29 or claim 30, wherein said data memories comprise first memories shared by adjacent ones of said plural element processors which are directly readable and writable from a plural number of said plural element processors which are connected to said first memories.

40. The information processing method of either claim 29 or claim 30, further comprising the step of temporarily buffering access demands to said data memories by buffer means.

41. A information processing method as claimed in either claim 29 or 30 further comprising the steps of:

sending communicated data to buffer memories of adjacent ones of said element processors, said communicated data including an object name; and searching for said communicated data in said buffer memories using said object name at a specific timing.

42. The information processing method of either claim 29 or 30, further comprising the step of waiting for said data which is necessary for at least one of said computing operations to be written to matching memories, and performing at least one prescribed operation among said computing operations in a corresponding one of said processing units at a point in a time sequence when said data which is necessary is available in a corresponding one of said matching memories.

43. The information processing method of either claim 29 or claim 30, further comprising the step of controlling said processing units using a program written into program memories of said element processors.

44. The information processing method of either claim 29 or claim 30, further comprising the steps of:

loading in advance said data memories of said plural element processors with internal point bits indicating that said plural lattice points are positioned inside a computing area in said field or outside an object in said computing area with respect to all of said plural lattice points, with external point bits indicating that said plural lattice points are positioned outside said computing area or inside said object in said computing area, and with boundary condition bits indicating information of boundary conditions with respect to said plural lattice points positioned on a boundary of said computing area, and changing a processing of a data flow graph according to said internal point bits, said external point bits and said boundary condition bits.

45. The information processing method of either claim 29 or claim 30, wherein the step of controlling comprises controlling processing of said lattice points by controlling said processing units to simultaneously execute a plural number of programs assigned to different areas of said program memories.

46. The information processing method of claim 45, further comprising the step of simultaneously executing a single program on plural input data sets using identifiers according to a data flow system which includes a dynamic data driven system.

47. The information processing method of claim 46, wherein said processing units calculate the address of said data memories which store data regarding said adjacent element processors and make reference to and renewal of said data memories by using the address of said data memories, based on the value of said identifiers assigned to said input data.

48. The information processing method of either claim 29 or claim 30, wherein said processing units respectively have hardware circuits in which arithmetic-logic elements are wired in the shape based on a data flow graph according to the wired-logic for part or whole of the data processing flow.

49. The information processing method of claim 29, wherein the step of communicating comprises:

leveling a number of times each of said lattice points communicates by performing dummy communications even for lattice points of said lattice points with small number of communications when solving said at least one governing equation of said field so that said lattice points on border areas communicate equally.

50. The information processing method of either claim 29 or claim 30, wherein said processing units respectively have hardware circuits according to one same wired-logic, said hardware circuits load in advance said data memories of said element processors with internal point bits indicating that said plural lattice points are positioned inside a computing area in said field or outside an object in said computing area with respect to all of said plural lattice points, with said external point bits indicating that said plural lattice points are positioned outside said computing area or inside said object in said computing area, and said hardware circuits change the processing of the data flow graph according to said internal point bits, said external point bits and said boundary condition bits.

51. The information processing method of either claim 29 or claim 30, further comprising the steps of:

multiplying a first input by a second input, a third input by a fourth input, . . . , and $(2 \times N-1)$-th input; and by a $(2 \times N)$-th input; and cumulatively adding 2N pieces of input data generated by said multiplying step.

52. The information processing method of either claim 29 or claim 30, wherein the step of computing comprises leveling the number of operations at all of said lattice points are performed by performing dummy operations even for said lattice points on border areas.

53. The information processing method of either claim 29 or claim 30, wherein the step of computing comprises computing finite differences at each of said lattice points to find a solution to a differential equation; and wherein the step of communicating comprises communicating between adjacent lattice points of said plural lattice points, information indicating the necessity or not of communication and a method of communication for each of said plural lattice points.

54. The information processing method of either claim 29 or claim 30, wherein the step of computing finite differences comprises assigning a memory area to each of said plural lattice points, and wherein said step of communicating between adjacent lattice points comprises providing each of said lattice points with information for indicating said memory area to be used for communication in each direction when communicating.

55. The information processing method of claim 54, further comprising the step of indicating a common dummy area in each direction where communication is impossible.

56. The information processing method of claim 54, wherein the step of assigning comprises assigning a virtual data area simulating lattice points which are closest to a border of a computation area and found outside said computation area.

57. The information processing method of either claim 29 or claim 30, wherein the step of communicating comprises:

transmitting, between adjacent element processors, change in data value between iterations, only if said change is no larger than a prescribed value.

58. The information processing method of either claim 29 or claim 30, further comprising the steps of:

coupling together adjacent ones of said plural element processors using fine node couplings; and coupling together, using coarse node couplings, said plural element processors by skipping no less than one of said plural element processors therebetween.

59. The information processing method of claim 58, wherein wherein said step of computing comprises computing said at least one prescribed equation by alternately performing 1) computation by said plural element processors connected by said coarse node coupling and 2) computation by said plural element processors connected by said free node coupling.

60. The information processing method of either claim 29 or claim 30, wherein the step of computing comprises partially calculating
said at least one governing equation of said field using only part of said plural lattice points selected, and completely calculating in parallel said at least one governing equation of said field using all of said plural lattice points.

61. The information processing method of claim 60, wherein the steps of partially and completely calculating utilize different algorithms.

62. The information processing method of claim 61, further comprising the step of stopping calculation if an amount of change between iterations is no larger than a prescribed amount.

63. The information processing method of claim 62, wherein the step of stopping comprises reducing the amount of change required for stopping based on a rate of convergence.

64. The information processing method of either claim 29 or claim 30, comprising the steps of:
asynchronously reading output data using said element processors,
furnishing said output data with identifiers necessary for arranging sorting internal data, and
sending said internal data to outside said plural element processors.

65. The information processing method of claim 64, further comprising the steps of collecting said output data from said plural element processors, and generating visible images of said output data in real time based on said output data.

66. The information processing method of either claim 29 or claim 30, further comprising the steps of converting a first coordinate system used by a host computer controlling said plural element processors to a second coordinate system used by said plural element processors when data are transferred from said host computer to said plural element processors, and
converting said second coordinate system used by said plural element processors to said first coordinate system used by said host computer when data are transferred from said plural element processors to said host computer.

67. The information processing method of either claim 29 or claim 30, further comprising the steps of:
integrally controlling said plural element processors using a host computer,
judging convergence without disturbing computation by the processing units, and
dividing a plural number of said plural element processors into plural groups; and
connecting said convergence judging units of respective ones of said plural element processors into a unidirectional closed looped or into a centralized form in said plural groups; and
integrating judgement results of convergence of all said first convergence judging units in said plural groups.

68. The information processing method of either claim 29 or claim 30, wherein
the step of computing further comprises the steps of:
(a) judging convergences on each of said plural element processors or no less than one processing means assigned to each of said plural element processors;
(b) sending a first message indicating a prescribed element processor or a processing means of said prescribed element, when said information processing system judges the convergence on said prescribed element processor or said processing means of said prescribed element;
(c) sending a second message indicating the convergence on the element processor or the processing means receiving said first or second message from an adjacent element processor or an adjacent processing means after said adjacent element processor or said adjacent processing means receives said first or second message; and
(d) judging the convergence of all said plural element processors by transferring said second message one after another by repeating said step (c).

69. The information processing method of claim 68, further comprising the step of repeating said step (a) to step (d) for a plurality of confirmations of said convergence of all said plural element processors.

70. The information processing method of claim 69, further comprising the step of confirming said convergence of all said element processors in a multiplex fashion by receiving the messages transferred one after another through a plurality of different routes.

71. The information processing method of claim 70, wherein the step d) of judging comprises the steps of:
determining general convergence; and
stopping processing of all said plural element processors or said processing means after determining general convergence.

72. The information processing method of either claim 29 or 30, further comprising steps of:
initializing a storing means for storing the results of judgement of convergence; and
judging convergence or not of the computation of said lattice points of said plural element processors,
judging if convergence has not yet been reached, and
setting said storing means to a prescribed logical value if said judging step determines that said convergence has not yet been reached.

73. The information processing method of either claim 29 or claim 30, further comprising the steps of:
sharing said data memories between a number of adjacent element processors,
controlling input/output of data with one of the plural data memories by switching a direction of communication according to a demand for access, and
accessing, using said plural element processors, a contents of said data memories.

74. The information processing method of either claim 29 or claim 30, further comprising the steps of:
temporarily storing, in plural registers provided in correspondence to said plural element processors, results of judgement of a convergence of corresponding element processors, and taking a logical product of said results of judgement stored in said plural registers with the wired OR circuit, while executing operations.

75. The method of computation performed by using an information processing system of either claim 29 or claim 30, wherein
the number of lattice points per one element processor including lattice points for analysis in which lattice factors exist is smaller than the number of lattice points per one element processor not including any unstable points for analysis.

76. The information processing method of either claim 29 or claim 30, further comprising the steps of:
- judging convergences on said plural element processors or on a corresponding processing means assigned to each of said plural element processors;
- sending a first message indicating the convergence on a prescribed element processor based on said judging step;
- sending a second message indicating the convergence on the element processor or the processing means receiving said first or second message from an adjacent element processor or an adjacent processing means after said adjacent element processor or said adjacent processing means receives said first or second message; and
- judging the convergence of all said plural element processors by transferring said second message one after another through said at least one route by said second sending means.

77. The information processing method of claim 76, wherein the step of judging the convergence of all said plural element processors comprises determining convergence of all said plural element processors in a multiplex fashion using the messages transferred one after another through said plurality of different routes.

* * * * *